(12) United States Patent
Kubota

(10) Patent No.: US 9,989,743 B2
(45) Date of Patent: Jun. 5, 2018

(54) PROJECTION ZOOM LENS

(71) Applicant: Takashi Kubota, Suginami-ku (JP)

(72) Inventor: Takashi Kubota, Suginami-ku (JP)

(73) Assignee: RICOH COMPANY, LTD., Tokyo (JP)

(*) Notice: Subject to any disclaimer, the term of this patent is extended or adjusted under 35 U.S.C. 154(b) by 21 days.

(21) Appl. No.: 15/453,543

(22) Filed: Mar. 8, 2017

(65) Prior Publication Data

US 2017/0176729 A1    Jun. 22, 2017

Related U.S. Application Data

(63) Continuation of application No. 14/142,088, filed on Dec. 27, 2013, now Pat. No. 9,638,903.

(30) Foreign Application Priority Data

Dec. 28, 2012  (JP) .................. 2012-288356
Dec. 28, 2012  (JP) .................. 2012-289126

(Continued)

(51) Int. Cl.
  *G02B 15/14*   (2006.01)
  *G02B 15/177*  (2006.01)
  *G02B 13/16*   (2006.01)

(52) U.S. Cl.
  CPC ........... *G02B 15/177* (2013.01); *G02B 13/16* (2013.01)

(58) Field of Classification Search
  CPC ................................................ G02B 15/177

(Continued)

(56) References Cited

U.S. PATENT DOCUMENTS 5,253,113 A   10/1993   Sekita et al.
5,576,890 A   11/1996   Tanaka (Continued)

FOREIGN PATENT DOCUMENTS

CN   1417616 A    5/2003
CN   1550818 A   12/2004

(Continued)

OTHER PUBLICATIONS

Chinese Office Action and Search Report issued in Patent Application No. 201310745356.3 dated Aug. 20, 2015 (w/ English Translation).

(Continued)

*Primary Examiner* — James Jones
(74) *Attorney, Agent, or Firm* — Oblon, McClelland, Maier & Neustadt, L.L.P.

(57) ABSTRACT

Disclosed is a projection zoom lens used in an image display device configured to project an image onto a target projection surface and display a magnified image of the image, in which the projection zoom lens has a five-lens-group configuration in which first to fifth lens groups G1 to G5 are arranged from the magnification side toward the reduction side, and each of the constituent lens groups or lenses included in the lens groups has a combination of negative and positive refractive powers, and in the lens configuration, focal lengths of the constituent lens groups, relative travel distances, lens distances to the image display element, and constituent lens shapes are properly selected.

17 Claims, 59 Drawing Sheets

(30) Foreign Application Priority Data

| Dec. 28, 2012 | (JP) | 2012-289149 |
| Dec. 28, 2012 | (JP) | 2012-289152 |
| Dec. 28, 2012 | (JP) | 2012-289157 |
| Apr. 30, 2013 | (JP) | 2013-095867 |
| Apr. 30, 2013 | (JP) | 2013-095878 |
| Jun. 13, 2013 | (JP) | 2013-124781 |
| Oct. 4, 2013 | (JP) | 2013-209598 |
| Oct. 4, 2013 | (JP) | 2013-209631 |
| Oct. 4, 2013 | (JP) | 2013-209636 |
| Oct. 4, 2013 | (JP) | 2013-209644 |
| Oct. 4, 2013 | (JP) | 2013-209678 |

(58) Field of Classification Search

USPC .................................................... 359/680

See application file for complete search history.

(56) References Cited

U.S. PATENT DOCUMENTS

| 6,191,896 | B1 | 2/2001 | Itoh |
| 6,233,099 | B1 | 5/2001 | Itoh |
| 6,639,737 | B2 | 10/2003 | Yasui et al. |
| 2002/0097502 | A1 | 7/2002 | Nakazawa et al. |
| 2002/0122262 | A1 | 9/2002 | Nanba |
| 2003/0103266 | A1 | 6/2003 | Wada |
| 2003/0140049 | A1 | 7/2003 | Radatti |
| 2004/0257644 | A1 | 12/2004 | Nishida |
| 2005/0036207 | A1 | 2/2005 | Yamasaki et al. |
| 2011/0002046 | A1 | 1/2011 | Wada |
| 2011/0038054 | A1 | 2/2011 | Maeda |
| 2011/0128637 | A1 | 6/2011 | Kubota |
| 2011/0249344 | A1 | 10/2011 | Nagatoshi et al. |
| 2011/0310496 | A1 | 12/2011 | Kubota et al. |
| 2011/0317285 | A1 | 12/2011 | Ohashi et al. |
| 2012/0147485 | A1 | 6/2012 | Kubota |
| 2012/0212835 | A1* | 8/2012 | Kimata ............... G02B 15/177 359/693 |
| 2013/0094095 | A1 | 4/2013 | Minefuji |
| 2013/0194488 | A1 | 8/2013 | Kubota et al. |
| 2013/0194681 | A1 | 8/2013 | Ohashi et al. |
| 2013/0308105 | A1 | 11/2013 | Kubota |
| 2014/0063612 | A1 | 3/2014 | Kubota |
| 2014/0126067 | A1 | 5/2014 | Nagahara et al. |
| 2014/0185144 | A1* | 7/2014 | Kubota ............... G02B 13/16 359/680 |

FOREIGN PATENT DOCUMENTS

| CN | 1580856 A | 2/2005 |
| JP | 4-116613 | 4/1992 |
| JP | 5-313066 | 11/1993 |
| JP | 06-134883 | 5/1994 |
| JP | 07-043613 | 2/1995 |
| JP | 7-49453 | 2/1995 |
| JP | 07-159689 | 6/1995 |
| JP | 8-86964 | 4/1996 |
| JP | 8-110470 | 4/1996 |
| JP | 11-167063 | 6/1999 |
| JP | 11-295599 | 10/1999 |
| JP | 2001-337275 A | 12/2001 |
| JP | 2002-107619 A | 4/2002 |
| JP | 2002-311330 | 10/2002 |
| JP | 2003-149552 | 5/2003 |
| JP | 2004-37924 | 2/2004 |
| JP | 2004-37966 | 2/2004 |
| JP | 2004-226510 | 8/2004 |
| JP | 2005-043607 | 2/2005 |
| JP | 2005-49843 | 2/2005 |
| JP | 2005-055625 | 3/2005 |
| JP | 2005-266173 | 9/2005 |
| JP | 2005-266174 | 9/2005 |
| JP | 2005-309124 | 11/2005 |
| JP | 2006-039034 | 2/2006 |
| JP | 2006-058584 | 3/2006 |
| JP | 2006-98962 | 4/2006 |
| JP | 2007-156268 | 6/2007 |
| JP | 2007-286233 | 11/2007 |
| JP | 2008-145639 | 6/2008 |
| JP | 2009-031659 | 2/2009 |
| JP | 2009-169051 | 7/2009 |
| JP | 2010-176099 | 8/2010 |
| JP | 2010-197742 | 9/2010 |
| JP | 2010-211056 | 9/2010 |
| JP | 2010-266577 | 11/2010 |
| JP | 2011-2817 | 1/2011 |
| JP | 2011-13469 | 1/2011 |
| JP | 2011-53663 | 3/2011 |
| JP | 2011-069959 | 4/2011 |
| JP | 2011-227124 | 11/2011 |
| JP | 2012-063568 | 3/2012 |
| JP | 2012-173420 | 9/2012 |
| JP | 2012-189971 | 10/2012 |
| JP | 2012-230209 | 11/2012 |
| JP | 2013-024965 | 2/2013 |
| WO | 2013/001804 A1 | 1/2013 |

OTHER PUBLICATIONS

Chinese Office Action and Search Report issued in Patent Application No. 201310744012.0 dated Aug. 31, 2015 (w/ English Translation).

U.S. Office Action issued in U.S. Appl. No. 14/142,122 dated Jan. 22, 2016.

Chinese Office Action and Search Report issued in Patent Application No. 201310744012.0 dated Apr. 19, 2016 (w/ English Translation).

U.S. Office Action issued in U.S. Appl. No. 14/142,122 dated Sep. 28, 2016.

Japanese Office Action issued in Application No. 2013-209631 dated Dec. 20, 2016.

Japanese Office Action issued in Application No. 2013-209636 dated Dec. 20, 2016.

Japanese Office Action issued in Application No. 2013-209644 dated Dec. 20, 2016.

Japanese Office Action issued in Application No. 2013-209646 dated Jan. 10, 2017.

Japanese Office Action issued in Application No. 2013-209647 dated Jan. 10, 2017.

Japanese Office Action issued in Application No. 2013-209678 dated Dec. 27, 2016.

Japanese Office Action issued in Application No. 2013-209598 dated Dec. 6, 2016.

* cited by examiner

FIG. 1
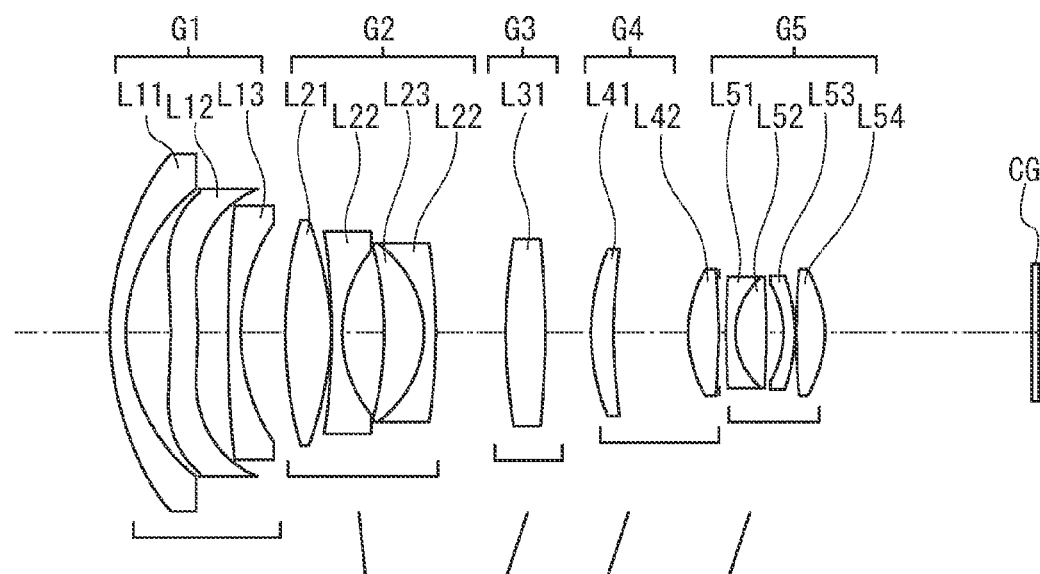
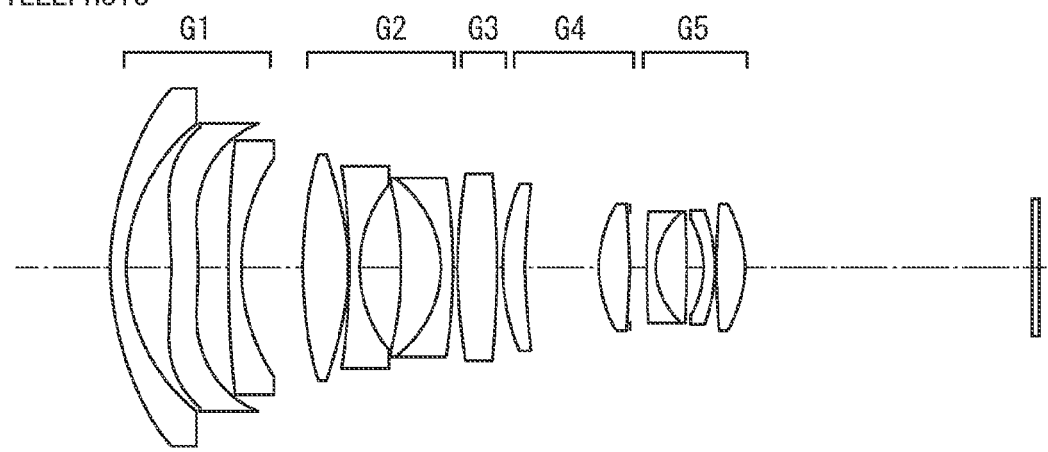

FIG. 3
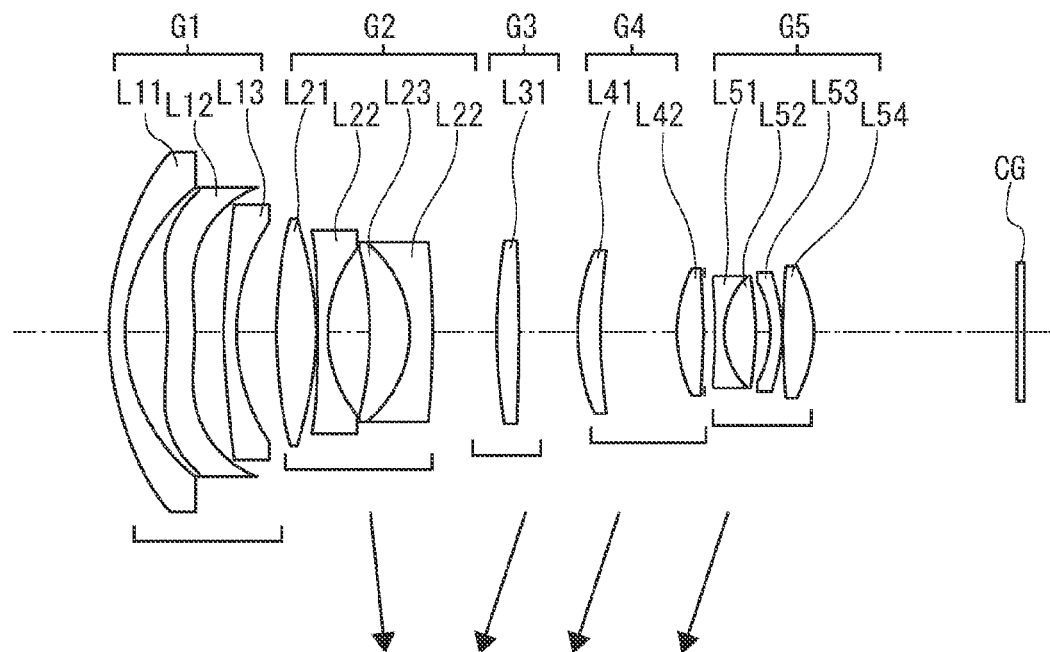
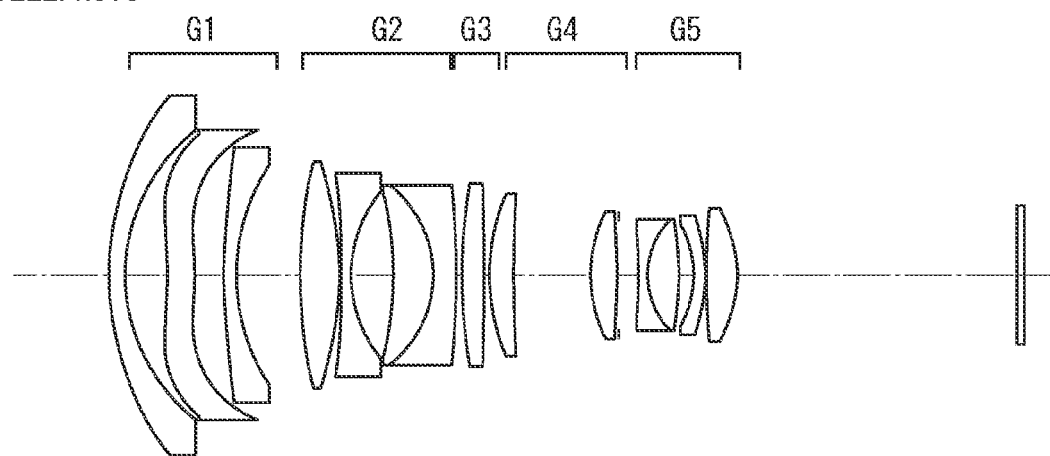

FIG. 5
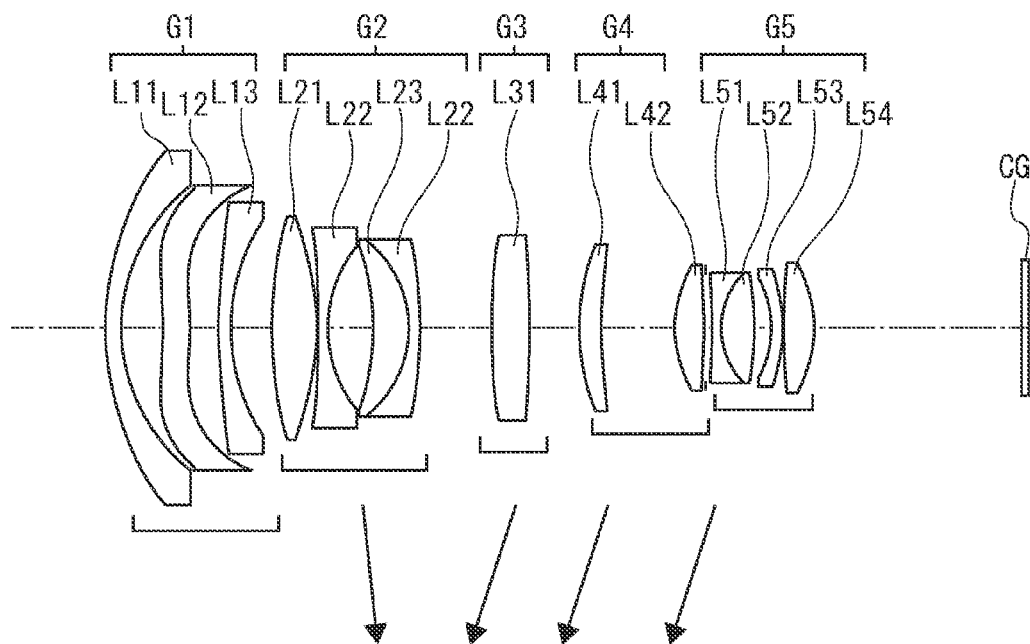
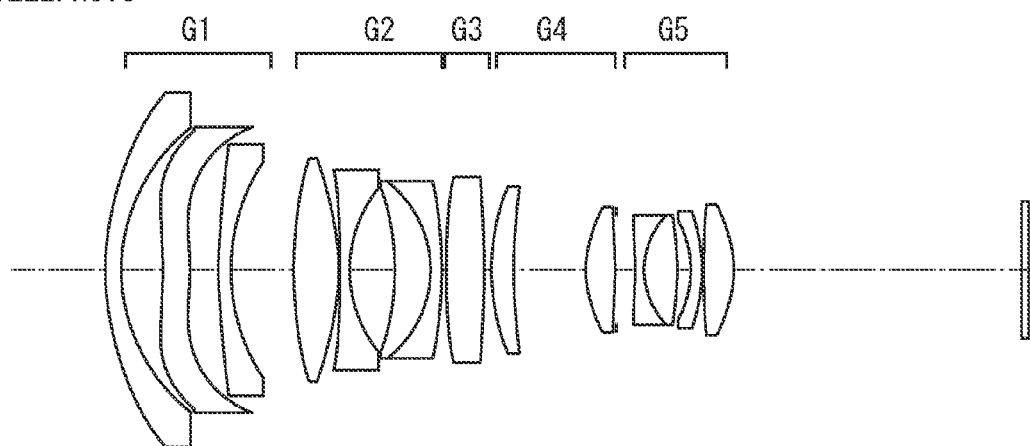

FIG. 7
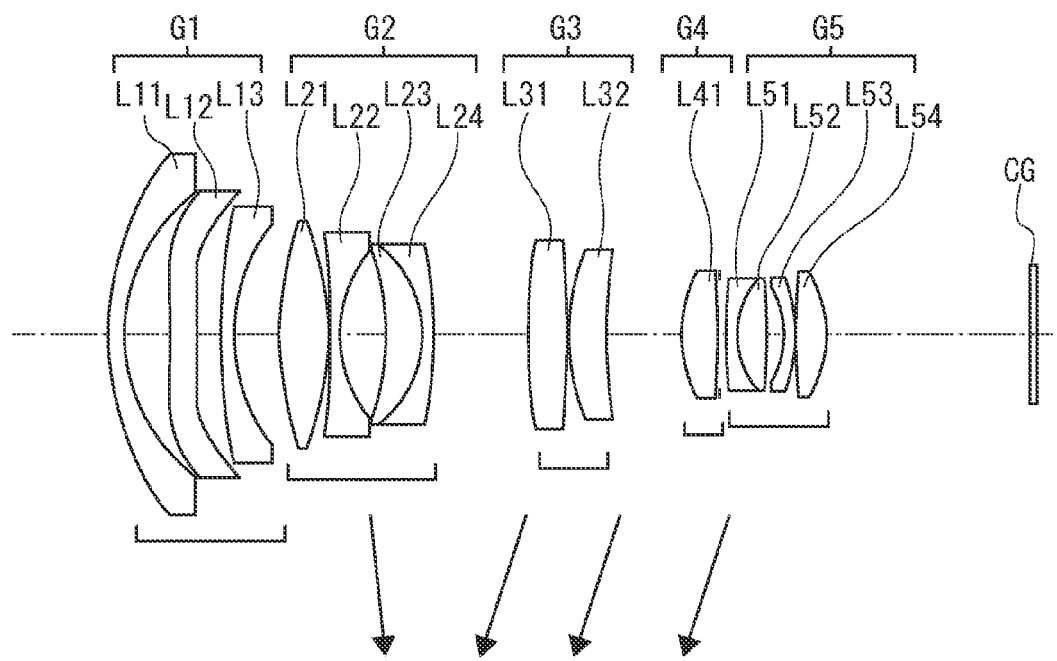
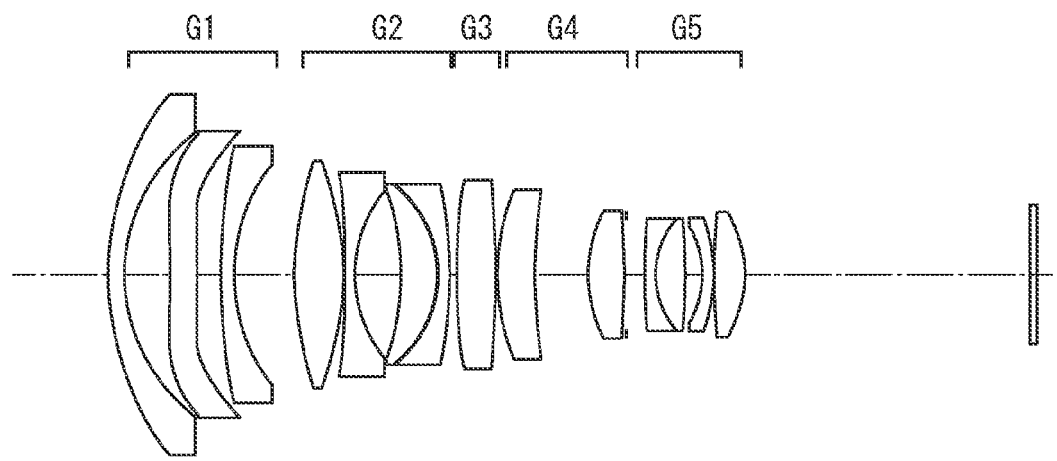

FIG. 9
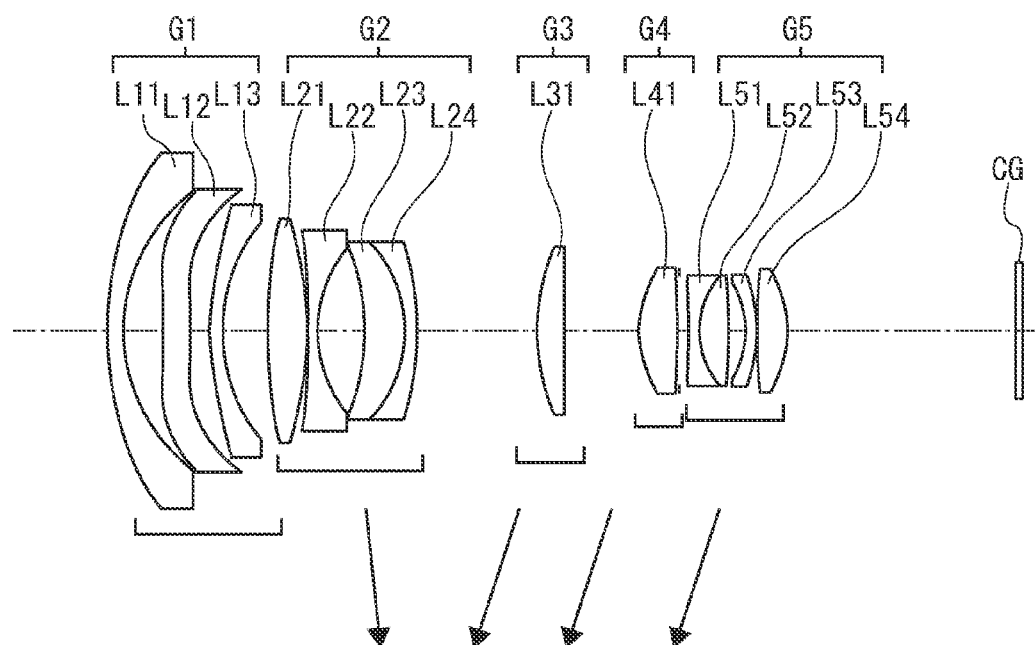
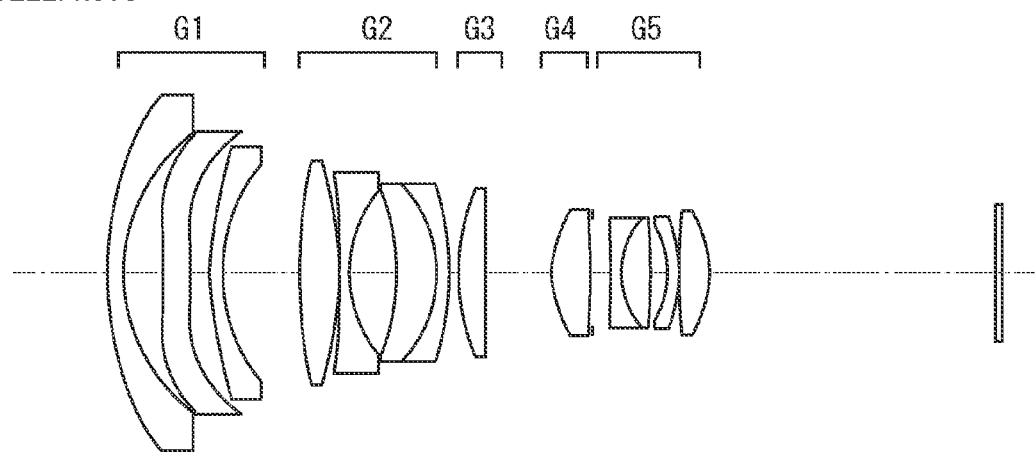

FIG.11
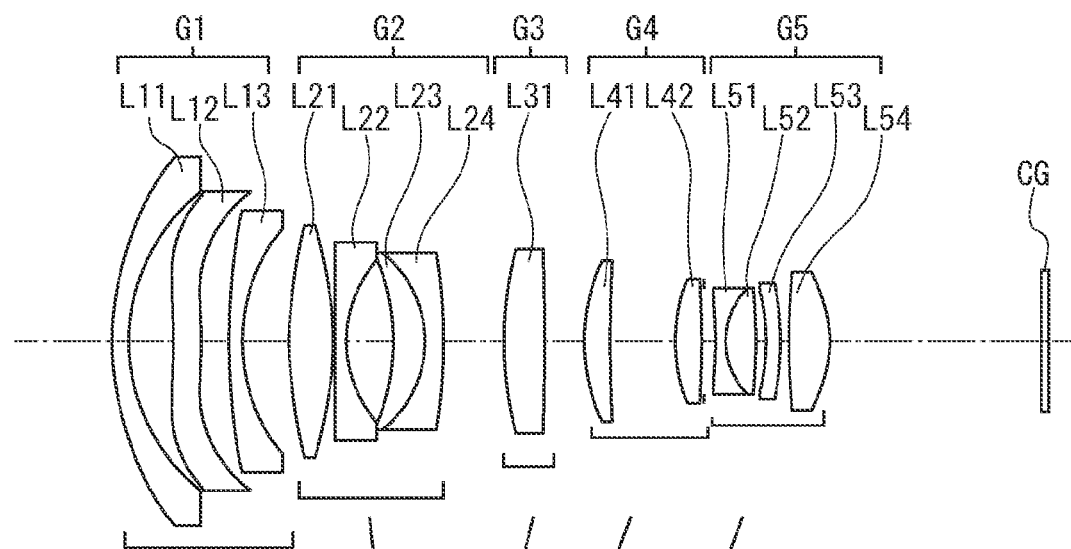
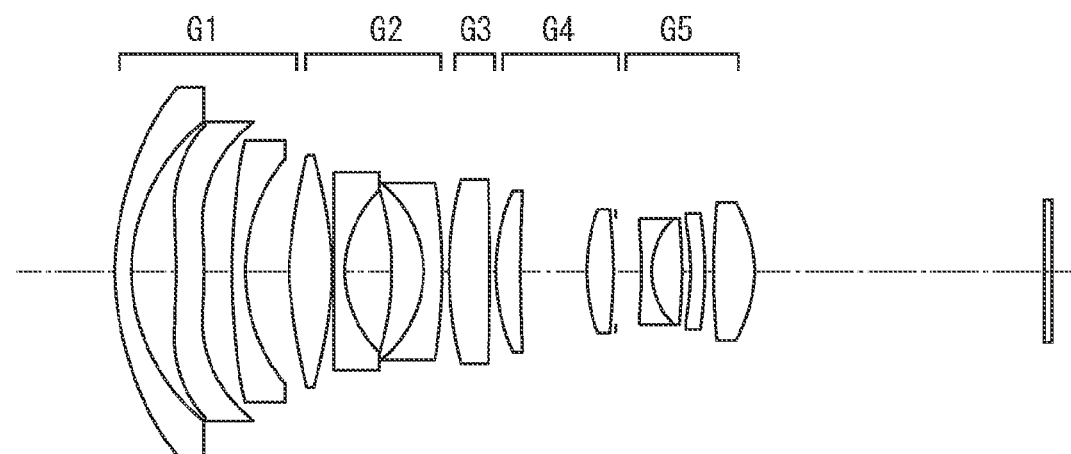

FIG.13
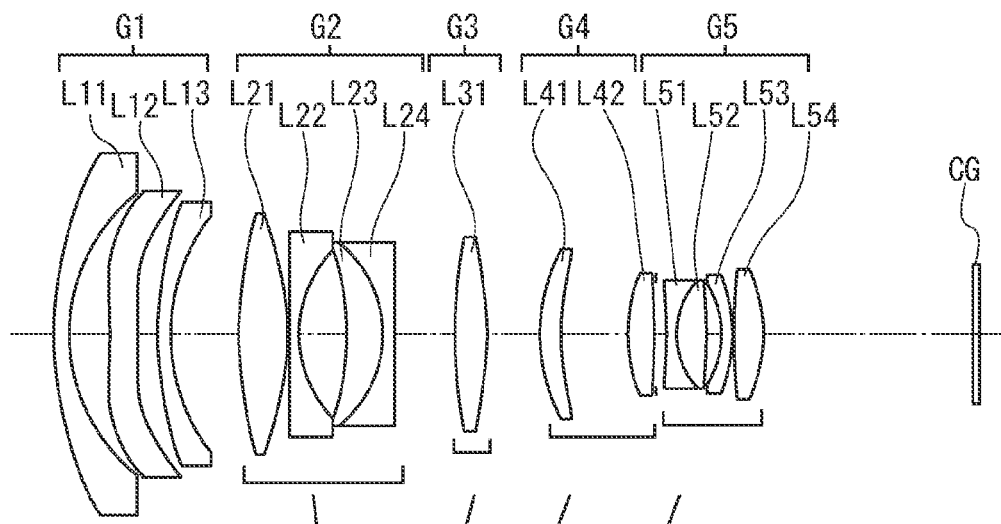
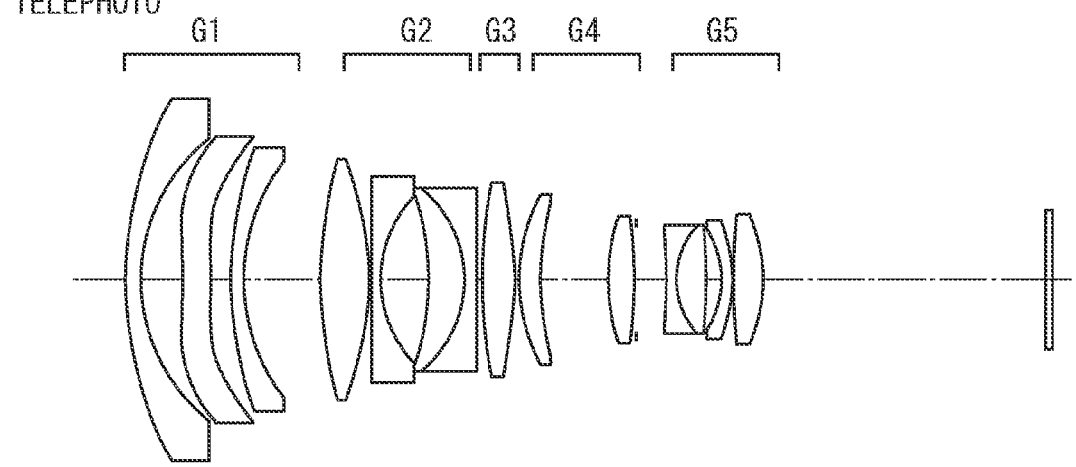

FIG.15
WIDE ANGLE
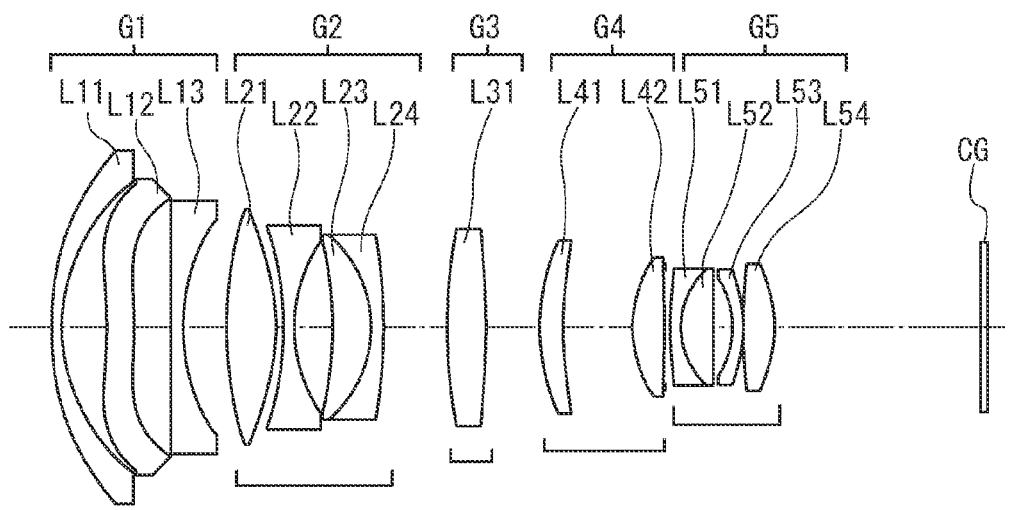
TELEPHOTO
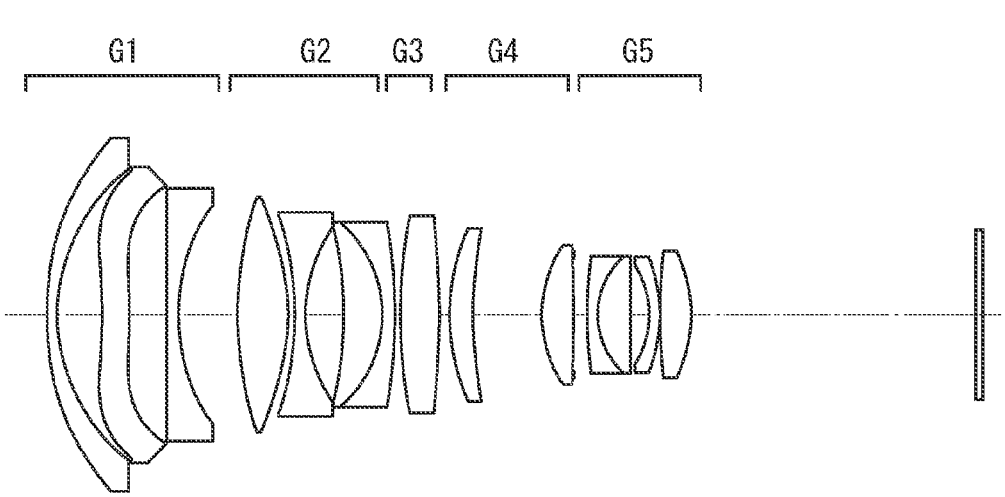

FIG.17
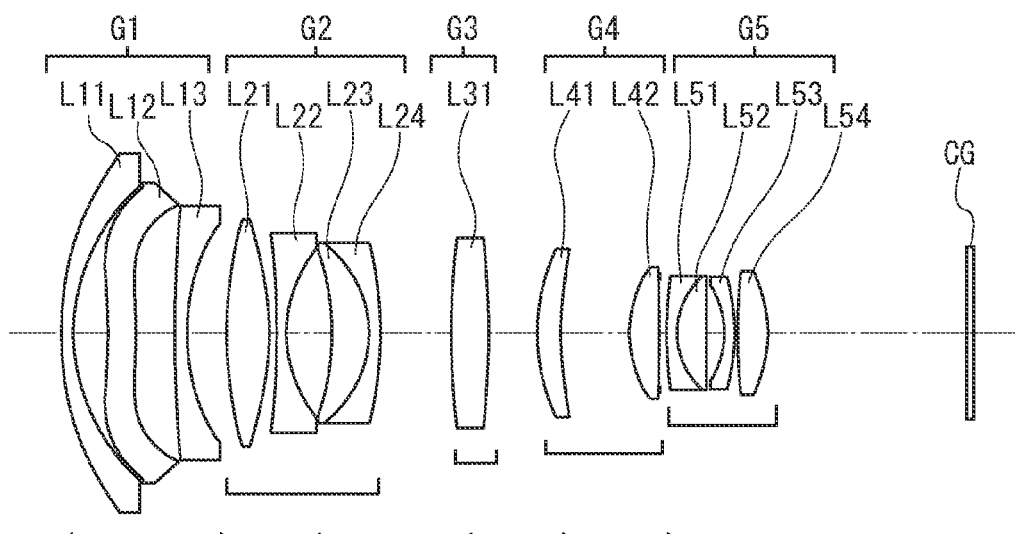
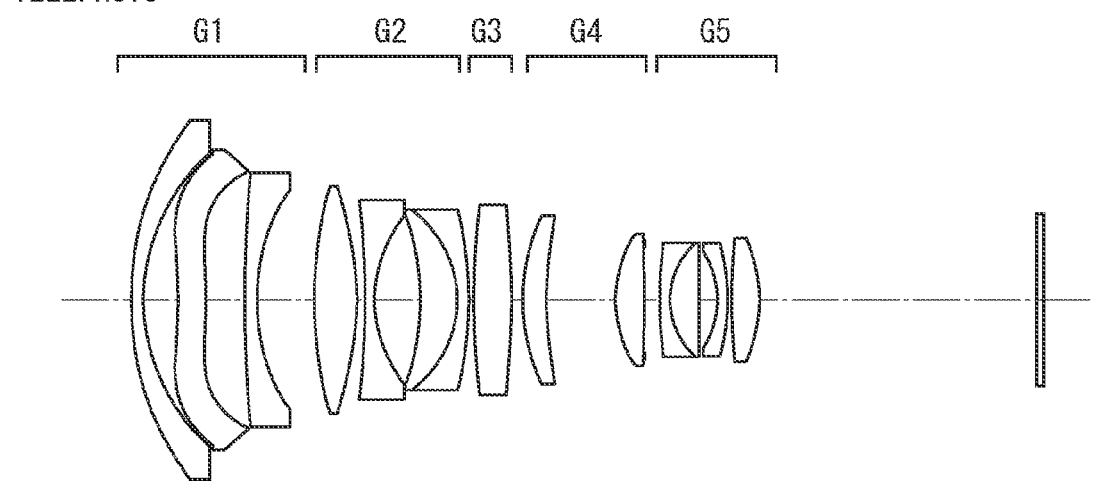

FIG.19
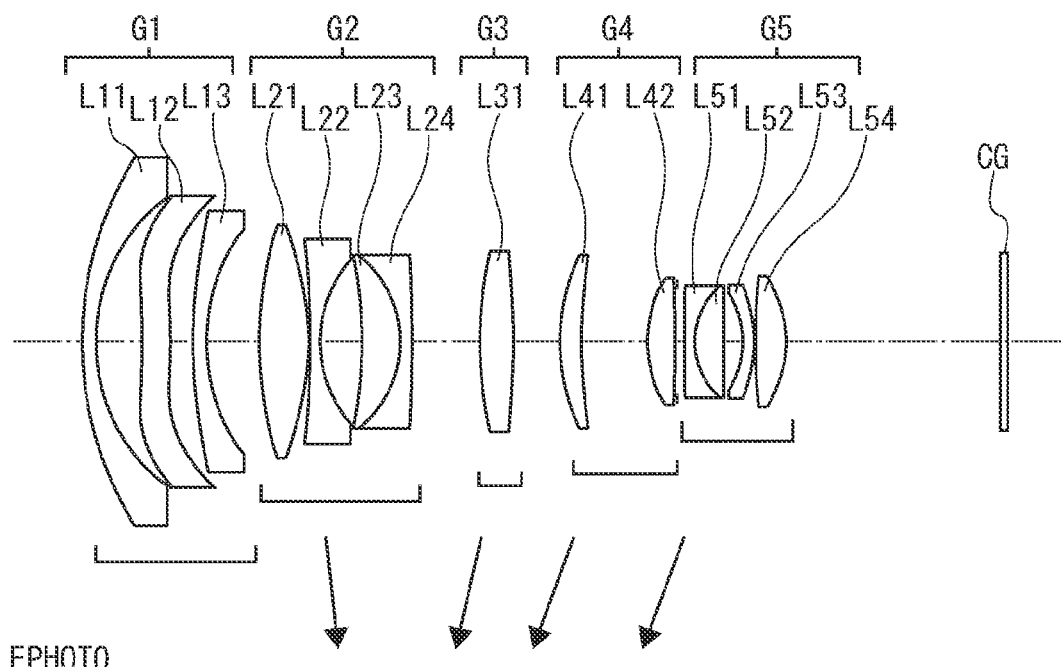
WIDE ANGLE
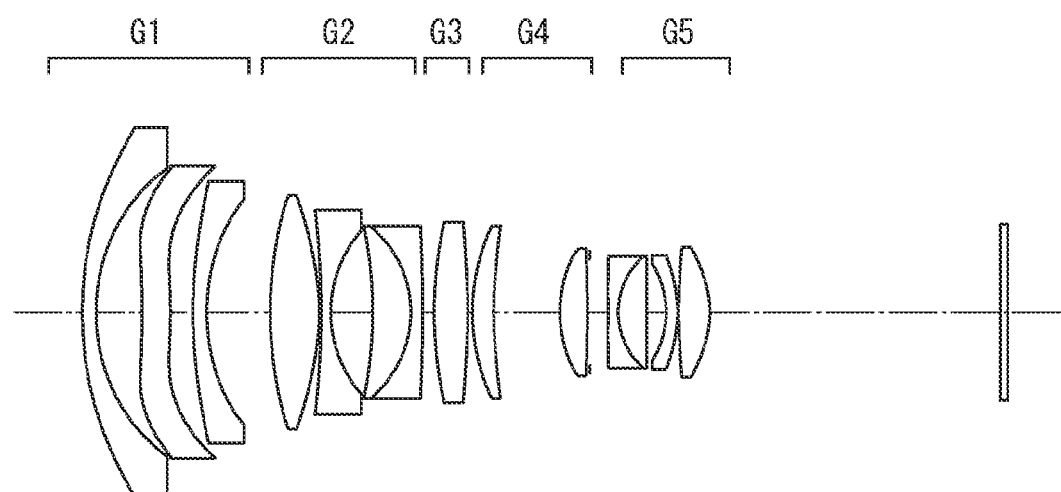
TELEPHOTO

FIG.27
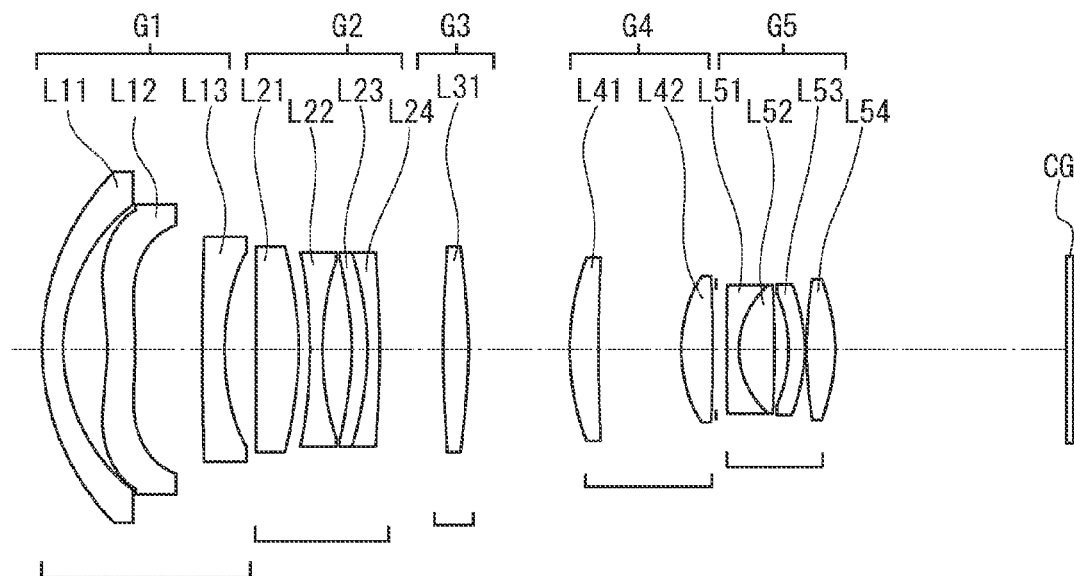
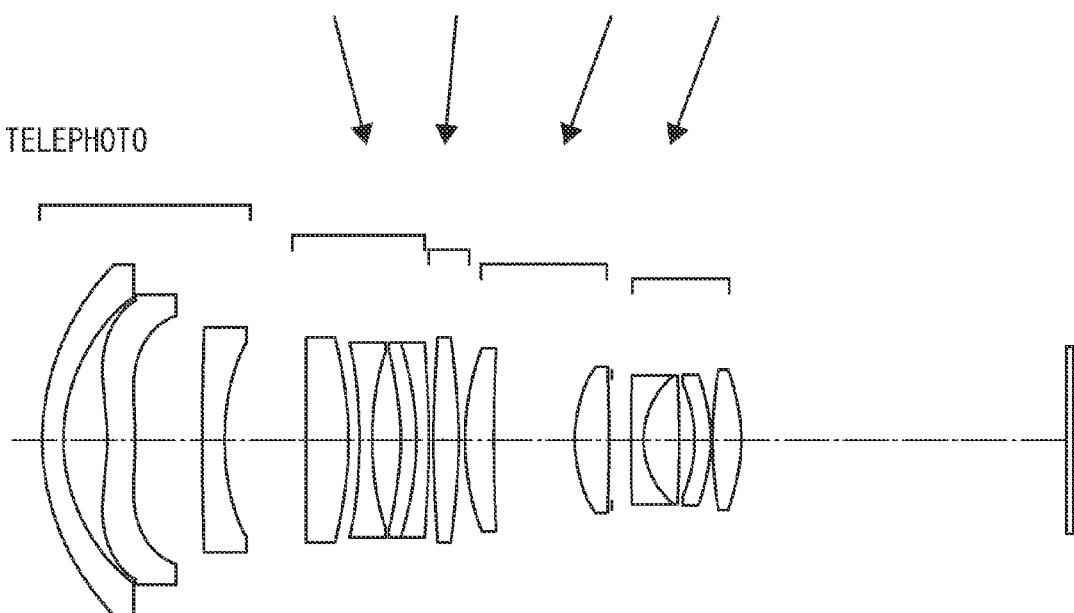

PROJECTION ZOOM LENS

CROSS-REFERENCE TO RELATED APPLICATIONS

The present application is a continuation of application Ser. No. 14/142,088 filed Dec. 27, 2013, which is based on and claims priority from Japanese Patent Application Numbers 2012-288356, 2012-289126, 2012-289149, 2012-289152 and 2012-289157 filed Dec. 28, 2012, Japanese Patent Application Numbers 2013-095867 and 2013-095878 filed Apr. 30, 2013, Japanese Patent Application Number 2013-124781 filed Jun. 13, 2013, and Japanese Patent Application Numbers 2013-209598, 2013-209631, 2013-209636, 2013-209644 and 2013-209678 filed Oct. 4, 2013, the disclosures of each of which are hereby incorporated by reference herein in their entireties.

BACKGROUND OF THE INVENTION

Technical Field of the Invention

The present invention relates to a projection zoom lens.

Description of the Related Art

A front-projection projector device configured to project a magnified image onto a screen in front of the device is recently widely used for presentations at companies, for education at schools and for home use.

As for a projection zoom lens, there has recently been a growing demand for "high magnification and wide angle".

There have been known those described in Patent Documents 1 and 2 to meet the demand.

A projection zoom lens described in Patent Document 1 have a five-lens-group configuration of negative, negative, positive, negative and positive, and is capable of sufficiently suppressing aberrations during magnification change. However, a half field angle at a wide angle end: ωw remains at 30°.

A projection zoom lens described in Patent Document 2 have a five-lens-group configuration of negative, negative, positive, positive and positive, and is capable of sufficiently suppressing aberrations. However, a half field angle at a wide angle end: ωw remains at 20.8°.

A "lens used to project images" is generally different from a photographic lens system for camera in using "oblique rays" as imaging light.

In a photographic lens for camera, an entire effective region of the lens is usable.

However, in the lens used to project images, since a projection image is formed by oblique rays, a range usable as an image projection region is a part of the effective region of the lens.

For this reason, the projection zoom lens needs to have a wider angle to increase the area of a target projection surface on which images are projected.

Recently, there has also been a strong demand that a projection distance of the projector device be reduced and the projector device be "disposed closer" to the target projection surface.

There is a demand for a much wider angle in the projection zoom lens, in order to realize a large target projection surface with a configuration where the projection zoom lens is disposed close to the target projection surface as described above.

The present invention is made in view of the aforementioned circumstances. It is one object of the present invention to realize a novel projection zoom lens with a large field angle of a projection image.

From the viewpoint of applicability to various light bulbs, it is preferable that the projection zoom lens has a large back focus.

From the viewpoint of applicability to various light bulbs and wide angle, a ratio: Bf/Fw of a back focus: Bf to a focal length of the entire system at the wide angle end: Fw serves as an important parameter.

Looking at the projection zoom lens described in Patent Documents 1 and 2 in this light, the parameter "Bf/Fw" is about 0.12 in Patent Document 1 and about 0.69 in Patent Document 2.

It is one object of the present invention to realize a wide angle projection zoom lens capable of ensuring optical performance while setting a large "Bf/Fw" with a five-lens-group configuration in which the power arrangement of first to third lens groups is "negative, negative and positive".

It has already been mentioned that there is a demand for a wider angle in the projection zoom lens, in order to realize a large target projection surface with the configuration where the projection zoom lens is disposed close to the target projection surface.

It is one object of the present invention to realize a projection zoom lens with a wide field angle.

Furthermore, in order to increase the area of a target projection surface on which images are projected, it is conceivable to achieve a wider angle of the projection zoom lens.

In contrast, recently, there has also been a strong demand that a projection distance of the projector device be reduced and the projector device be "disposed closer" to the target projection surface.

There is a demand for a much wider angle in the projection zoom lens, in order to realize a large target projection surface with a configuration where the projection zoom lens is disposed close to the target projection surface as described above.

In the projector as the image display device, an object of the projection zoom lens is an image display surface, and an imaging surface is a screen.

The image display surface and the screen are both flat. Therefore, good correction of "field curvature" is important in determining whether the projection zoom lens is good or bad.

Also, since an image to be projected is a magnified image, distortion in the projected image due to distortion is easily-noticeable. Therefore, good correction of the distortion is also important.

Furthermore, since the magnification is changed in the projection zoom lens, it is important that a variation in "field curvature and distortion" is small during the magnification change.

Therefore, It is one object of the present invention to realize a novel projection zoom lens with a wide field angle, which is capable of displaying a projection image with a large field angle.

It has already been mentioned that there have been known those described in Patent Documents 1 and 2 to meet such demand.

The projection zoom lens described in Patent Document 1 has a five-lens-group configuration of negative, negative, positive, negative and positive, and realizes a variable magnification ratio of approximately 1.5 times.

The projection zoom lens described in Patent Document 2 has a five-lens-group configuration of negative, negative, positive, positive and positive, and realizes a variable magnification ratio of approximately 1.7 times.

In the projection zoom lens described in Patent Document 1, first, third and fifth lens groups are fixed groups, and magnification change from a wide angle end to a telephoto end is performed by moving second and fourth lens groups toward the reduction side.

In the projection zoom lens described in Patent Document 2, first and fifth lens groups are fixed groups, and magnification change from a wide angle end to a telephoto end is performed by moving second to fourth lens groups toward the reduction side.

In the projection zoom lenses described in Patent Documents 1 and 2, the first lens group on the magnification side and the fifth lens group on the reduction side are the fixed groups.

Therefore, the moved groups need to be displaced in a "displacement area with both ends fixed".

Generally, a displacement amount of the moved groups needs to be increased to increase the variable magnification ratio. A reduction in the displacement area of the moved groups results in an increase in a rate of change in the magnification. As a result, aberrations are likely to be deteriorated.

When the moved groups are increased in size with the number of lens groups such as five, the entire lens system is likely to be increased in weight and length.

The present invention is made in view of the aforementioned circumstances. It is one object of the present invention to realize a projection zoom lens having a five-lens-group configuration and employing a novel magnification varying method, thereby achieving a high variable magnification ratio.

It has already been mentioned that there is a demand for a much wider angle in the projection zoom lens, in order to realize a large target projection surface with the configuration where the projection zoom lens is disposed close to the target projection surface.

From the practical aspect 36, it is preferable that the projection zoom lens is compact and light in addition to having a wide angle.

Among the lens groups included in the projection zoom lens, the one most likely to grow in size and weight is the first lens group.

When the first lens group is heavy, not only the projection zoom lens itself becomes heavy but also "eccentricity caused by its own weight" may occur in the first lens group.

From this viewpoint, in both of the projection zoom lenses described in Patent Documents 1 and 2, the first lens group has a four-lens configuration. Thus, the projection zoom lenses still have room for improvement in terms of reduction in weight of the first lens group.

The present invention is made in view of the aforementioned circumstances.

More specifically, it is one object of the present invention to realize a projection zoom lens which has a wide field angle and is capable of reduction in size and weight.

It has already been mentioned that there is a demand for a much wider angle in the projection zoom lens, in order to realize a large target projection surface with a configuration where the projection zoom lens is disposed close to the target projection surface.

The present invention relates to the combination of the refractive powers of the constituent lenses. It is one object of the present invention to realize a projection zoom lens of a five-lens-group type, which achieves high performance across the entire zoom area.

PATENT DOCUMENTS

[Patent Document 1]
Japanese Patent Application Publication No. 2011-69959
[Patent Document 2]
Japanese Patent No. 4952225

SUMMARY OF THE INVENTION

A projection zoom lens of the present invention is a projection zoom lens used in an image display device configured to project an image onto a target projection surface and display a magnified image of the image, wherein the projection zoom lens has a five-lens-group configuration including first to fifth lens groups arranged from the magnification side toward the reduction side. The first lens group has negative refractive power, the second lens group has negative refractive power, and the third lens group has positive refractive power. A Half field angle at a wide angle end: ωw, a focal length of the first lens group: f1, and a focal length of the second lens group: f2 satisfy the condition:

$$34 \text{ degrees} \leq \omega w < 45 \text{ degrees} \tag{1-I}$$

$$0.1 < f1/f2 < 1.0 \tag{2-I}$$

A projection zoom lens of the present invention is a projection zoom lens used in an image display device configured to project an image onto a target projection surface and display a magnified image of the image, wherein the projection zoom lens has a five-lens-group configuration including first to fifth lens groups arranged from the magnification side toward the reduction side. The first lens group has negative refractive power, the second lens group has negative refractive power, and the third lens group has positive refractive power, and a distance: Bf between an image display element and a lens surface farthest to the reduction side in the fifth lens group farthest to the reduction side, a focal length at the wide angle end: Fw at the wide angle end, and a focal length: F1 of the first lens group satisfy the conditions:

$$1.9 \leq Bf/Fw \tag{1-II}$$

$$1.2 < |F1|/Fw < 3.5 \tag{2-II}$$

A projection zoom lens of the present invention is a projection zoom lens used in an image display device configured to project an image onto a target projection surface and display a magnified image of the image, wherein the projection zoom lens has a five-lens-group configuration including first to fifth lens groups arranged from the magnification side toward the reduction side. The first lens group has negative refractive power, the second lens group has negative refractive power, and the third lens group has positive refractive power, the fifth lens group is moved toward the magnification side when the magnification is changed from the wide angle end to the telephoto end, and a half field angle at the wide angle end: ωw satisfies the condition:

$$34 \text{ degrees} \leq \omega w < 45 \text{ degrees} \tag{1-III}$$

A projection zoom lens of the present invention is a projection zoom lens used in an image display device configured to project an image onto a target projection surface and display a magnified image of the image, wherein the projection zoom lens has a five-lens-group configuration including first to fifth lens groups arranged from the magnification side toward the reduction side. The first lens group has negative refractive power, the second lens group has negative refractive power, and the third lens group has positive refractive power, in the first lens group, a lens surface farthest to the magnification side is convex toward the magnification side, and a lens surface farthest to the reduction side is concave toward the reduction side, and a half field angle at the wide angle end: ωw satisfies the condition:

$$34 \text{ degrees} \leq \omega w < 45 \text{ degrees} \quad (1\text{-IV})$$

A projection zoom lens of the present invention is a projection zoom lens used in an image display device configured to project an image onto a target projection surface and display a magnified image of the image, wherein the projection zoom lens has a five-lens-group configuration including first to fifth lens groups arranged from the magnification side toward the reduction side. The first lens group has negative refractive power, the second lens group has negative refractive power, and the third lens group has positive refractive power, the third lens group is moved toward the magnification side and the fourth lens group is moved toward the magnification side when the magnification is changed from the wide angle end to the telephoto end, and a travel distance D3 of the third lens group in magnification change and a travel distance D4 of the fourth lens group in magnification change satisfy the condition:

$$0.05 < D3/D4 < 1.10 \quad (1\text{-V})$$

A projection zoom lens of the present invention is a projection zoom lens used in an image display device configured to project an image onto a target projection surface and display a magnified image of the image, wherein the projection zoom lens has a five-lens-group configuration including first to fifth lens groups arranged from the magnification side toward the reduction side. The first lens group has negative refractive power, the second lens group has negative refractive power, and the third lens group has positive refractive power, the first lens group includes two or three lenses, and a half field angle at the wide angle end: ωw satisfies the condition:

$$34 \text{ degrees} \leq \omega w < 45 \text{ degrees} \quad (1\text{-IV})$$

A projection zoom lens of the present invention is a projection zoom lens used in an image display device configured to project an image onto a target projection surface and display a magnified image of the image, wherein the projection zoom lens has a five-lens-group configuration including first to fifth lens groups arranged from the magnification side toward the reduction side The first lens group has negative refractive power, the second lens group has negative refractive power, and the third lens group has positive refractive power, at least one of the second to fifth lens groups is set to be a negative lens group including four or more lenses and having negative refractive power, and refractive power arrangement of the first to fourth lenses from the magnification side among the four or more lenses included in the negative lens group is set to positive, negative, positive and negative or negative, positive, negative and positive.

BRIEF DESCRIPTION OF THE DRAWINGS

FIG. 1 is a cross-sectional view showing a configuration of a projection zoom lens according to Example 1.

FIG. 3 is a cross-sectional view showing a configuration of a projection zoom lens according to Example 2.

FIG. 5 is a cross-sectional view showing a configuration of a projection zoom lens according to Example 3.

FIG. 7 is a cross-sectional view showing a configuration of a projection zoom lens according to Example 4.

FIG. 9 is a cross-sectional view showing a configuration of a projection zoom lens according to Example 5.

FIG. 11 is a cross-sectional view showing a configuration of a projection zoom lens according to Example 6.

FIG. 13 is a cross-sectional view showing a configuration of a projection zoom lens according to Example 7.

FIG. 15 is a cross-sectional view showing a configuration of a projection zoom lens according to Example 8.

FIG. 17 is a cross-sectional view showing a configuration of a projection zoom lens according to Example 9.

FIG. 19 is a cross-sectional view showing a configuration of a projection zoom lens according to Example 10.

FIG. 27 is a cross-sectional view showing a configuration of a projection zoom lens according to Example 14.

DETAILED DESCRIPTION OF THE PREFERRED EMBODIMENTS

Figure 2:
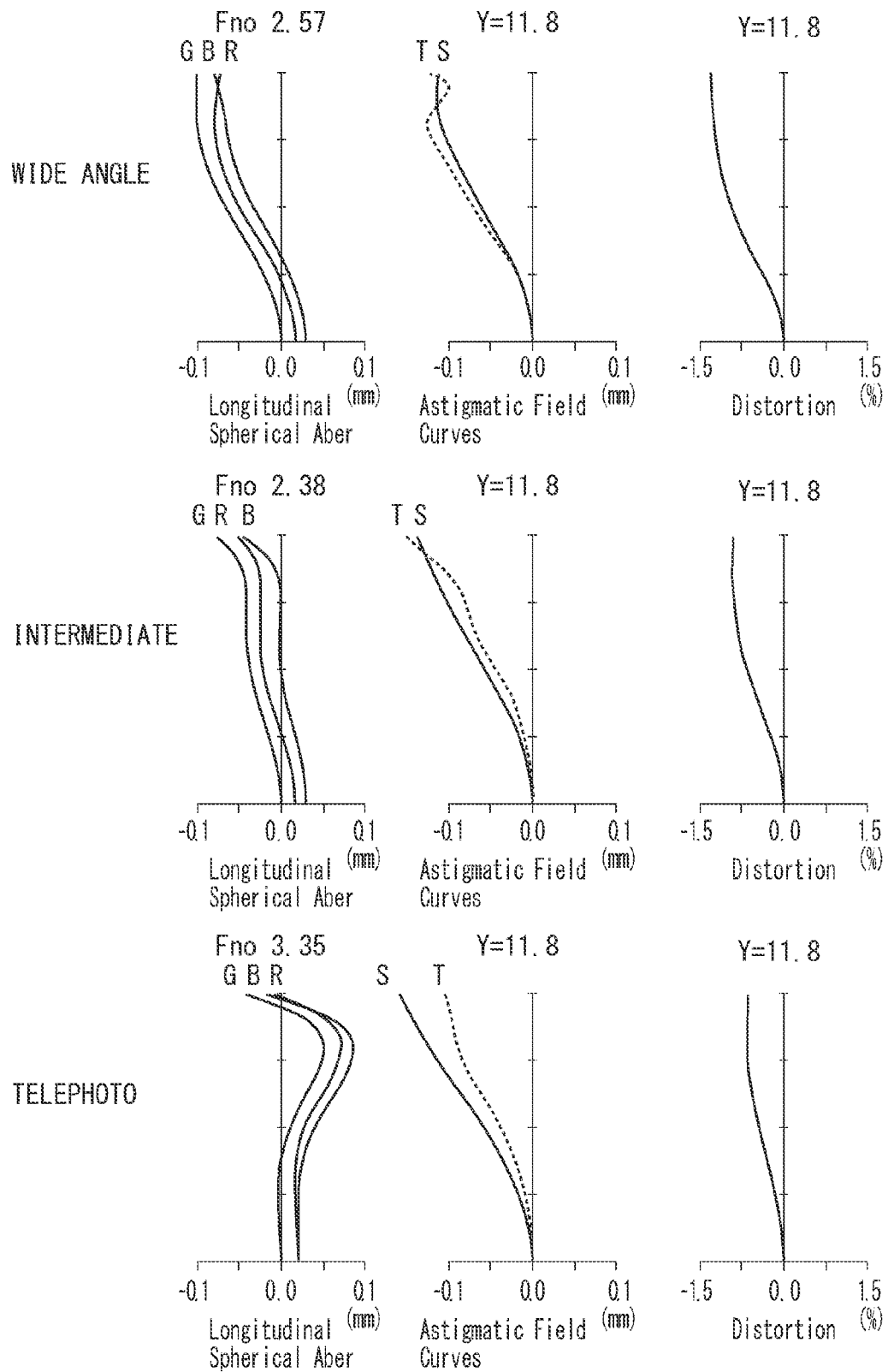
FIG. 2 is an aberration curve diagram of the projection zoom lens according to Example 1.

Embodiments of the invention will be described below.

A zoom lens of the invention is a "projection zoom lens" as described above.

As described above, a "projection lens" uses "oblique rays" as imaging light. Likewise, the projection zoom lens of the invention also uses "oblique ray flux" as projection luminous flux for forming a projected image.

FIGS. 1, 3, 5, 7, 9, 11, 13, 15, 17, 19, 21, 23, 25 and 27 show fourteen embodiments of the projection zoom lens.

The zoom lenses according to those embodiments correspond, in this order, to concrete Examples 1 to 14 to be described later.

In each of the drawings, the left side thereof indicates "magnification side" and the right side thereof indicates "reduction side". In order to avoid complication, the same reference numerals are used throughout the drawings.

In each of the drawings, reference numeral G1 denotes a first lens group, reference numeral G2 denotes a second lens group, reference numeral G3 denotes a third lens group, reference numeral G4 denotes a fourth lens group, and reference numeral G5 denotes a fifth lens group.

More specifically, the projection zoom lens, whose embodiments are shown in the respective drawings, has a five-lens-group configuration including the first to fifth lens groups G1 to G5 arranged from the magnification side toward the reduction side.

Also, an "aperture stop" is disposed at or behind the third lens group G3.

As for lenses, a j-th lens from the magnification side in an i-th lens group (i=1 to 5) is denoted by reference symbol Lij.

Furthermore, in each of the drawings, reference symbol CG denotes a "cover glass of an image display element (light bulb)".

In the embodiments and examples, a "DMD that is a micromirror device" is assumed as the light bulb. However, needless to say, the light bulb is not limited thereto.

In each of the drawings, the upper part thereof shows "lens group arrangement at a wide angle end (represented as wide angle)", while the lower part thereof shows "lens group arrangement at a telephoto end (represented as telephoto)".

Also, the arrows drawn between the upper and lower parts of each drawing indicate shift directions of the second to fifth lens groups G2 to G5 when the magnification is changed from the wide angle end to the telephoto end.

In the projection zoom lens, whose embodiments are shown in the respective drawings, the first and second lens groups G1 and G2 both have negative refractive power, and the third lens group G3 has positive refractive power.

More specifically, in the first to fifth lens groups, a refractive power distribution of the first to third lens groups G1 to G3 is "negative, negative and positive".

As for the refractive power of the fourth and fifth lens groups G4 and G5, the fourth lens group may have positive refractive power and the fifth lens group may have "positive or negative" refractive power, as described in claim 3.

Also, as for the refractive power of the fourth and fifth lens groups G4 and G5, the fourth lens group may have negative refractive power and the fifth lens group may have "positive or negative" refractive power, as described in claim 4.

More specifically, for the refractive power of the fourth and fifth lens groups G4 and G5, combinations of "positive and negative", "positive and positive", "negative and negative" and "negative and positive" are possible.

Condition (1-I) specifies a range of a half field angle at the wide angle end.

More specifically, the half field angle at the wide angle end of the projection zoom lens of the present invention is greater than 34 degrees and less than 45 degrees. In other words, the zoom lens has a very wide field angle.

In order to satisfy the above condition, a negative lens group preceding type is preferable. Therefore, the refractive power distribution of the first to third lens groups G1 to G3 is "negative, negative and positive" where the negative lens groups precede the positive lens group.

By adopting the negative lens group preceding type, a principal ray height can be reduced and a lens effective diameter can be reduced. Therefore, a compact projection zoom lens with a wide field angle can be realized.

Also, a "flip-up angle of luminous flux" from the second lens group to the first lens group upon image projection can be minimized.

Upon image projection, projection luminous flux (oblique ray flux) projected from the light bulb side is guided toward the first lens group from the fifth lens group.

In this event, since the first and second lens groups G1 and G2 are both negative, a divergence angle of the luminous flux from the third lens group can be naturally increased in the second and first lens groups.

Therefore, as described above, a flip-up angle of the luminous flux handed over from the second lens group to the first lens group can be minimized, and thus a divergence angle of luminous flux radiated from the first lens group can be naturally increased.

Moreover, there is achieved an effect of suppressing performance degradation caused by lens eccentricity at the time of manufacturing.

Condition (2-I) is a condition particularly effective in satisfactory correction of astigmatism and field curvature.

When the upper limit of Condition (2-I) is exceeded, an absolute value of the refractive power (1/f1) of the first lens group G1 is likely to be relatively reduced and the field curvature is likely to be increased.

When the lower limit of Condition (2-I) is exceeded, the absolute value of the refractive power of the first lens group G1 is likely to be relatively increased and the astigmatism is likely to be increased.

As for the projection zoom lens of the present invention, better performance can be realized by satisfying one or more of the following Conditions (3-I) to (12-I) in addition to the above configuration.

$$0.3 < D3/F3 \text{ or } D4/F4 < 0.6 \quad (3\text{-I})$$

$$0 < 1/|f1\_3w| < 0.14 \quad (4\text{-I})$$

$$0.5 < |f1\_3w/fw| < 8.0 \quad (5\text{-I})$$

$$Nd2p \cdot vd2p < Nd2n \cdot vd2n \quad (6\text{-I})$$

$$1.70 < Nd2p < 2.10 \quad (7\text{-I})$$

$$18.0 < vd2p < 30.0 \quad (8\text{-I})$$

$$1.45 < Nd2n < 1.75 \quad (9\text{-I})$$

$$48.0 < vd2n < 90.0 \quad (10\text{-I})$$

$$1.0 < |f2p/f2n| < 2.0 \quad (11\text{-I})$$

$$2.5E\text{-}04 < |f2p2n| < 2.0E\text{-}02 \quad (12\text{-I})$$

In Conditions (3-I) to (12-I) described above, the meanings of respective parameter symbols are as follows.

"F3" represents a focal length of the third lens group and "F4" represents a focal length of the fourth lens group.

"D3" represents a travel distance of the third lens group when the magnification is changed from the wide angle side to the telephoto side.

"D4" represents a travel distance of the fourth lens group when the magnification is changed from the wide angle side to the telephoto side.

"f1_3w" represents a composite focal length of the first to third lens groups at the wide angle end. Also, "fw" represents a "focal length of the entire system" at the wide angle end.

"Nd2p" represents a refractive index of d-line of a "positive lens with the lowest Abbe number of d-line" among the positive lenses arranged in the second lens group. "vd2p" represents the Abbe number of d-line of the positive lens.

"Nd2n" represents a refractive index of d-line of a "negative lens with the highest Abbe number of d-line" among the negative lenses arranged in the second lens group. "vd2n" represents the Abbe number of d-line of the negative lens.

"f2p" represents a focal length of a "positive lens with the lowest Abbe number of d-line" among the positive lenses arranged in the second lens group.

"f2n" represents a focal length of a "negative lens with the highest Abbe number of d-line" among the negative lenses arranged in the second lens group.

"f2p2n" represents a composite focal length of the "positive lens with the lowest Abbe number of d-line" and the "negative lens with the highest Abbe number of d-line" among the lenses arranged in the second lens group.

Note that, in Condition (12-I), "2.5E-04", for example, represents "$2.5 \times 10^{-4}$". The same goes for the following.

As described above, Conditions (6-I) to (12-I) among Conditions (3-I) to (12-I) are those specifying the materials of the lenses included in the second lens group.

In the projection zoom lens of the embodiment described below, the second lens group G2 is an "aberration correction group".

Moreover, the third lens group G3 or the fourth lens group G4 is set as a "zoom group", and a focal length and a travel distance thereof are optimized to enable a zoom ratio of 1.5 times or more.

The first lens group G1 is a "focus group", which is fixed in magnification change.

In a wide angle projection zoom lens, a lens group (a first lens group) at the farthest to the wide angle side needs to increase "a flip-up angle of a light ray", and thus a lens diameter thereof is inevitably increased.

Also, the zoom lens tends to become heavy in weight since high refractive index glass of high specific gravity is mainly used.

Therefore, by fixing the first lens group in magnification change, the occurrence of the eccentricity of the lens group is prevented compared with the case where the first lens group is moved in magnification change.

Accordingly, a significant advantage is achieved in assembly of the lens system.

Moreover, energy to move the lens groups required for magnification change can also be reduced.

Condition (3-I) is a condition effective in enabling achievement of a zoom ratio: 1.45 times or more.

When the upper limit of Condition (3-I) is exceeded, astigmatism on the telephoto side is likely to be increased. When the lower limit of Condition (3-I) is exceeded, it becomes difficult to achieve the zoom ratio: 1.45 times.

By satisfying Condition (3-I), an optimum solution for astigmatism correction is achieved even if the zoom ratio is 1.45 times or more, and an increase in field curvature can also be effectively suppressed.

Condition (4-I) is an optimum range of a composite focal length of the negative first lens group G1, the negative second lens group G2 and the positive third lens group G3.

The range of Condition (4-I) is exceeded, "aberration correction by the second lens group G2" during magnification change is not sufficiently optimized. As a result, aberrations, particularly, a large coma aberration is likely to remain.

By satisfying Condition (4-I), the aberration correction by the second lens group G2 during magnification change can be optimized. Thus, the aberrations such as the coma aberration can be effectively prevented from remaining.

Condition (5-I) is a condition to realize more satisfactory "coma aberration correction" over the entire variable magnification region.

When the upper or lower limit of Condition (5-I) is exceeded, a large coma aberration is likely to occur, and magnification chromatic aberration is also likely to be increased.

By satisfying Condition (5-I), occurrence of the coma aberration and magnification chromatic aberration can be effectively suppressed.

Condition (6-I) is a condition to keep the magnification chromatic aberration, coma aberration and astigmatism in balance.

When Condition (6-I) is not satisfied, a large imbalance is likely to occur particularly in the magnification chromatic aberration, coma aberration and astigmatism.

By satisfying Condition (6-I), particularly the magnification chromatic aberration, coma aberration and astigmatism can be kept in balance.

The "negative second lens group" in the projection zoom lens of the present invention can be set as the "aberration correction group" as described above.

In this case, outside the range of Condition (7-I), a large magnification chromatic aberration occurs, and the coma aberration and astigmatism are also likely to be increased.

By satisfying Condition (7-I), increases in the magnification chromatic aberration, coma aberration and astigmatism can be effectively suppressed.

As is well known, a combination of crown glass (low refractive index) as a positive lens and flint glass (high refractive index) as a negative lens is generally effective in effectively performing "achromatization".

However, in the projection zoom lens of the present invention, it is preferable that the second lens group includes a high refractive index and high dispersion positive lens and a low refractive index and low dispersion negative lens, as in the case of Condition (7-I).

This combination is effective in improving the achromatization and reducing the Petzval sum.

Here, description is given of the case of a lens configuration of "positive, negative and negative (cemented lens)", which is also employed as the second lens group in examples to be described later.

In this case, when a positive lens farthest to the magnification side has a "high refractive index and high dispersion" and a negative lens disposed on the reduction side of the positive lens has a "low refractive index and low dispersion", the high refractive index and high dispersion causes a large chromatic aberration on the positive side and increases the Petzval sum on the negative side in the positive lens.

Such chromatic aberration and Petzval sum are "effectively suppressed" by the negative lens having the low refractive index and low dispersion.

Thus, the increases in the magnification chromatic aberration, coma aberration and astigmatism are effectively suppressed.

On the other hand, when the positive lens has a "low refractive index and low dispersion" and the negative lens has a "high refractive index and high dispersion", the chromatic aberration and the Petzval sum are significantly amplified.

For this reason, the magnification chromatic aberration, coma aberration and astigmatism are even more likely to be increased.

Condition (8-I) is a condition effective in suppressing the magnification chromatic aberration.

As described above, a "high-dispersion material" is preferable for the positive lens in the second lens group. The use of the high-dispersion material which satisfies Condition (8-I) can effectively suppress the occurrence of the magnification chromatic aberration.

Also, in the case of the projection zoom lens which satisfies Condition (7-I) or (8-I), it is preferable that a "biconvex lens" is adopted as the "positive lens in the second lens group" as described in claim 11.

The adoption of the biconvex lens as the shape of the "positive lens with the lowest Abbe number relative to d-line within the second lens group" is effective in correcting the aberration and suppressing the Petzval sum.

When the positive lens is "not the biconvex lens", a large "variation in field curvature" is likely to occur during magnification change.

Condition (9-I) is a condition effective in suppressing the magnification chromatic aberration. As described above, a lens made of a low-refractive-index material is preferable as the negative lens in the second lens group.

The satisfaction of Condition (9-I) is effective in suppressing a large magnification chromatic aberration and the Petzval sum.

Condition (10-I) is also a condition effective in suppressing the magnification chromatic aberration. As described above, a lens made of a low-dispersion material is preferable as the negative lens in the second lens group.

The satisfaction of Condition (10-I) is effective in suppressing the magnification chromatic aberration.

In the projection zoom lens which satisfies Condition (9-I) or (10-I), it is preferable that a "biconcave lens" is adopted as the "negative lens in the second lens group" as described in claim 14.

Such a configuration facilitates optimum control of the aberration correction and the Petzval sum.

When the negative lens (negative lens with the highest Abbe number and a low refractive index) is "not the biconcave lens", a "large variation in field curvature" is likely to occur during magnification change.

Condition (11-I) is an optimum solution to suppress the variation in field curvature during magnification change. By satisfying (11-I), the variation in field curvature during magnification change can be most effectively suppressed.

Condition (12-I) is a condition favorable to effective suppression of the occurrence of aberrations.

By satisfying Condition (12-I), the occurrence of large aberrations can be effectively suppressed.

The "projection zoom lens used in the image display device which enlarges an image displayed on the display surface of the image display element by projecting the image onto a target projection surface" described above has a five-lens-group configuration.

More specifically, the first to fifth lens groups are arranged from the magnification side toward the reduction side. The first and second lens groups have "negative" refractive power, and the third lens group has "positive" refractive power.

In such a configuration, when the refractive power of the fourth lens group is "negative", it is preferable that, within the range of Conditions (1-I) and (2-I) described above, the following conditions are satisfied.

$$43 \text{ degrees} \leq \omega w < 45 \text{ degrees} \tag{1A-I}$$

$$0.9 < f1/f2 < 1.0 \tag{2A-I}$$

Also, it is preferable to satisfy one or more of the following Conditions (3A-I) to (12A-I) together with Conditions (1A-I) and (2A-0. Conditions (1A-I) to (12A-I) are within the range of Conditions (1-I) to (12-I).

$0.5 < D3/F3$ or $D4/F4 < 0.55$ (3A-I)

$0.12 < 1/|f1\_3w| < 0.14$ (4A-I)

$0.5 < |f1\_3w/fw| < 0.7$ (5A-I)

$Nd2p \cdot vd2p < Nd2n \cdot vd2n$ (6A-I)

$1.8 < Nd2p < 1.9$ (7A-I)

$23.0 < vd2p < 24.0$ (8A-I)

$1.7 < Nd2n < 1.75$ (9A-I)

$48 < vd2n < 50$ (10A-I)

$1.5 < |f2p/f2n| < 1.8$ (11A-I)

$1.2E\text{-}02 < |f2p2n| < 1.6E\text{-}02$ (12A-I)

The parameters in Conditions (3A-I) to (12A-I) are the same as those in Conditions (3-I) to (12-I) described above.

In the configuration in which the fourth lens group has the "negative" refractive power, the satisfaction of one or more of Conditions (3A-I) to (12A-I) together with Conditions (1A-I) and (2A-I) can allow the role of Conditions (1-I) to (12-I) described above to similarly function.

Moreover, when the refractive power of the fourth lens group is "positive", it is preferable that, within the range of Conditions (1-I) and (2-I) described above, the following conditions are satisfied.

$34 \text{ degrees} \leq \omega w < 45 \text{ degrees}$ (1B-I)

$0.1 < f1/f2 < 0.5$ (2B-I)

Also, it is preferable to satisfy one or more of the following Conditions (3B-I) to (12B-I) together with Conditions (1B-I) and (2B-I). Conditions (1B-I) to (12B-I) are within the range of Conditions (1-I) to (12-I).

$0.3 < D3/F3$ or $D4/F4 < 0.6$ (3B-I)

$0 < 1/|f1\_3w| < 0.05$ (4B-I)

$1.7 < |f1\_3w/fw| < 8.0$ (5B-I)

$Nd2p \cdot vd2p < Nd2n \cdot vd2n$ (6B-I)

$1.70 < Nd2p < 2.10$ (7B-I)

$18.0 < vd2p < 30.0$ (8B-I)

$1.45 < Nd2n < 1.60$ (9B-I)

$58.0 < vd2n < 90.0$ (10B-I)

$1.0 < |f2p/f2n| < 1.4$ (11B-I)

$2.5E\text{-}04 < |f2p2n| < 4.6E\text{-}03$ (12B-I)

The parameters in Conditions (3B-I) to (12B-I) are the same as those in Conditions (3-I) to (12-I) described above.

In the configuration in which the fourth lens group has the "positive" refractive power, the satisfaction of one or more of Conditions (3B-I) to (12B-I) together with Conditions (1B-I) and (2B-I) can allow the role of Conditions (1-I) to (12-I) described above to similarly function.

Condition (1-II) is a condition to satisfy both of "a large back focus and a short focal length".

As is clear from Condition (1-II), at the wide angle end where the focal length of the entire system is at its shortest, the position of the principal point on the reduction side is set closer to the reduction side than the lens surface farthest to the reduction side in the fifth lens group.

When the lower limit of Condition (1-II) is exceeded, the back focus is reduced relative to the focal length at the wide angle end. This tends to cause difficulty in layout of the projection zoom lens and an illumination box.

Particularly, a region of a wide field angle exceeding 34 degrees as described in the examples has great difficulty in the layout.

Such difficulty in layout is the same even when three liquid crystal panels are used as the light bulb, since a large back focus is required to dispose a color synthesis prism.

Condition (2-II) is a condition to satisfy both of "good optical performance and a large back focus".

It is not preferable when the lower limit of Condition (2-II) is exceeded, since the refractive power of the first lens group is increased, even though a larger back focus can be obtained, and a large field curvature is likely to occur.

It is not preferable when the upper limit of Condition (2-II) is exceeded, since the back focus is reduced even though the field curvature and coma aberration are improved.

As for the projection zoom lens of the present invention, better performance can be realized by satisfying one or more of the following Conditions (3-II) to (6-II) in addition to the above configuration.

$0.8 < |Fw1\text{-}2|/D2G\text{-}3G < 2.0$ (3-II)

$0.35 < F3o4/Fw < 0.70$ (4-II)

$4.0 < OAL/Bf < 5.0$ (5-II)

$0.4 < D5/Bf < 0.6$ (6-II)

In Conditions (3-II) to (6-II) described above, the meanings of respective parameter symbols are as follows.

"Fw1-2" represents a composite focal length of the first and second lens groups at the wide angle end.

"D2G-3G" represents a distance between the surface farthest to the reduction side in the second lens group and the surface farthest to the magnification side in the third lens group at the wide angle end.

"F3o4" represents a focal length of the lens group, the third lens group or the fourth lens group, which has a higher refractive power. "Fw" represents a focal length at the wide angle end.

"OAL" represents a distance between the lens surface farthest to the magnification side in the first lens group and the image display element. "Bf" represents back focus.

Also, "D5" represents an effective diameter of the lens farthest to the reduction side in the fifth lens group.

Condition (3-II) is a condition effective to realize a "short focal length at the wide angle end with good optical performance".

When the lower limit of Condition (3-II) is exceeded, a shorter focal length can be achieved, but the field curvature and coma aberration are likely to be excessive.

When the upper limit of Condition (3-II) is exceeded, the field curvature and coma aberration are improved, but it is more likely that a short focal length cannot be achieved.

Condition (4-II) is a condition to satisfy both of "compactness and large back focus". The positive lens group, i.e., the third or fourth lens group serves as a variator.

When the lower limit of Condition (4-II) is exceeded, the refractive power of the third or fourth lens group is increased and the back focus is likely to be reduced.

When the upper limit of Condition (4-II) is exceeded, the back focus is increased, but the lens is likely to lack compactness.

Condition (5-II) is a condition to satisfy both of "compactness and large back focus".

When the lower limit of Condition (5-II) is exceeded, the refractive powers (absolute values) of the first to fifth lens groups are increased, making it difficult to maintain good "field curvature and coma aberration" during magnification change.

When the upper limit of Condition (5-II) is exceeded, the refractive power of each lens group is reduced and the overall length of the lens is increased, making it difficult to ensure the compactness.

Condition (6-II) is a condition that the back focus and the "lens diameter of the lens farthest to the reduction side" are optimized.

Condition (6-II) is a condition concerning ease of layout of the projection zoom lens and the constituent components related to the image display element, such as the illumination box and liquid crystal panel.

When Condition (6-II) is satisfied, the layout of the projection zoom lens and the illumination box, the color synthesis prism and the like is facilitated.

Outside the range of Condition (6-II), the layout is likely to become difficult.

When the projection zoom lens is configured with the fourth lens group having "negative" refractive power, it is preferable to satisfy the following conditions within the range of Conditions (1-II) and (2-II) described above.

$$2.68 \leq Bf/Fw \quad (1\text{A-II})$$

$$3.2<|F1|/Fw<3.5 \quad (2\text{A-II})$$

In this case, it is preferable to satisfy one or more of the following Conditions (3A-II) to (6A-II). Conditions (1A-II) to (6A-II) are within the range of Conditions (1-II) to (6-II).

$$0.9<|Fw1-2|/D2G-3G<1.1 \quad (3\text{A-II})$$

$$0.5<F3o4/Fw<0.6 \quad (4\text{A-II})$$

$$4.90<OAL/Bf<4.95 \quad (5\text{A-II})$$

$$0.5<D5/Bf<0.6 \quad (6\text{A-II})$$

The parameters in Conditions (3A-II) to (6A-II) are the same as those in Conditions (3-II) to (6-II).

When the projection zoom lens is configured with the fourth lens group as the negative group, the satisfaction of Conditions (1A-II) and (2A-II) and the satisfaction of one or more of Conditions (3A-II) to (6A-II) can allow the role of Conditions (1-II) to (6-II) to similarly function.

When the projection zoom lens is configured with the fourth lens group having "positive" refractive power, it is preferable to satisfy the following conditions within the range of Conditions (1-II) and (2-II) described above.

$$1.9<Bf/Fw \quad (1\text{B-II})$$

$$1.2<|F1|/Fw<2.1 \quad (2\text{B-II})$$

In this case, it is preferable to satisfy one or more of the following Conditions (3B-II) to (6B-II). Conditions (1B-II) to (6B-II) are within the range of Conditions (1-II) to (6-II).

$$0.8<|Fw1-2|/D2G-3G<1.5 \quad (3\text{B-II})$$

$$0.35<F3o4/Fw<0.70 \quad (4\text{B-II})$$

$$4.0<OAL/Bf<4.7 \quad (5\text{B-II})$$

$$0.4<D5/Bf<0.6 \quad (6\text{B-II})$$

The parameters in Conditions (3B-II) to (6B-II) are the same as those in Conditions (3-II) to (6-II).

When the projection zoom lens is configured with the fourth lens group as the positive group, the satisfaction of Conditions (1B-II) and (2B-II) and the satisfaction of one or more of Conditions (3B-II) to (6B-II) can allow the role of Conditions (1-II) to (6-II) to similarly function.

In the present invention, a variation in aberrations during magnification change can be minimized by moving the second to fifth lens groups with the first lens group as the fixed group (focus group) during magnification change.

Moreover, the configuration of the second to fifth lens groups is set as a symmetrical configuration "negative, positive, positive and negative" with the third and fourth lens groups as the boundary. Thus, the magnification chromatic aberration and distortion can be controlled to be small also during magnification change.

In Examples 1, 2, 3, 4, 5, 8, 9, 10, 11 and 14 to be described later, the second to fifth lens groups have a symmetrical configuration "negative, positive, positive and negative".

As for magnification chromatic aberration in those examples, a high level of correction of magnification chromatic aberration is realized as shown in FIGS. 32, 33, 34, 35, 36, 39, 40, 41, 42 and 45, respectively.

Also, even when the second to fifth lens groups are configured as "negative, positive, negative and negative", a symmetrical configuration of "negative, negative, positive, negative and negative" is realized with the third lens group in the middle by including the first lens group. Thus, the magnification chromatic aberration and distortion can be controlled to be small.

Figure 43:
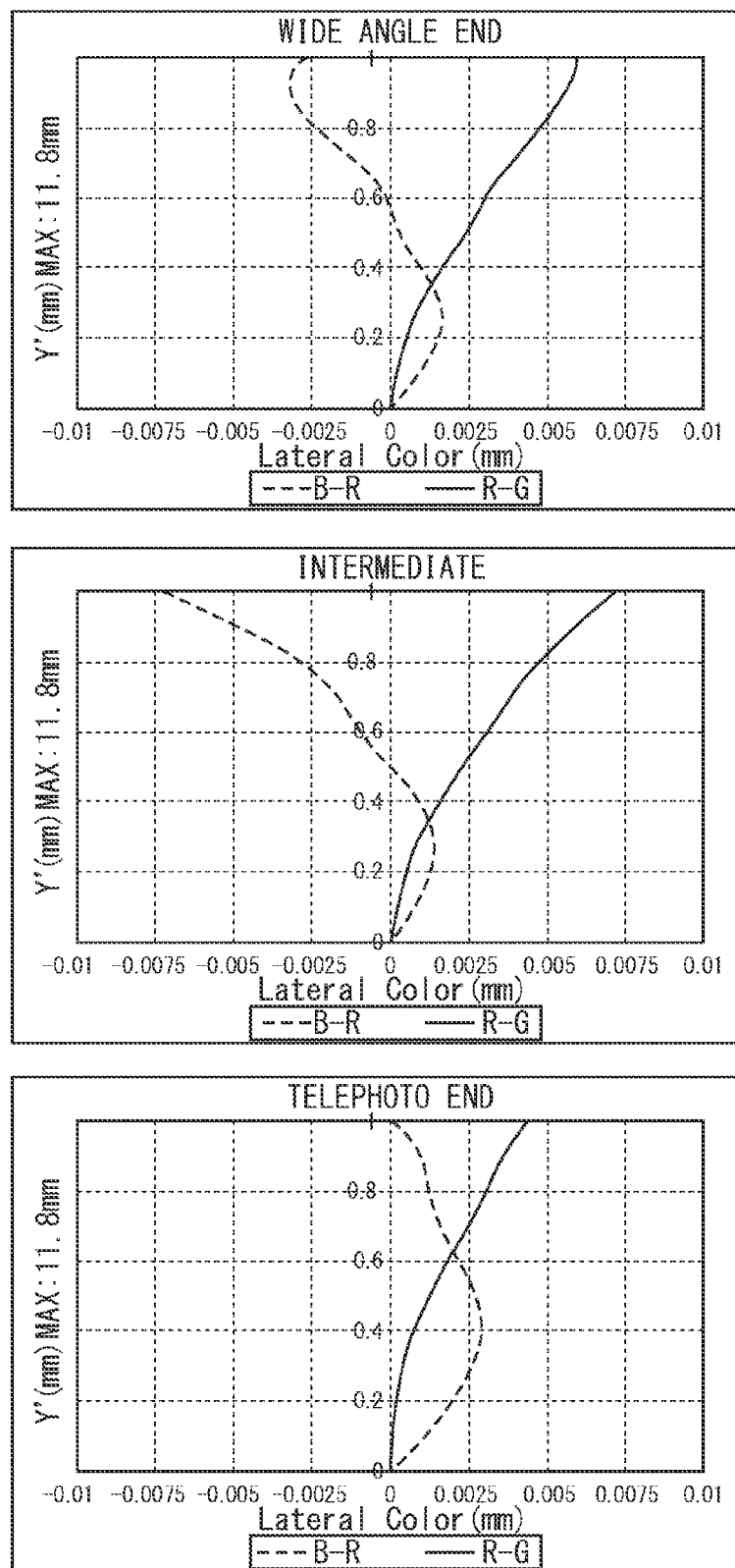
FIG. 43 is a magnification chromatic aberration diagram of the projection zoom lens according to Example 12.

In Example 12, the first to fifth lens groups have a symmetrical configuration "negative, negative, positive, negative and negative". Also, as for the magnification chromatic aberration, a high level of correction of magnification chromatic aberration is made possible as shown in FIG. 43.

Figure 37:
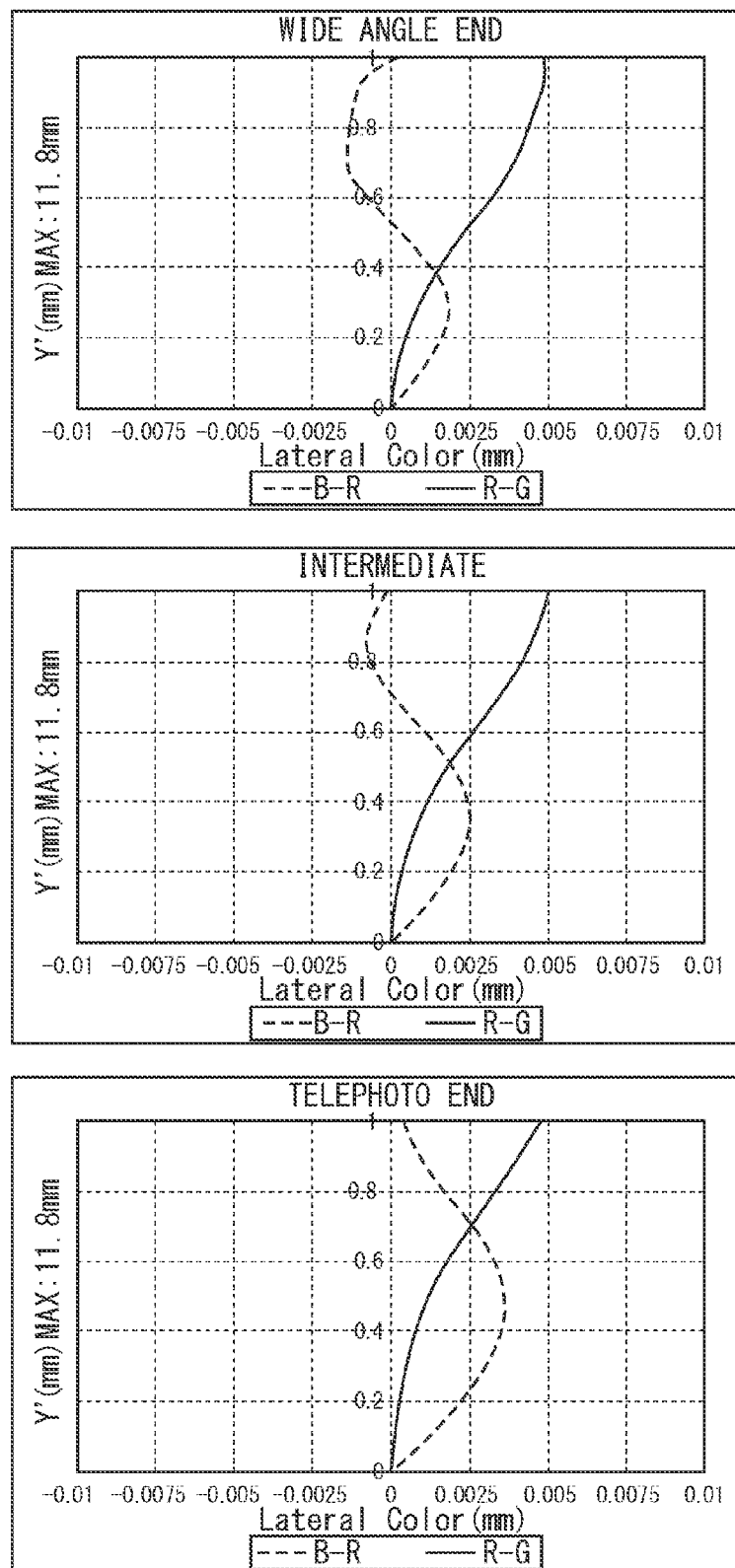
FIG. 37 is a magnification chromatic aberration diagram of the projection zoom lens according to Example 6.
Figure 38:
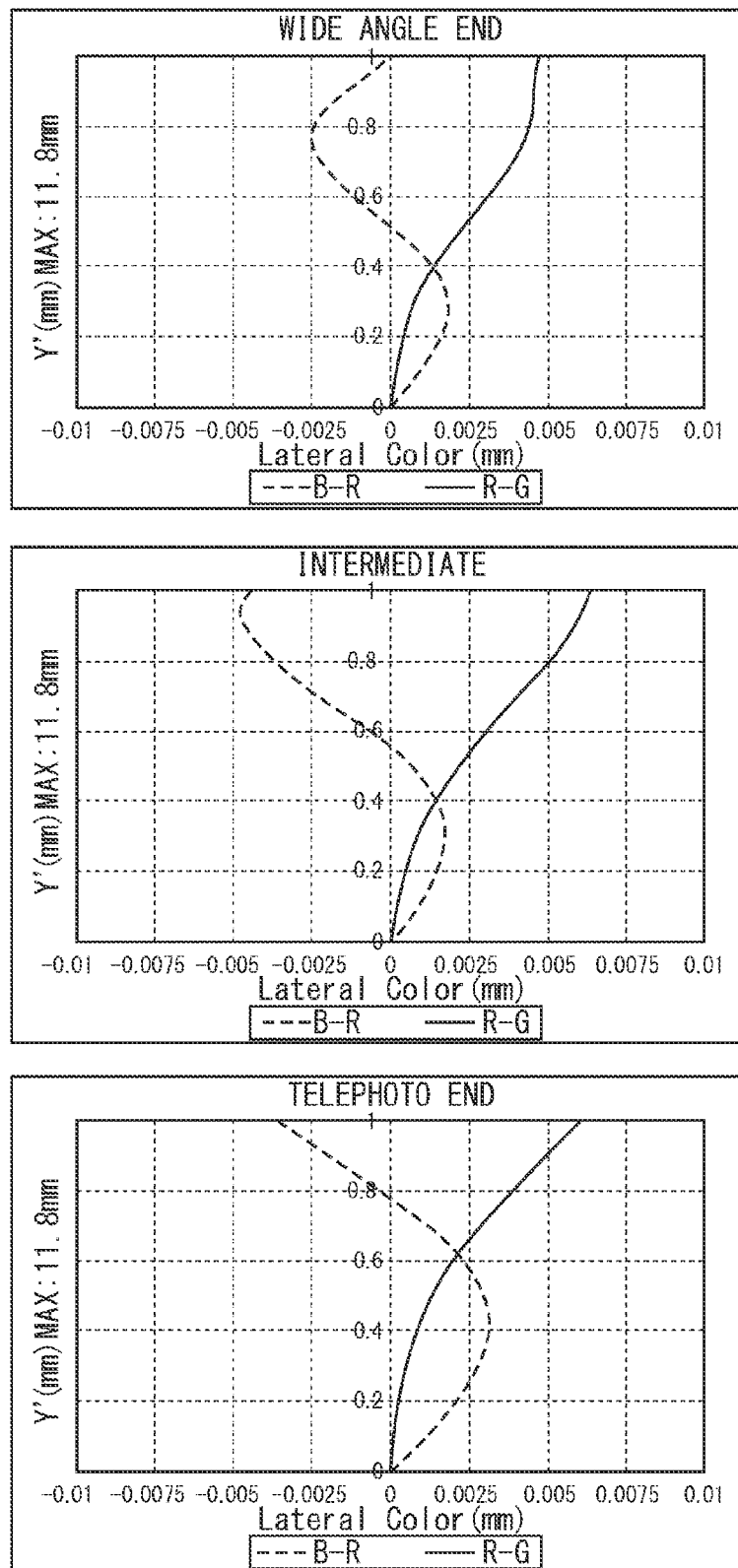
FIG. 38 is a magnification chromatic aberration diagram of the projection zoom lens according to Example 7.

Meanwhile, even for a configuration such as "negative, positive, positive and positive" or "negative, positive, negative and positive" in which the second to fifth lens groups are not symmetrical, "magnification chromatic aberration correction equivalent to that achieved with the symmetrical lens configuration" is made possible by setting the power (=1/focal length) of the positive lens group (the fifth lens group) farthest to the reduction side to be the smallest among all the lens groups. Regarding this, Examples 6 and 7 have the "negative, positive, positive and positive" configuration, and FIGS. 37 and 38 show magnification chromatic aberration diagrams of Examples 6 and 7.

Figure 44:
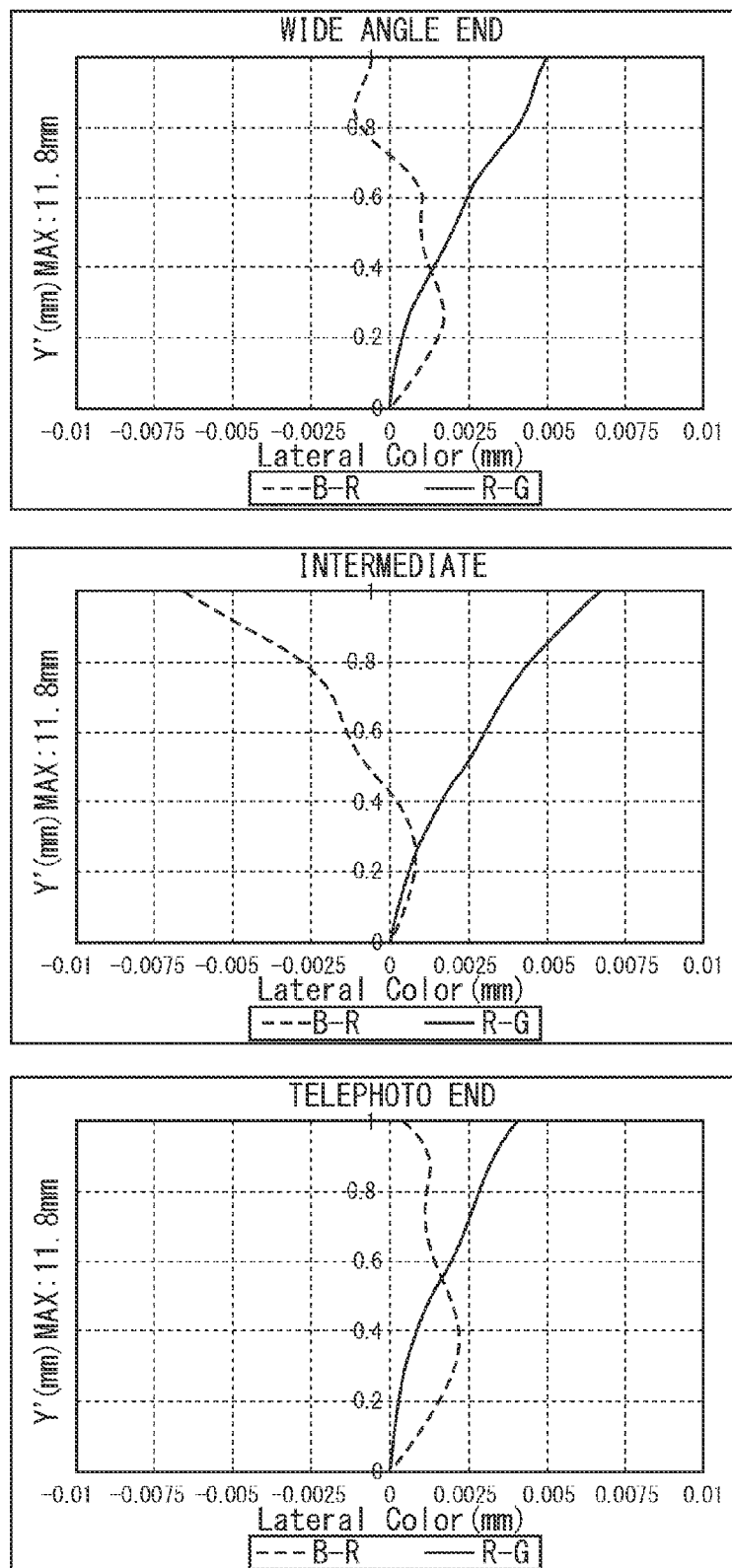
FIG. 44 is a magnification chromatic aberration diagram of the projection zoom lens according to Example 13.

Also, in Example 13, the second to fifth lens groups have the "negative, positive, negative and positive" configuration. FIG. 44 shows a magnification chromatic aberration diagram of Example 13.

Examples 6 and 7 also show the "magnification chromatic aberration approximately equivalent to that in the symmetrical configuration". By setting the fifth lens group to have the weakest power, the magnification chromatic aberration can be reduced.

Moreover, when the groups to be moved during magnification change have a "negative, positive, positive and negative" or "negative, positive, positive and positive" configuration, the magnification chromatic aberration can be further reduced by adopting the following lens configuration for the moved groups. Specifically, the second lens group farthest to the magnification side among the moved groups is configured to include four lenses of "positive, negative, positive and negative", and the fifth lens group farthest to the reduction side among the moved groups is configured to include four lenses of "negative, positive, negative and positive". Thus, a "symmetrical" lens configuration is realized within the second lens group and within the fifth lens group.

Condition (1-III) specifies a range of a half field angle at the wide angle end.

More specifically, the half field angle at the wide angle end of the projection zoom lens of the present invention is greater than 34 degrees and less than 45 degrees. In other words, the zoom lens has a very wide field angle.

In order to satisfy the above condition, a negative lens group preceding type is preferable. Therefore, the refractive power distribution of the first to third lens groups G1 to G3 is "negative, negative and positive" where the negative lens groups precede the positive lens group.

By adopting the negative lens group preceding type, a principal ray height can be reduced and a lens effective diameter can be reduced. Therefore, a compact projection zoom lens with a wide field angle can be realized.

Also, a "flip-up angle of luminous flux" from the second lens group to the first lens group upon image projection can be minimized.

Upon image projection, projection luminous flux (oblique ray flux) projected from the light bulb side is guided toward the first lens group from the fifth lens group.

In this event, since the first and second lens groups G1 and G2 are both negative, a divergence angle of the luminous flux from the third lens group can be naturally increased in the second and first lens groups.

Therefore, as described above, a flip-up angle of the luminous flux handed over from the second lens group to the first lens group can be minimized, and thus a divergence angle of luminous flux radiated from the first lens group can be naturally increased.

Moreover, there is achieved an effect of suppressing performance degradation caused by lens eccentricity at the time of manufacturing.

When the magnification is changed from the wide angle end to the telephoto end, the fifth lens group G5 is moved toward the magnification side.

An "aberration variation associated with magnification change" can be reduced by moving the fifth lens group toward the magnification side. Particularly, a variation in field curvature can be reduced.

Also, good correction of axial chromatic aberration is made possible.

As for the projection zoom lens of the present invention, better performance can be realized by satisfying one or more of the following Conditions (2-III) and (3-III) in addition to the above configuration.

$$|F4|<|F5| \tag{2-III}$$

$$0.9<F4\text{-}5w/F4\text{-}5t<1.1 \tag{3-III}$$

In Conditions (2-III) and (3-III) described above, the meanings of respective parameter symbols are as follows.

"F4" represents a focal length of the fourth lens group and "F5" represents a focal length of the fifth lens group.

"F4-5w" represents a composite focal length of the fourth and fifth lens groups at the wide angle end. Also, "F4-5t" represents a composite focal length of the fourth and fifth lens groups at the telephoto end.

As described above, for the refractive power of the fourth and fifth lens groups, the following four combinations are possible: "positive and negative, positive and positive, negative and negative, and negative and positive".

Therefore, the composite focal lengths: F4 and F5 may be "positive" or "negative".

Condition (2-III) specifies a magnitude relationship between absolute values of the composite focal lengths: F4 and F5.

When Condition (2-III) is not satisfied, it is difficult to achieve a balance in power distribution in the entire system of the projection zoom lens. Accordingly, aberrations are likely to be increased.

The satisfaction of Condition (2-III) makes it easier to achieve a balance in power distribution in the entire system and to realize good correction of the aberrations.

It is preferable that the refractive power of the fifth lens group has the "smallest absolute value" among the first to fifth lens groups.

When the refractive power of the fifth lens group becomes larger than those of the other lens groups in absolute value, it becomes difficult to achieve a balance in power distribution in the entire system. Thus, the aberrations are likely to be increased.

When the upper limit of Condition (3-III) is exceeded, a "difference in composite focal length between the fourth and fifth lens groups" is increased during magnification change. As a result, spherical aberration and axial chromatic aberration are likely to be increased during magnification change.

Also, the astigmatism at the telephoto end is likely to be increased.

When the lower limit of Condition (3-III) is exceeded, coma aberration at the telephoto end is likely to be increased.

By satisfying Condition (3-III), the increases in astigmatism and coma aberration at the telephoto end are suppressed. Thus, variations in spherical aberration and axial chromatic aberration during magnification change can be effectively suppressed.

When the fourth lens group is set to have the "negative refractive power", it is preferable to satisfy the following condition within the range of Condition (1-III) described above.

$$43 \text{ degrees} \leq \omega w < 45 \text{ degrees} \tag{1A-III}$$

Also, it is preferable to satisfy one or more of the following conditions together with Condition (1A-III).

$$|F4|<|F5| \tag{2A-III}$$

$$0.9<F4\text{-}5w/F4\text{-}5t<1.1 \tag{3A-III}$$

The parameters in Conditions (2A-III) and (3A-III) are the same as those in Conditions (2-III) and (3-III). Conditions (1A-III) to (3A-III) are within the range of Conditions (1-III) to (3-III).

In the configuration in which the fourth lens group has the "negative" refractive power, the satisfaction of one or more of Conditions (2A-III) and (3A-III) together with Condition (1A-III) can allow the role of Conditions (1-III) to (3-III) described above to similarly function.

Meanwhile, when the fourth lens group is set to have the "positive refractive power", it is preferable to satisfy the following condition within the range of Condition (1-III) described above.

$$34 \text{ degrees} \leq \omega w < 45 \text{ degrees} \tag{1B-III}$$

Also, it is preferable to satisfy one or more of the following conditions together with Condition (1B-III).

$$|F4| < |F5| \tag{2B-III}$$

$$0.9 < F4\text{-}5w/F4\text{-}5t < 1.1 \tag{3B-III}$$

The parameters in Conditions (2B-III) and (3B-III) are the same as those in Conditions (2-III) and (3-III). Conditions (1B-III) to (3B-III) are within the range of Conditions (1-III) to (3-III).

In the configuration in which the fourth lens group has the "positive" refractive power, the satisfaction of one or more of Conditions (2B-III) and (3B-III) together with Condition (1B-III) can allow the role of Conditions (1-III) to (3-III) described above to similarly function.

When the magnification is changed from the wide angle end to the telephoto end, it is preferable that the second lens group is slowly moved toward the reduction side, and that the third and fourth lens groups are individually moved toward the magnification side.

By moving the second to fourth lens groups as described above in magnification change from the wide angle end to the telephoto end, an aberration variation associated with magnification change, particularly, a variation in coma aberration can be reduced.

In this case, when the first lens group G1 is fixed, the third to fifth lens groups are displaced toward the magnification side, and the second lens group is displaced toward the reduction side.

By moving the first to fifth lens groups as described above, the aberration variation during magnification change can be easily suppressed. Thus, a compact high-performance projection zoom lens can be realized.

Moreover, since the third to fifth lens groups are displaced toward the magnification side in magnification change from the wide angle end to the telephoto end, a "long back focus" can be ensured also during magnification change.

This facilitates use of a micromirror device such as a DMD, as a light bulb of the projection zoom lens.

As described above, the projection zoom lens of the invention described above satisfies Condition (1-IV).

In the first lens group, the lens surface farthest to the magnification side is convex toward the magnification side, and the lens surface farthest to the reduction side is concave toward the reduction side.

Condition (1-IV) specifies a range of a half field angle at the wide angle end.

More specifically, the half field angle at the wide angle end of the projection zoom lens of the invention is greater than 34 degrees and less than 45 degrees. In other words, the zoom lens has a very wide field angle.

In order to satisfy the above condition, a "negative lens group preceding type" is preferable. Therefore, the refractive power distribution of the first to third lens groups G1 to G3 is "negative, negative and positive" where the negative lens groups precede the positive lens group.

By adopting the negative lens group preceding type, a principal ray height can be "further reduced" and a lens effective diameter can be reduced. Therefore, a compact projection zoom lens with a wide field angle can be realized.

Also, a "flip-up angle of luminous flux" from the second lens group to the first lens group upon image projection can be minimized.

Upon image projection, projection luminous flux (oblique ray flux) projected from the light bulb side is guided toward the first lens group G1 from the fifth lens group G5.

In this event, since the first and second lens groups G1 and G2 are both negative, a divergence angle of the luminous flux from the third lens group G3 can be naturally increased in the second and first lens groups.

Therefore, as described above, a flip-up angle of the luminous flux handed over from the second lens group to the first lens group can be minimized, and thus a divergence angle of luminous flux radiated from the first lens group can be naturally increased.

More specifically, a wider angle can be achieved without sacrificing the performance.

Moreover, there is achieved an effect of suppressing performance degradation caused by lens eccentricity at the time of manufacturing.

While the first lens group is a "negative group", the field curvature is likely to be significantly negative when the lens surface farthest to the magnification side of the first lens group is "concave toward the magnification side".

Therefore, in the projection zoom lens of the invention, the lens surface farthest to the magnification side of the first lens group is set to be "convex toward the magnification side".

Also, a variation in "field curvature and distortion" during magnification change is reduced by setting the lens surface farthest to the reduction side of the first lens group to be "concave toward the reduction side".

As for the projection zoom lens of the present invention, better performance can be realized by satisfying one or more of the following Conditions (2-IV) to (5-IV) in addition to the above configuration.

$$1.3 < R1/R2 < 2.1 \tag{2-IV}$$

$$2.0 < |f1/F1| < 6.5 \tag{3-IV}$$

$$4.5 < |f1/fw| < 10.8 \tag{4-IV}$$

$$|F1| < |F2| \tag{5-IV}$$

In Conditions (2-IV) to (5-IV) described above, the meanings of respective parameter symbols are as follows.

"R1" represents a "curvature radius of the magnification-side lens surface" of the lens farthest to the magnification side in the first lens group. "R2" represents a "curvature radius of the reduction-side lens surface" of the lens.

"f1" represents a focal length of the lens farthest to the magnification side in the first lens group. "F1" represents a focal length of the first lens group (a composite focal length of the lenses included in the first lens group).

"fw" is a focal length of the entire system at the wide angle end. "F2" is a focal length of the second lens group. Since the first and second lens groups are both negative groups, F1 and F2 are both "negative".

Condition (2-IV) relates to "field curvature".

When the upper limit of Condition (2-IV) is exceeded, a large astigmatism is likely to occur particularly on the telephoto side. On the other hand, when the lower limit thereof is exceeded, a large field curvature is likely to occur on the positive side.

By satisfying Condition (2-IV), the astigmatism on the telephoto side and the field curvature are easily optimized.

Condition (3-IV) is a condition concerning "astigmatism and color difference of coma aberration".

When the lower limit of Condition (3-IV) is exceeded, the "astigmatism on the telephoto side" and a "color difference of coma aberration on the wide angle side" are likely to be increased. When the upper limit thereof is exceeded, a "color difference of coma aberration on the telephoto side" is likely to be increased.

When Condition (3-IV) is satisfied, the astigmatism and the "color difference of coma aberration" can be effectively suppressed.

Condition (4-IV) is a condition to enable good correction of "magnification chromatic aberration".

Outside the range of Condition (4-IV), the magnification chromatic aberration is likely to be increased. However, by satisfying Condition (4-IV), an increase in magnification chromatic aberration can be effectively suppressed.

Condition (5-IV) is a condition to optimize the "field curvature during magnification change".

Condition (5-IV) represents that the negative refractive power of the first lens group is smaller than the negative refractive power of the second lens group in absolute value.

More specifically, in a state where Condition (5-IV) is satisfied, the negative refractive power is larger in the first lens group than in the second lens group.

When Condition (5-IV) is not satisfied, the power of the second lens group becomes stronger than that of the first lens group. Thus, a large field curvature occurs during magnification change.

By satisfying Condition (5-IV), the "occurrence of the field curvature can be effectively suppressed across the entire zoom area". Note that it is preferable that a ratio of focal lengths F1 and F2: F1/F2 is within the range of the following condition.

$$0.1 < F1/F2 < 1.0 \tag{a-IV}$$

Condition (a-IV) is effective in correcting the astigmatism and field curvature.

The "projection zoom lens used in the image display device which enlarges an image displayed on the display surface of the image display element by projecting the image onto a target projection surface" described above has a five-lens-group configuration.

More specifically, the first to fifth lens groups are arranged from the magnification side toward the reduction side. The first lens group has "negative" refractive power, the second lens group has "negative" refractive power, and the third lens group has "positive" refractive power.

In the first lens group, the lens surface farthest to the magnification side is convex toward the magnification side, and the lens surface farthest to the reduction side is concave toward the reduction side.

In such a configuration, when the refractive power of the fourth lens group is "negative", it is preferable to satisfy the following condition within the range of Condition (1-IV) described above.

$$43 \text{ degrees} \leq \omega w < 45 \text{ degrees} \tag{1A-IV}$$

In this case, it is preferable to satisfy one or more of the following Conditions (2A-IV) to (5A-IV) together with Condition (1A-IV). Conditions (1A-IV) to (5A-IV) are within the range of Conditions (1-IV) to (5-IV).

$$1.8 < R1/R2 < 2.1 \tag{2A-IV}$$

$$2.5 < |f1/F1| < 3.5 \tag{3A-IV}$$

$$9.5 < |f1/fw| < 10.8 \tag{4A-IV}$$

$$|F1| < |F2| \tag{5A-IV}$$

The parameters in Conditions (2A-IV) to (5A-IV) are the same as those in Conditions (2-IV) to (5-IV) described above.

In the configuration in which the fourth lens group has the "negative" refractive power, the satisfaction of Condition (1A-IV) and the satisfaction of one or more of Conditions (2A-IV) to (5A-IV) together with Condition (1A-IV) can allow the role of Conditions (1-IV) to (5-IV) described above to similarly function.

When the refractive power of the fourth lens group is "positive", it is preferable to satisfy one or more of the following Conditions (2B-IV) to (5B-IV) together with Condition (1-IV). Conditions (2B-IV) to (5B-IV) are within the range of Conditions (2-IV) to (5-IV).

$$1.3 < R1/R2 < 2.1 \tag{2B-IV}$$

$$2.0 < |f1/F1| < 6.5 \tag{3B-IV}$$

$$4.5 < |f1/fw| < 9.5 \tag{4B-IV}$$

$$|F1| < |F2| \tag{5B-IV}$$

The parameters in Conditions (2B-IV) to (5B-IV) are the same as those in Conditions (2-IV) to (5-IV) described above.

In the configuration in which the fourth lens group has the "positive" refractive power, the satisfaction of one or more of Conditions (2B-IV) to (5B-IV) together with Condition (1-IV) can allow the role of Conditions (1-IV) to (5-IV) described above to similarly function.

When the magnification is changed from the wide angle end to the telephoto end, the second lens group G2 is moved toward the reduction side, the third lens group G3 is moved toward the magnification side, and the fourth lens group G4 is moved toward the magnification side.

An "aberration variation associated with magnification change" can be reduced by moving the second lens group G2 toward the reduction side.

Also, by moving the third and fourth lens groups G3 and G4 toward the magnification side, the magnification can be efficiently changed, and the aberration variation can also be reduced.

Thus, a variable magnification ratio can be set to 1.45 times or more. However, needless to say, the aberration variation during the magnification change can be reduced even when the variable magnification ratio is 1.45 times or less.

It is preferable that the displacement of the second lens group toward the reduction side during the magnification change from the wide angle end to the telephoto end is "gradual and monotonous" or that the second lens group is moved so as to draw a "convex trajectory toward the reduction side".

The "convex trajectory toward the reduction side" has an effect of reducing the movement region of the second lens group during the magnification change, and thus contributes to the downsizing of the projection zoom lens.

Also, the fourth lens group is a positive lens group, the third and fourth lens groups each include one or two positive lenses, and the total number of lenses in the third and fourth lens groups is three or less. Such a configuration enables effective magnification change and also an aberration variation during the magnification change to be minimized.

Moreover, the fourth lens group is the positive lens group, and, as to the d-line refractive indices of the lenses in the third and fourth lens groups, the lens farthest to the magnification side in the third lens group has the largest refractive index and the lens farthest to the reduction side in the fourth lens group has the smallest refractive index.

By gradually reducing the refractive index, a ray refraction angle can be gradually reduced. Thus, optimum aberration correction can be performed.

When the refractive index of d-line of the lens farthest to the magnification side in the third lens group is 1.7 or more and the refractive index of d-line of the lens farthest to the reduction side in the fourth lens group is 1.5 or less, aberrations can be effectively prevented from occurring.

Note that, needless to say, the refractive index of d-line of the lens means the "refractive index of d-line of the material of the lens".

During the magnification change from the wide angle end to the telephoto end, the first lens group G1 is fixed.

Since the first lens group G1 is fixed during magnification change, the external shape of the projection zoom lens mounted on the image formation device is not changed during magnification change.

Condition (1-V) is a condition to maintain high performance across the entire variable magnification area from the wide angle to the telephoto when the variable magnification ratio is 1.45 times or more during the magnification change from the wide angle end to the telephoto end.

When the upper or lower limit of Condition (1-V) is exceeded, a variation in "aberrations particularly on the telephoto side" during the magnification change is increased.

Also, in the projection zoom lens, it is preferable that the half field angle at the wide angle end: ωw satisfies the following condition.

$$34 \text{ degrees} \leq \omega w < 45 \text{ degrees} \tag{2-V}$$

By satisfying Condition (2-V), a projection zoom lens with a very wide field angle can be realized.

As described above, for the refractive power of the fourth and fifth lens groups G4 and G5, combinations of "positive and negative", "positive and positive", "negative and negative" and "negative and positive" are possible.

When the refractive power of the fourth lens group is "negative", it is preferable to satisfy the following condition within the range of Condition (1-V) described above.

$$1.00 < D3/D4 < 1.10 \tag{1A-V}$$

Also, it is preferable to satisfy the following condition within the range of Condition (2-V) together with Condition (1A-V).

$$43 \text{ degrees} \leq \omega w < 45 \text{ degrees} \tag{2A-V}$$

Conditions (1A-V) and (2A-V) are within the range of Conditions (1-V) and (2-V).

In the configuration in which the fourth lens group has the "negative" refractive power, the satisfaction of Condition (1A-V) can allow the role of Condition (1-V) to similarly function.

Also, the satisfaction of Condition (2A-V) together with Condition (1A-V) can allow the role of Condition (1-V) to similarly function within the field angle range of Condition (2A-V).

When the refractive power of the fourth lens group is "positive", it is preferable to satisfy the following condition within the range of Condition (1-V) described above.

$$0.05 < D3/D4 < 1.10 \tag{1B-V}$$

Also, it is preferable to satisfy the following condition within the range of Condition (2-V) together with Condition (1B-V).

$$34 \text{ degrees} \leq \omega w < 45 \text{ degrees} \tag{2B-V}$$

Conditions (1B-V) and (2B-V) are within the range of Conditions (1-V) and (2-V).

In the configuration in which the fourth lens group has the "positive" refractive power, the satisfaction of Condition (1B-V) can allow the role of Condition (1-V) to similarly function.

Also, the satisfaction of Condition (2B-V) together with Condition (1B-V) can allow the role of Condition (1-V) to similarly function within the field angle range of Condition (2B-V).

Condition (1-VI) specifies a range of a half field angle at the wide angle end.

More specifically, the half field angle at the wide angle end of the projection zoom lens of the present invention is greater than 34 degrees and less than 45 degrees. In other words, the projection zoom lens has a very wide field angle.

In order to satisfy the above condition, a negative lens group preceding type is preferable. Therefore, the refractive power distribution of the first to third lens groups G1 to G3 is "negative, negative and positive" where the negative lens groups precede the positive lens group.

By adopting the negative lens group preceding type, a principal ray height can be reduced and a lens effective diameter can be reduced. Therefore, a compact projection zoom lens with a wide field angle can be realized.

Also, a "flip-up angle of luminous flux" from the second lens group to the first lens group upon image projection can be minimized.

Upon image projection, projection luminous flux (oblique ray flux) projected from the light bulb side is guided toward the first lens group G1 from the fifth lens group G5.

In this event, since the first and second lens groups G1 and G2 are both negative, a divergence angle of the luminous flux from the third lens group can be naturally increased in the second and first lens groups.

Therefore, as described above, a flip-up angle of the luminous flux handed over from the second lens group to the first lens group can be minimized, and thus a divergence angle of luminous flux radiated from the first lens group can be naturally increased.

More specifically, a wider angle can be achieved without sacrificing the performance.

Moreover, there is achieved an effect of suppressing performance degradation caused by lens eccentricity at the time of manufacturing.

Also, by using two or three lenses to form the first lens group likely to grow in size and weight, the projection zoom lens can be reduced in size and weight.

A wide angle lens generally has a negative lens disposed in a preceding group to radiate a light ray. However, such disposition is likely to generate particularly coma aberration, astigmatism and distortion.

In order to correct such coma aberration, astigmatism and distortion likely to be generated, an appropriate number of the lenses included in the first lens group is 2 or 3.

A configuration of the first lens group including only one lens is not preferable since an aberration variation during magnification change is increased, the lens diameter is increased and the curvature of the lens surface becomes too large.

Meanwhile, a configuration of the first lens group including four lenses or more may cause "eccentricity by its own weight" in the first lens group, since the first lens group grows in weight and the projection zoom lens itself grows in weight.

As for the projection zoom lens of the present invention, better performance can be realized by satisfying one or more of the following Conditions (2-VI), (4-VI) and (C-VI) in addition to the above configuration.

$$0.2<|fw/F1|<0.8 \qquad (2\text{-VI})$$

$$-1.35\%<DISw<0.0\% \qquad (4\text{-VI})$$

$$1.3<R1f/R1r<2.1 \qquad (C\text{-VI})$$

In Conditions (2-VI), (4-VI) and (C-VI) described above, the meanings of respective parameter symbols are as follows.

"fw" represents a focal length of the entire system at the wide angle end. "F1" represents a focal length of the first lens group.

"DISw" represents a value of optical distortion in an effective image circle at the wide angle end when the projection distance is 1600 mm.

"R1f" represents a curvature radius of the magnification-side lens surface farthest to the magnification side in the first lens group. "R1r" represents a curvature radius of the reduction-side lens surface farthest to the reduction side in the first lens group.

Condition (2-VI) is a condition concerning a preferable range of the power of the first lens group with respect to the power of the entire system of the projection zoom lens.

When the range of Condition (2-VI) is exceeded, the power balance between the first lens group and the entire system is lost, leading to an imbalance of aberrations. As a result, a large variation is likely to occur particularly in field curvature during magnification change.

By satisfying Condition (2-VI), the negative power of the first lens group and a power distribution of the entire projection zoom lens can be kept in good balance. This enables a good balance of aberrations.

Condition (4-VI) is a condition to control optical distortion in an effective image circle at the wide angle end with the projection distance: 1600 mm.

Outside the range of Condition (4-VI), a so-called "TV distortion" to an image to be projected is increased. This tends to affect the shape of the projection image.

By satisfying Condition (4-VI), a well-shaped projection image can be obtained.

Note that the "projection distance" means a distance between the target projection surface and the lens surface farthest to the magnification side of the projection zoom lens.

Condition (C-VI) is a condition which enables good correction of coma aberration, in particular, among aberrations.

Outside the range of Condition (C-VI), the lens surface farthest to the magnification side and the lens surface farthest to the reduction side in the first lens group are likely to go out of balance.

When the balance therebetween is lost, a large color difference of blue light (wavelength: 460 nm) particularly from green light (wavelength: 550 nm) is likely to occur in the coma aberration.

By satisfying Condition (C-VI), the above problem related to the coma aberration can be effectively avoided.

In the projection zoom lens of the present invention, one or more aspherical lenses can be disposed in the first lens group. Thus, the performance can be further improved by the use of the aspherical lens.

In this case, better performance can be realized by satisfying one or more of the following Conditions (3-VI) and Conditions (A-VI) and (B-VI) in addition to the above configuration and Conditions (2-VI), (4-VI) and (C-VI).

$$1.0E\text{-}03<1/|fsph|<2.0E\text{-}02 \qquad (3\text{-VI})$$

$$0.3<|Rpf/Rpr|<2.5 \qquad (A\text{-VI})$$

$$1.5<fp/F1<10.0 \qquad (B\text{-VI})$$

In Conditions (3-VI), (A-VI) and (B-VI) described above, the meanings of respective parameter symbols are as follows.

"fsph" represents a focal length of the aspherical lens arranged in the first lens group.

"Rpf" represents a curvature radius of the surface farthest to the magnification side in the aspherical lens arranged in the first lens group.

"Rpr" represents a curvature radius of the surface farthest to the reduction side in the aspherical lens arranged in the first lens group.

"fp" represents a focal length of the aspherical lens within the first lens group. "F1" represents a focal length of the first lens group as described above.

In the notation of Condition (3-VI), "2.0E-02", for example, represents "$2.0 \times 10^{-2}$". The same goes for the following.

Condition (3-VI) is a condition which makes it possible to easily realize a good range of distortion specified by Condition (4-VI) described above.

Outside the range of Condition (3-VI), the refractive power of the aspherical lens included in the first lens group is too large or too small. This leads to an increase in the TV distortion.

Condition (A-VI) is a condition effective in improving the shape of distortion.

The optical distortion is likely to be reduced when the lower limit of Condition (A-VI) is exceeded, and is likely to be increased when the upper limit thereof is exceeded.

Outside the range of Condition (A-VI), the optical distortion goes out of balance. As a result, the shape of the TV distortion is likely to be distorted.

By satisfying Condition (A-VI), a good "shape of TV distortion (shape of projection image)" is easily maintained.

Condition (B-VI) is a condition effective in keeping the distortion and coma aberration in good balance.

Outside the range of Condition (B-VI), the distortion and coma aberration are likely to complexly go out of balance. By satisfying Condition (B-VI), the distortion and coma aberration are easily kept in good balance.

The number of aspherical lenses disposed in the first lens group may be one.

When the refractive power of the fourth lens group G4 among the first to fifth lens groups G1 to G5 in the projection zoom lens is positive, the magnification-side lens surface of the aspherical lens can be set to be an aspherical surface.

In this case, it is preferable that the aspherical surface has a "shape which is concave toward the magnification side in the vicinity of the optical axis and has an inflection point in the vicinity of 50% of the effective radius of the lens surface outward from the optical axis".

Moreover, as the fourth lens group G4, one having "negative refractive power" can also be used. In such a case, it is preferable that the magnification-side lens surface has an aspherical surface of a shape as described below.

Specifically, the aspherical surface has a "shape which is convex toward the magnification side in the vicinity of the optical axis and has an inflection point in the vicinity of 30% of the effective radius of the lens surface outward from the optical axis".

The aspherical lens in the first lens group is "effective in correcting the distortion".

The aspherical shape in each of the above cases is effective in suppressing the optical distortion.

The "projection zoom lens used in the image display device which enlarges a projection image displayed on the image display element by projecting the image onto a target projection surface" described above has a five-lens-group configuration.

More specifically, the first to fifth lens groups are arranged from the magnification side toward the reduction side. The first lens group has "negative" refractive power, the second lens group has "negative" refractive power, and the third lens group has "positive" refractive power.

Also, the first lens group includes "two or three lenses".

When the projection zoom lens is configured with the fourth lens group as a "negative group", it is preferable to satisfy the following condition within the range of Condition (1-VI).

$$43 \text{ degrees} \leq \omega w < 45 \text{ degrees} \quad \text{(1A-VI)}$$

Moreover, in this case, it is preferable to satisfy one or more of the following Conditions (2A-VI) to (C1-VI). Conditions (1A-VI) to (C1-VI) are within the range of Conditions (1-VI) to (C-VI).

$$0.28 < |fw/F1| < 0.31 \quad \text{(2A-VI)}$$

$$1.0E\text{-}02 < 1/|fsph| < 2.0E\text{-}02 \quad \text{(3A-VI)}$$

$$-1.35\% < DISw < -1.2\% \quad \text{(4A-VI)}$$

$$2.0 < |Rpf/Rpr| < 2.5 \quad \text{(A1-VI)}$$

$$1.5 < fp/F1 < 2.0 \quad \text{(B1-VI)}$$

$$1.7 < R1f/R1r < 2.1 \quad \text{(C1-VI)}$$

The parameters in Conditions (2A-VI) to (C1-VI) are the same as those in Conditions (2-VI) to (C-VI) described above.

Conditions (3A-VI), (A1-VI) and (B1-VI) are based on the premise that "one or more aspherical lenses" are disposed in the first lens group.

In the configuration of the projection zoom lens in which the fourth lens group has the "negative refractive power", the satisfaction of Condition (1A-VI) and the satisfaction of one or more of Conditions (2A-VI) to (C1-VI) can allow the role of Conditions (1-VI) to (C-VI) described above to similarly function.

When the projection zoom lens is configured with the fourth lens group as a "positive group", it is preferable to satisfy the following condition within the range of Condition (1-VI).

$$43 \text{ degrees} \leq \omega w < 45 \text{ degrees} \quad \text{(1B-VI)}$$

Moreover, in this case, it is preferable to satisfy one or more of the following Conditions (2B-VI) to (C2-VI). Conditions (1B-VI) to (C2-VI) are within the range of Conditions (1-VI) to (C-VI).

$$0.4 < |fw/F1| < 0.8 \quad \text{(2B-VI)}$$

$$1.0E\text{-}03 < 1/|fsph| < 1.0E\text{-}02 \quad \text{(3B-VI)}$$

$$-1.35\% < DISw < 0.0\% \quad \text{(4B-VI)}$$

$$0.3 < |Rpf/Rpr| < 1.0 \quad \text{(A2-VI)}$$

$$7.0 < fp/F1 < 10.0 \quad \text{(B2-VI)}$$

$$1.3 < R1f/R1r < 2.0 \quad \text{(C2-VI)}$$

The parameters in Conditions (2B-VI) to (C2-VI) are the same as those in Conditions (2-VI) to (C-VI).

Conditions (3B-VI), (A2-VI) and (B2-VI) are based on the premise that "one or more aspherical lenses" are disposed in the first lens group.

In the configuration of the projection zoom lens in which the fourth lens group has the "positive refractive power", the satisfaction of Condition (1B-VI) and the satisfaction of one or more of Conditions (2B-VI) to (C2-VI) can allow the role of Conditions (1-VI) to (C-VI) described above to similarly function.

One of the features of the present invention is that at least one "lens group including four lenses or more and having negative refractive power" is disposed as the second lens group or any of the subsequent lens groups (i.e., the second to fifth lens groups).

By configuring the negative lens group with four lenses or more as a compensator, the effect of the compensator is effectively improved.

The present invention intends to realize a non-conventional wide-angle projection zoom lens having a half field angle at a wide angle end: 34 degrees or more.

In consideration of the function of the compensator used in the wide-angle projection zoom lens as described above, configuration of the compensator with four lenses or more is preferable in correcting aberrations.

Needless to say, the use of aspherical lenses makes it possible to configure the compensator with a negative lens group including three lenses or less.

Up to the fourth lens from the magnification side in the negative lens group, the refractive power arrangement of the lenses is positive, negative, positive and negative or negative, positive, negative and positive.

By "alternately disposing the positive and negative lenses" as described above, aberrations can be effectively corrected.

Also, an "effect of reducing the occurrence of chromatic aberrations" can be achieved.

Furthermore, by "disposing a cemented lens" in the negative lens group, an effect of "reducing the lens eccentricity sensitivity" by the cemented lens is achieved as well as reduction in chromatic aberrations.

As for the projection zoom lens of the present invention, better performance can be realized by satisfying one or more of the following Conditions (1-VII) to (8-VII) in addition to the above configuration.

$$0.7 < F2b/F2 < 3.0 \quad \text{(1-VII)}$$

$$NdNp \cdot vdNp < NdNn \cdot vdNn \quad \text{(2-VII)}$$

$$1.70 < NdNp < 2.10 \quad \text{(3-VII)}$$

$$18.0 < vdNp < 30.0 \quad \text{(4-VII)}$$

$$1.45 < NdNn < 1.75 \quad \text{(5-VII)}$$

$$48.0 < vdNn < 90.0 \quad \text{(6-VII)}$$

$$1.0 < |fNp/fNn| < 2.0 \quad \text{(7-VII)}$$

$$2.5E\text{-}04 < |fNpNn| < 2.0E\text{-}02 \quad \text{(8-VII)}$$

In the above conditions described above, the meanings of respective parameter symbols are as follows.

"F2b" represents a focal length of a cemented lens in the negative lens group disposed as the second lens group or subsequent lens group. "F2" represents a focal length of the negative lens group disposed as the second lens group or subsequent lens group.

"NdNp" represents a refractive index of d-line of a "positive lens with the lowest Abbe number of d-line" among the positive lenses in the negative lens group disposed as the second lens group or subsequent lens group. "vdNp" represents the Abbe number of d-line of the positive lens.

"NdNn" represents a refractive index of d-line of a "negative lens with the highest Abbe number of d-line" among the negative lenses in the negative lens group disposed as the second lens group or subsequent lens group. "vdNn" represents the Abbe number of d-line of the negative lens.

"f2p" represents a focal length of a "positive lens with the lowest Abbe number of d-line" among the positive lenses in the negative lens group disposed as the second lens group or subsequent lens group.

"f2n" represents a focal length of a "negative lens with the highest Abbe number of d-line" among the negative lenses in the negative lens group disposed as the second lens group or subsequent lens group.

"f2p2n" represents a composite focal length of the "positive lens with the lowest Abbe number of d-line" and the "negative lens with the highest Abbe number of d-line" among the lenses in the negative lens group disposed as the second lens group or subsequent lens group.

Note that, in Condition (8-VII), "2.5E-04", for example, represents "$2.5\times10^{-4}$". The same goes for the following.

As described above, Conditions (1-VII) to (8-VII) are those specifying the materials of the lenses included in the negative lens group as the second lens group or subsequent lens group.

In the projection zoom lens of each of the examples to be described below, the negative lens group in the second lens group G2 is set to be an "aberration correction group".

By configuring the aberration correction group with four lenses or more, the "aberration correction" effect can be maximized.

Particularly, all of the examples relate to a wide-angle zoom lens. Also, in an aberration correction group on the wide angle side, aberration correction tends to be not enough unless there are four lenses or more.

Moreover, the aberration correction effect is improved by moving the second lens group G2 from the magnification side to the reduction side during magnification change from the wide angle end to the telephoto end.

In all of the examples, the second lens group that is the negative lens group includes positive and negative lenses, two for each, arranged in the order of "positive, negative, positive and negative" from the magnification side.

By "alternately disposing the positive and negative lenses" as described above, chromatic aberrations are effectively corrected, thereby improving coma aberration and astigmatism.

The same effect as that described above can be achieved even when the positive and negative lenses are reversely arranged as "negative, positive, negative and positive".

Condition (1-VII) is a condition to keep the astigmatism and field curvature in good balance.

When Condition (1-VII) is not satisfied, the "balance between the astigmatism and field curvature" is likely to be significantly disrupted during magnification change.

Condition (2-VII) is a condition to keep the magnification chromatic aberration, coma aberration and astigmatism in balance.

When Condition (2-VII) is not satisfied, a large imbalance is likely to occur particularly in the magnification chromatic aberration, coma aberration and astigmatism.

By satisfying Condition (2-VII), particularly the magnification chromatic aberration, coma aberration and astigmatism can be kept in balance.

The "negative second lens group" in the projection zoom lens of the present invention can be set as the "aberration correction group" as described above.

In this case, outside the range of Condition (3-VII), a large magnification chromatic aberration occurs, and the coma aberration and astigmatism are also likely to be increased.

By satisfying Condition (3-VII), increases in the magnification chromatic aberration, coma aberration and astigmatism can be effectively suppressed.

As is well known, a combination of crown glass (low refractive index) as a positive lens and flint glass (high refractive index) as a negative lens is generally effective in effectively performing "achromatization".

However, in the projection zoom lens of the present invention, it is preferable that the second lens group includes a high refractive index and high dispersion positive lens and a low refractive index and low dispersion negative lens, as in the case of Condition (3-VII).

This combination is effective in improving the achromatization and reducing the Petzval sum.

Here, description is given of the case of a lens configuration of positive, negative and negative (cemented lens), which is also employed as the second lens group in examples to be described later.

In this case, consideration is given to the case where a positive lens farthest to the magnification side has a "high refractive index and high dispersion" and a negative lens disposed on the reduction side of the positive lens has a "low refractive index and low dispersion".

In this case, the high refractive index and high dispersion causes a large chromatic aberration on the positive side and increases the Petzval sum on the negative side in the positive lens.

Such chromatic aberration and Petzval sum are "effectively suppressed" by the negative lens having the low refractive index and low dispersion.

Thus, the increases in the magnification chromatic aberration, coma aberration and astigmatism are effectively suppressed.

On the other hand, when the positive lens has a "low refractive index and low dispersion" and the negative lens has a "high refractive index and high dispersion", the chromatic aberration and the Petzval sum are significantly amplified.

For this reason, the magnification chromatic aberration, coma aberration and astigmatism are even more likely to be increased.

Condition (4-VII) is a condition effective in suppressing the magnification chromatic aberration.

As described above, a "high-dispersion material" is preferable for the positive lens in the second lens group. The use of the high-dispersion material which satisfies Condition (4-VII) can effectively suppress the occurrence of the magnification chromatic aberration.

Also, in the case of the projection zoom lens which satisfies Condition (3-VII) or (4-VII), it is preferable that a "biconvex lens" is adopted as the "positive lens in the second lens group" as described in claim 70.

The adoption of the biconvex lens as the shape of the "positive lens with the lowest Abbe number relative to d-line within the second lens group" is effective in correcting the aberration and suppressing the Petzval sum.

When the positive lens is "not the biconvex lens", a large "variation in field curvature" is likely to occur during magnification change.

Condition (5-VII) is a condition effective in suppressing the magnification chromatic aberration. As described above, a lens made of a low-refractive-index material is preferable as the negative lens in the second lens group.

The satisfaction of Condition (5-VII) is effective in controlling a large magnification chromatic aberration and the Petzval sum.

Condition (6-VII) is also a condition effective in suppressing the magnification chromatic aberration. As described above, a lens made of a low-dispersion material is preferable as the negative lens in the second lens group.

The satisfaction of Condition (6-VII) is effective in suppressing the magnification chromatic aberration.

In the projection zoom lens which satisfies Condition (5-VII) or (6-VII), it is preferable that a "biconcave lens" is adopted as the "negative lens in the second lens group" as described in claim 73.

Such a configuration is preferable in correcting the aberration and controlling the Petzval sum.

When the negative lens (negative lens with the highest Abbe number and a low refractive index) is "not the biconcave lens", a "large variation in field curvature" is likely to occur during magnification change.

Condition (7-VII) is an optimum solution to suppress the variation in field curvature during magnification change. By satisfying (7-VII), the variation in field curvature during magnification change can be most effectively suppressed.

Condition (8-VII) is a condition favorable to effective suppression of the occurrence of aberrations.

By satisfying Condition (8-VII), the occurrence of large aberrations can be effectively suppressed.

When the projection zoom lens is configured such that the refractive power of the fourth lens group is "negative", it is preferable to satisfy one or more of the following Conditions (1A-VII) to (8A-VII) within the range of Conditions (1-VII) to (8-VII) described above. Conditions (1A-VII) to (8A-VII) are within the range of Conditions (1-VII) to (8-VII).

$2.0 < F2b/F2 < 3.0$ (1A-VII)

$NdNp \cdot vdNp < NdNn \cdot vdNn$ (2A-VII)

$1.8 < NdNp < 1.9$ (3A-VII)

$23.0 < vdNp < 24.0$ (4A-VII)

$1.7 < NdNn < 1.75$ (5A-VII)

$48.0 < vdNn < 50.0$ (6A-VII)

$1.5 < |fNp/fNn| < 1.8$ (7A-VII)

$1.2E\text{-}02 < |fNpNn| < 1.6E\text{-}02$ (8A-VII)

The parameters in Conditions (1A-VII) to (8A-VII) are the same as those in Conditions (1-VII) to (8-VII) described above.

When the projection zoom lens is configured such that the refractive power of the fourth lens group is "negative", the satisfaction of one or more of Conditions (1A-VII) to (8A-VII) can allow the role of Conditions (1-VII) to (8-VII) described above to similarly function.

When the projection zoom lens is configured such that the refractive power of the fourth lens group is "positive", it is preferable to satisfy one or more of the following Conditions (1B-VII) to (8B-VII) within the range of Conditions (1-VII) to (8-VII) described above. Conditions (1B-VII) to (8B-VII) are within the range of Conditions (1-VII) to (8-VII).

$0.7 < F2b/F2 < 1.5$ (1B-VII)

$NdNp \cdot vdNp < NdNn \cdot vdNn$ (2B-VII)

$1.70 < NdNp < 2.10$ (3B-VII)

$18.0 < vdNp < 30.0$ (4B-VII)

$1.45 < NdNn < 1.60$ (5B-VII)

$58.0 < vdNn < 90.0$ (6B-VII)

$1.0 < |fNp/fNn| < 1.4$ (7B-VII)

$2.5E\text{-}04 < |fNpNn| < 4.6E\text{-}03$ (8B-VII)

The parameters in Conditions (1B-VII) to (8B-VII) are the same as those in Conditions (1-VII) to (8-VII) described above.

When the projection zoom lens is configured such that the refractive power of the fourth lens group is "positive", the satisfaction of one or more of Conditions (1B-VII) to (8B-VII) can allow the role of Conditions (1-VII) to (8-VII) described above to similarly function.

Before giving concrete examples of the projection zoom lens, an embodiment of a projector device will be briefly described with reference to FIG. 29.

Figure 29:
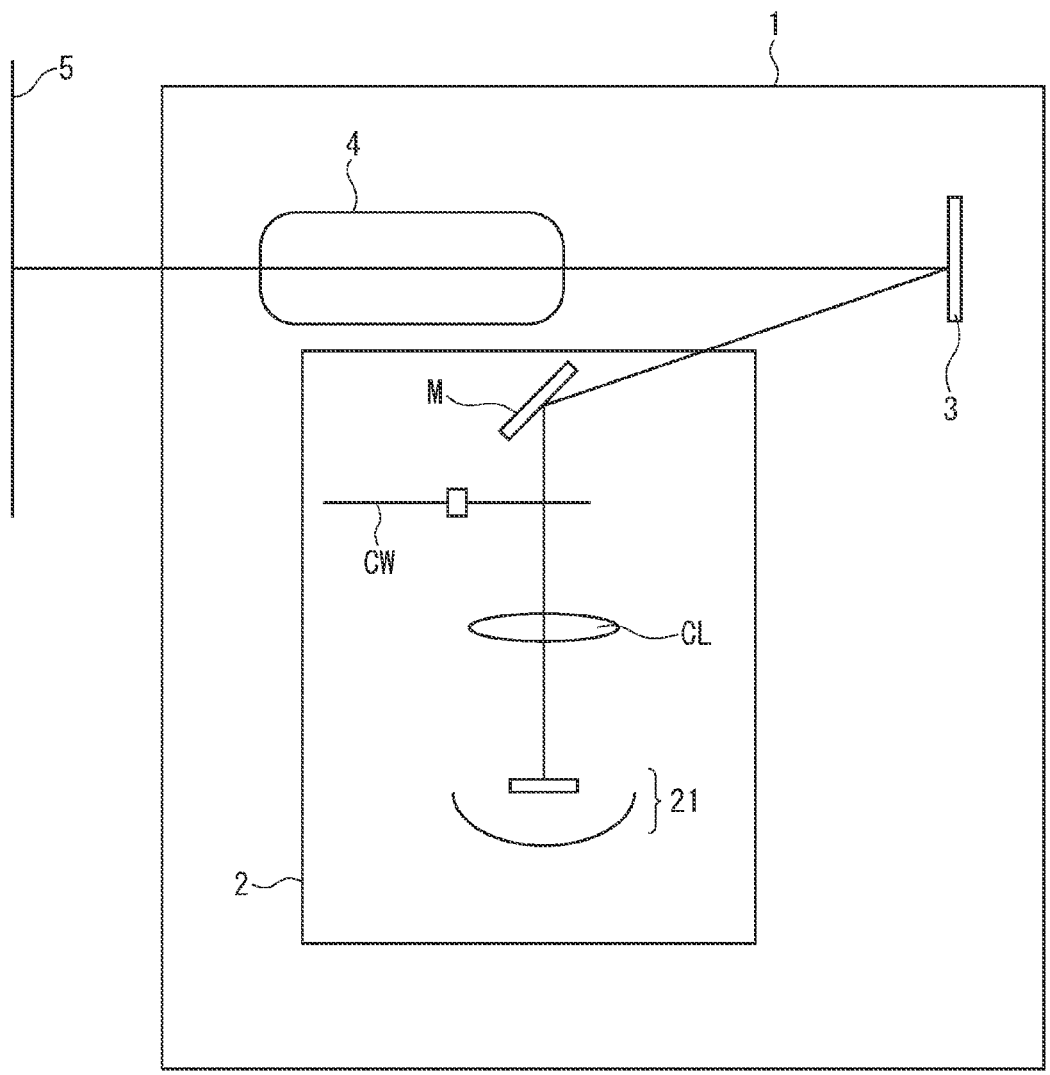
FIG. 29 is a schematic configuration diagram of a projector device as an image display device.

A projector device 1 shown in FIG. 29 is an example of adopting a DMD that is a micromirror device as a light bulb 3.

The projector device 1 includes an illumination system 2, a DMD 3 that is a light bulb, and a projection zoom lens 4.

As the projection zoom lens 4, more specifically, one according to any one of Examples 1 to 14 is used.

The illumination system 2 irradiates the DMD 3 with "light of three colors, R, G and B", while temporally splitting the light. Then, the tilt of a micromirror corresponding to each pixel is controlled at the timing of irradiation of the light of each color.

In this manner, the "image to be projected" is displayed on the DMD 3, and the light intensity-modulated by the image is magnified by the projection zoom lens 4 and projected onto a screen 5.

The micromirror device such as the DMD displays an image by selectively tilting the micromirrors set in array on an image display surface.

The tilt angle of each of the micromirrors is set to about ±10 degrees. By switching the tilt angle, effective reflected light (effective light) and ineffective reflected light (ineffective light) are switched therebetween.

When the micromirror device is used as the light bulb, the projection zoom lens needs to successfully take in the effective light and take in as little ineffective light as possible.

In order to meet the above need, it is preferable that the projection zoom lens is disposed in a "normal direction of the image display surface on which the micromirrors are set in array".

With such disposition of the projection zoom lens, a light source of the illumination system needs to be installed adjacent to the projection zoom lens.

For this reason, a lens diameter on the light bulb side of the projection zoom lens needs to be reduced such that a reduction-side portion of the projection zoom lens does not block illumination light incident on the image display surface.

The illumination system 2 includes a light source 21, a condenser lens CL, an RGB color wheel CW, and a mirror M. Also, a space to dispose the illumination system needs to be "secured so as to be to some extent large in size".

For this reason, an incident angle of the illumination light made incident on the DMD 3 from the illumination system 2 needs to be set to some extent large.

Because of such a relationship between the zoom lens 4 and the space of the illumination system 2, a certain degree of back focus of the zoom lens 4 needs to be secured.

Note that the condenser lens CL, the RGB color wheel CW and the mirror M are included in the "illumination optical system".

In the zoom lens according to Examples 1 to 14, when the magnification is changed from the wide angle end to the telephoto end, third to fifth lens groups G3 to G5 are moved toward the magnification side.

Therefore, a sufficiently large back focus is secured also during magnification change.

EXAMPLES

Fourteen concrete examples of the projection zoom lens of the present invention will be given below.

Note that a lens group having positive refractive power will be hereinafter referred to as a "positive group", and a lens group having negative refractive power will be hereinafter referred to as a "negative group".

In each of the examples, the meanings of respective symbols are as follows.
F: focal length of the entire optical system
Fno: numerical aperture
R: curvature radius ("paraxial curvature radius" for aspherical surface)
D: surface separation
Nd: refractive index
Vd: Abbe number
BF: back focus
The aspherical surface is expressed in the following well-known equation.

$$X=(H^2/R)/[1+\{1-K(H/r)^2\}^{1/2}]+C4\cdot H^4+C6\cdot H^6+C8\cdot H^8+C10\cdot H^{10}+\ldots$$

In the above equation, X represents "displacement in an optical axis direction at a position of a height H from an optical axis based on a surface apex", K represents a "conic constant", and C4, C6, C8, C10 . . . represent aspheric constants.

Example 1

FIG. 1 shows a projection zoom lens of Example 1.

As shown in FIG. 1, a first lens group G1 includes lenses L11 to L13, and a second lens group G2 includes lenses L21 to L24.

A third lens group G3 includes one lens L31, and a fourth lens group G4 includes two lenses L41 and L42.

A fifth lens group G5 includes four lenses L51 to L54.

As described above, a DMD is assumed as a light bulb and has a cover glass CG.

When the magnification is changed from the wide angle end to the telephoto end, the second lens group G2 is moved to the reduction side, and the third to fifth lens groups G3 to G5 are moved to the magnification side.

The first lens group G1 is a negative group, and includes a negative meniscus lens L11 convex toward the magnification side, a negative lens L12 concave toward the magnification side, and a negative meniscus lens L13 concave toward the reduction side.

The second lens group G2 is a negative group, and includes a biconvex lens L21, a biconcave lens L22, a positive meniscus lens L23 convex toward the reduction side, and a negative meniscus lens L24 concave toward the magnification side.

The positive meniscus lens L23 and the negative meniscus lens L24 are cemented.

The third lens group G3 is a positive group, and includes one biconvex lens L31.

The fourth lens group G4 is a positive group, and includes a positive meniscus lens L41 convex toward the magnification side and a positive meniscus lens L42 convex toward the magnification side.

The fifth lens group G5 is a negative group, and includes a negative meniscus lens L51 convex toward the magnification side, a biconvex lens L52, a negative meniscus lens L53 concave toward the magnification side, and a biconvex lens L54.

The negative meniscus lens L51 and the biconvex lens L52 are cemented.

The second lens group G2 is a negative group, and includes a biconvex lens L21, a biconcave lens L22, a positive meniscus lens L23 convex toward the reduction side, and a negative meniscus lens L24 concave toward the magnification side (positive, negative, positive, and negative).

The fifth lens group G5 is a negative group, and includes a negative meniscus lens L51 convex toward the magnification side, a biconvex lens L52, a negative meniscus lens L53 concave toward the magnification side, and a biconvex lens L54 (negative, positive, negative, and positive).

Note that, in the description of Examples 1 to 14, the "biconvex lens" is the positive lens, and the "biconcave lens" is the negative lens.

In Example 1, the range of the focal length of the entire system: F, the F-number, and the half field angle at the wide angle end: ωw are as follows.

F=13.0 to 19.6 mm, Fno=2.55 to 3.34, and ωw=42.1°.

Table 1 shows data on Example 1.

TABLE 1

| SURFACE NUMBER | R | D | Nd | Vd | Lens | Group |
|---|---|---|---|---|---|---|
| 1 | 44.406 | 2.30 | 1.83400 | 37.35 | L11 | G1 |
| 2 | 26.856 | 6.95 | | | | |
| 3* | −42.177 | 4.00 | 1.53159 | 55.70 | L12 | |
| 4* | −72.074 | 4.67 | | | | |
| 5 | 172.742 | 2.00 | 1.84666 | 23.78 | L13 | |
| 6 | 29.498 | S6 | | | | |
| 7 | 60.448 | 6.79 | 1.74077 | 27.79 | L21 | G2 |
| 8 | −47.004 | 0.40 | | | | |
| 9 | −97.889 | 1.50 | 1.49700 | 81.55 | L22 | |

TABLE 1-continued

| SURFACE NUMBER | R | D | Nd | Vd | Lens | Group |
|---|---|---|---|---|---|---|
| 10 | 19.566 | 6.48 | | | | |
| 11 | −49.086 | 6.00 | 1.64769 | 33.79 | L23 | |
| 12 | −16.570 | 1.80 | 1.77250 | 49.60 | L24 | |
| 13 | −88.107 | S13 | | | | |
| 14 | 90.521 | 5.85 | 1.72000 | 46.02 | L31 | G3 |
| 15 | −192.114 | S15 | | | | |
| 16 | 31.766 | 3.55 | 1.69350 | 53.21 | L41 | G4 |
| 17 | 92.110 | 11.32 | | | | |
| 18 | 18.225 | 4.55 | 1.49700 | 81.55 | L42 | |
| 19 | −182.965 | 0.30 | | | | |
| 20 | INF | S20 | | | | |
| 21 | 145.815 | 1.50 | 1.83400 | 37.35 | L51 | G5 |
| 22 | 11.093 | 4.60 | 1.48749 | 70.44 | L52 | |
| 23 | −248.139 | 2.68 | | | | |
| 24 | −14.885 | 1.60 | 1.80610 | 40.93 | L53 | |
| 25 | −28.426 | 0.30 | | | | |
| 26* | 73.512 | 4.52 | 1.48749 | 70.44 | L54 | |
| 27* | −17.082 | Bf | | | | |
| 28 | INF | 1 | 1.51680 | 64.10 | CG | |
| 29 | INF | — | | | | |

In Table 1, the surface numbers are the numbers of surfaces counted from the magnification side, including an aperture stop surface (surface number: 20 in Table 1) and a cover glass CG surface (surface number: 28 and 29 in Table 1).

In Example 1, the configuration of the first to fifth lens groups G1 to G3 is "negative, negative, positive, positive and negative".

"INF" in Table 1 indicates that the curvature radius is infinite. Furthermore, "*" indicates that the surface having this symbol attached thereto is an "aspherical surface".

These items are also the same in Example 2 and subsequent examples.

"Aspherical Surface Data"

Table 2 shows data on the aspherical surface.

TABLE 2

| | 3 | 4 | 26 | 27 |
|---|---|---|---|---|
| K | 0 | 0 | 0 | 0 |
| C4 | 8.3242E−05 | 7.7677E−05 | −5.0310E−06 | 2.1371E−05 |
| C6 | −1.6077E−07 | −8.0673E−08 | 6.1340E−08 | 1.2977E−07 |
| C8 | 2.3526E−10 | −1.1834E−10 | 9.6894E−11 | −9.0695E−10 |
| C10 | 3.8179E−15 | 6.8269E−13 | 2.5985E−12 | 8.9458E−12 |
| C12 | −4.4307E−16 | 7.5274E−16 | 0 | 0 |
| C14 | 5.3461E−19 | −5.5343E−18 | 0 | 0 |
| C16 | −1.5575E−22 | 5.8313E−21 | 0 | 0 |

In Table 1, S6, S13, S15 and S20 each represent lens group spacing, which varies in the event of magnification change.

Table 3 shows the lens group spacing for the wide angle end, intermediate, and the telephoto end when a projection distance is set to 1600 mm.

TABLE 3

| | S6 | S13 | S15 | S20 |
|---|---|---|---|---|
| WIDE ANGLE END | 6.82 | 10.80 | 7.09 | 1.00 |
| INTERMEDIATE | 9.28 | 3.98 | 4.74 | 1.70 |
| TELEPHOTO END | 9.41 | 0.85 | 0.80 | 2.41 |

"Parameter Values in Each Condition"

Table 4 shows parameter values in Conditions (1-I) to (12-I).

TABLE 4

| (1) | ωw | 42.1° |
|---|---|---|
| (2) | f1/f2 | 0.25 |
| (3) | D3/F3 | 0.09 |
| | D4/F4 | 0.52 |
| (4) | 1/|f1_3w| | 0.04 |
| (5) | |f1_3w/fw| | 2.1 |
| (6) | Nd2p · vd2p | 48.4 |
| | Nd2n · vd2n | 122.1 |
| (7) | Nd2p | 1.7408 |
| (8) | vd2p | 27.8 |
| (9) | Nd2n | 1.497 |
| (10) | vd2n | 81.5 |
| (11) | |f2p/f2n| | 1.1 |
| (12) | |f2p2n| | 7.1E−04 |

"Parameter Values in Each Condition"

Table 104 shows parameter values in Conditions (1-II) to (6-II).

TABLE 104

| (1) | Bf/Fw | 2.54 |
|---|---|---|
| (2) | |F1|/Fw | 1.68 |
| (3) | |Fw1 − 2|/D2G − 3G | 1.26 |
| (4) | F3o4/Fw | 0.49 |
| (5) | OAL/Bf | 4.56 |
| (6) | D5/Bf | 0.53 |

"Parameter Values in Each Condition"

Table 204 shows parameter values in Conditions (1-III) to (3-III).

TABLE 204

| (1) | ωw | 42.1° |
|---|---|---|
| (2) | |F4| | 26.3 |
| | |F5| | 261.8 |
| (3) | F4 − 5w/F4 − 5t | 1.0 |

"Parameter Values in Each Condition"

Table 304 shows parameter values in Conditions (1-IV) to (5-IV).

TABLE 304

| (1) | ωw | 42.1° |
|---|---|---|
| (2) | R1/R2 | 1.7 |
| (3) | f1/F1 | 4.0 |
| (4) | f1/Fw | 6.7 |
| (5) | |F1| | 21.8 |
| | |F2| | 86.9 |

"Parameter Values in Each Condition"

Table 404 shows parameter values in Conditions (1-V).

TABLE 404

| (1) | D3/D4 | 0.54 |
|---|---|---|

"Parameter Values in Each Condition"

Table 504 shows parameter values in Conditions (1-VI) to (4-VI).

TABLE 504

| (1) | ωw | 42.1° |
|---|---|---|
| (2) | \|fw/F1\| | 0.60 |
| (3) | 1/\|fsph\| | 5.0E−03 |
| (4) | DISw | −1.3% |

Table 505 shows parameter values in Conditions (A-VI) to (C-VI).

TABLE 505

| (A) | Rpf/Rpr | 0.59 |
|---|---|---|
| (B) | fp/F1 | 9.2 |
| (C) | R1f/R1r | 1.5 |

"Parameter Values in Each Condition"

Table 604 shows parameter values in Conditions (1-VII) to (8-VII).

TABLE 604

| (1) | F2b/F2 | 0.98 |
|---|---|---|
| (2) | NdNp · vdNp | 48.4 |
|  | NdNn · vdNn | 122.1 |
| (3) | NdNp | 1.7408 |
| (4) | vdNp | 27.8 |
| (5) | NdNn | 1.497 |
| (6) | vdNn | 81.5 |
| (7) | \|fNp/fNn\| | 1.1 |
| (8) | \|fNpNn\| | 7.1E−04 |

FIG. 2 shows aberration diagrams of Example 1.

The upper part of FIG. 2 shows an aberration at the "wide angle end (represented as wide angle)", the middle part thereof shows an aberration at an "intermediate focal length (represented as intermediate)", and the lower part thereof shows an aberration at the "telephoto end (represented as telephoto)".

In the aberration diagram of each part, the graph on the left side shows "spherical aberration", the graph in the middle shows "astigmatism", and the graph on the right side shows "distortion".

R, G and B in the graph of "spherical aberration" represent the wavelengths: R=625 nm, G=550 nm, and B=460 nm, respectively.

In the graph of "astigmatism", "T" represents a tangential ray and "S" represents a sagittal ray.

Note that the astigmatism and distortion are on the wavelength: 550 nm.

These items in the aberration diagrams are also the same in aberration diagrams of the following Examples 2 to 14.

Figure 32:
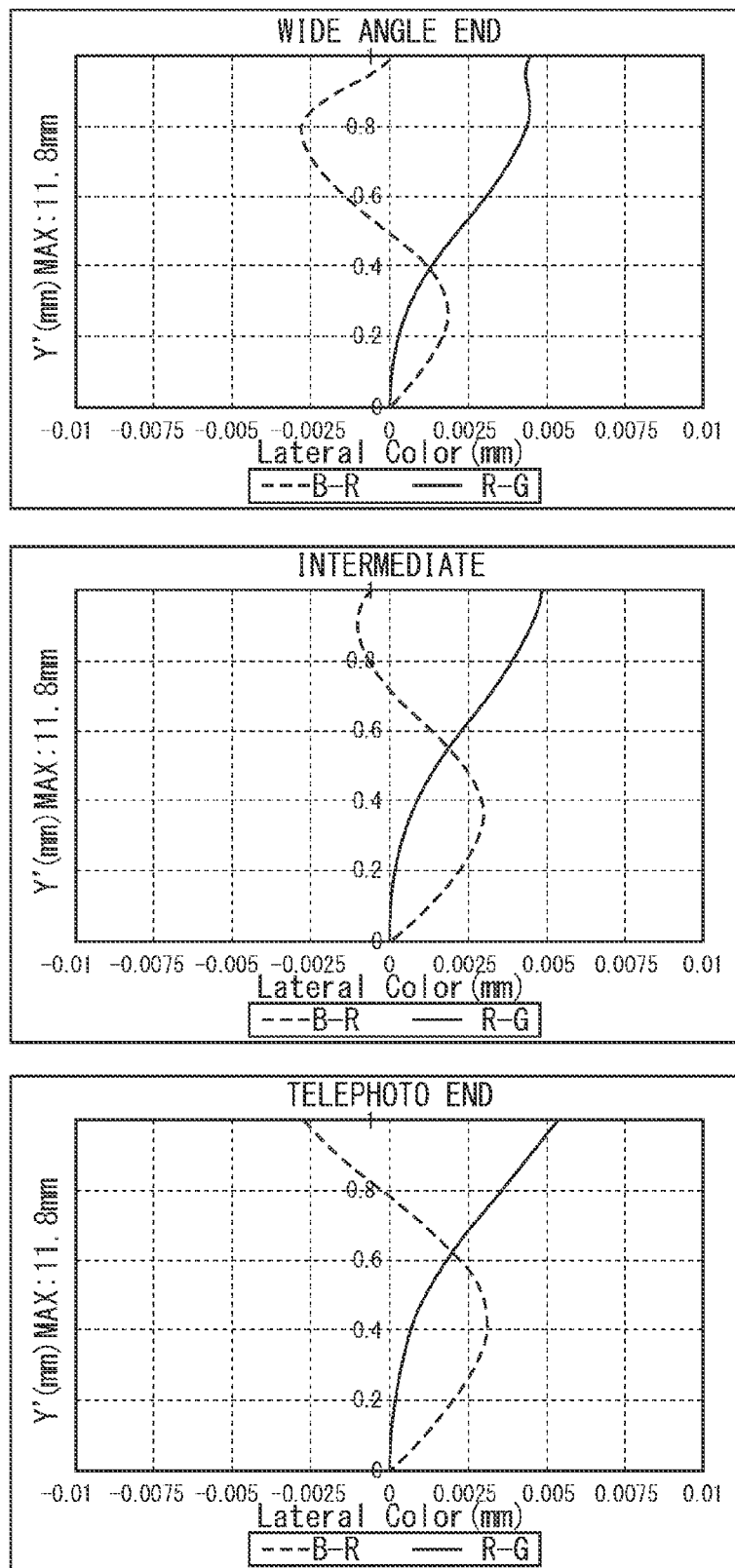
FIG. 32 is a magnification chromatic aberration diagram of a projection zoom lens according to Example 1.

FIG. 32 shows a magnification chromatic aberration diagram of Example 1.

The upper part of FIG. 32 shows a magnification chromatic aberration at the "wide angle end", the middle part thereof shows a magnification chromatic aberration at an "intermediate focal length (represented as intermediate)", and the lower part thereof shows a magnification chromatic aberration at the "telephoto end".

The dashed line (B-R) in FIG. 32 represents a "magnification chromatic aberration of blue with red as a base", while the solid line (R-G) represents a "magnification chromatic aberration of red with green as a base"

Example 2

FIG. 3 shows a projection zoom lens of Example 2.

As shown in FIG. 3, a first lens group G1 includes lenses L11 to L13, and a second lens group G2 includes lenses L21 to L24.

A third lens group G3 includes one lens L31, a fourth lens group G4 includes lenses L41 and L42, and a fifth lens group G5 includes lenses L51 to L54.

When the magnification is changed from the wide angle end to the telephoto end, the second lens group G2 is moved to the reduction side, and the third to fifth lens groups G3 to G5 are moved to the magnification side.

The first lens group G1 is a negative group, and includes a negative meniscus lens L11 convex toward the magnification side, a negative lens L12 concave toward the magnification side, and a negative meniscus lens L13 concave toward the reduction side.

The second lens group G2 is a negative group, and includes a biconvex lens L21, a biconcave lens L22, a positive meniscus lens L23 convex toward the reduction side, and a negative meniscus lens L24 concave toward the magnification side.

The positive meniscus lens L23 and the negative meniscus lens L24 are cemented.

The third lens group G3 is a positive group, and includes one biconvex lens L31.

The fourth lens group G4 is a positive group, and includes a positive meniscus lens L41 convex toward the magnification side and a biconvex lens L42 whose convex surface on the magnification side has a large curvature.

The fifth lens group G5 is a negative group, and includes a biconcave lens L51, a biconvex lens L52, a negative meniscus lens L53 concave toward the magnification side, and a biconvex lens L54.

The biconcave lens L51 and the biconvex lens L52 are cemented.

In Example 2, the range of the focal length of the entire system: F, the F-number, and the half field angle at the wide angle end: ωw are as follows.

F=13.0 to 19.6 mm, Fno=2.55 to 3.34, and ωw=42.1°.

Table 5 shows data on Example 2.

TABLE 5

| SURFACE NUMBER | R | D | Nd | Vd | Lens | Group |
|---|---|---|---|---|---|---|
| 1 | 42.925 | 2.30 | 1.83400 | 37.35 | L11 | G1 |
| 2 | 27.025 | 6.68 |  |  |  |  |
| 3* | −50.899 | 4.00 | 1.53159 | 55.70 | L12 |  |
| 4* | −100.040 | 4.62 |  |  |  |  |
| 5 | 122.391 | 2.00 | 1.84666 | 23.78 | L13 |  |
| 6 | 30.005 | S6 |  |  |  |  |
| 7 | 77.762 | 5.81 | 1.78470 | 26.29 | L21 | G2 |
| 8 | −54.705 | 0.30 |  |  |  |  |
| 9 | −155.918 | 1.60 | 1.49700 | 81.55 | L22 |  |
| 10 | 18.674 | 6.59 |  |  |  |  |
| 11 | −48.419 | 5.93 | 1.64769 | 33.79 | L23 |  |
| 12 | −17.960 | 3.73 | 1.77250 | 49.60 | L24 |  |
| 13 | −102.424 | S13 |  |  |  |  |
| 14 | 81.589 | 3.49 | 1.69700 | 48.52 | L31 | G3 |
| 15 | −486.914 | S15 |  |  |  |  |
| 16 | 32.258 | 3.78 | 1.69350 | 50.81 | L41 | G4 |
| 17 | 200.172 | 11.56 |  |  |  |  |
| 18 | 20.135 | 4.13 | 1.49700 | 81.55 | L42 |  |
| 19 | −110.425 | 0.30 |  |  |  |  |
| 20 | INF | S20 |  |  |  |  |
| 21 | −117.692 | 1.60 | 1.83400 | 37.35 | L51 | G5 |
| 22 | 12.966 | 4.53 | 1.48749 | 70.44 | L52 |  |
| 23 | −65.449 | 2.42 |  |  |  |  |

TABLE 5-continued

| SURFACE NUMBER | R | D | Nd | Vd | Lens | Group |
|---|---|---|---|---|---|---|
| 24 | −16.005 | 1.55 | 1.80610 | 40.93 | L53 | |
| 25 | −29.327 | 0.25 | | | | |
| 26* | 62.689 | 4.94 | 1.48749 | 70.24 | L54 | |
| 27* | −17.740 | Bf | | | | |
| 28 | INF | 1 | 1.51680 | 64.17 | CG | |
| 29 | INF | — | | | | |

In Example 2, the configuration of the first to fifth lens groups G1 to G5 is "negative, negative, positive, positive and negative".

"Aspherical Surface Data"

Table 6 shows data on the aspherical surface.

TABLE 6

| | 3 | 4 | 26 | 27 |
|---|---|---|---|---|
| K | 0 | 0 | 0 | 0 |
| C4 | 7.5167E−05 | 7.2360E−05 | −1.1005E−05 | 1.9459E−05 |
| C6 | −1.3938E−07 | −7.1757E−08 | 8.1058E−08 | 8.9295E−08 |
| C8 | 1.9731E−10 | −1.0107E−10 | −2.5836E−10 | −7.0144E−10 |
| C10 | −2.1512E−14 | 5.0654E−13 | 5.8440E−12 | 9.6074E−12 |
| C12 | −3.1062E−16 | 6.3442E−16 | 0 | 0 |
| C14 | 5.5741E−19 | −3.0366E−18 | 0 | 0 |
| C16 | −3.7441E−22 | 1.9049E−21 | 0 | 0 |

Table 7 shows the lens group spacing: S6, S13, S15 and S20 for the wide angle end, intermediate, and the telephoto end when a projection distance is set to 1600 mm.

TABLE 7

| | S6 | S13 | S15 | S20 |
|---|---|---|---|---|
| WIDE ANGLE END | 6.15 | 9.79 | 8.90 | 1.43 |
| INTERMEDIATE | 9.34 | 3.34 | 5.38 | 2.22 |
| TELEPHOTO END | 9.63 | 0.80 | 0.80 | 3.02 |

"Parameter Values in Each Condition"

Table 8 shows parameter values in Conditions (1-I) to (12-I).

TABLE 8

| (1) | ωw | 42.1° |
|---|---|---|
| (2) | f1/f2 | 0.38 |
| (3) | D3/F3 | 0.06 |
| | D4/F4 | 0.54 |
| (4) | 1/|f1_3w| | 0.04 |
| (5) | |f1_3w/fw| | 1.8 |
| (6) | Nd2p · vd2p | 46.9 |
| | Nd2n · vd2n | 122.1 |
| (7) | Nd2p | 1.7847 |
| (8) | vd2p | 26.3 |
| (9) | Nd2n | 1.497 |
| (10) | vd2n | 81.5 |
| (11) | |f2p/f2n| | 1.2 |
| (12) | |f2p2n| | 3.9E 04 |

"Parameter Values in Each Condition"

Table 108 shows parameter values in Conditions (1-II) to (6-II).

TABLE 108

| (1) | Bf/Fw | 2.54 |
|---|---|---|
| (2) | |F1|/Fw | 1.86 |
| (3) | |Fw1 − 2|/D2G − 3G | 1.40 |

TABLE 108-continued

| (4) | F3o4/Fw | 0.51 |
|---|---|---|
| (5) | OAL/Bf | 4.60 |
| (6) | D5/Bf | 0.55 |

"Parameter Values in Each Condition"

Table 208 shows parameter values in Conditions (1-III) to (3-III).

TABLE 208

| (1) | ωw | 42.1° |
|---|---|---|
| (2) | |F4| | 25.3 |
| | |F5| | 377.4 |
| (3) | F4 − 5w/F4 − 5t | 1.0 |

Figure 33:
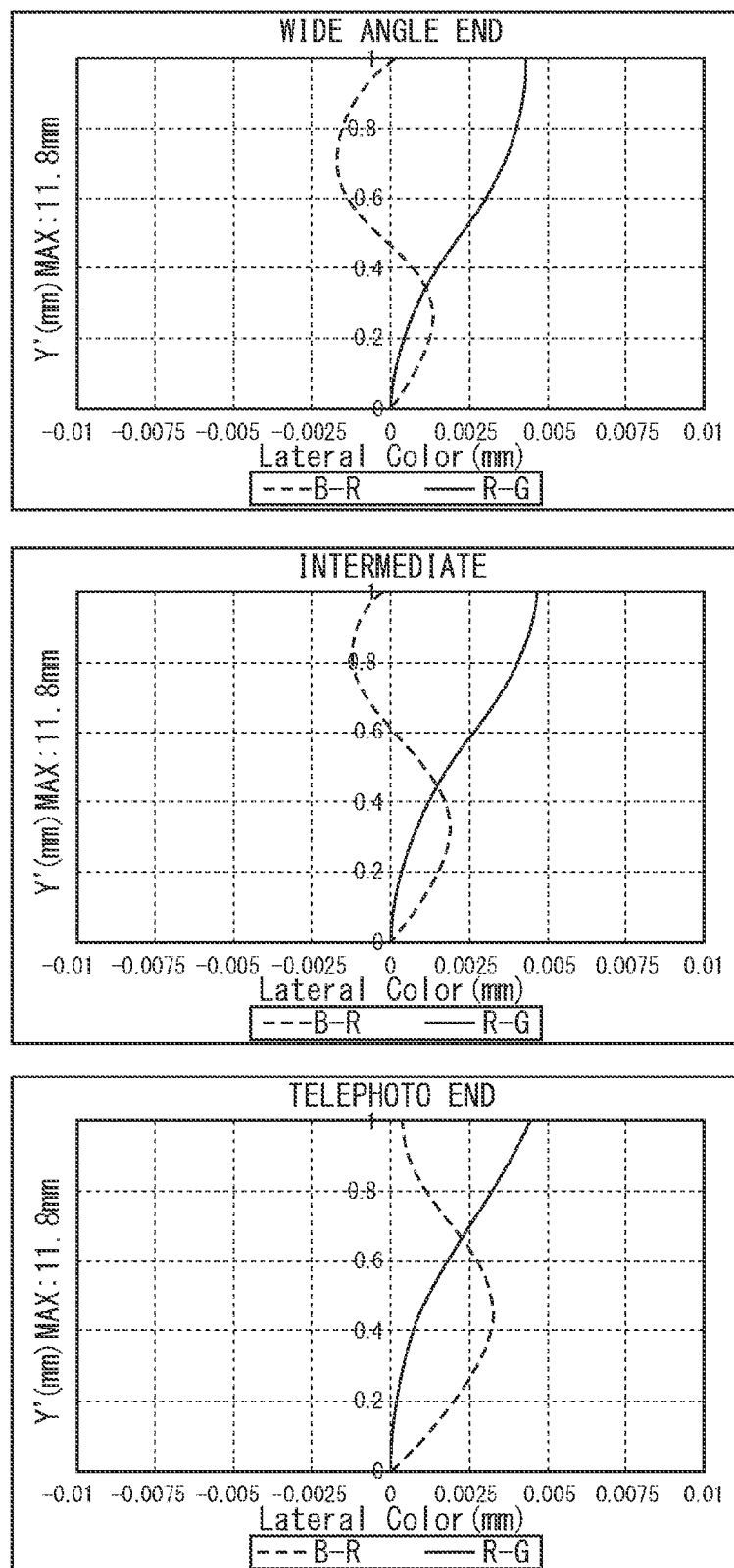
FIG. 33 is a magnification chromatic aberration diagram of the projection zoom lens according to Example 2.

Also, FIG. 33 shows a magnification chromatic aberration diagram of Example 2 based on FIG. 32.

"Parameter Values in Each Condition"

Table 308 shows parameter values in Conditions (1-IV) to (5-IV).

TABLE 308

| (1) | ωw | 42.1° |
|---|---|---|
| (2) | R1/R2 | 1.6 |
| (3) | f1/F1 | 3.9 |
| (4) | f1/Fw | 7.2 |
| (5) | |F1| | 24.2 |
| | |F2| | 63.2 |

"Parameter Values in Each Condition"

Table 408 shows parameter values in Conditions (1-V).

TABLE 408

| (1) | D3/D4 | 0.40 |
|---|---|---|

"Parameter Values in Each Condition"

Table 509 shows parameter values in Conditions (1-VI) to (4-VI).

TABLE 509

| (1) | ωw | 42.1° |
|---|---|---|
| (2) | |fw/F1| | 0.54 |
| (3) | 1/|fsph| | 5.0E−03 |
| (4) | DISw | −1.3% |

Table 510 shows parameter values in Conditions (A-VI) to (C-VI).

TABLE 510

| (A) | Rpf/Rpr | 0.51 |
|---|---|---|
| (B) | fp/F1 | 8.3 |
| (C) | R1f/R1r | 1.43 |

"Parameter Values in Each Condition"

Table 608 shows parameter values in Conditions (1-VII) to (8-VII).

TABLE 608

| (1) | F2b/F2 | 1.14 |
|---|---|---|
| (2) | NdNp · vdNp | 46.9 |
| | NdNn · vdNn | 122.1 |
| (3) | NdNp | 1.7847 |
| (4) | vdNp | 26.3 |

TABLE 608-continued

| | | |
|---|---|---|
| (5) | NdNn | 1.497 |
| (6) | vdNn | 81.5 |
| (7) | \|fNp/fNn\| | 1.2 |
| (8) | \|fNpNn\| | 3.9E−04 |

Figure 4:
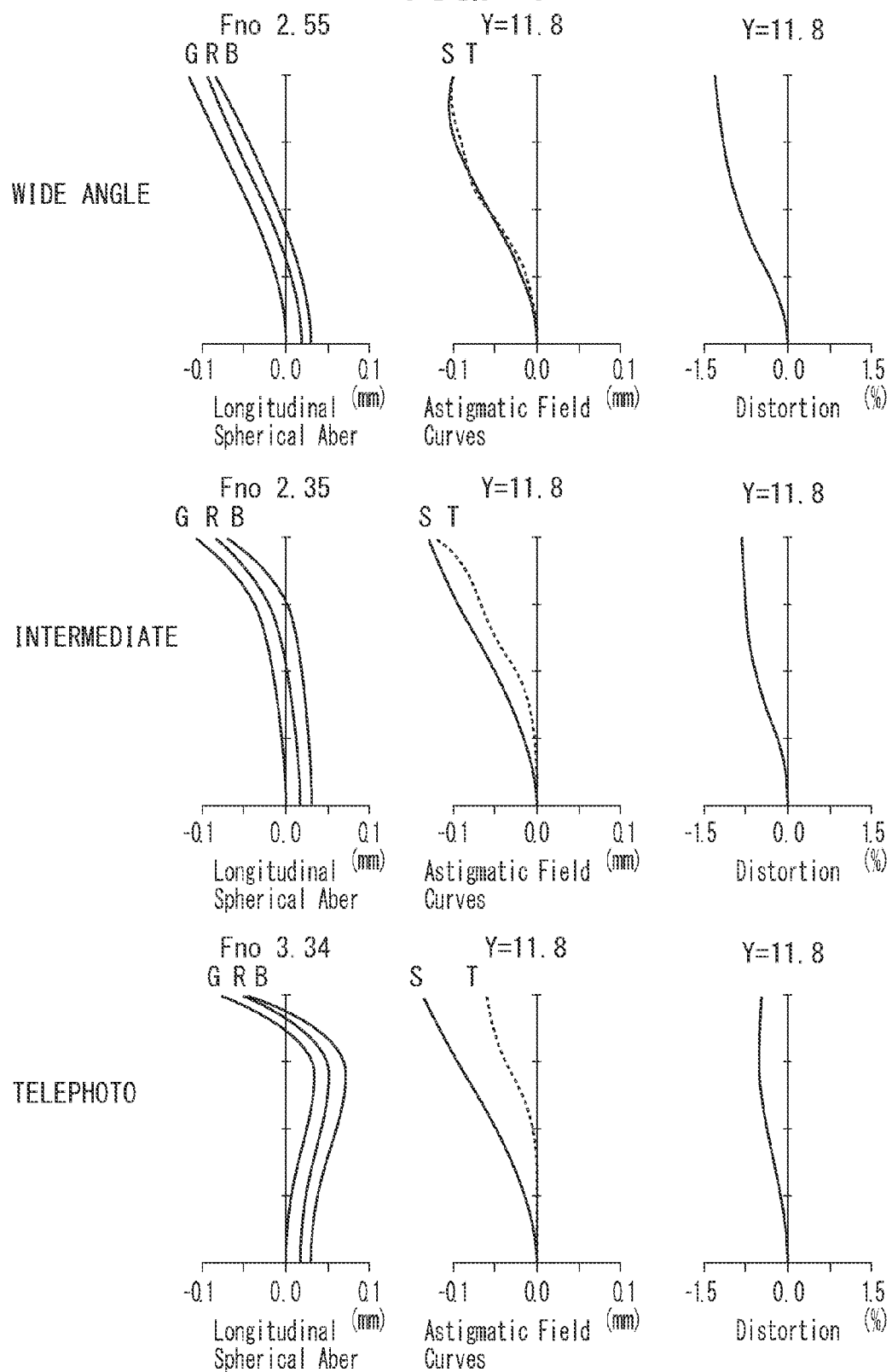
FIG. 4 is an aberration curve diagram of the projection zoom lens according to Example 2.

FIG. 4 shows aberration diagrams of Example 2 based on FIG. 2.

Example 3

FIG. 5 shows a projection zoom lens of Example 3.

As shown in FIG. 5, a first lens group G1 includes lenses L11 to L13, and a second lens group G2 includes lenses L21 to L24.

A third lens group G3 includes a lens L31, a fourth lens group G4 includes lenses L41 and L42, and a fifth lens group G5 includes lenses L51 to L54.

When the magnification is changed from the wide angle end to the telephoto end, the second lens group G2 is moved to the reduction side, and the third to fifth lens groups G3 to G5 are moved to the magnification side.

The first lens group G1 is a negative group, and includes a negative meniscus lens L11 convex toward the magnification side, a negative lens L12 concave toward the magnification side, and a negative meniscus lens L13 concave toward the reduction side.

The second lens group G2 is a negative group, and includes a biconvex lens L21, a biconcave lens L22, a positive meniscus lens L23 convex toward the reduction side, and a negative meniscus lens L24 concave toward the magnification side.

The positive meniscus lens L23 and the negative meniscus lens L24 are cemented.

The third lens group G3 is a positive group, and includes one biconvex lens L31.

The fourth lens group G4 is a positive group, and includes a positive meniscus lens L41 convex toward the magnification side and a biconvex lens L42.

The fifth lens group G5 is a negative group, and includes a negative meniscus lens L51 convex toward the magnification side, a biconvex lens L52, a negative meniscus lens L53 concave toward the magnification side, and a biconvex lens L54.

The negative meniscus lens L51 and the biconvex lens L52 are cemented.

In Example 3, the range of the focal length of the entire system: F, the F-number, and the half field angle at the wide angle end: ωw are as follows.

F=13.0 to 19.6 mm, Fno=2.55 to 3.34, and ωw=42.1°.

Table 9 shows data on Example 3.

TABLE 9

| SURFACE NUMBER | R | D | Nd | Vd | Lens | Group |
|---|---|---|---|---|---|---|
| 1 | 48.317 | 2.30 | 1.83400 | 37.3 | L11 | G1 |
| 2 | 26.507 | 6.70 | | | | |
| 3* | −49.145 | 4.00 | 1.53159 | 55.7 | L12 | |
| 4* | −93.737 | 4.20 | | | | |
| 5 | 107.867 | 2.00 | 1.84666 | 23.8 | L13 | |
| 6 | 29.680 | S6 | | | | |
| 7 | 57.965 | 6.84 | 1.74077 | 27.8 | L21 | G2 |
| 8 | −49.565 | 0.30 | | | | |
| 9 | −119.866 | 1.50 | 1.49700 | 81.5 | L22 | |
| 10 | 19.136 | 6.92 | | | | |
| 11 | −41.223 | 5.43 | 1.64769 | 33.8 | L23 | |

TABLE 9-continued

| SURFACE NUMBER | R | D | Nd | Vd | Lens | Group |
|---|---|---|---|---|---|---|
| 12 | −16.675 | 1.80 | 1.77250 | 49.6 | L24 | |
| 13 | −77.854 | S13 | | | | |
| 14 | 93.718 | 6 | 1.72000 | 46.0 | L31 | G3 |
| 15 | −145.518 | S15 | | | | |
| 16 | 30.927 | 3.50 | 1.69350 | 53.2 | L41 | G4 |
| 17 | 79.686 | 11.40 | | | | |
| 18 | 18.447 | 4.37 | 1.49700 | 81.5 | L42 | |
| 19 | −190.324 | 0.39 | | | | |
| 20 | INF | S20 | | | | |
| 21 | 195.779 | 1.50 | 1.83400 | 37.3 | L51 | G5 |
| 22 | 10.964 | 4.89 | 1.48749 | 70.4 | L52 | |
| 23 | −97.137 | 2.66 | | | | |
| 24 | −14.751 | 1.60 | 1.80610 | 40.9 | L53 | |
| 25 | −29.458 | 0.30 | | | | |
| 26 | 101.453 | 4.70 | 1.516330. | 64.1 | L54 | |
| 27* | −16.829 | Bf | | | | |
| 28 | INF | 1 | 1.51680 | 64.1 | CG | |
| 29 | INF | — | | | | |

In Example 3, the configuration of the first to fifth lens groups G1 to G5 is "negative, negative, positive, positive and negative".

"Aspherical Surface Data"

Table 10 shows data on the aspherical surface.

TABLE 10

| | 3 | 4 | 27 |
|---|---|---|---|
| K | 0 | 0 | 6.2282E−02 |
| C4 | 8.0309E−05 | 7.4840E−05 | 2.2166E−05 |
| C6 | −1.6071E−07 | −7.8566E−08 | 5.3239E−08 |
| C8 | 2.4996E−10 | −1.5100E−10 | −1.8252E−10 |
| C10 | −4.0536E−14 | 7.6378E−13 | −3.1594E−13 |
| C12 | −4.3525E−16 | 8.6766E−16 | 0 |
| C14 | 7.4081E−19 | −6.2556E−18 | 0 |
| C16 | −4.8502E−22 | 6.1093E−21 | 0 |

Table 11 shows the lens group spacing: S6, S13, S15 and S20 for the wide angle end, intermediate, and the telephoto end when a projection distance is set to 1600 mm.

TABLE 11

| | S6 | S13 | S15 | S20 |
|---|---|---|---|---|
| WIDE ANGLE END | 6.34 | 11.06 | 7.55 | 1.06 |
| INTERMEDIATE | 9.27 | 4.06 | 4.72 | 1.77 |
| TELEPHOTO END | 9.38 | 0.80 | 0.80 | 2.50 |

"Parameter Values in Each Condition"

Table 12 shows parameter values in Conditions (1-I) to (12-I).

TABLE 12

| | | |
|---|---|---|
| (1) | ωw | 42.1° |
| (2) | f1/f2 | 0.28 |
| (3) | D3/F3 | 0.09 |
| | D4/F4 | 0.52 |
| (4) | 1/\|f1__3w\| | 0.03 |
| (5) | \|f1__3w/fw\| | 2.3 |
| (6) | Nd2p · vd2p | 48.4 |
| | Nd2n · vd2n | 122.1 |
| (7) | Nd2p | 1.7408 |
| (8) | vd2p | 27.8 |
| (9) | Nd2n | 1.497 |
| (10) | vd2n | 81.5 |

TABLE 12-continued

| (11) | \|f2p/f2n\| | 1.1 |
| (12) | \|f2p2n\| | 6.5E−04 |

"Parameter Values in Each Condition"

Table 112 shows parameter values in Conditions (1-II) to (6-II).

TABLE 112

| (1) | Bf/Fw | 2.54 |
| (2) | \|F1\|/Fw | 1.73 |
| (3) | \|Fw1 − 2\|/D2G − 3G | 1.23 |
| (4) | F3o4/Fw | 0.49 |
| (5) | OAL/Bf | 4.31 |
| (6) | D5/Bf | 0.53 |

"Parameter Values in Each Condition"

Table 212 shows parameter values in Conditions (1-III) to (3-III).

TABLE 212

| (1) | ωw | 42.1° |
| (2) | \|F4\| | 26.8 |
|  | \|F5\| | 367.0 |
| (3) | F4 − 5w/F4 − 5t | 1.0 |

Figure 34:
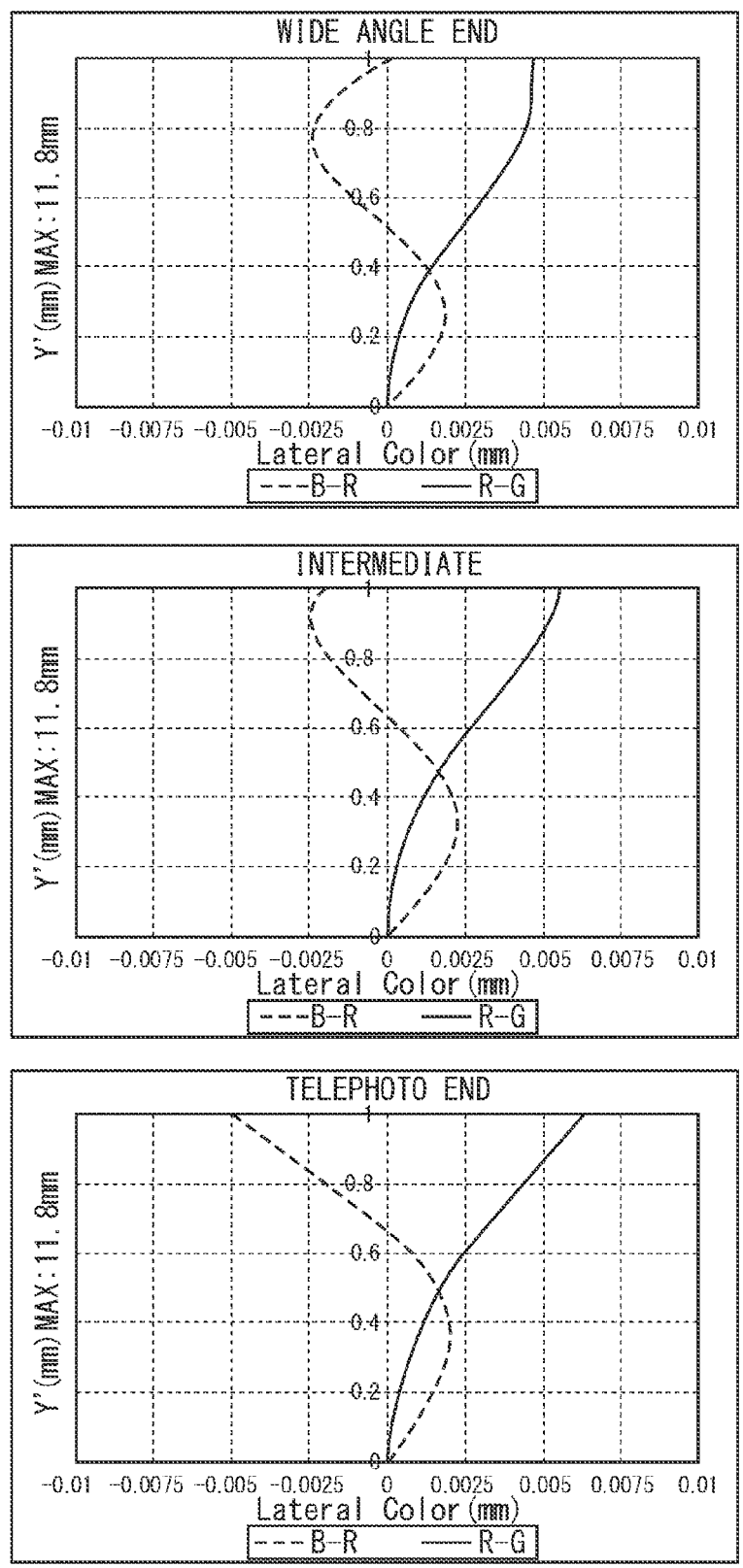
FIG. 34 is a magnification chromatic aberration diagram of the projection zoom lens according to Example 3.

Also, FIG. 34 shows a magnification chromatic aberration diagram of Example 3 based on FIG. 32.

"Parameter Values in Each Condition"

Table 312 shows parameter values in Conditions (1-IV) to (5-IV).

TABLE 312

| (1) | ωw | 42.1° |
| (2) | R1/R2 | 1.8 |
| (3) | f1/F1 | 3.3 |
| (4) | f1/Fw | 5.7 |
| (5) | \|F1\| | 22.6 |
|  | \|F2\| | 79.7 |

"Parameter Values in Each Condition"

Table 412 shows parameter values in Conditions (1-V).

TABLE 412

| (1) | D3/D4 | 0.52 |

"Parameter Values in Each Condition"

Table 514 shows parameter values in Conditions (1-VI) to (4-VI).

TABLE 514

| (1) | ωw | 42.1° |
| (2) | \|fw/F1\| | 0.54 |
| (3) | 1/\|fsph\| | 5.0E−03 |
| (4) | DISw | −1.3% |

Table 515 shows parameter values in Conditions (A-VI) to (C-VI).

TABLE 515

| (A) | Rpf/Rpr | 0.52 |
| (B) | fp/F1 | 8.9 |
| (C) | R1f/R1r | 1.63 |

"Parameter Values in Each Condition"

Table 612 shows parameter values in Conditions (1-VII) to (8-VII).

TABLE 612

| (1) | F2b/F2 | 0.97 |
| (2) | NdNp · vdNp | 48.4 |
|  | NdNn · vdNn | 122.1 |
| (3) | NdNp | 1.7408 |
| (4) | vdNp | 27.8 |
| (5) | NdNn | 1.497 |
| (6) | vdNn | 81.5 |
| (7) | \|fNp/fNn\| | 1.1 |
| (8) | \|fNpNn\| | 6.5E−04 |

Figure 6:
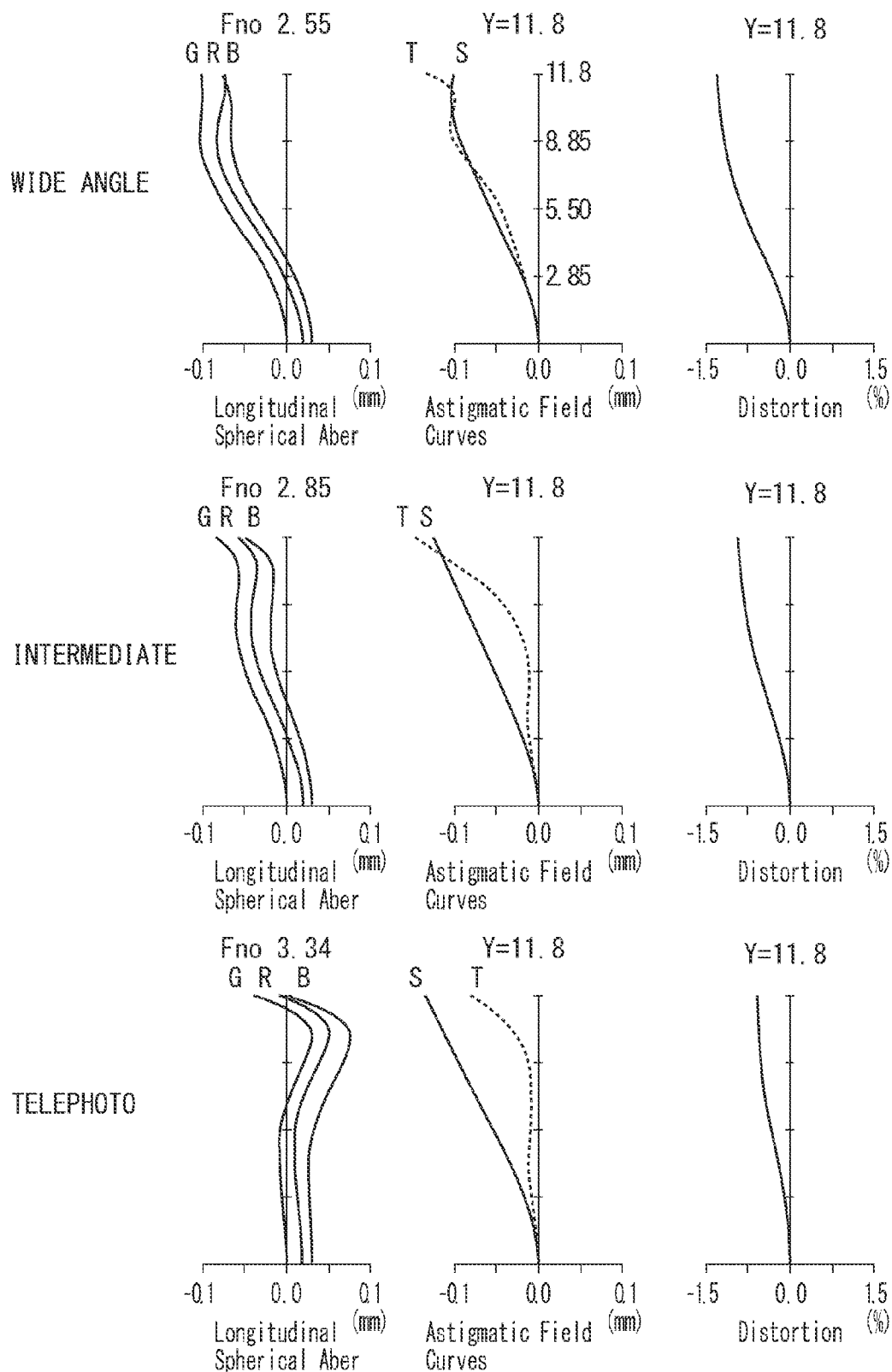
FIG. 6 is an aberration curve diagram of the projection zoom lens according to Example 3.

FIG. 6 shows aberration diagrams of Example 3 based on FIG. 2.

Example 4

FIG. 7 shows a projection zoom lens of Example 4.

As shown in FIG. 7, a first lens group G1 includes lenses L11 to L13, and a second lens group G2 includes lenses L21 to L24.

A third lens group G3 includes lenses L31 and L32, a fourth lens group G4 includes a lens L41, and a fifth lens group G5 includes lenses L51 to L54.

When the magnification is changed from the wide angle end to the telephoto end, the second lens group G2 is moved to the reduction side, and the third to fifth lens groups G3 to G5 are moved to the magnification side.

The first lens group G1 is a negative group, and includes a negative meniscus lens L11 convex toward the magnification side, a negative meniscus lens L12 concave toward the magnification side, and a negative meniscus lens L13 concave toward the reduction side.

The second lens group G2 is a negative group, and includes a biconvex lens L21, a biconcave lens L22, a positive meniscus lens L23 convex toward the reduction side, and a negative meniscus lens L24 concave toward the magnification side.

The positive meniscus lens L23 and the negative meniscus lens L24 are cemented.

The third lens group G3 is a positive group, and includes a biconvex lens L31 and a positive meniscus lens L32 convex toward the magnification side.

The fourth lens group G4 is a positive group, and includes a biconvex lens L41.

The fifth lens group G5 is a negative group, and includes a negative meniscus lens L51 concave toward the reduction side, a biconvex lens L52, a negative meniscus lens L53 concave toward the magnification side, and a biconvex lens L54.

The negative meniscus lens L51 and the biconvex lens L52 are cemented.

In Example 4, the range of the focal length of the entire system: F, the F-number, and the half field angle at the wide angle end: ωw are as follows.

F=13.0 to 19.6 mm, Fno=2.55 to 3.34, and ωw=42.1°.

Table 13 shows data on Example 4.

TABLE 13

| SURFACE NUMBER | R | D | Nd | Vd | Lens | Group |
|---|---|---|---|---|---|---|
| 1 | 47.619 | 2.30 | 1.83400 | 37.3 | L11 | G1 |
| 2 | 26.561 | 6.97 | | | | |
| 3 | −56.434 | 4.00 | 1.53159 | 55.7 | L12 | |
| 4 | −122.828 | 3.75 | | | | |
| 5 | 96.207 | 2.00 | 1.84666 | 23.8 | L13 | |
| 6 | 27.030 | S6 | | | | |
| 7 | 47.758 | 7.41 | 1.74077 | 27.8 | L21 | G2 |
| 8 | −48.276 | 0.37 | | | | |
| 9 | −80.029 | 1.50 | 1.49700 | 81.5 | L22 | |
| 10 | 19.290 | 6.73 | | | | |
| 11 | −43.652 | 6.00 | 1.64769 | 33.8 | L23 | |
| 12 | −16.964 | 1.80 | 1.77250 | 49.6 | L24 | |
| 13 | −74.271 | S13 | | | | |
| 14 | 89.328 | 6.00 | 1.69350 | 53.2 | L31 | G3 |
| 15 | −173.557 | 0.30 | | | | |
| 16 | 37.478 | 5.70 | 1.69350 | 53.2 | L32 | |
| 17 | 95.951 | S17 | | | | |
| 18 | 19.081 | 5.75 | 1.49700 | 81.5 | L41 | G4 |
| 19 | −122.064 | 0.30 | | | | |
| 20 | INF | S20 | | | | |
| 21 | 226.979 | 1.50 | 1.83400 | 37.3 | L51 | G5 |
| 22 | 11.328 | 4.52 | 1.48749 | 70.4 | L52 | |
| 23 | −146.917 | 2.69 | | | | |
| 24 | −14.356 | 1.60 | 1.80610 | 40.9 | L53 | |
| 25 | −24.687 | 0.30 | | | | |
| 26* | 80.889 | 4.60 | 1.48749 | 70.4 | L54 | |
| 27* | −16.897 | Bf | | | | |
| 28 | INF | 1 | 1.51680 | 64.1 | CG | |
| 29 | INF | — | | | | |

In Example 4, the configuration of the first to fifth lens groups G1 to G5 is "negative, negative, positive, positive and negative".

"Aspherical Surface Data"

Table 14 shows data on the aspherical surface.

TABLE 14

| | 3 | 4 | 26 | 27 |
|---|---|---|---|---|
| K | 0 | 0 | 0 | 0 |
| C4 | 7.4160E−05 | 6.9420E−05 | 3.2161E−07 | 2.2340E−05 |
| C6 | −1.5267E−07 | −8.6568E−08 | −2.9004E−08 | 6.3343E−08 |
| C8 | 2.4149E−10 | −1.1318E−10 | 1.3655E−09 | 8.9989E−11 |
| C10 | −4.1560E−14 | 7.3276E−13 | −5.0207E−12 | 3.0536E−12 |
| C12 | −4.4089E−16 | 6.6358E−16 | 0 | 0 |
| C14 | 7.4596E−19 | −6.2146E−18 | 0 | 0 |
| C16 | −5.3286E−22 | 6.4916E−21 | 0 | 0 |

Table 15 shows the lens group spacing: S6, S13, S17 and S20 for the wide angle end, intermediate, and the telephoto end when a projection distance is set to 1600 mm.

TABLE 15

| | S6 | S13 | S17 | S20 |
|---|---|---|---|---|
| WIDE ANGLE END | 7.07 | 14.03 | 11.32 | 1.08 |
| INTERMEDIATE | 9.41 | 5.91 | 10.30 | 1.91 |
| TELEPHOTO END | 9.41 | 0.80 | 8.06 | 2.87 |

"Parameter Values in Each Condition"

Table 16 shows parameter values in Conditions (1-I) to (12-I).

TABLE 16

| (1) | ωw | 42.1° |
|---|---|---|
| (2) | f1/f2 | 0.20 |
| (3) | D3/F3 | 0.25 |
| | D4/F4 | 0.42 |
| (4) | 1/|f1_3w| | 0.01 |
| (5) | |f1_3w/fw| | 7.7 |
| (6) | Nd2p · vd2p | 48.4 |
| | Nd2n · vd2n | 122.1 |
| (7) | Nd2p | 1.7408 |
| (8) | vd2p | 27.8 |
| (9) | Nd2n | 1.497 |
| (10) | vd2n | 81.5 |
| (11) | |f2p/f2n| | 1.1 |
| (12) | |f2p2n| | 1.1E−03 |

"Parameter Values in Each Condition"

Table 116 shows parameter values in Conditions (1-II) to (6-II).

TABLE 116

| (1) | Bf/Fw | 2.54 |
|---|---|---|
| (2) | |F1|/Fw | 1.67 |
| (3) | |Fw1 − 2|/D2G − 3G | 1.01 |
| (4) | F3o4/Fw | 0.39 |
| (5) | OAL/Bf | 4.32 |
| (6) | D5/Bf | 0.53 |

"Parameter Values in Each Condition"

Table 216 shows parameter values in Conditions (1-III) to (3-III).

TABLE 216

| (1) | ωw | 42.1° |
|---|---|---|
| (2) | |F4| | 33.6 |
| | |F5| | 886.1 |
| (3) | F4 − 5w/F4 − 5t | 1.0 |

Figure 35:
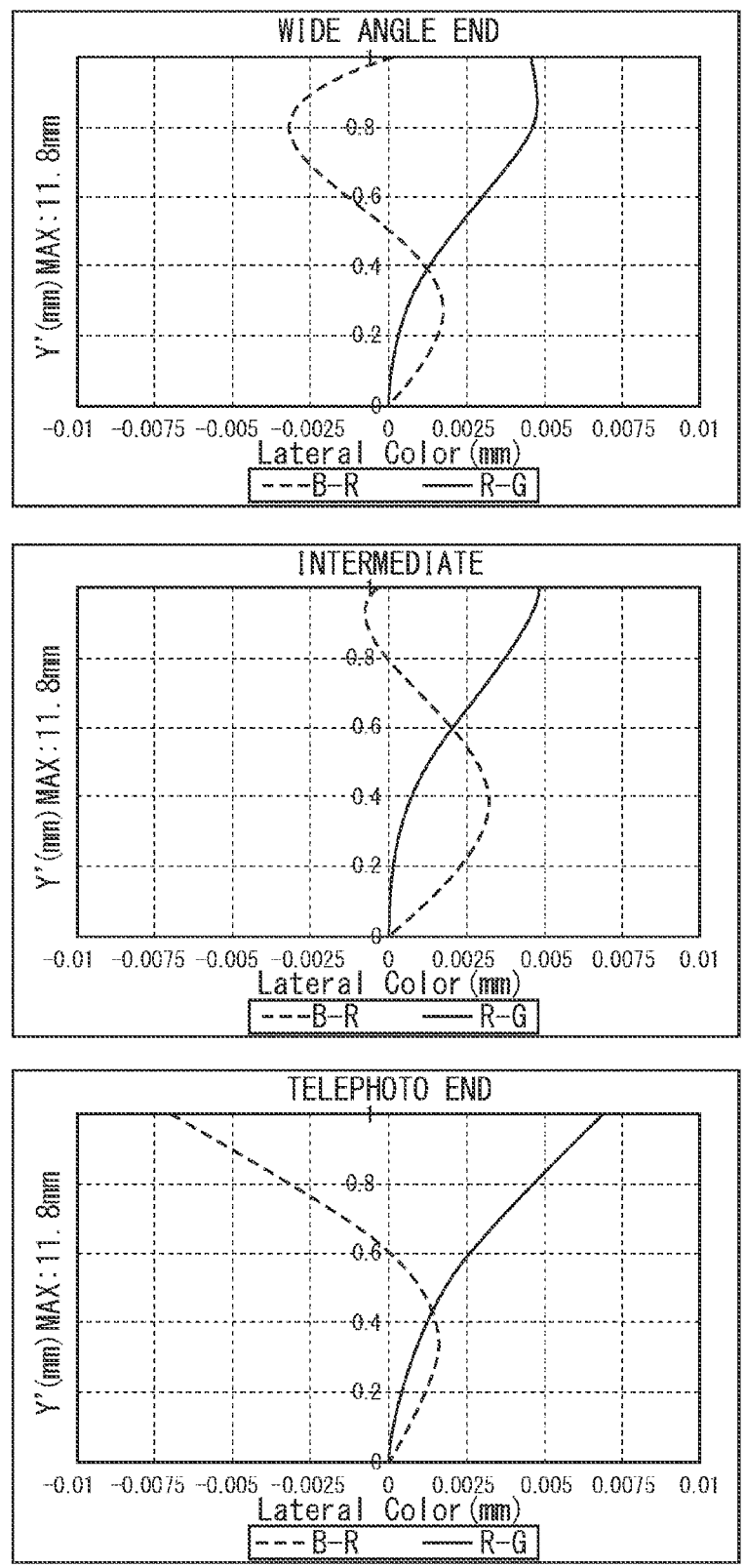
FIG. 35 is a magnification chromatic aberration diagram of the projection zoom lens according to Example 4.

Also, FIG. 35 shows a magnification chromatic aberration diagram of Example 4 based on FIG. 32.

"Parameter Values in Each Condition"

Table 316 shows parameter values in Conditions (1-IV) to (5-IV).

TABLE 316

| (1) | ωw | 42.1° |
|---|---|---|
| (2) | R1/R2 | 1.8 |
| (3) | f1/F1 | 3.5 |
| (4) | f1/Fw | 5.8 |
| (5) | |F1| | 21.7 |
| | |F2| | 110.6 |

"Parameter Values in Each Condition"

Table 416 shows parameter values in Conditions (1-V).

TABLE 416

| (1) | D3/D4 | 0.77 |
|---|---|---|

"Parameter Values in Each Condition"

Table 519 shows parameter values in Conditions (1-VI) to (4-VI).

TABLE 519

| (1) | ωw | 42.1° |
|---|---|---|
| (2) | \|fw/F1\| | 0.60 |
| (3) | 1/\|fsph\| | 5.0E−03 |
| (4) | DISw | −1.3% |

Table 520 shows parameter values in Conditions (A-VI) to (C-VI).

TABLE 520

| (A) | Rpf/Rpr | 0.46 |
|---|---|---|
| (B) | fp/F1 | 9.20 |
| (C) | R1f/R1r | 1.76 |

"Parameter Values in Each Condition"

Table 616 shows parameter values in Conditions (1-VII) to (8-VII).

TABLE 616

| (1) | F2b/F2 | 0.79 |
|---|---|---|
| (2) | NdNp · vdNp | 48.4 |
|  | NdNn · vdNn | 122.1 |
| (3) | NdNp | 1.7408 |
| (4) | vdNp | 27.8 |
| (5) | NdNn | 1.497 |
| (6) | vdNn | 81.5 |
| (7) | \|fNp/fNn\| | 1.1 |
| (8) | \|fNpNn\| | 1.1E−03 |

Figure 8:
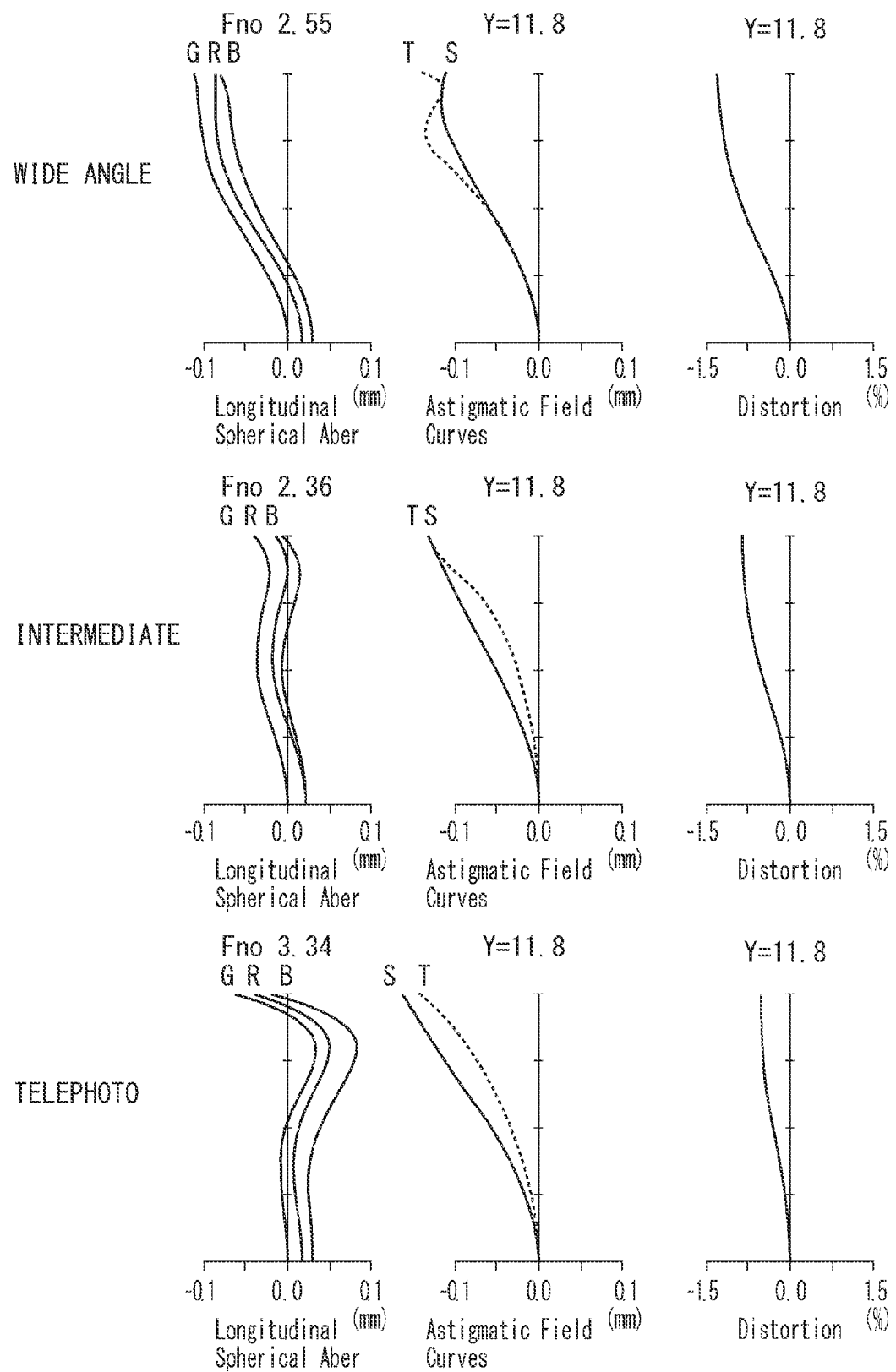
FIG. 8 is an aberration curve diagram of the projection zoom lens according to Example 4.

FIG. 8 shows aberration diagrams of Example 4 based on FIG. 2.

Example 5

FIG. 9 shows a projection zoom lens of Example 5.

As shown in FIG. 9, a first lens group G1 includes lenses L11 to L13, and a second lens group G2 includes lenses L21 to L24.

A third lens group G3 includes one lens L31, a fourth lens group G4 includes one lens L41, and a fifth lens group G5 includes lenses L51 to L54.

When the magnification is changed from the wide angle end to the telephoto end, the second lens group G2 is moved to the reduction side, and the third to fifth lens groups G3 to G5 are moved to the magnification side.

The first lens group G1 is a negative group, and includes a negative meniscus lens L11 convex toward the magnification side, a negative lens L12 concave toward the magnification side, and a negative meniscus lens L13 concave toward the reduction side.

The second lens group G2 is a negative group, and includes a biconvex lens L21, a biconcave lens L22, a positive meniscus lens L23 convex toward the reduction side, and a negative meniscus lens L24 concave toward the magnification side.

The positive meniscus lens L23 and the negative meniscus lens L24 are cemented.

The third lens group G3 is a positive group, and includes one biconvex lens L31.

The fourth lens group G4 is a positive group, and includes one biconvex lens L41.

The fifth lens group G5 is a negative group, and includes a biconcave lens L51, a biconvex lens L52, a negative meniscus lens L53 concave toward the magnification side, and a biconvex lens L54.

The biconvex lens L51 and the biconcave lens L52 are cemented.

In Example 5, the range of the focal length of the entire system: F, the F-number, and the half field angle at the wide angle end: ωw are as follows.

F=13.0 to 19.6 mm, Fno=2.55 to 3.35, and ωw=42.1°.

Table 17 shows data on Example 5.

TABLE 17

| SURFACE NUMBER | R | D | Nd | Vd | Lens | Group |
|---|---|---|---|---|---|---|
| 1 | 48.747 | 2.30 | 1.83400 | 37.3 | L11 | G1 |
| 2 | 26.475 | 6.33 |  |  |  |  |
| 3* | −56.542 | 4.00 | 1.53159 | 55.7 | L12 |  |
| 4* | −123.318 | 3.09 |  |  |  |  |
| 5 | 55.529 | 2.00 | 1.84666 | 23.8 | L13 |  |
| 6 | 26.860 | S6 |  |  |  |  |
| 7 | 86.821 | 5.85 | 1.74077 | 27.8 | L21 | G2 |
| 8 | −51.249 | 0.30 |  |  |  |  |
| 9 | −118.150 | 1.50 | 1.49700 | 81.5 | L22 |  |
| 10 | 19.644 | 7.33 |  |  |  |  |
| 11 | −31.042 | 6.00 | 1.64769 | 33.8 | L23 |  |
| 12 | −18.981 | 1.80 | 1.77250 | 49.6 | L24 |  |
| 13 | −43.602 | S13 |  |  |  |  |
| 14 | 34.287 | 4.26 | 1.72000 | 43.6 | L31 | G3 |
| 15 | −1505.390 | S15 |  |  |  |  |
| 16 | 17.516 | 6.0 | 1.49700 | 81.5 | L41 | G4 |
| 17 | −177.061 | 0.3 |  |  |  |  |
| 18 | INF | S18 |  |  |  |  |
| 19 | −123.699 | 1.5 | 1.83400 | 37.3 | L51 | G5 |
| 20 | 11.537 | 4.60 | 1.48749 | 70.4 | L52 |  |
| 21 | −66.810 | 2.35 |  |  |  |  |
| 22 | −15.505 | 1.6 | 1.80610 | 40.9 | L53 |  |
| 23 | −29.591 | 0.3 |  |  |  |  |
| 24* | 48.370 | 4.91 | 1.48749 | 70.4 | L54 |  |
| 25* | −16.871 | Bf |  |  |  |  |
| 26 | INF | 1 | 1.51680 | 64.1 | CG |  |
| 27 | INF | — |  |  |  |  |

In Example 5, the configuration of the first to fifth lens groups G1 to G5 is "negative, negative, positive, positive and negative".

"Aspherical Surface Data"

Table 18 shows data on the aspherical surface.

TABLE 18

|  | 3 | 4 | 24 | 25 |
|---|---|---|---|---|
| K | 0 | 0 | 0 | 0 |
| C4 | 7.7909E−05 | 7.4653E−05 | −1.2037E−05 | 2.4235E−05 |
| C6 | −1.5781E−07 | −8.4976E−08 | −3.5165E−09 | 5.8840E−08 |
| C8 | 2.5209E−10 | −1.1802E−10 | 7.4397E−10 | −4.3687E−10 |
| C10 | −5.0530E−14 | 7.2180E−13 | −9.7127E−13 | 6.1522E−12 |
| C12 | −4.6002E−16 | 8.1085E−16 | 0 | 0 |
| C14 | 8.8615E−19 | −6.0194E−18 | 0 | 0 |
| C16 | −6.7085E−22 | 5.6661E−21 | 0 | 0 |

Table 19 shows the lens group spacing: S6, S13, S15 and S18 for the wide angle end, intermediate, and the telephoto end when a projection distance is set to 1600 mm.

TABLE 19

| | S6 | S13 | S15 | S18 |
|---|---|---|---|---|
| WIDE ANGLE END | 6.90 | 18.58 | 11.32 | 1.41 |
| INTERMEDIATE | 11.19 | 7.98 | 11.09 | 2.08 |
| TELEPHOTO END | 11.78 | 1.58 | 9.95 | 2.89 |

"Parameter Values in Each Condition"

Table 20 shows parameter values in Conditions (1-I) to (12-I).

TABLE 20

| (1) | ωw | 42.1° |
|---|---|---|
| (2) | f1/f2 | 0.33 |
| (3) | D3/F3 | 0.26 |
| | D4/F4 | 0.37 |
| (4) | 1/|f1__3w| | 0.01 |
| (5) | |f1__3w/fw| | 5.7 |
| (6) | Nd2p · vd2p | 48.4 |
| | Nd2n · vd2n | 122.1 |
| (7) | Nd2p | 1.7408 |
| (8) | vd2p | 27.8 |
| (9) | Nd2n | 1.497 |
| (10) | vd2n | 81.5 |
| (11) | |f2p/f2n| | 1.3 |
| (12) | |f2p2n| | 4.6E−03 |

"Parameter Values in Each Condition"

Table 120 shows parameter values in Conditions (1-II) to (6-II).

TABLE 120

| (1) | Bf/Fw | 2.54 |
|---|---|---|
| (2) | |F1|/Fw | 2.00 |
| (3) | |Fw1 − 2|/D2G − 3G | 0.88 |
| (4) | F3o4/Fw | 0.40 |
| (5) | OAL/Bf | 4.17 |
| (6) | D5/Bf | 0.53 |

"Parameter Values in Each Condition"

Table 220 shows parameter values in Conditions (1-III) to (3-III).

TABLE 220

| (1) | ωw | 42.1° |
|---|---|---|
| (2) | |F4| | 32.3 |
| | |F5| | 502.1 |
| (3) | F4 − 5w/F4 − 5t | 1.0 |

Figure 36:
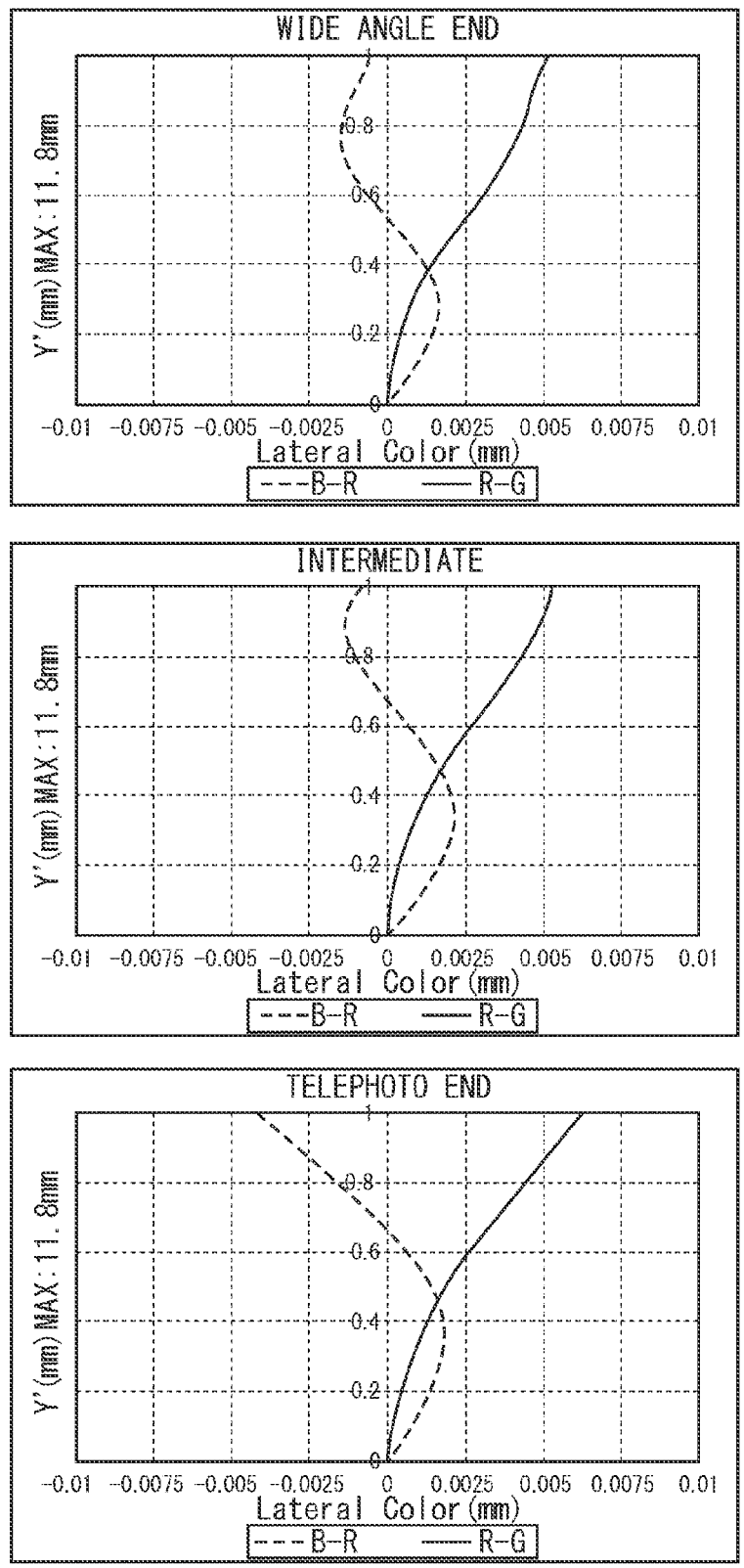
FIG. 36 is a magnification chromatic aberration diagram of the projection zoom lens according to Example 5.

Also, FIG. 36 shows a magnification chromatic aberration diagram of Example 5 based on FIG. 32.

"Parameter Values in Each Condition"

Table 320 shows parameter values in Conditions (1-IV) to (5-IV).

TABLE 320

| (1) | ωw | 42.1° |
|---|---|---|
| (2) | R1/R2 | 1.8 |
| (3) | f1/F1 | 2.8 |
| (4) | f1/Fw | 5.6 |
| (5) | |F1| | 26.0 |
| | |F2| | 79.7 |

"Parameter Values in Each Condition"
Table 420 shows parameter values in Conditions (1-V).

TABLE 420

| (1) | D3/D4 | 1.00 |
|---|---|---|

"Parameter Values in Each Condition"
Table 524 shows parameter values in Conditions (1-VI) to (4-VI).

TABLE 524

| (1) | ωw | 42.1° |
|---|---|---|
| (2) | |fw/F1| | 0.50 |
| (3) | 1/|fsph| | 5.0E−03 |
| (4) | DISw | −1.3% |

Table 525 shows parameter values in Conditions (A-VI) to (C-VI).

TABLE 525

| (A) | Rpf/Rpr | 0.46 |
|---|---|---|
| (B) | fp/F1 | 7.69 |
| (C) | R1f/R1r | 1.82 |

"Parameter Values in Each Condition"
Table 620 shows parameter values in Conditions (1-VII) to (8-VII).

TABLE 620

| (1) | F2b/F2 | 1.50 |
|---|---|---|
| (2) | NdNp · vdNp | 48.4 |
| | NdNn · vdNn | 122.1 |
| (3) | NdNp | 1.7408 |
| (4) | vdNp | 27.8 |
| (5) | NdNn | 1.497 |
| (6) | vdNn | 81.5 |
| (7) | |fNp/fNn| | 1.3 |
| (8) | |fNpNn| | 4.6E−03 |

Figure 10:
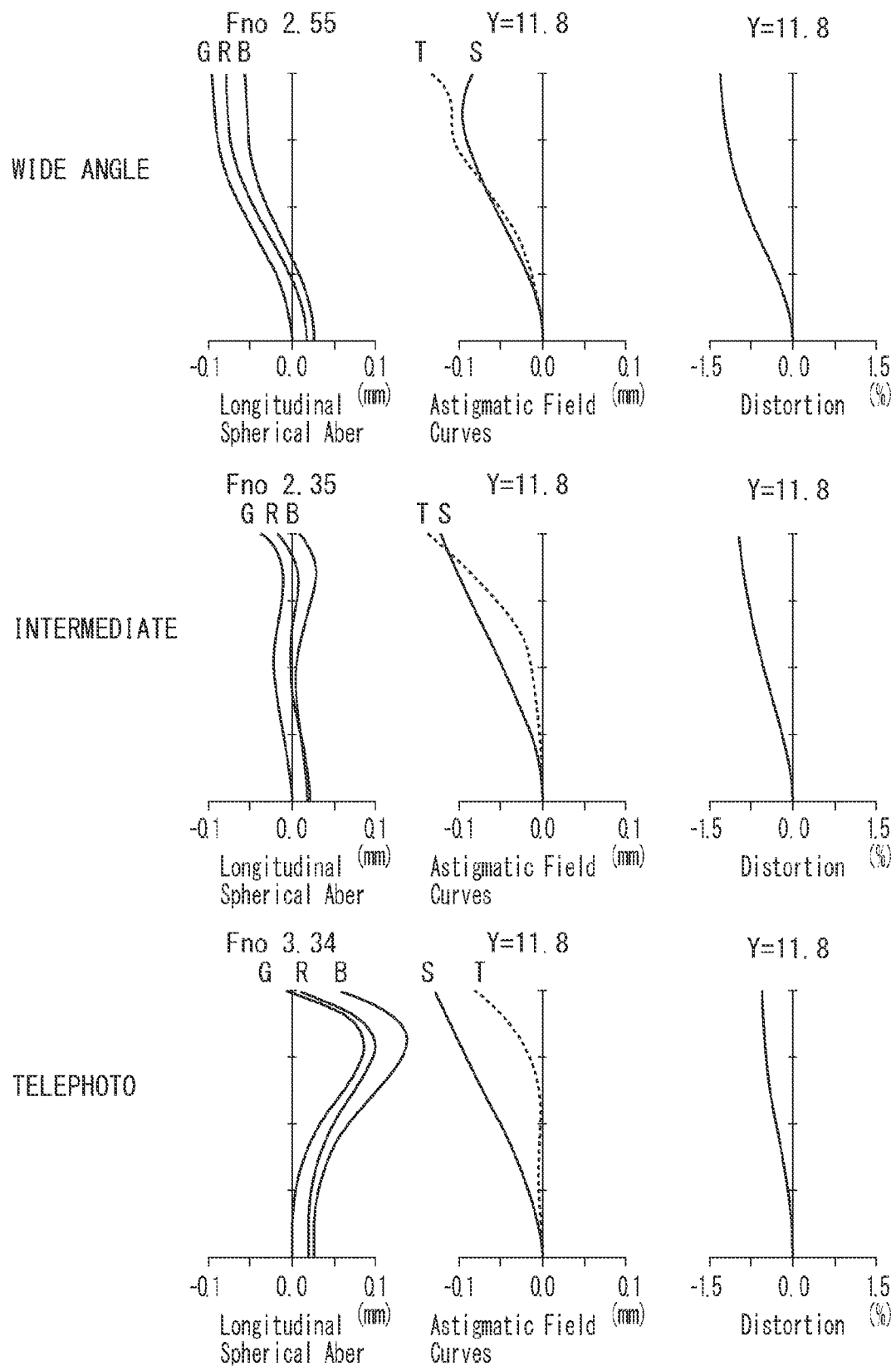
FIG. 10 is an aberration curve diagram of the projection zoom lens according to Example 5.

FIG. 10 shows aberration diagrams of Example 5 based on FIG. 2.

Example 6

FIG. 11 shows a projection zoom lens of Example 6.

As shown in FIG. 11, a first lens group G1 includes lenses L11 to L13, and a second lens group G2 includes lenses L21 to L24.

A third lens group G3 includes one lens L31, a fourth lens group G4 includes lenses L41 and L42, and a fifth lens group G5 includes lenses L51 to L54.

When the magnification is changed from the wide angle end to the telephoto end, the second lens group G2 is moved to the reduction side, and the third to fifth lens groups G3 to G5 are moved to the magnification side.

The first lens group G1 is a negative group, and includes a negative meniscus lens L11 convex toward the magnification side, a negative lens L12 concave toward the magnification side, and a negative meniscus lens L13 concave toward the reduction side.

The second lens group G2 is a negative group, and includes a biconvex lens L21, a negative meniscus lens L22 concave toward the reduction side, a positive meniscus lens L23, and a negative meniscus lens L24.

The positive meniscus lens L23 is "convex toward the reduction side", and the negative meniscus lens L24 is "concave toward the magnification side". These positive and negative meniscus lenses L23 and L24 are cemented.

The third lens group G3 is a positive group, and includes one biconvex lens L31.

The fourth lens group G4 is a positive group, and includes a positive meniscus lens L41 convex toward the magnification side and a biconvex lens L42.

The fifth lens group G5 is a positive group, and includes a biconcave lens L51, a biconvex lens L52, a negative meniscus lens L53 concave toward the magnification side, and a biconvex lens L54.

The biconcave lens L51 and the biconvex lens L52 are cemented.

In Example 6, the range of the focal length of the entire system: F, the F-number, and the half field angle at the wide angle end: ωw are as follows.

F=13.0 to 19.6 mm, Fno=2.58 to 3.24, and ωw=42.1°.

Table 21 shows data on Example 6.

TABLE 21

| SURFACE NUMBER | R | D | Nd | Vd | Lens | Group |
|---|---|---|---|---|---|---|
| 1 | 43.101 | 2.30 | 1.84666 | 23.8 | L11 | G1 |
| 2 | 26.644 | 6.57 | | | | |
| 3* | −63.360 | 4.00 | 1.53159 | 55.7 | L12 | |
| 4* | −159.546 | 4.07 | | | | |
| 5 | 87.280 | 2.00 | 1.80000 | 29.8 | L13 | |
| 6 | 25.379 | S6 | | | | |
| 7 | 56.387 | 6.04 | 1.84666 | 23.8 | L21 | G2 |
| 8 | −61.866 | 0.42 | | | | |
| 9 | 709.690 | 1.73 | 1.59282 | 68.6 | L22 | |
| 10 | 16.806 | 6.76 | | | | |
| 11 | −36.026 | 4.75 | 1.64769 | 33.8 | L23 | |
| 12 | −15.954 | 2.68 | 1.74320 | 49.3 | L24 | |
| 13 | −89.316 | S13 | | | | |
| 14 | 50.994 | 6.00 | 1.74400 | 44.8 | L31 | G3 |
| 15 | −568.983 | S15 | | | | |
| 16 | 30.458 | 3.72 | 1.59282 | 68.6 | L41 | G4 |
| 17 | 235.776 | 9.57 | | | | |
| 18 | 24.379 | 3.92 | 1.49700 | 81.5 | L42 | |
| 19 | −74.932 | 0.30 | | | | |
| 20 | INF | S20 | | | | |
| 21 | −56.659 | 1.60 | 1.83400 | 37.3 | L51 | G5 |
| 22 | 12.444 | 4.25 | 1.48749 | 70.4 | L52 | |
| 23 | −86.589 | 1.45 | | | | |
| 24* | −78.006 | 2.04 | 1.58913 | 61.2 | L53 | |
| 25* | −201.757 | 1.25 | | | | |
| 26 | 91.864 | 6.00 | 1.49700 | 81.5 | L54 | |
| 27 | −19.104 | Bf | | | | |
| 28 | INF | 1 | 1.51680 | 64.1 | CG | |
| 29 | INF | — | | | | |

In Example 6, the configuration of the first to fifth lens groups G1 to G5 is "negative, negative, positive, positive and positive".

The first to fifth lens groups G1 to G5 have focal lengths (mm) of −23.2, −58.4, 62.9, 26.3 and 406.3, respectively, and the fifth lens group G5 has the smallest power (1/focal length).

"Aspherical Surface Data"

Table 22 shows data on the aspherical surface.

TABLE 22

| | 3 | 4 | 24 | 25 |
|---|---|---|---|---|
| K | 0 | 0 | −24.99980522 | 24.99841672 |
| C4 | 7.1278E−05 | 6.8878E−05 | −1.4278E−04 | −1.0001E−04 |
| C6 | −1.3779E−07 | −7.0317E−08 | −8.3692E−08 | 2.5181E−25 |
| C8 | 2.1969E−10 | −1.0845E−10 | −1.9649E−10 | −2.9106E−27 |
| C10 | −8.1224E−14 | 6.0146E−13 | −2.5088E−11 | −9.2147E−12 |
| C12 | −3.5620E−16 | 4.0237E−16 | 0 | 0 |

TABLE 22-continued

| | 3 | 4 | 24 | 25 |
|---|---|---|---|---|
| C14 | 8.9636E−19 | −3.7571E−18 | 0 | 0 |
| C16 | −8.2594E−22 | 2.8327E−21 | 0 | 0 |

Table 23 shows the lens group spacing: S6, S13, S15 and S20 for the wide angle end, intermediate, and the telephoto end when a projection distance is set to 1600 mm.

TABLE 23

| | S6 | S13 | S15 | S20 |
|---|---|---|---|---|
| WIDE ANGLE END | 6.94 | 8.77 | 5.94 | 1.63 |
| INTERMEDIATE | 7.75 | 3.46 | 3.75 | 2.71 |
| TELEPHOTO END | 6.42 | 0.87 | 0.80 | 3.77 |

"Parameter Values in Each Condition"

Table 24 shows parameter values in Conditions (1-I) to (12-I).

TABLE 24

| (1) | ωw | 42.1° |
|---|---|---|
| (2) | f1/f2 | 0.40 |
| (3) | D3/F3 | 0.13 |
| | D4/F4 | 0.51 |
| (4) | 1/|f1_3w| | 0.03 |
| (5) | |f1_3w/fw| | 2.4 |
| (6) | Nd2p · vd2p | 43.9 |
| | Nd2n · vd2n | 109.3 |
| (7) | Nd2p | 1.8467 |
| (8) | vd2p | 23.8 |
| (9) | Nd2n | 1.5928 |
| (10) | vd2n | 68.6 |
| (11) | |f2p/f2n| | 1.2 |
| (12) | |f2p2n| | 3.0E−03 |

"Parameter Values in Each Condition"

Table 124 shows parameter values in Conditions (1-II) to (6-II).

TABLE 124

| (1) | Bf/Fw | 2.54 |
|---|---|---|
| (2) | |F1|/Fw | 1.78 |
| (3) | |Fw1 − 2|/D2G − 3G | 1.41 |
| (4) | F3o4/Fw | 0.49 |
| (5) | OAL/Bf | 4.17 |
| (6) | D5/Bf | 0.55 |

"Parameter Values in Each Condition"

Table 224 shows parameter values in Conditions (1-III) to (3-III).

TABLE 224

| (1) | ωw | 42.1° |
|---|---|---|
| (2) | |F4| | 26.3 |
| | |F5| | 406.3 |
| (3) | F4 − 5w/F4 − 5t | 1.0 |

Also, FIG. 37 shows a magnification chromatic aberration diagram of Example 6 based on FIG. 32.

"Parameter Values in Each Condition"
Table 324 shows parameter values in Conditions (1-IV) to (5-IV).

TABLE 324

| (1) | ωw | 42.1° |
|---|---|---|
| (2) | R1/R2 | 1.6 |
| (3) | f1/F1 | 3.8 |
| (4) | f1/Fw | 6.8 |
| (5) | |F1| | 23.2 |
|  | |F2| | 58.4 |

"Parameter Values in Each Condition"
Table 424 shows parameter values in Conditions (1-V).

TABLE 424

| (1) | D3/D4 | 0.62 |
|---|---|---|

"Parameter Values in Each Condition"
Table 529 shows parameter values in Conditions (1-VI) to (4-VI).

TABLE 529

| (1) | ωw | 42.1° |
|---|---|---|
| (2) | |fw/F1| | 0.56 |
| (3) | 1/|fsph| | 5.0E−03 |
| (4) | DISw | −1.3% |

Table 530 shows parameter values in Conditions (A-VI) to (C-VI).

TABLE 530

| (A) | Rpf/Rpr | 0.40 |
|---|---|---|
| (B) | fp/F1 | 8.64 |
| (C) | R1f/R1r | 1.70 |

"Parameter Values in Each Condition"
Table 624 shows parameter values in Conditions (1-VII) to (8-VII).

TABLE 624

| (1) | F2b/F2 | 1.12 |
|---|---|---|
| (2) | NdNp · vdNp | 43.9 |
|  | NdNn · vdNn | 109.3 |
| (3) | NdNp | 1.8467 |
| (4) | vdNp | 23.8 |
| (5) | NdNn | 1.5928 |
| (6) | vdNn | 68.6 |
| (7) | |fNp/fNn| | 1.2 |
| (8) | |fNpNn| | 3.0E−03 |

Figure 12:
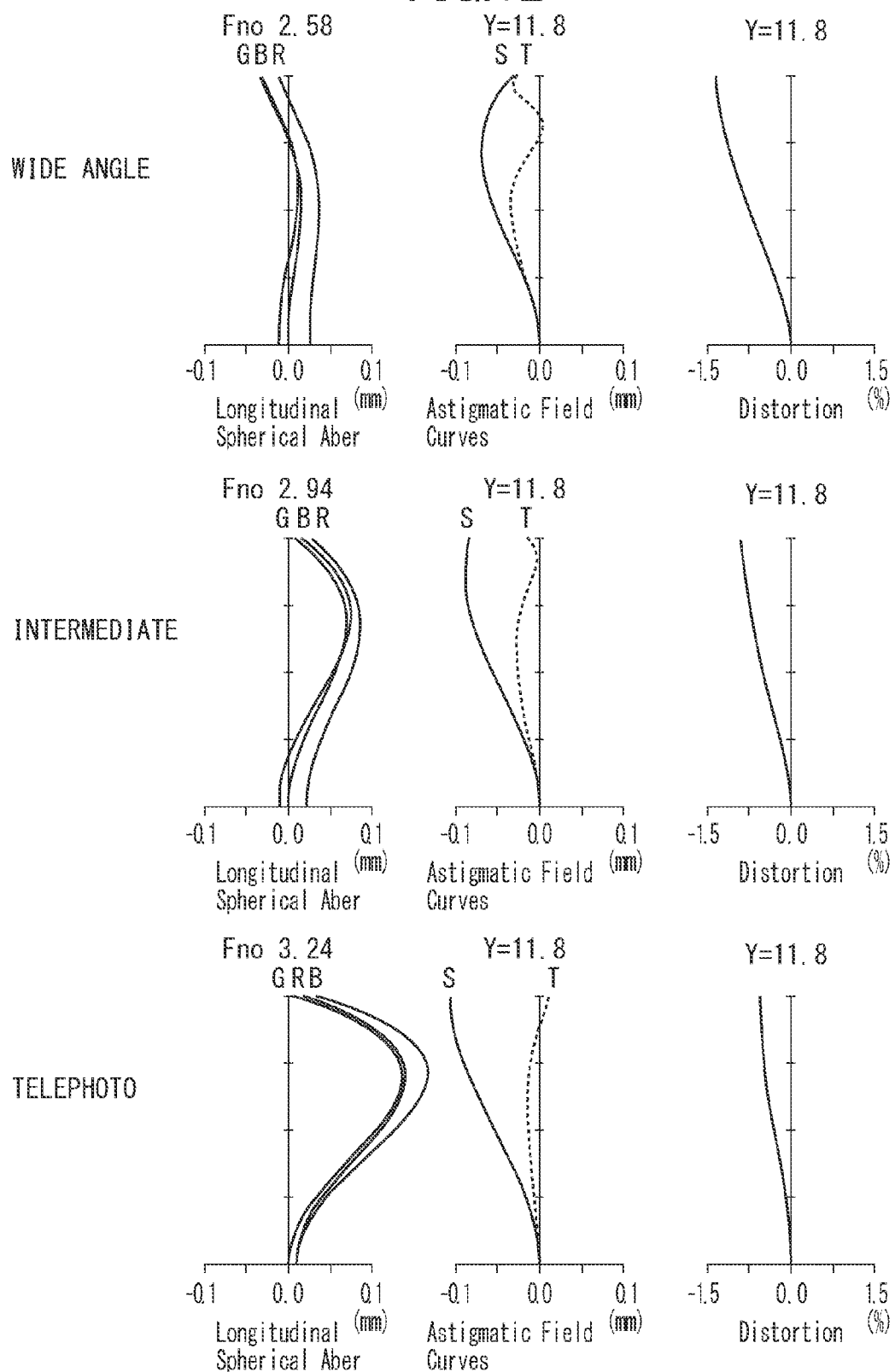
FIG. 12 is an aberration curve diagram of the projection zoom lens according to Example 6.

FIG. 12 shows aberration diagrams of Example 6 based on FIG. 2.

Example 7

FIG. 13 shows a projection zoom lens of Example 7.
As shown in FIG. 13, a first lens group G1 includes lenses L11 to L13, and a second lens group G2 includes lenses L21 to L24.
A third lens group G3 includes one lens L31, a fourth lens group G4 includes lenses L41 and L42, and a fifth lens group G5 includes lenses L51 to L54.
When the magnification is changed from the wide angle end to the telephoto end, the second lens group G2 is moved to the reduction side, and the third to fifth lens groups G3 to G5 are moved to the magnification side.
The first lens group G1 is a negative group, and includes a negative meniscus lens L11 convex toward the magnification side, a negative lens L12 concave toward the magnification side, and a negative meniscus lens L13 concave toward the reduction side.
The second lens group G2 is a negative group, and includes a biconvex lens L21, a negative meniscus lens L22 concave toward the reduction side, a positive meniscus lens L23, and a negative meniscus lens L24.
The positive meniscus lens L23 is "convex toward the reduction side", and the negative meniscus lens L24 is "concave toward the magnification side". These positive and negative meniscus lenses L23 and L24 are cemented.
The third lens group G3 is a positive group, and includes one biconvex lens L31.
The fourth lens group G4 is a positive group, and includes a positive meniscus lens L41 convex toward the magnification side and a biconvex lens L42.
The fifth lens group G5 is a positive group, and includes a biconcave lens L51, a biconvex lens L52, a negative meniscus lens L53 concave toward the magnification side, and a biconvex lens L54.
The biconcave lens L51 and the biconvex lens L52 are cemented.
In Example 7, the range of the focal length of the entire system: F, the F-number, and the half field angle at the wide angle end: ωw are as follows.
F=13.0 to 19.6 mm, Fno=2.58 to 3.24, and ωw=42.1°.
Table 25 shows data on Example 7.

TABLE 25

| SURFACE NUMBER | R | D | Nd | Vd | Lens | Group |
|---|---|---|---|---|---|---|
| 1 | 53.492 | 2.30 | 1.90366 | 31.3 | L11 | G1 |
| 2 | 26.233 | 6.50 |  |  |  |  |
| 3* | −67.458 | 4.00 | 1.53159 | 55.7 | L12 |  |
| 4* | −187.393 | 3.00 |  |  |  |  |
| 5 | 54.685 | 2.00 | 1.92286 | 20.9 | L13 |  |
| 6 | 28.402 | S6 |  |  |  |  |
| 7 | 62.981 | 7.23 | 1.74077 | 27.8 | L21 | G2 |
| 8 | −48.178 | 0.30 |  |  |  |  |
| 9 | 500.000 | 1.50 | 1.49700 | 81.5 | L22 |  |
| 10 | 16.740 | 7.19 |  |  |  |  |
| 11 | −49.641 | 5.59 | 1.64769 | 33.8 | L23 |  |
| 12 | −16.240 | 1.80 | 1.77250 | 49.6 | L24 |  |
| 13 | −672.705 | S13 |  |  |  |  |
| 14 | 72.632 | 4.94 | 1.72000 | 46.0 | L31 | G3 |
| 15 | −62.077 | S15 |  |  |  |  |
| 16 | 25.305 | 3.22 | 1.69680 | 55.5 | L41 | G4 |
| 17 | 41.551 | 10.16 |  |  |  |  |
| 18 | 24.980 | 3.89 | 1.49700 | 81.5 | L42 |  |
| 19 | −76.791 | 0.30 |  |  |  |  |
| 20 | INF | S20 |  |  |  |  |
| 21 | −77.930 | 1.50 | 1.80610 | 33.3 | L51 | G5 |
| 22 | 12.959 | 4.72 | 1.48749 | 70.4 | L52 |  |
| 23 | −43.390 | 2.27 |  |  |  |  |
| 24 | −15.480 | 1.60 | 1.80610 | 40.9 | L53 |  |
| 25 | −23.073 | 0.30 |  |  |  |  |
| 26 | 90.115 | 4.45 | 1.51633 | 64.1 | L54 |  |
| 27* | −20.913 | Bf |  |  |  |  |
| 28 | INF | 1 | 1.51680 | 64.1 | CG |  |
| 29 | INF | — |  |  |  |  |

In Example 7, the configuration of the first to fifth lens groups G1 to G5 is "negative, negative, positive, positive and positive".
The first to fifth lens groups G1 to G5 have focal lengths (mm) of −24.0, −55.9, 47.0, 30.2 and 2433.5, respectively, and the fifth lens group G5 has the smallest power (1/focal length).

"Aspherical Surface Data"
Table 26 shows data on the aspherical surface.

TABLE 26

|     | 3 | 4 | 27 |
|-----|---|---|-----|
| K   | 0 | 0 | 0.393934714 |
| C4  | 7.6234E−05 | 7.4068E−05 | 1.5354E−05 |
| C6  | −1.5415E−07 | −8.5135E−08 | 3.8223E−08 |
| C8  | 2.5366E−10 | −1.0818E−10 | −3.4304E−10 |
| C10 | −8.4776E−14 | 7.2425E−13 | 1.0072E−12 |
| C12 | −4.8871E−16 | 4.4639E−16 | 0 |
| C14 | 8.7600E−19 | −7.1712E−18 | 0 |
| C16 | −7.4076E−22 | 8.5656E−21 | 0 |

Table 27 shows the lens group spacing: S6, S13, S15 and S20 for the wide angle end, intermediate, and the telephoto end when a projection distance is set to 1600 mm.

TABLE 27

|  | S6 | S13 | S15 | S20 |
|---|---|---|---|---|
| WIDE ANGLE END | 10.27 | 9.00 | 7.92 | 1.53 |
| INTERMEDIATE | 11.96 | 3.68 | 4.57 | 3.06 |
| TELEPHOTO END | 11.49 | 0.80 | 0.80 | 4.65 |

"Parameter Values in Each Condition"
Table 28 shows parameter values in Conditions (1-I) to (12-I).

TABLE 28

| (1)  | ωw | 42.1° |
|------|----|-------|
| (2)  | f1/f2 | 0.43 |
| (3)  | D3/F3 | 0.15 |
|      | D4/F4 | 0.47 |
| (4)  | 1/|f1_3w| | 0.02 |
| (5)  | |f1_3w/fw| | 4.7 |
| (6)  | Nd2p · vd2p | 48.4 |
|      | Nd2n · vd2n | 122.1 |
| (7)  | Nd2p | 1.7408 |
| (8)  | vd2p | 27.8 |
| (9)  | Nd2n | 1.497 |
| (10) | vd2n | 81.5 |
| (11) | |f2p/f2n| | 1.1 |
| (12) | |f2p2n| | 2.7E−04 |

"Parameter Values in Each Condition"
Table 128 shows parameter values in Conditions (1-II) to (6-II).

TABLE 128

| (1) | Bf/Fw | 2.54 |
| (2) | |F1|/Fw | 1.85 |
| (3) | |Fw1 − 2|/D2G − 3G | 1.28 |
| (4) | F3o4/Fw | 0.43 |
| (5) | OAL/Bf | 4.26 |
| (6) | D5/Bf | 0.53 |

"Parameter Values in Each Condition"
Table 228 shows parameter values in Conditions (1-III) to (3-III).

TABLE 228

| (1) | ωw | 42.1° |
| (2) | |F4| | 30.2 |
|     | |F5| | 2433.5 |
| (3) | F4 − 5w/F4 − 5t | 1.0 |

Also, FIG. 38 shows a magnification chromatic aberration diagram of Example 7 based on FIG. 32.
"Parameter Values in Each Condition"
Table 328 shows parameter values in Conditions (1-IV) to (5-IV).

TABLE 328

| (1) | ωw | 42.1° |
| (2) | R1/R2 | 2.0 |
| (3) | f1/F1 | 2.5 |
| (4) | f1/Fw | 4.6 |
| (5) | |F1| | 24.0 |
|     | |F2| | 55.9 |

"Parameter Values in Each Condition"
Table 428 shows parameter values in Conditions (1-V).

TABLE 428

| (1) | D3/D4 | 0.49 |

"Parameter Values in Each Condition"
Table 534 shows parameter values in Conditions (1-VI) to (4-VI).

TABLE 534

| (1) | ωw | 42.1° |
| (2) | |fw/F1| | 0.54 |
| (3) | 1/|fsph| | 5.0E−03 |
| (4) | DISw | −1.3% |

Table 535 shows parameter values in Conditions (A-VI) to (C-VI).

TABLE 535

| (A) | Rpf/Rpr | 0.36 |
| (B) | fp/F1 | 8.33 |
| (C) | R1f/R1r | 1.88 |

"Parameter Values in Each Condition"
Table 628 shows parameter values in Conditions (1-VII) to (8-VII).

TABLE 628

| (1) | F2b/F2 | 0.90 |
| (2) | NdNp · vdNp | 48.4 |
|     | NdNn · vdNn | 122.1 |
| (3) | NdNp | 1.7408 |
| (4) | vdNp | 27.8 |
| (5) | NdNn | 1.497 |
| (6) | vdNn | 81.5 |
| (7) | |fNp/fNn| | 1.1 |
| (8) | |fNpNn| | 2.7E−04 |

Figure 14:
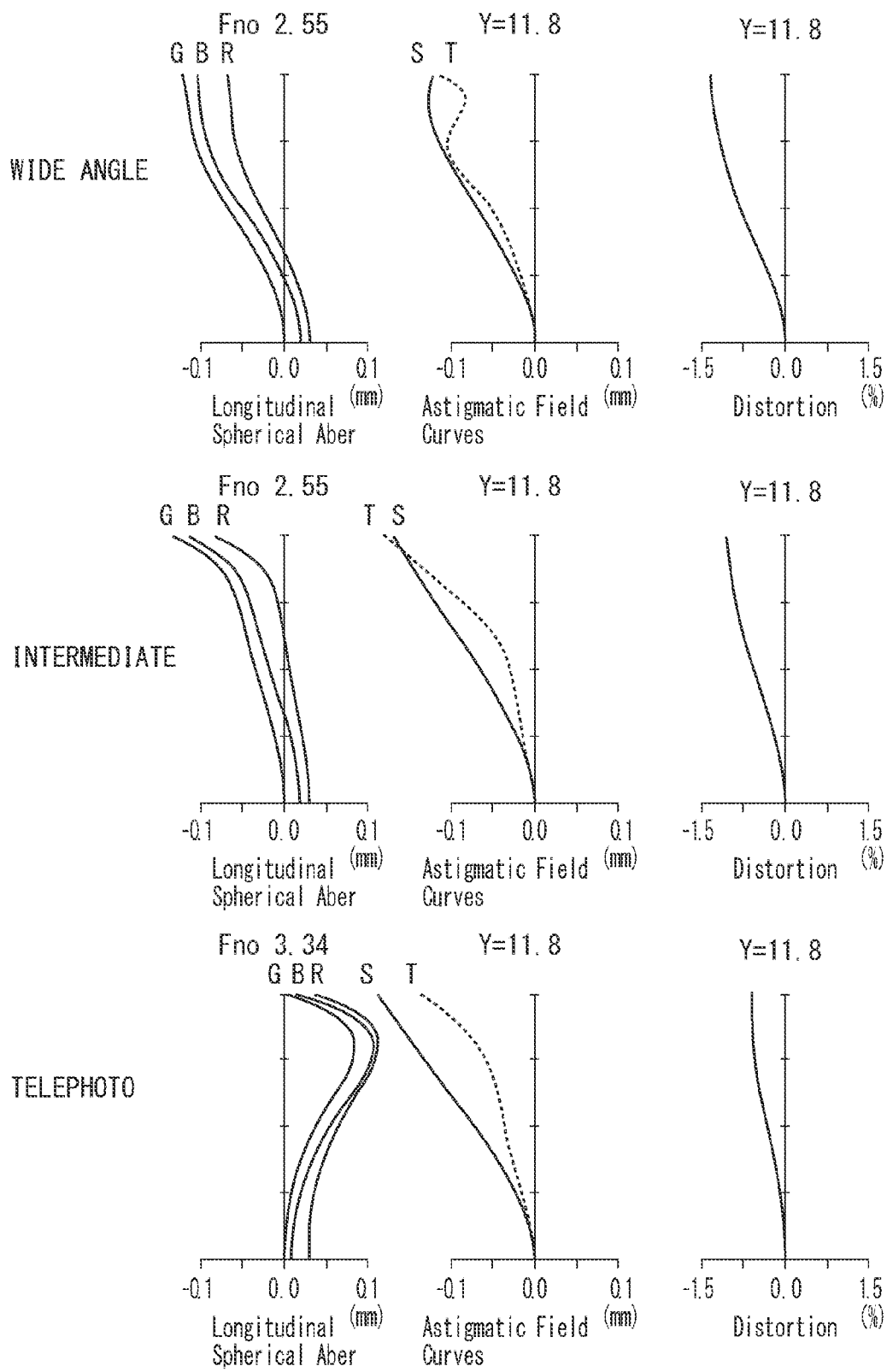
FIG. 14 is an aberration curve diagram of the projection zoom lens according to Example 7.

FIG. 14 shows aberration diagrams of Example 7 based on FIG. 2.

Example 8

FIG. 15 shows a projection zoom lens of Example 8.
As shown in FIG. 15, a first lens group G1 includes lenses L11 to L13, and a second lens group G2 includes lenses L21 to L24.
A third lens group G3 includes one lens L31, a fourth lens group G4 includes lenses L41 and L42, and a fifth lens group G5 includes lenses L51 to L54.

When the magnification is changed from the wide angle end to the telephoto end, the second lens group G2 is moved to the reduction side, and the third to fifth lens groups G3 to G5 are moved to the magnification side.

The first lens group G1 is a negative group, and includes a negative meniscus lens L11 convex toward the magnification side, a negative lens L12 concave toward the magnification side, and a negative meniscus lens L13 concave toward the reduction side.

The second lens group G2 is a negative group, and includes a biconvex lens L21, a biconcave lens L22, a positive meniscus lens L23 convex toward the reduction side, and a negative meniscus lens L24 concave toward the magnification side.

The positive meniscus lens L23 and the negative meniscus lens L24 are cemented.

The third lens group G3 is a positive group, and includes one biconvex lens L31.

The fourth lens group G4 is a positive group, and includes a positive meniscus lens L41 convex toward the magnification side and a biconvex lens L42.

The fifth lens group G5 is a negative group, and includes a negative meniscus lens L51 convex toward the magnification side, a biconvex lens L52, a negative meniscus lens L53 concave toward the magnification side, and a biconvex lens L54.

The negative meniscus lens L51 and the biconvex lens L52 are cemented.

The fifth lens group G5 has negative refractive power, but this negative refractive power is weak.

In Example 8, the range of the focal length of the entire system: F, the F-number, and the half field angle at the wide angle end: ωw are as follows.

F=14.2 to 21.1 mm, Fno=2.55 to 3.34, and ωw=39.6°.

Table 29 shows data on Example 8.

TABLE 29

| SURFACE NUMBER | R | D | Nd | Vd | Lens | Group |
|---|---|---|---|---|---|---|
| 1 | 40.390 | 2.00 | 1.75520 | 27.53 | L11 | G1 |
| 2 | 27.971 | 6.92 | | | | |
| 3* | −37.277 | 4.10 | 1.53159 | 55.70 | L12 | |
| 4* | −59.504 | 5.64 | | | | |
| 5 | 4914.482 | 2.00 | 1.84666 | 23.78 | L13 | |
| 6 | 29.546 | S6 | | | | |
| 7 | 56.614 | 7.68 | 1.74077 | 27.79 | L21 | G2 |
| 8 | −40.382 | 1.27 | | | | |
| 9 | −46.097 | 1.50 | 1.49700 | 81.55 | L22 | |
| 10 | 22.058 | 5.99 | | | | |
| 11 | −57.021 | 6.00 | 1.64769 | 33.79 | L23 | |
| 12 | −17.121 | 1.80 | 1.77250 | 49.60 | L24 | |
| 13 | −94.921 | S13 | | | | |
| 14 | 90.549 | 6.00 | 1.72000 | 46.02 | L31 | G3 |
| 15 | −155.491 | S15 | | | | |
| 16 | 31.526 | 3.71 | 1.71300 | 53.94 | L41 | G4 |
| 17 | 78.606 | 10.50 | | | | |
| 18 | 17.642 | 4.96 | 1.49700 | 81.55 | L42 | |
| 19 | −303.512 | 0.30 | | | | |
| 20 | INF | S20 | | | | |
| 21 | 96.837 | 1.50 | 1.83400 | 37.35 | L51 | G5 |
| 22 | 10.749 | 5.04 | 1.48749 | 70.44 | L52 | |
| 23 | −226.938 | 2.79 | | | | |
| 24 | −15.477 | 1.60 | 1.80610 | 40.93 | L53 | |
| 25 | −34.192 | 0.30 | | | | |
| 26* | 70.532 | 4.72 | 1.48749 | 70.44 | L54 | |
| 27* | −17.501 | Bf | | | | |
| 28 | INF | 1 | 1.51680 | 64.10 | CG | |
| 29 | INF | — | | | | |

In Example 8, the configuration of the first to fifth lens groups G1 to G5 is "negative, negative, positive, positive and negative".

"Aspherical Surface Data"
Table 30 shows data on the aspherical surface.

TABLE 30

| | S3 | S4 | S26 | S27 |
|---|---|---|---|---|
| K | 0 | 0 | 0 | 0 |
| C4 | 8.4159E−05 | 7.7770E−05 | −2.7356E−06 | 2.2269E−05 |
| C6 | −1.6258E−07 | −7.6149E−08 | 6.8176E−08 | 1.2531E−07 |
| C8 | 2.3960E−10 | −1.2751E−10 | 1.1402E−10 | −7.9451E−10 |
| C10 | 1.0252E−15 | 6.9122E−13 | 4.3531E−12 | 1.0073E−11 |
| C12 | −4.4487E−16 | 8.7161E−16 | 0 | 0 |
| C14 | 5.6651E−19 | −5.2808E−18 | 0 | 0 |
| C16 | −1.4016E−22 | 5.9419E−21 | 0 | 0 |

Table 31 shows the lens group spacing: S6, S13, S15 and S20 for the wide angle end, intermediate, and the telephoto end when a projection distance is set to 1600 mm.

TABLE 31

| | S6 | S13 | S15 | S20 |
|---|---|---|---|---|
| WIDE ANGLE END | 6.49 | 9.97 | 8.35 | 0.86 |
| INTERMEDIATE | 8.61 | 3.78 | 5.82 | 1.39 |
| TELEPHOTO END | 8.85 | 0.80 | 1.68 | 1.93 |

"Parameter Values in Each Condition"
Table 32 shows parameter values in Conditions (1-I) to (12-I).

TABLE 32

| (1) | ωw | 39.6° |
|---|---|---|
| (2) | f1/f2 | 0.17 |
| (3) | D3/F3 | 0.09 |
| | D4/F4 | 0.51 |
| (4) | 1/|f1_3w| | 0.03 |
| (5) | |f1_3w/fw| | 2.2 |
| (6) | Nd2p · vd2p | 48.4 |
| | Nd2n · vd2n | 122.1 |
| (7) | Nd2p | 1.7408 |
| (8) | vd2p | 27.8 |
| (9) | Nd2n | 1.497 |
| (10) | vd2n | 81.5 |
| (11) | |f2p/f2n| | 1.1 |
| (12) | |f2p2n| | 9.0E−04 |

"Parameter Values in Each Condition"
Table 132 shows parameter values in Conditions (1-II) to (6-II).

TABLE 132

| (1) | Bf/Fw | 2.32 |
|---|---|---|
| (2) | |F1|/Fw | 1.51 |
| (3) | |Fw1-2|/D2G-3G | 1.42 |
| (4) | F3o4/Fw | 0.54 |
| (5) | OAL/Bf | 4.39 |
| (6) | D5/Bf | 0.53 |

"Parameter Values in Each Condition"
Table 232 shows parameter values in Conditions (1-III) to (3-III).

TABLE 232

| (1) | ω w | 39.6° |
|---|---|---|
| (2) | |F4| | 26.4 |
| | |F5| | 175.0 |
| (3) | F4-5w/F4-5t | 1.0 |

Figure 39:
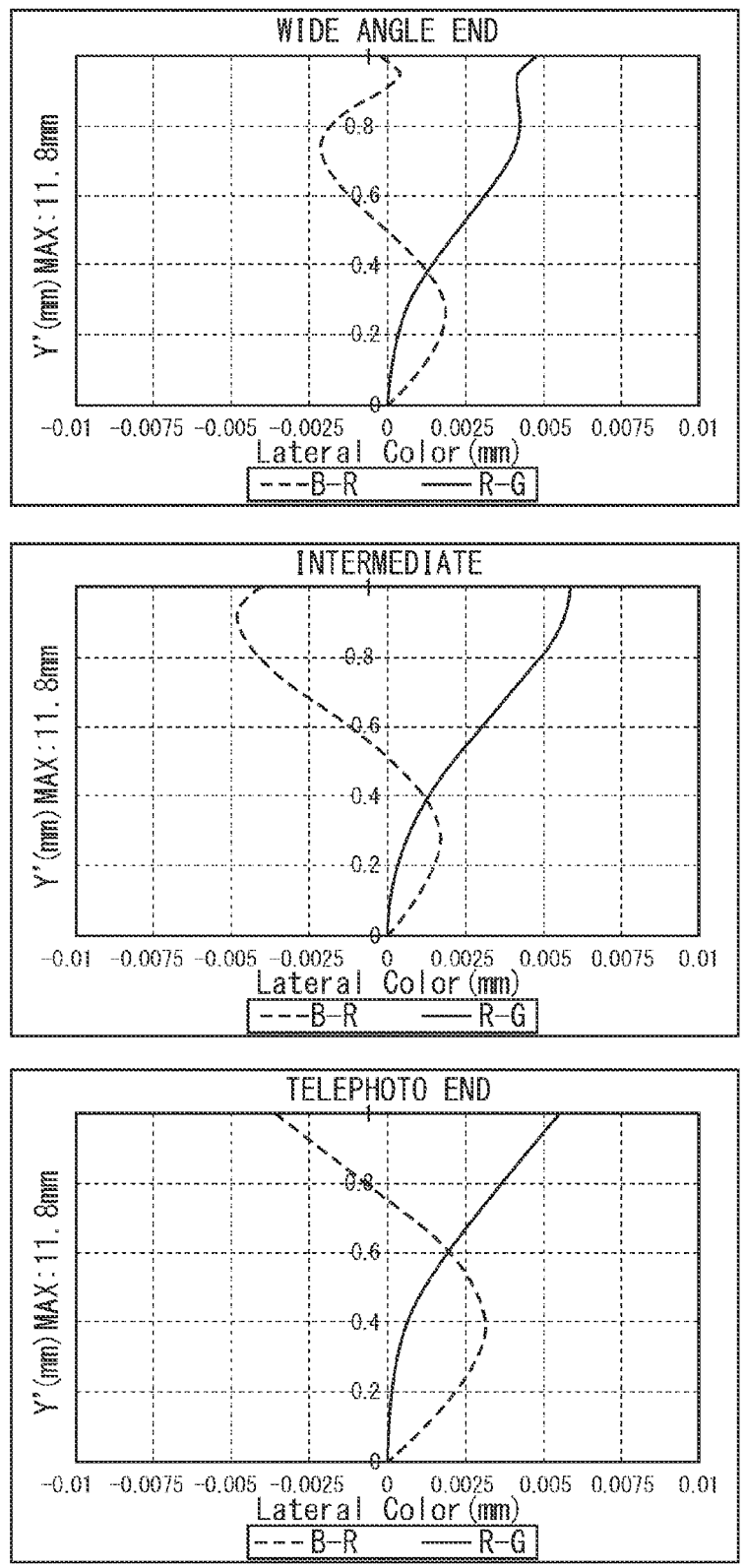
FIG. 39 is a magnification chromatic aberration diagram of the projection zoom lens according to Example 8.

Also, FIG. 39 shows a magnification chromatic aberration diagram of Example 8 based on FIG. 32.

"Parameter Values in Each Condition"

Table 332 shows parameter values in Conditions (1-IV) to (5-IV).

TABLE 332

| (1) | ω w | 39.6° |
|---|---|---|
| (2) | R1/R2 | 1.4 |
| (3) | f1/F1 | 6.0 |
| (4) | f1/Fw | 9.1 |
| (5) | |F1| | 21.4 |
|  | |F2| | 122.8 |

"Parameter Values in Each Condition"

Table 432 shows parameter values in Conditions (1-V).

TABLE 432

| (1) | D3/D4 | 0.51 |
|---|---|---|

"Parameter Values in Each Condition"

Table 539 shows parameter values in Conditions (1-VI) to (4-VI).

TABLE 539

| (1) | ωw | 39.6° |
|---|---|---|
| (2) | |fw/F1| | 0.66 |
| (3) | 1/|fsph| | 5.0E−03 |
| (4) | DISw | −1.3% |

Table 540 shows parameter values in Conditions (A-VI) to (C-VI).

TABLE 540

| (A) | Rpf/Rpr | 0.63 |
|---|---|---|
| (B) | fp/F1 | 9.32 |
| (C) | R1f/R1r | 1.37 |

"Parameter Values in Each Condition"

Table 632 shows parameter values in Conditions (1-VII) to (8-VII).

TABLE 632

| (1) | F2b/F2 | 0.79 |
|---|---|---|
| (2) | NdNp · vdNp | 48.4 |
|  | NdNn · vdNn | 122.1 |
| (3) | NdNp | 1.7408 |
| (4) | vdNp | 27.8 |
| (5) | NdNn | 1.497 |
| (6) | vdNn | 81.5 |
| (7) | |fNp/fNn| | 1.1 |
| (8) | |fNpNn| | 9.0E−04 |

Figure 16:
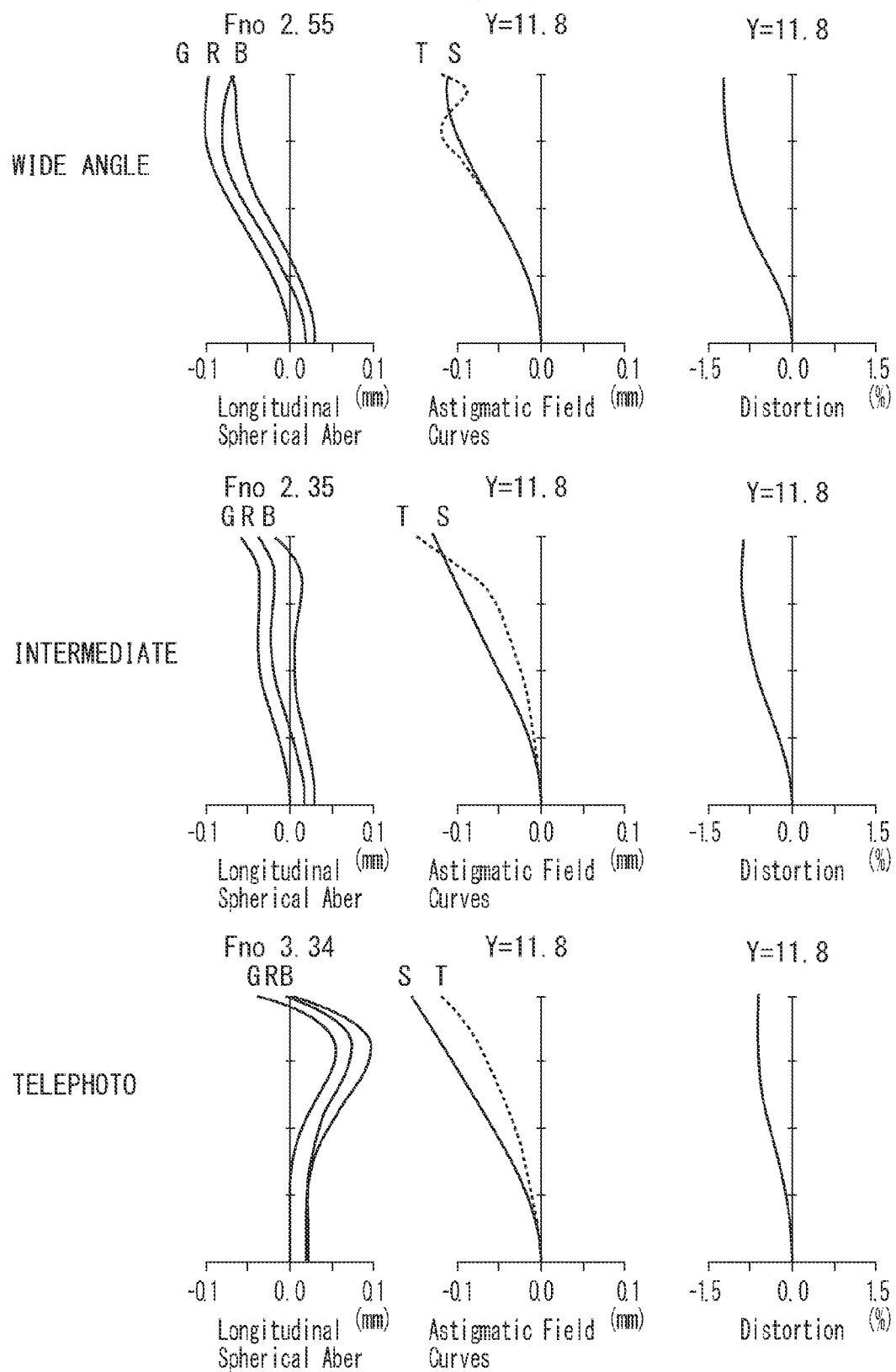
FIG. 16 is an aberration curve diagram of the projection zoom lens according to Example 8.

FIG. 16 shows aberration diagrams of Example 8 based on FIG. 2.

Example 9

FIG. 17 shows a projection zoom lens of Example 9.

As shown in FIG. 17, a first lens group G1 includes lenses L11 to L13, and a second lens group G2 includes lenses L21 to L24.

A third lens group G3 includes one lens L31, a fourth lens group G4 includes lenses L41 and L42, and a fifth lens group G5 includes lenses L51 to L54.

When the magnification is changed from the wide angle end to the telephoto end, the second lens group G2 is moved to the reduction side, and the third to fifth lens groups G3 to G5 are moved to the magnification side.

The first lens group G1 is a negative group, and includes a negative meniscus lens L11 convex toward the magnification side, a negative lens L12 concave toward the magnification side, and a negative meniscus lens L13 concave toward the reduction side.

The second lens group G2 is a negative group, and includes a biconvex lens L21, a biconcave lens L22, a positive meniscus lens L23 convex toward the reduction side, and a negative meniscus lens L24 concave toward the magnification side.

The positive meniscus lens L23 and the negative meniscus lens L24 are cemented.

The third lens group G3 is a positive group, and includes one biconvex lens L31.

The fourth lens group G4 is a positive group, and includes a positive meniscus lens L41 convex toward the magnification side and a biconvex lens L42.

The fifth lens group G5 is a negative group with weak refractive power, and includes a negative meniscus lens L51 convex toward the magnification side, a biconvex lens L52, a negative meniscus lens L53 and a biconvex lens L54.

The negative meniscus lens L53 is "concave toward the magnification side". The negative meniscus lens L51 and the biconvex lens L52 are cemented.

In Example 9, the range of the focal length of the entire system: F, the F-number, and the half field angle at the wide angle end: ωw are as follows.

F=13.8 to 20.5 mm, Fno=2.55 to 3.34, and ωw=40.4°.

Table 33 shows data on Example 9.

TABLE 33

| SURFACE NUMBER | R | D | Nd | Vd | Lens | Group |
|---|---|---|---|---|---|---|
| 1 | 46.867 | 2.00 | 1.75520 | 27.53 | L11 | G1 |
| 2 | 30.251 | 5.52 |  |  |  |  |
| 3* | −36.475 | 4.27 | 1.53159 | 55.70 | L12 |  |
| 4* | −57.690 | 6.22 |  |  |  |  |
| 5 | 344.426 | 2.00 | 1.84666 | 23.78 | L13 |  |
| 6 | 31.478 | S6 |  |  |  |  |
| 7 | 67.766 | 6.71 | 1.78472 | 25.72 | L21 | G2 |
| 8 | −51.452 | 1.16 |  |  |  |  |
| 9 | −141.511 | 1.50 | 1.49700 | 81.61 | L22 |  |
| 10 | 19.824 | 7.19 |  |  |  |  |
| 11 | −36.834 | 6.00 | 1.67270 | 32.17 | L23 |  |
| 12 | −17.103 | 1.80 | 1.77250 | 49.62 | L24 |  |
| 13 | −69.964 | S13 |  |  |  |  |
| 14 | 124.592 | 6.00 | 1.72000 | 46.02 | L31 | G3 |
| 15 | −124.592 | S15 |  |  |  |  |
| 16 | 30.372 | 3.78 | 1.69350 | 53.21 | L41 | G4 |
| 17 | 79.326 | 10.94 |  |  |  |  |
| 18 | 18.479 | 4.64 | 1.49700 | 81.55 | L42 |  |
| 19 | −221.173 | 0.30 |  |  |  |  |
| 20 | INF | S20 |  |  |  |  |
| 21 | 132.941 | 1.50 | 1.83400 | 37.35 | L51 | G5 |
| 22 | 11.072 | 4.89 | 1.48749 | 70.44 | L52 |  |
| 23 | −112.557 | 2.54 |  |  |  |  |
| 24 | −15.967 | 1.75 | 1.80610 | 40.93 | L53 |  |
| 25 | −34.153 | 0.61 |  |  |  |  |
| 26 | 80.480 | 4.54 | 1.48749 | 70.44 | L54 |  |
| 27* | −18.048 | Bf |  |  |  |  |
| 28 | INF | 1 | 1.51680 | 64.17 | CG |  |
| 29 | INF | — |  |  |  |  |

In Example 9, the configuration of the first to fifth lens groups G1 to G5 is "negative, negative, positive, positive and negative".

"Aspherical Surface Data"

Table 34 shows data on the aspherical surface.

TABLE 34

|     | S3 | S4 | S26 |
|-----|-----|-----|-----|
| K   | 0 | 0 | 0 |
| C4  | 8.5185E−05 | 7.9789E−05 | 2.1623E−05 |
| C6  | −1.6323E−07 | −7.4696E−08 | 8.7304E−09 |
| C8  | 2.3812E−10 | −1.2153E−10 | 2.1191E−10 |
| C10 | 7.1995E−16 | 6.6970E−13 | −2.5309E−12 |
| C12 | −4.4456E−16 | 8.6234E−16 | 0 |
| C14 | 5.6391E−19 | −5.1440E−18 | 0 |
| C16 | −1.3912E−22 | 6.1909E−21 | 0 |

Table 35 shows the lens group spacing: S6, S13, S15 and S20 for the wide angle end, intermediate, and the telephoto end when a projection distance is set to 1600 mm.

TABLE 35

|  | S6 | S13 | S15 | S20 |
|---|---|---|---|---|
| WIDE ANGLE END | 6.24 | 11.23 | 7.68 | 0.97 |
| INTERMEDIATE | 8.79 | 4.26 | 5.53 | 1.58 |
| TELEPHOTO END | 9.13 | 0.80 | 1.80 | 2.21 |

"Parameter Values in Each Condition"

Table 36 shows parameter values in Conditions (1-I) to (12-I).

TABLE 36

| (1) | ωw | 40.4° |
|---|---|---|
| (2) | f1/f2 | 0.25 |
| (3) | D3/F3 | 0.09 |
|  | D4/F4 | 0.50 |
| (4) | 1/|f1_3w| | 0.03 |
| (5) | |f1_3w/fw| | 2.2 |
| (6) | Nd2p · vd2p | 45.9 |
|  | Nd2n · vd2n | 122.2 |
| (7) | Nd2p | 1.7847 |
| (8) | vd2p | 25.7 |
| (9) | Nd2n | 1.497 |
| (10) | vd2n | 81.6 |
| (11) | |f2p/f2n| | 1.1 |
| (12) | |f2p2n| | 4.3E−04 |

"Parameter Values in Each Condition"

Table 136 shows parameter values in Conditions (1-II) to (6-II).

TABLE 136

| (1) | Bf/Fw | 2.39 |
|---|---|---|
| (2) | |F1|/Fw | 1.70 |
| (3) | |Fw1 − 2|/D2G − 3G | 1.30 |
| (4) | F3o4/Fw | 0.52 |
| (5) | OAL/Bf | 4.39 |
| (6) | D5/Bf | 0.53 |

"Parameter Values in Each Condition"

Table 236 shows parameter values in Conditions (1-III) to (3-III).

TABLE 236

| (1) | ωw | 42.4° |
|---|---|---|
| (2) | |F4| | 26.7 |
|  | |F5| | 209.6 |
| (3) | F4 − 5w/F4 − 5t | 1.0 |

Figure 40:
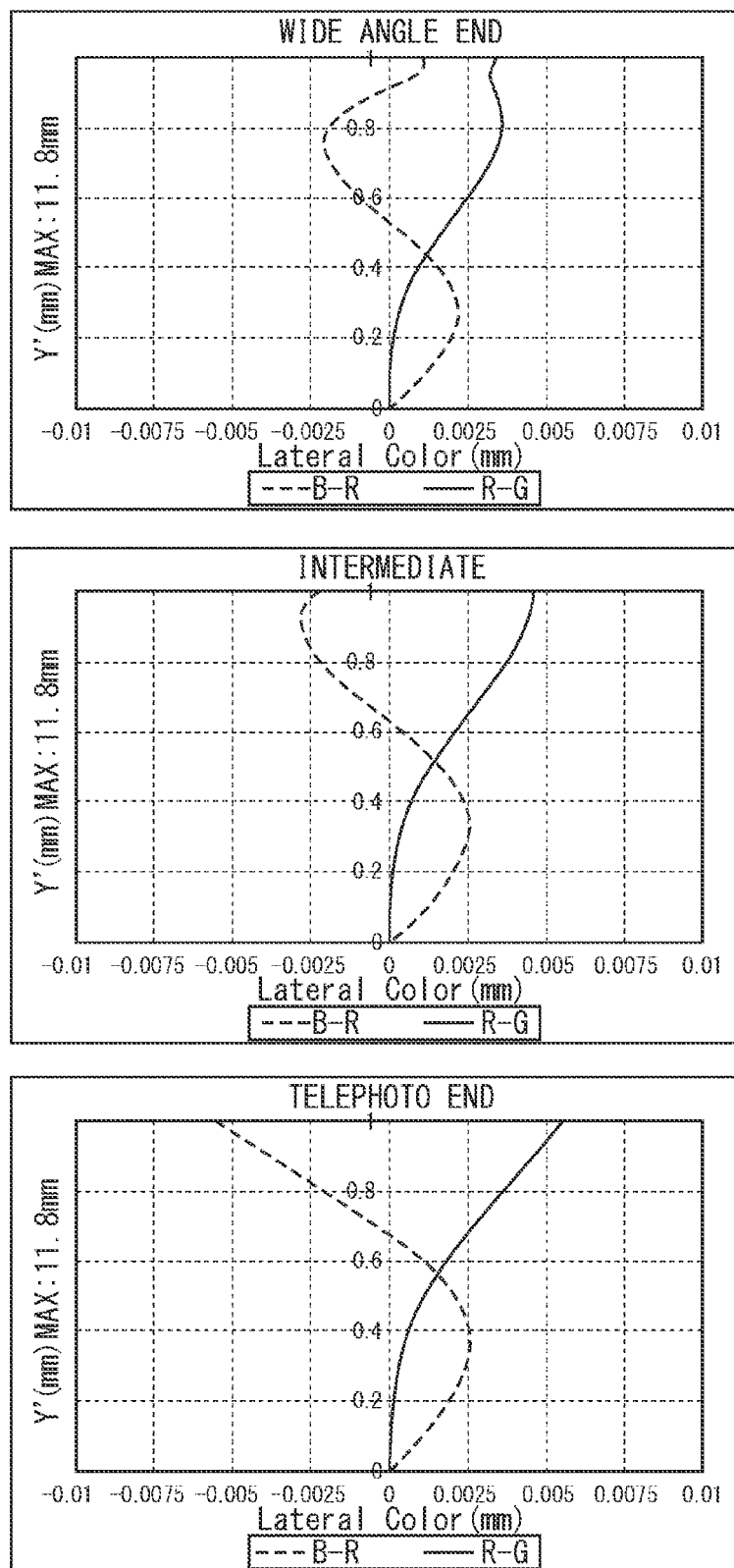
FIG. 40 is a magnification chromatic aberration diagram of the projection zoom lens according to Example 9.

Also, FIG. 40 shows a magnification chromatic aberration diagram of Example 9 based on FIG. 32.

"Parameter Values in Each Condition"

Table 336 shows parameter values in Conditions (1-IV) to (5-IV).

TABLE 336

| (1) | ωw | 40.4° |
|---|---|---|
| (2) | R1/R2 | 1.5 |
| (3) | f1/F1 | 5.1 |
| (4) | f1/Fw | 8.6 |
| (5) | |F1| | 23.4 |
|  | |F2| | 92.8 |

"Parameter Values in Each Condition"

Table 436 shows parameter values in Conditions (1-V).

TABLE 436

| (1) | D3/D4 | 0.56 |
|---|---|---|

"Parameter Values in Each Condition"

Table 544 shows parameter values in Conditions (1-VI) to (4-VI).

TABLE 544

| (1) | ωw | 42.4° |
|---|---|---|
| (2) | |fw/F1| | 0.59 |
| (3) | 1/|fsph| | 5.0E−03 |
| (4) | DISw | −1.3% |

Table 545 shows parameter values in Conditions (A-VI) to (C-VI).

TABLE 545

| (A) | Rpf/Rpr | 0.63 |
|---|---|---|
| (B) | fp/F1 | 8.54 |
| (C) | R1f/R1r | 1.49 |

"Parameter Values in Each Condition"

Table 636 shows parameter values in Conditions (1-VII) to (8-VII).

TABLE 636

| (1) | F2b/F2 | 0.87 |
|---|---|---|
| (2) | NdNp · vdNp | 45.9 |
|  | NdNn · vdNn | 122.2 |
| (3) | NdNp | 1.7847 |
| (4) | vdNp | 25.7 |
| (5) | NdNn | 1.497 |
| (6) | vdNn | 81.6 |
| (7) | |fNp/fNn| | 1.1 |
| (8) | |fNpNn| | 4.3E−04 |

Figure 18:
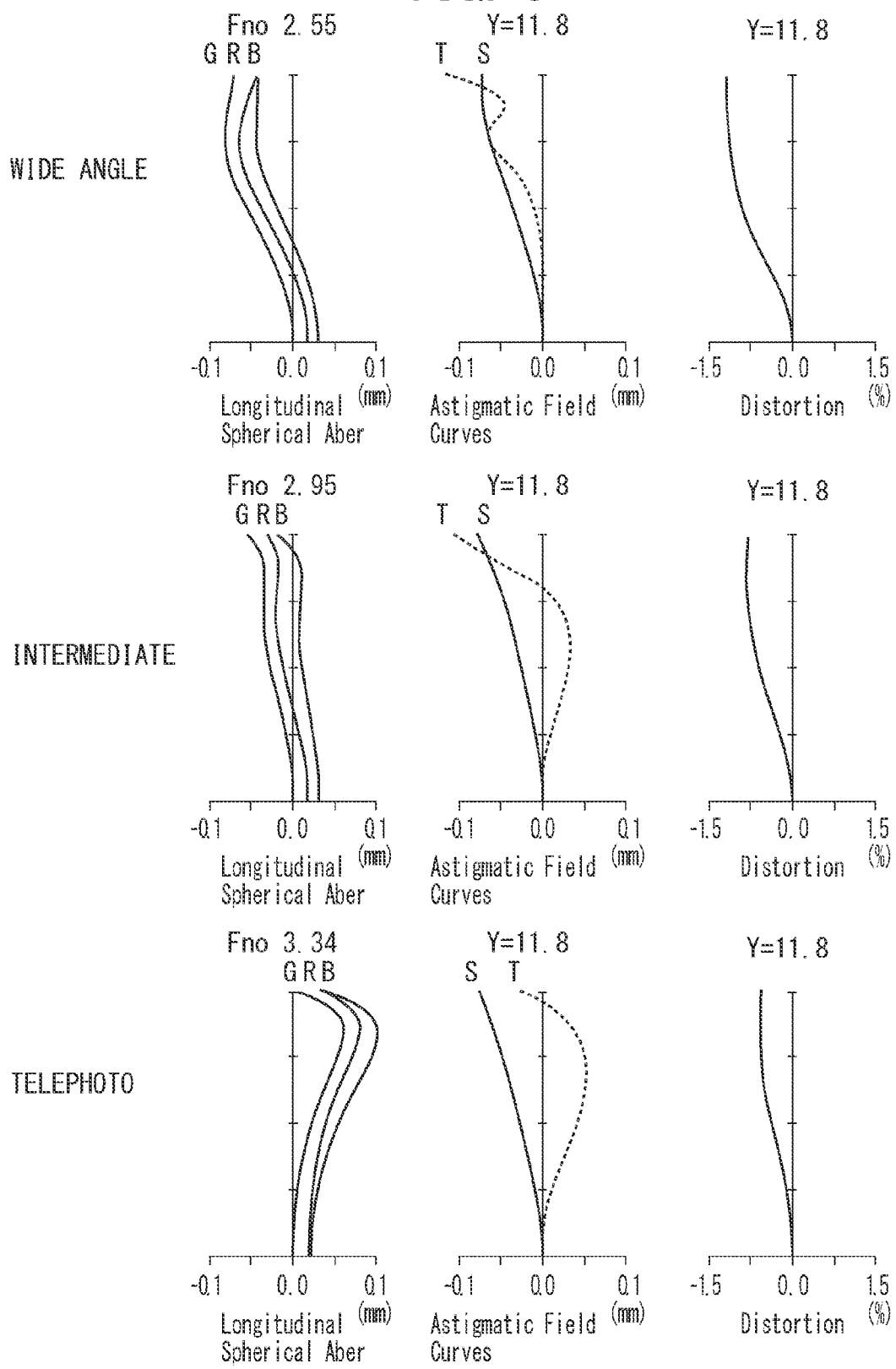
FIG. 18 is an aberration curve diagram of the projection zoom lens according to Example 9.

FIG. 18 shows aberration diagrams of Example 9 based on FIG. 2.

Example 10

FIG. 19 shows a projection zoom lens of Example 10.

As shown in FIG. 19, a first lens group G1 includes lenses L11 to L13, and a second lens group G2 includes lenses L21 to L24.

A third lens group G3 includes one lens L31, a fourth lens group G4 includes lenses L41 and L42, and a fifth lens group G5 includes lenses L51 to L54.

When the magnification is changed from the wide angle end to the telephoto end, the second lens group G2 is moved to the reduction side, and the third to fifth lens groups G3 to G5 are moved to the magnification side.

The first lens group G1 is a negative group, and includes a negative meniscus lens L11 convex toward the magnification side, a negative lens L12 concave toward the magnification side, and a negative meniscus lens L13 concave toward the reduction side.

The second lens group G2 is a negative group, and includes a biconvex lens L21, a biconcave lens L22, a positive meniscus lens L23 convex toward the reduction side, and a negative meniscus lens L24 concave toward the magnification side.

The positive meniscus lens L23 and the negative meniscus lens L24 are cemented.

The third lens group G3 is a positive group, and includes one biconvex lens L31.

The fourth lens group G4 is a positive group, and includes a positive meniscus lens L41 convex toward the magnification side and a biconvex lens L42.

The fifth lens group G5 is a negative group with weak refractive power, and includes a negative meniscus lens L51 convex toward the magnification side, a biconvex lens L52, a negative meniscus lens L53 and a biconvex lens L54.

The negative meniscus lens L53 is "concave toward the magnification side". The negative meniscus lens L51 and the biconvex lens L52 are cemented.

In Example 10, the range of the focal length of the entire system: F, the F-number, and the half field angle at the wide angle end: ωw are as follows.

F=12.4 to 18.5 mm, Fno=2.56 to 3.34, and ωw=43.3°.

Table 37 shows data on Example 10.

TABLE 37

| SURFACE NUMBER | R | D | Nd | Vd | Lens | Group |
|---|---|---|---|---|---|---|
| 1 | 50.661 | 2.00 | 1.80420 | 46.50 | L11 | G1 |
| 2 | 26.441 | 7.11 | | | | |
| 3* | −42.815 | 4.00 | 1.53159 | 55.70 | L12 | |
| 4* | −73.861 | 3.28 | | | | |
| 5 | 82.087 | 2.00 | 1.92286 | 20.88 | L13 | |
| 6 | 27.439 | S6 | | | | |
| 7 | 50.904 | 7.05 | 1.74077 | 27.79 | L21 | G2 |
| 8 | −49.701 | 0.30 | | | | |
| 9 | −170.144 | 1.50 | 1.49700 | 81.55 | L22 | |
| 10 | 17.939 | 6.31 | | | | |
| 11 | −55.923 | 5.66 | 1.64769 | 33.79 | L23 | |
| 12 | −15.786 | 1.80 | 1.77250 | 49.60 | L24 | |
| 13 | −207.884 | S13 | | | | |
| 14 | 64.599 | 4.88 | 1.72000 | 46.02 | L31 | G3 |
| 15 | −147.036 | S15 | | | | |
| 16 | 30.230 | 3.19 | 1.69350 | 53.21 | L41 | G4 |
| 17 | 69.717 | 9.82 | | | | |
| 18 | 18.812 | 4.09 | 1.49700 | 81.55 | L42 | |
| 19 | −156.901 | 0.30 | | | | |

TABLE 37-continued

| SURFACE NUMBER | R | D | Nd | Vd | Lens | Group |
|---|---|---|---|---|---|---|
| 20 | INF | S20 | | | | |
| 21 | 335.907 | 1.50 | 1.83400 | 37.35 | L51 | G5 |
| 22 | 10.976 | 4.44 | 1.48749 | 70.44 | L52 | |
| 23 | −269.004 | 2.71 | | | | |
| 24 | −13.961 | 1.60 | 1.80610 | 40.93 | L53 | |
| 25 | −21.675 | 0.30 | | | | |
| 26* | 78.896 | 4.41 | 1.49700 | 81.61 | L54 | |
| 27* | −17.491 | Bf | | | | |
| 28 | INF | 1 | 1.51680 | 64.17 | CG | |
| 29 | INF | — | | | | |

In Example 10, the configuration of the first to fifth lens groups G1 to G5 is "negative, negative, positive, positive and negative".

"Aspherical Surface Data"

Table 38 shows data on the aspherical surface.

TABLE 38

| | S3 | S4 | S26 | S27 |
|---|---|---|---|---|
| K | 0 | 0 | 0 | 0 |
| C4 | 8.5374E−05 | 7.8094E−05 | −2.5032E−06 | 1.7694E−05 |
| C6 | −1.6340E−07 | −7.5457E−08 | −2.7651E−08 | 6.0681E−08 |
| C8 | 2.4362E−10 | −1.4355E−10 | 1.2366E−09 | −3.1234E−10 |
| C10 | −2.3225E−14 | 6.7055E−13 | −4.6825E−12 | 3.4879E−12 |
| C12 | −4.7486E−16 | 6.1644E−16 | 0 | 0 |
| C14 | 6.2305E−19 | −5.9963E−18 | 0 | 0 |
| C16 | −2.8932E−22 | 6.7931E−21 | 0 | 0 |

Table 39 shows the lens group spacing: S6, S13, S15 and S20 for the wide angle end, intermediate, and the telephoto end when a projection distance is set to 1600 mm.

TABLE 39

| | S6 | S13 | S15 | S20 |
|---|---|---|---|---|
| WIDE ANGLE END | 7.90 | 10.19 | 6.98 | 1.12 |
| INTERMEDIATE | 9.53 | 4.66 | 4.49 | 1.91 |
| TELEPHOTO END | 9.55 | 1.76 | 0.80 | 2.74 |

"Parameter Values in Each Condition"

Table 40 shows parameter values in Conditions (1-I) to (12-I).

TABLE 40

| (1) | ωw | 43.3° |
|---|---|---|
| (2) | f1/f2 | 0.29 |
| (3) | D3/F3 | 0.11 |
| | D4/F4 | 0.49 |
| (4) | 1/|f1__3w| | 0.03 |
| (5) | |f1__3w/fw| | 2.6 |
| (6) | Nd2p · vd2p | 48.4 |
| | Nd2n · vd2n | 122.1 |
| (7) | Nd2p | 1.7408 |
| (8) | vd2p | 27.8 |
| (9) | Nd2n | 1.497 |
| (10) | vd2n | 81.5 |
| (11) | |f2p/f2n| | 1.1 |
| (12) | |f2p2n| | 8.9E−04 |

"Parameter Values in Each Condition"

Table 140 shows parameter values in Conditions (1-II) to (6-II).

TABLE 140

| (1) | Bf/Fw | 2.65 |
|---|---|---|
| (2) | |F1|/Fw | 1.71 |
| (3) | |Fw1 − 2|/D2G − 3G | 1.19 |
| (4) | F3o4/Fw | 0.47 |
| (5) | OAL/Bf | 4.17 |
| (6) | D5/Bf | 0.53 |

"Parameter Values in Each Condition"

Table 240 shows parameter values in Conditions (1-III) to (3-III).

TABLE 240

| (1) | ωw | 43.3° |
|---|---|---|
| (2) | |F4| | 26.6 |
|  | |F5| | 985.9 |
| (3) | F4 − 5w/F4 − 5t | 1.0 |

Figure 41:
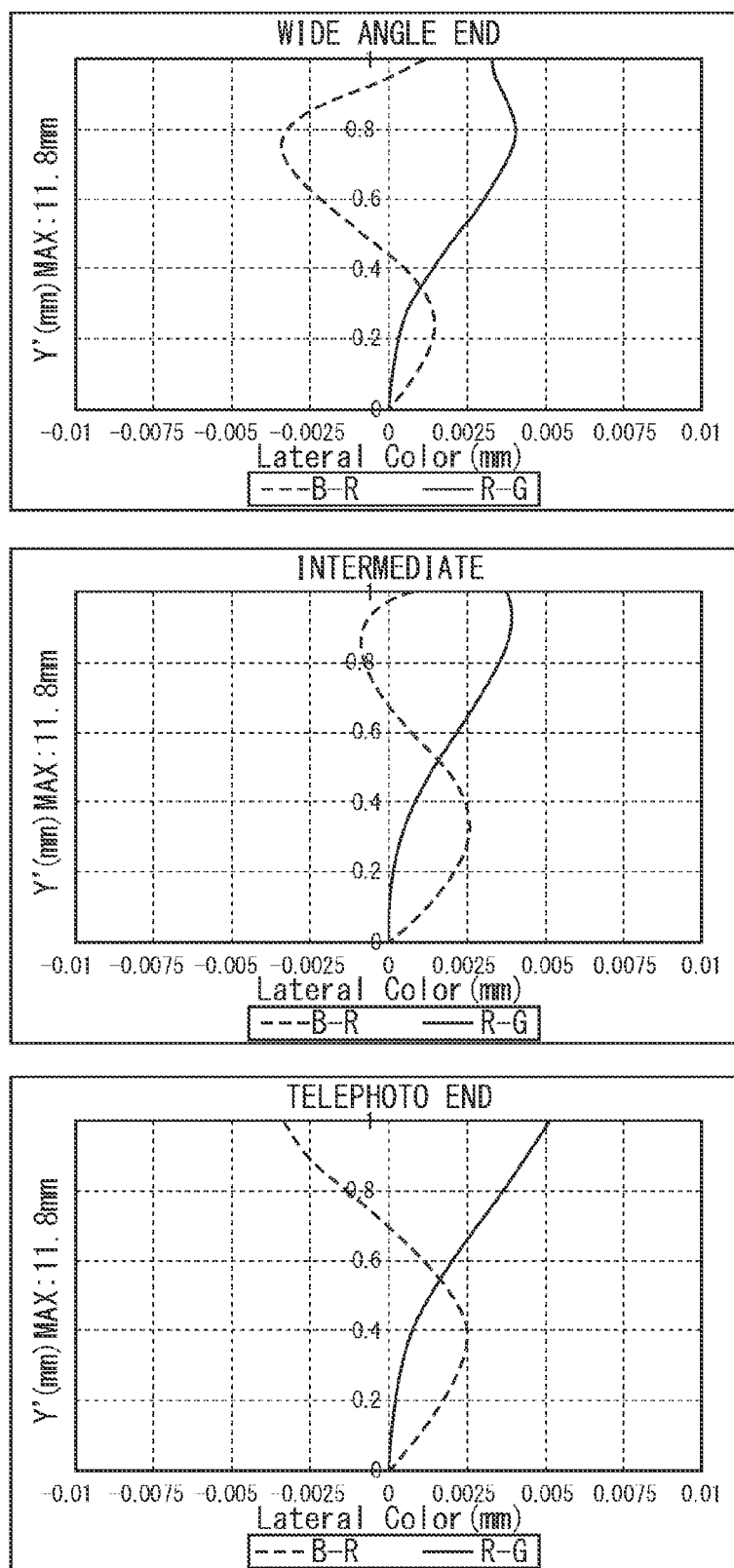
FIG. 41 is a magnification chromatic aberration diagram of the projection zoom lens according to Example 10.

Also, FIG. 41 shows a magnification chromatic aberration diagram of Example 10 based on FIG. 32.

"Parameter Values in Each Condition"

Table 340 shows parameter values in Conditions (1-IV) to (5-IV).

TABLE 340

| (1) | ωw | 43.3° |
|---|---|---|
| (2) | R1/R2 | 1.9 |
| (3) | f1/F1 | 3.4 |
| (4) | f1/Fw | 5.7 |
| (5) | |F1| | 21.3 |
|  | |F2| | 74.7 |

"Parameter Values in Each Condition"

Table 440 shows parameter values in Conditions (1-V).

TABLE 440

| (1) | D3/D4 | 0.52 |
|---|---|---|

"Parameter Values in Each Condition"

Table 549 shows parameter values in Conditions (1-VI) to (4-VI).

TABLE 549

| (1) | ωw | 43.3° |
|---|---|---|
| (2) | |fw/F1| | 0.58 |
| (3) | 1/|fsph| | 5.0E−03 |
| (4) | DISw | −1.3% |

Table 550 shows parameter values in Conditions (A-VI) to (C-VI).

TABLE 550

| (A) | Rpf/Rpr | 0.49 |
|---|---|---|
| (B) | fp/F1 | 9.39 |
| (C) | R1f/R1r | 1.88 |

"Parameter Values in Each Condition"

Table 640 shows parameter values in Conditions (1-VII) to (8-VII).

TABLE 640

| (1) | F2b/F2 | 0.84 |
|---|---|---|
| (2) | NdNp · vdNp | 48.4 |
|  | NdNn · vdNn | 122.1 |
| (3) | NdNp | 1.7408 |
| (4) | vdNp | 27.8 |
| (5) | NdNn | 1.497 |
| (6) | vdNn | 81.5 |
| (7) | |fNp/fNn| | 1.1 |
| (8) | |fNpNn | 8.9E−04 |

Figure 20:
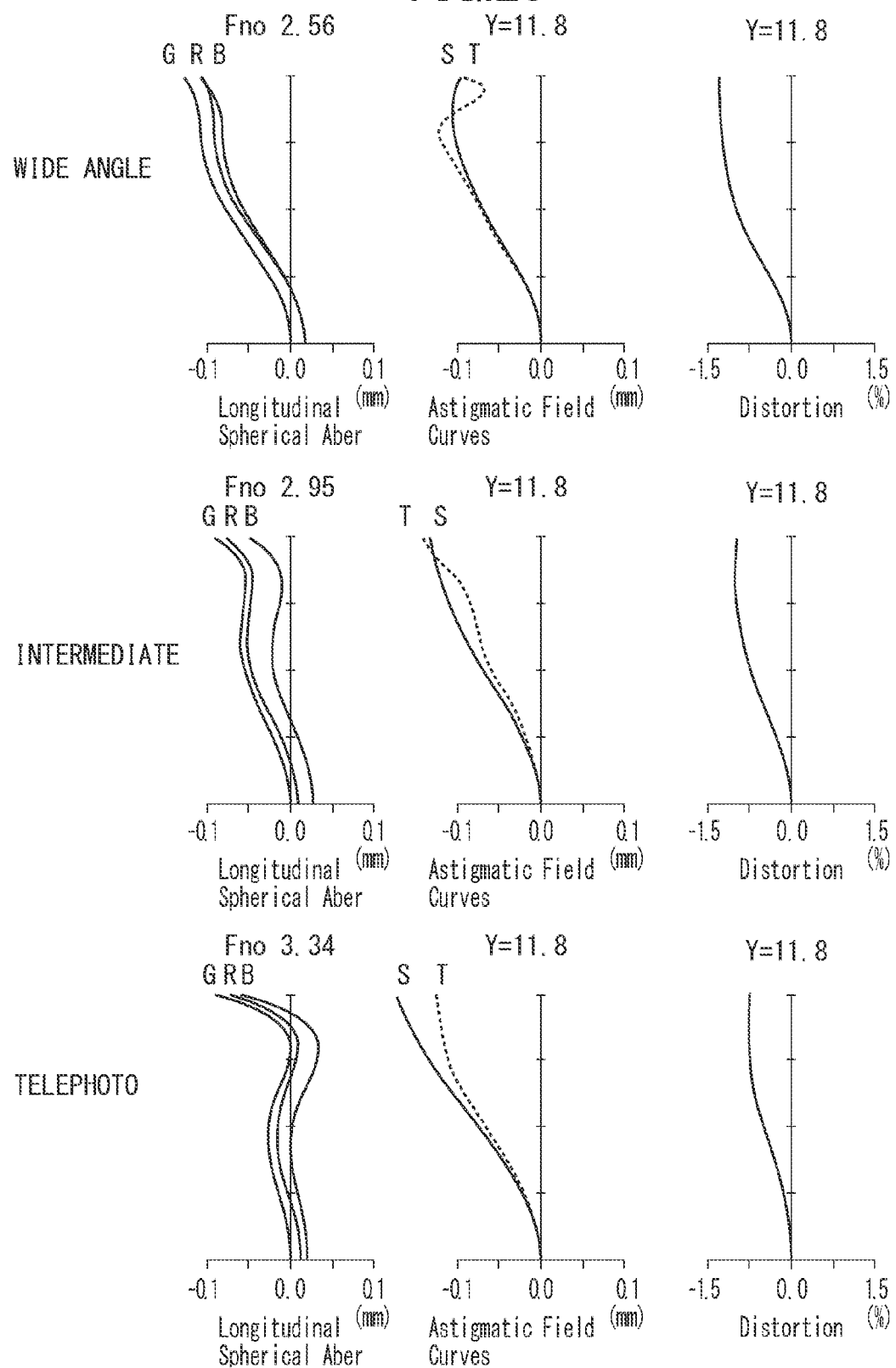
FIG. 20 is an aberration curve diagram of the projection zoom lens according to Example 10.

FIG. 20 shows aberration diagrams of Example 10 based on FIG. 2.

Example 11

Figure 21:
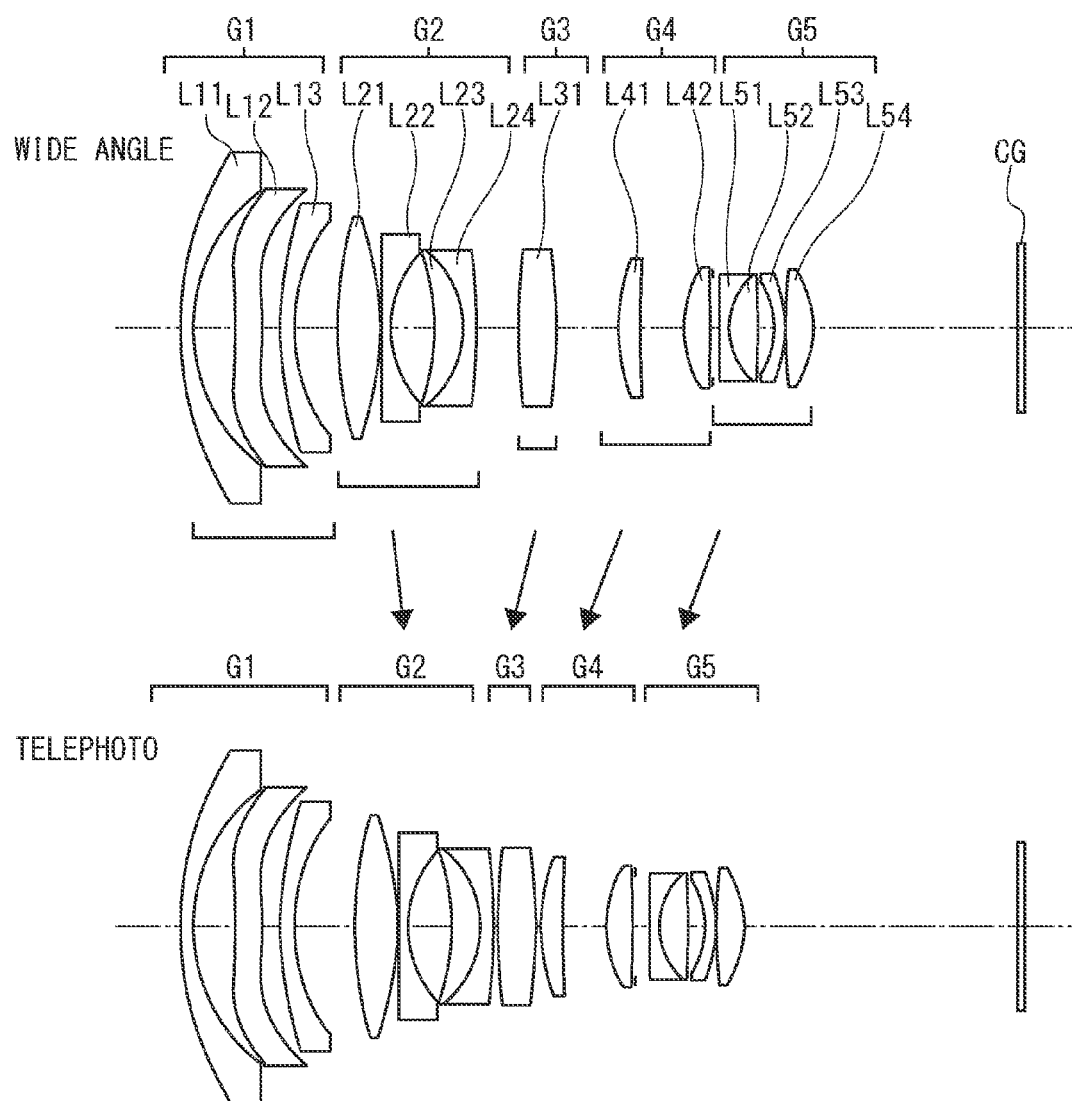
FIG. 21 is a cross-sectional view showing a configuration of a projection zoom lens according to Example 11.

FIG. 21 shows a projection zoom lens of Example 11.

As shown in FIG. 21, a first lens group G1 includes lenses L11 to L13, and a second lens group G2 includes lenses L21 to L24.

A third lens group G3 includes one lens L31, a fourth lens group G4 includes lenses L41 and L42, and a fifth lens group G5 includes lenses L51 to L54.

When the magnification is changed from the wide angle end to the telephoto end, the second lens group G2 is moved to the reduction side, and the third to fifth lens groups G3 to G5 are moved to the magnification side.

The first lens group G1 is a negative group, and includes a negative meniscus lens L11 convex toward the magnification side, a negative lens L12 concave toward the magnification side, and a negative meniscus lens L13 concave toward the reduction side.

The second lens group G2 is a negative group, and includes a biconvex lens L21, a biconcave lens L22, a positive meniscus lens L23 convex toward the reduction side, and a negative meniscus lens L24 concave toward the magnification side.

The positive meniscus lens L23 and the negative meniscus lens L24 are cemented.

The third lens group G3 is a positive group, and includes one biconvex lens L31.

The fourth lens group G4 is a positive group, and includes a positive meniscus lens L41 convex toward the magnification side and a biconvex lens L42.

The fifth lens group G5 is a negative group with weak refractive power, and includes a negative meniscus lens L51 convex toward the magnification side, a biconvex lens L52, a negative meniscus lens L53 and a biconvex lens L54.

The negative meniscus lens L53 is "concave toward the magnification side". The negative meniscus lens L51 and the biconvex lens L52 are cemented.

In Example 11, the range of the focal length of the entire system: F, the F-number, and the half field angle at the wide angle end: ωw are as follows.

F=11.8 to 17.6 mm, Fno=2.56 to 3.34, and ωw=44.8°.

Table 41 shows data on Example 11.

TABLE 41

| SURFACE NUMBER | R | D | Nd | Vd | Lens | Group |
|---|---|---|---|---|---|---|
| 1 | 50.155 | 2.00 | 1.83481 | 42.72 | L11 | G1 |
| 2 | 26.381 | 6.70 | | | | |
| 3* | −53.270 | 4.00 | 1.53159 | 55.70 | L12 | |
| 4* | −109.223 | 3.00 | | | | |
| 5 | 61.681 | 2.00 | 1.92286 | 20.88 | L13 | |
| 6 | 26.721 | S6 | | | | |
| 7 | 58.967 | 6.59 | 1.72825 | 28.32 | L21 | G2 |
| 8 | −48.599 | 0.30 | | | | |
| 9 | −563.077 | 1.50 | 1.49700 | 81.55 | L22 | |
| 10 | 15.632 | 6.83 | | | | |
| 11 | −32.599 | 4.73 | 1.64769 | 33.79 | L23 | |
| 12 | −14.531 | 1.80 | 1.77250 | 49.60 | L24 | |
| 13 | −83.596 | S13 | | | | |
| 14 | 118.991 | 6.00 | 1.72000 | 46.02 | L31 | G3 |
| 15 | −85.370 | S15 | | | | |
| 16 | 29.686 | 3.30 | 1.67270 | 32.17 | L41 | G4 |
| 17 | 121.713 | 6.89 | | | | |
| 18 | 17.445 | 4.19 | 1.49700 | 81.55 | L42 | |
| 19 | −167.813 | 0.30 | | | | |
| 20 | INF | S20 | | | | |
| 21 | 246.707 | 1.50 | 1.91082 | 35.25 | L51 | G5 |
| 22 | 10.804 | 4.64 | 1.48749 | 70.44 | L52 | |
| 23 | −61.219 | 2.48 | | | | |
| 24 | −13.053 | 1.60 | 1.83400 | 37.35 | L53 | |
| 25 | −20.527 | 0.30 | | | | |
| 26* | 281.847 | 4.35 | 1.49700 | 81.61 | L54 | |
| 27* | −15.195 | Bf | | | | |
| 28 | INF | 1 | 1.51680 | 64.17 | CG | |
| 29 | INF | — | | | | |

In Example 11, the configuration of the first to fifth lens groups G1 to G5 is "negative, negative, positive, positive and negative".

"Aspherical Surface Data"

Table 42 shows data on the aspherical surface.

TABLE 42

| | S3 | S4 | S26 | S27 |
|---|---|---|---|---|
| K | 0 | 0 | 0 | 0 |
| C4 | 8.4493E−05 | 7.9696E−05 | −5.4775E−07 | 2.3441E−05 |
| C6 | −1.8695E−07 | −1.0554E−07 | −2.0203E−07 | −1.5887E−07 |
| C8 | 3.3301E−10 | −1.0395E−10 | 4.6270E−09 | 4.3860E−09 |
| C10 | −1.4165E−13 | 8.6022E−13 | −4.5308E−11 | −4.1747E−11 |
| C12 | −6.0562E−16 | 4.9655E−16 | 0 | 0 |
| C14 | 1.2688E−18 | −7.8628E−18 | 0 | 0 |
| C16 | −1.0593E−21 | 9.0619E−21 | 0 | 0 |

Table 43 shows the lens group spacing: S6, S13, S15 and S20 for the wide angle end, intermediate, and the telephoto end when a projection distance is set to 1600 mm.

TABLE 43

| | S6 | S13 | S15 | S20 |
|---|---|---|---|---|
| WIDE ANGLE END | 7.90 | 10.19 | 6.98 | 1.12 |
| INTERMEDIATE | 9.53 | 4.66 | 4.49 | 1.91 |
| TELEPHOTO END | 9.55 | 1.76 | 0.80 | 2.74 |

"Parameter Values in Each Condition"

Table 44 shows parameter values in Conditions (1-I) to (12-I).

TABLE 44

| (1) | ωw | 44.8° |
|---|---|---|
| (2) | f1/f2 | 0.48 |
| (3) | D3/F3 | 0.05 |
| | D4/F4 | 0.53 |
| (4) | 1/|f1_3w| | 0.04 |
| (5) | |f1_3w/fw| | 1.9 |
| (6) | Nd2p · vd2p | 48.9 |
| | Nd2n · vd2n | 122.1 |
| (7) | Nd2p | 1.7283 |
| (8) | vd2p | 28.3 |
| (9) | Nd2n | 1.497 |
| (10) | vd2n | 81.5 |
| (11) | |f2p/f2n| | 1.2 |
| (12) | |f2p2n| | 3.3E−03 |

"Parameter Values in Each Condition"

Table 144 shows parameter values in Conditions (1-II) to (6-II).

TABLE 144

| (1) | Bf/Fw | 2.79 |
|---|---|---|
| (2) | |F1|/Fw | 1.94 |
| (3) | |Fw1 − 2|/D2G − 3G | 1.09 |
| (4) | F3o4/Fw | 0.51 |
| (5) | OAL/Bf | 4.07 |
| (6) | D5/Bf | 0.49 |

"Parameter Values in Each Condition"

Table 244 shows parameter values in Conditions (1-III) to (3-III).

TABLE 244

| (1) | ωw | 44.8° |
|---|---|---|
| (2) | |F4| | 23.0 |
| | |F5| | 526.9 |
| (5) | F4 − 5w/F4 − 5t | 1.0 |

Figure 42:
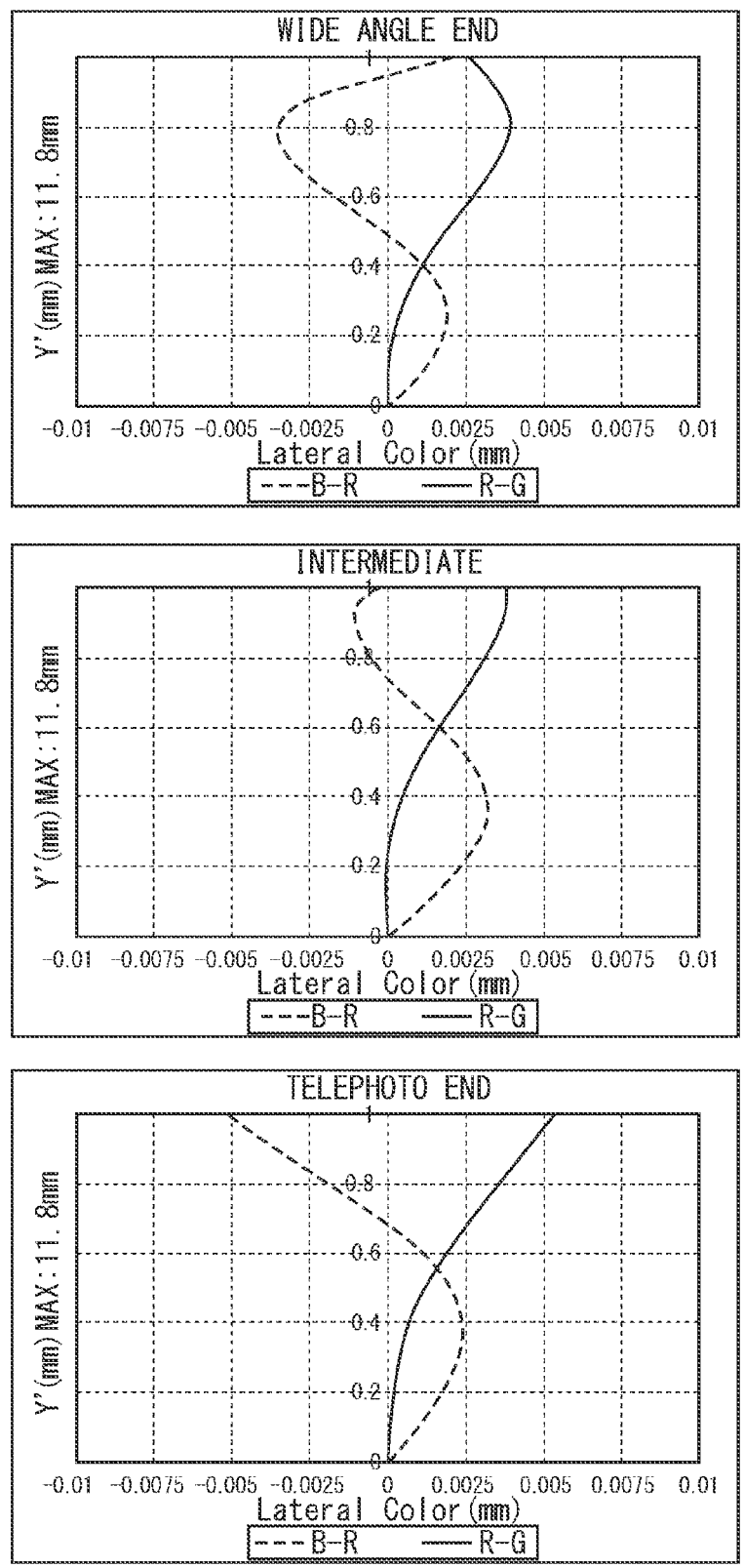
FIG. 42 is a magnification chromatic aberration diagram of the projection zoom lens according to Example 11.

Also, FIG. 42 shows a magnification chromatic aberration diagram of Example 11 based on FIG. 32.

"Parameter Values in Each Condition"

Table 344 shows parameter values in Conditions (1-IV) to (5-IV).

TABLE 344

| (1) | ωw | 44.8° |
|---|---|---|
| (2) | R1/R2 | 1.9 |
| (3) | f1/F1 | 3.0 |
| (4) | f1/Fw | 5.9 |
| (5) | |F1| | 23.0 |
| | |F2| | 47.4 |

"Parameter Values in Each Condition"

Table 444 shows parameter values in Conditions (1-V).

TABLE 444

| (1) | D3/D4 | 0.27 |

"Parameter Values in Each Condition"

Table 554 shows parameter values in Conditions (1-VI) to (4-VI).

TABLE 554

| (1) | ωw | 44.8° |
|---|---|---|
| (2) | |fw/F1| | 0.52 |
| (3) | 1/|fsph| | 5.0E−03 |
| (4) | DISw | −1.3% |

Table 555 shows parameter values in Conditions (A-VI) to (C-VI).

TABLE 555

| (A) | Rpf/Rpr | 0.49 |
|---|---|---|
| (B) | fp/F1 | 8.71 |
| (C) | R1f/R1r | 1.88 |

"Parameter Values in Each Condition"

Table 644 shows parameter values in Conditions (1-VII) to (8-VII).

TABLE 644

| (1) | F2b/F2 | 1.11 |
|---|---|---|
| (2) | NdNp · vdNp | 48.9 |
|  | NdNn · vdNn | 122.1 |
| (3) | NdNp | 1.7283 |
| (4) | vdNp | 28.3 |
| (5) | NdNn | 1.497 |
| (6) | vdNn | 81.5 |
| (7) | |fNp/fNn| | 1.2 |
| (8) | |fNpNn| | 3.3E−03 |

Figure 22:
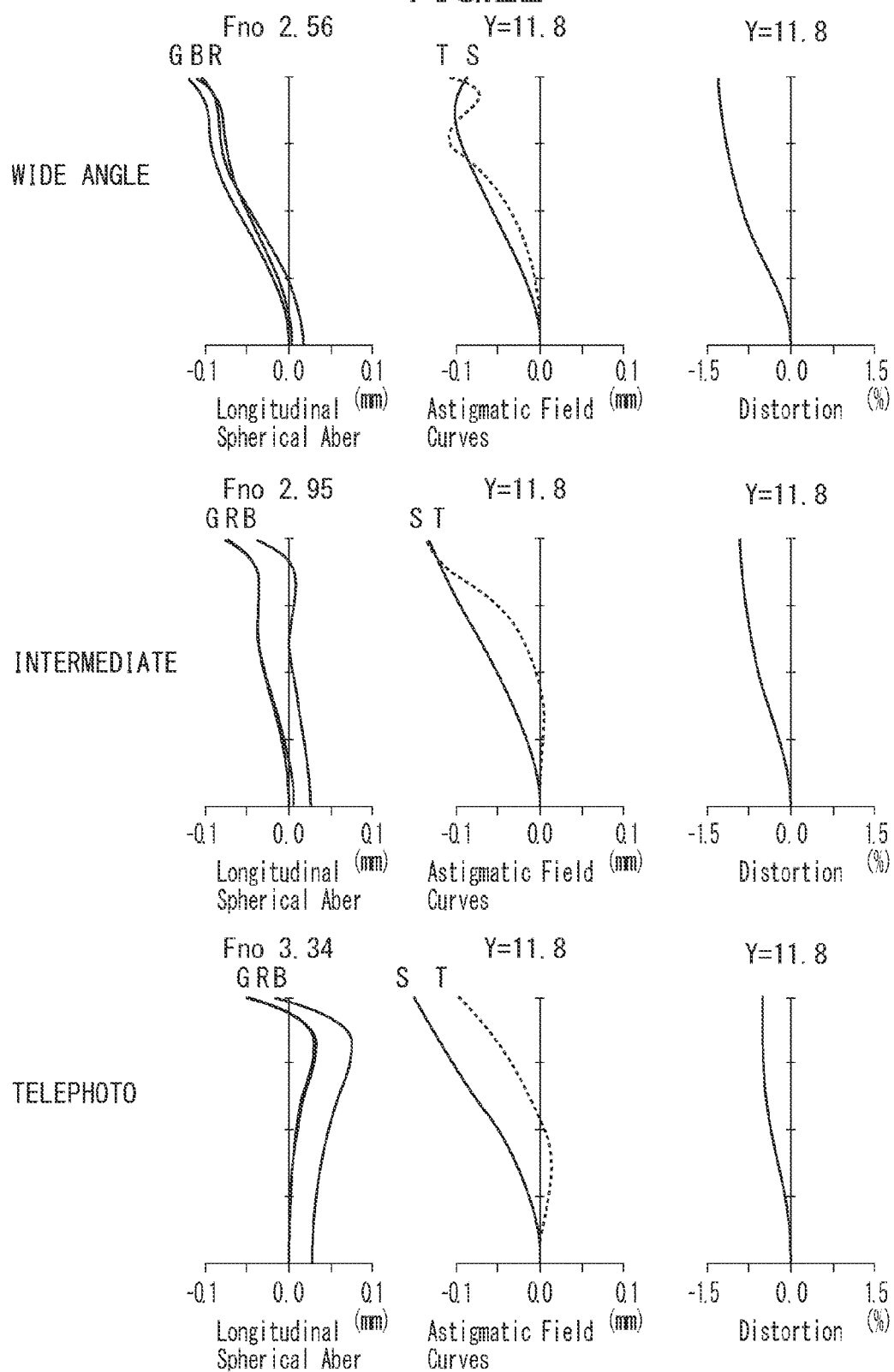
FIG. 22 is an aberration curve diagram of the projection zoom lens according to Example 11.

FIG. 22 shows aberration diagrams of Example 11 based on FIG. 2.

Example 12

Figure 23:
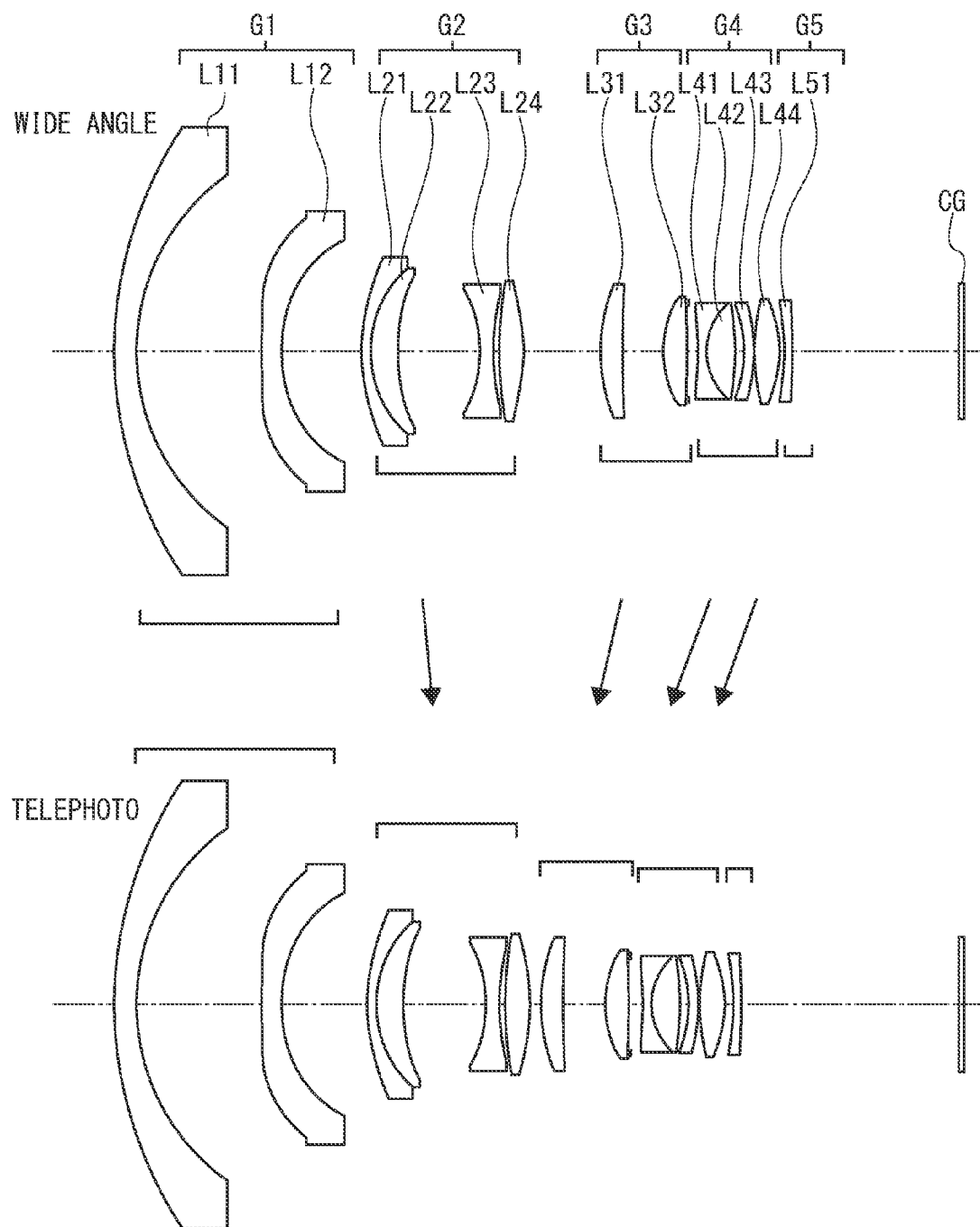
FIG. 23 is a cross-sectional view showing a configuration of a projection zoom lens according to Example 12.

FIG. 23 shows a projection zoom lens of Example 12.

As shown in FIG. 23, a first lens group G1 includes lenses L11 and L12, and a second lens group G2 includes lenses L21 to L24.

A third lens group G3 includes lenses L31 and L32, a fourth lens group G4 includes lenses L41 to L44, and a fifth lens group G5 includes one lens L51.

When the magnification is changed from the wide angle end to the telephoto end, the second lens group G2 is moved to the reduction side, and the third to fifth lens groups G3 to G5 are moved to the magnification side.

The first lens group G1 is a negative group, and includes a negative meniscus lens L11 convex toward the magnification side and a negative lens L12 concave toward the reduction side.

The second lens group G2 is a negative group, and includes a negative meniscus lens L21 convex toward the magnification side, a positive meniscus lens L22 convex toward the magnification side, a biconcave lens L23, and a biconvex lens L24.

The negative meniscus lens L21 and the positive meniscus lens L22 are cemented.

The third lens group G3 is a positive group, and includes a positive meniscus lens L31 convex toward the magnification side and a biconvex lens L32.

The fourth lens group G4 is a negative group, and includes a biconcave lens L41, a biconvex lens L42, a negative meniscus lens L43 concave toward the magnification side and a biconvex lens L44.

The biconcave lens L41 and the biconvex lens L42 are cemented.

The fifth lens group G5 is a negative group, and includes one negative meniscus lens L51 concave toward the magnification side.

In Example 12, the range of the focal length of the entire system: F, the F-number, and the half field angle at the wide angle end: ωw are as follows.

F=12.3 to 17.9 mm, Fno=2.56 to 3.34, and ωw=43.6°.

Table 45 shows data on Example 12.

TABLE 45

| SURFACE NUMBER | R | D | Nd | vd | Lens | Group |
|---|---|---|---|---|---|---|
| 1 | 76.324 | 4.00 | 1.74320 | 49.3 | L11 | 1G |
| 2 | 40.449 | 23.98 |  |  |  |  |
| 3* | −135.284 | 4.00 | 1.53159 | 55.7 | L12 |  |
| 4* | 54.697 | S4 |  |  |  |  |
| 5 | 41.315 | 1.60 | 2.00270 | 19.3 | L21 | 2G |
| 6 | 21.192 | 5.08 | 1.75211 | 25.0 | L22 |  |
| 7 | 34.918 | 15.97 |  |  |  |  |
| 8 | −23.248 | 2.49 | 1.74330 | 49.2 | L23 |  |
| 9 | 44.087 | 1.19 |  |  |  |  |
| 10 | 78.153 | 4.68 | 1.84666 | 23.8 | L24 |  |
| 11 | −44.190 | S11 |  |  |  |  |
| 12 | 30.739 | 4.15 | 1.73800 | 32.3 | L31 | 3G |
| 13 | 295.716 | 7.93 |  |  |  |  |
| 14 | 18.937 | 4.74 | 1.52249 | 59.8 | L32 |  |
| 15 | −139.100 | 0.30 |  |  |  |  |
| 16 | INF | S16 |  |  |  |  |
| 17 | −87.887 | 1.60 | 1.80610 | 33.3 | L41 | 4G |
| 18 | 11.428 | 5.35 | 1.49700 | 81.6 | L42 |  |
| 19 | −52.339 | 1.90 |  |  |  |  |
| 20 | −21.104 | 1.60 | 1.85026 | 32.3 | L43 |  |
| 21 | −46.940 | 0.30 |  |  |  |  |
| 22 | 39.206 | 4.90 | 1.49700 | 81.6 | L44 |  |
| 23 | −21.563 | S23 |  |  |  |  |
| 24* | −61.821 | 1.60 | 1.48749 | 70.4 | L51 | 5G |
| 25* | −86.236 | Bf |  |  |  |  |
| 26 | INF | 1.00 | 1.5168 | 64.2 | CG | — |
| 27 | INF | — |  |  |  |  |

In Example 12, the configuration of the first to fifth lens groups G1 to G5 is "negative, negative, positive, negative and negative".

"Aspherical Surface Data"

Table 46 shows data on the aspherical surface.

TABLE 46

|  | 3 | 4 | 24 | 25 |
|---|---|---|---|---|
| K | 1.5413E+01 | 2.4155E+00 | 1.6045E+01 | −4.7321E+01 |
| C4 | 6.8599E−05 | 6.7062E−05 | −1.0582E−05 | 2.2807E−06 |
| C6 | −1.6435E−07 | −8.8985E−08 | 5.5748E−08 | 5.9153E−08 |
| C8 | 2.2089E−10 | −2.7935E−10 | 5.8491E−10 | 3.4806E−10 |
| C10 | 1.2552E−14 | 9.9796E−13 | 5.1475E−12 | 3.4453E−12 |
| C12 | −3.9118E−16 | 1.1059E−15 | 0 | 0 |
| C14 | 4.4967E−19 | −6.4218E−18 | 0 | 0 |
| C16 | −1.6559E−22 | 5.8455E−21 | 0 | 0 |

Table 47 shows the lens group spacing: S4, S11, S16 and S23 for the wide angle end, intermediate, and the telephoto end when a projection distance is set to 1600 mm.

TABLE 47

|  | S4 | S11 | S16 | S23 |
|---|---|---|---|---|
| WIDE ANGLE END | 15.25 | 14.79 | 1.56 | 0.80 |
| INTERMEDIATE | 17.33 | 7.38 | 2.00 | 0.94 |
| TELEPHOTO END | 16.62 | 2.26 | 2.37 | 1.56 |

"Parameter Values in Each Condition"

Table 48 shows parameter values in Conditions (1-I) to (12-I).

TABLE 48

| (1) | ωw | 43.6° |
|---|---|---|
| (2) | f1/f2 | 0.91 |
| (3) | D3/F3 | 0.51 |
|  | D4/F4 | 0.03 |
| (4) | 1/|f1_3w| | 0.13 |
| (5) | |f1_3w/fw| | 0.6 |
| (6) | Nd2p · vd2p | 43.9 |
|  | Nd2n · vd2n | 85.8 |
| (7) | Nd2p | 1.8467 |
| (8) | vd2p | 23.8 |
| (9) | Nd2n | 1.7433 |
| (10) | vd2n | 49.2 |
| (11) | |f2p/f2n| | 1.7 |
| (12) | |f2p2n| | 1.5E−02 |

"Parameter Values in Each Condition"

Table 148 shows parameter values in Conditions (1-II) to (6-II).

TABLE 148

| (1) | Bf/Fw | 2.68 |
|---|---|---|
| (2) | |F1|/Fw | 3.29 |
| (3) | |Fw1 − 2|/D2G − 3G | 1.00 |
| (4) | F3o4/Fw | 0.56 |
| (5) | OAL/Bf | 4.93 |
| (6) | D5/Bf | 0.53 |

"Parameter Values in Each Condition"

Table 248 shows parameter values in Conditions (1-III) to (3-III).

TABLE 248

| (1) | ωw | 43.6° |
|---|---|---|
| (2) | |F4| | 306.4 |
|  | |F5| | 456.4 |
| (3) | F4 − 5w/F4 − 5t | 1.0 |

Also, FIG. 43 shows a magnification chromatic aberration diagram of Example 12 based on FIG. 32.

"Parameter Values in Each Condition"

Table 348 shows parameter values in Conditions (1-IV) to (5-IV).

TABLE 348

| (1) | ωw | 43.6° |
|---|---|---|
| (2) | R1/R2 | 1.9 |
| (3) | f1/F1 | 3.0 |
| (4) | f1/Fw | 9.9 |
| (5) | |F1| | 40.5 |
|  | |F2| | 44.5 |

"Parameter Values in Each Condition"

Table 448 shows parameter values in Conditions (1-V).

TABLE 448

| (1) | D3/D4 | 1.08 |
|---|---|---|

"Parameter Values in Each Condition"

Table 559 shows parameter values in Conditions (1-VI) to (4-VI).

TABLE 559

| (1) | ωw | 43.6° |
|---|---|---|
| (2) | |fw/F1| | 0.30 |
| (3) | 1/|fsph| | 1.4E−02 |
| (4) | DISw | −1.3% |

Table 560 shows parameter values in Conditions (A-VI) to (C-VI).

TABLE 560

| (A) | |Rpf/Rpr| | 2.47 |
|---|---|---|
| (B) | fp/F1 | 1.80 |
| (C) | R1f/R1r | 1.89 |

"Parameter Values in Each Condition"

Table 648 shows parameter values in Conditions (1-VII) to (8-VII).

TABLE 648

| (1) | F2b/F2 | 2.89 |
|---|---|---|
| (2) | NdNp · vdNp | 43.9 |
|  | NdNn · vdNn | 85.8 |
| (3) | NdNp | 1.8467 |
| (4) | vdNp | 23.8 |
| (5) | NdNn | 1.7433 |
| (6) | vdNn | 49.2 |
| (7) | |fNp/fNn| | 1.7 |
| (8) | |fNpNn| | 1.5E−02 |

Figure 24:
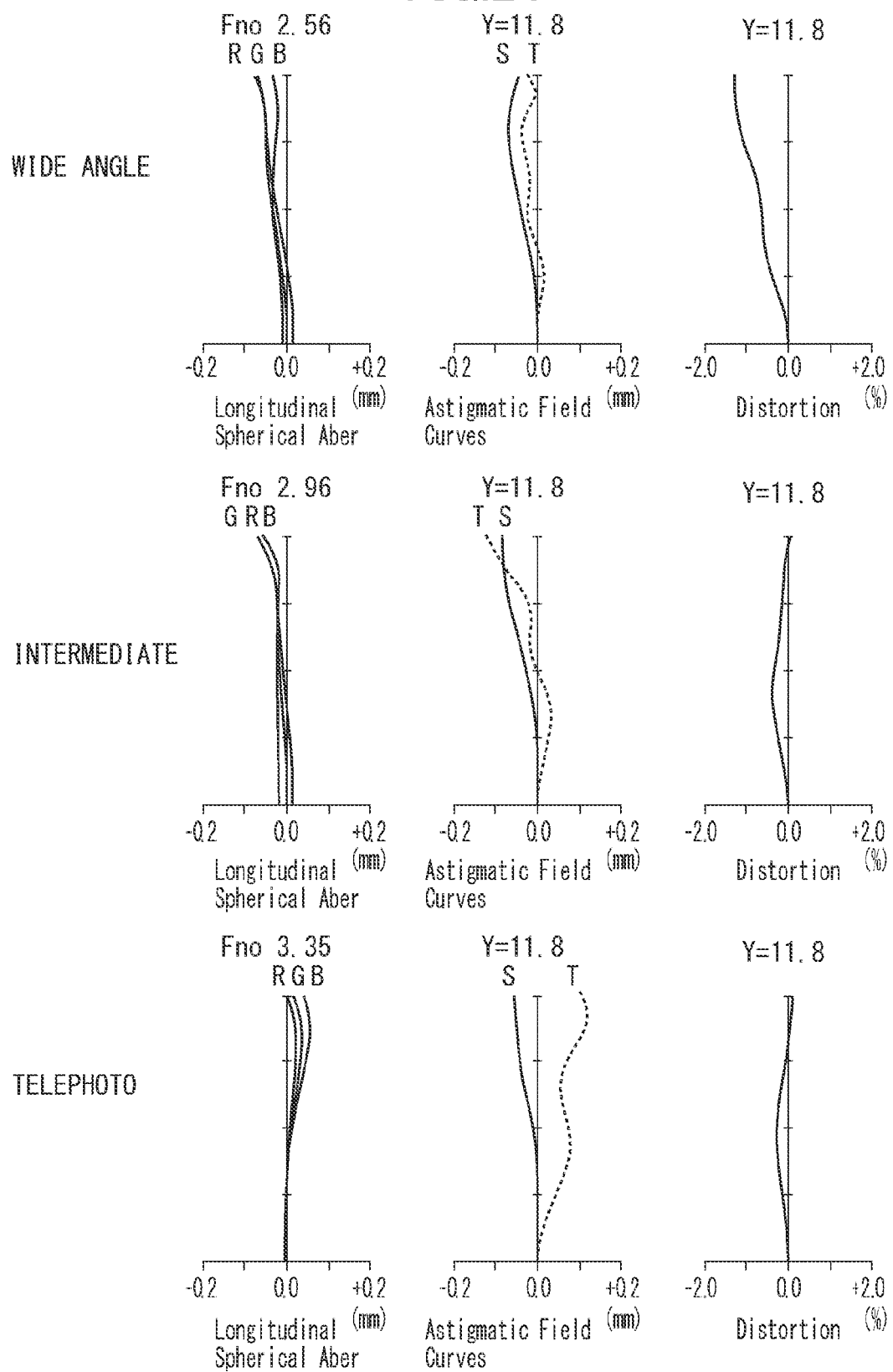
FIG. 24 is an aberration curve diagram of the projection zoom lens according to Example 12.

FIG. 24 shows aberration diagrams of Example 12 based on FIG. 2.

Example 13

Figure 25:
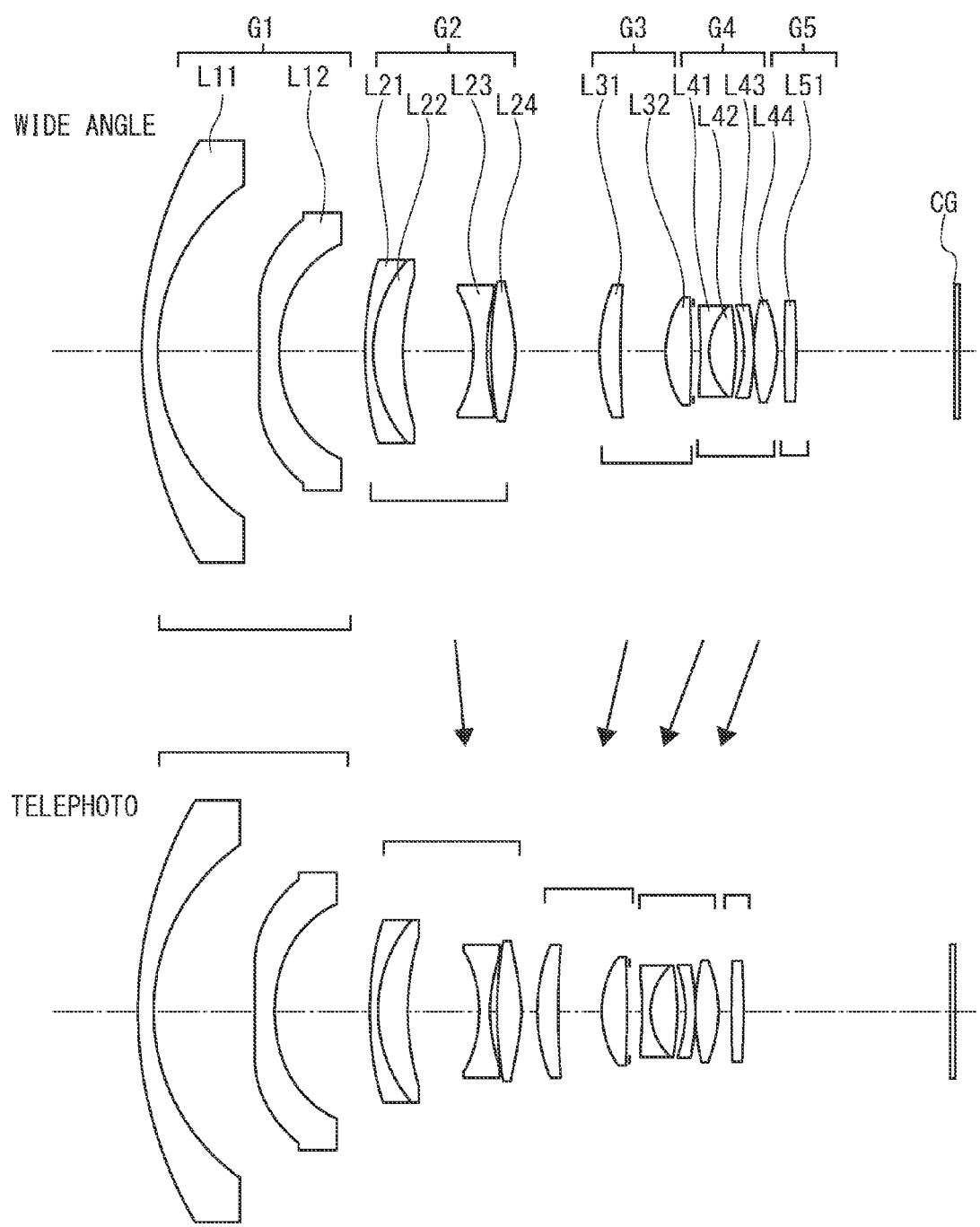
FIG. 25 is a cross-sectional view showing a configuration of a projection zoom lens according to Example 13.

FIG. 25 shows a projection zoom lens of Example 13.

As shown in FIG. 25, a first lens group G1 includes lenses L11 and L12, and a second lens group G2 includes lenses L21 to L24.

A third lens group G3 includes lenses L31 and L32, a fourth lens group G4 includes lenses L41 to L44, and a fifth lens group G5 includes one lens L51.

When the magnification is changed from the wide angle end to the telephoto end, the second lens group G2 is moved to the reduction side, and the third to fifth lens groups G3 to G5 are moved to the magnification side.

The first lens group G1 is a negative group, and includes a negative meniscus lens L11 convex toward the magnification side and a negative lens L12 concave toward the reduction side.

The second lens group G2 is a negative group, and includes a negative meniscus lens L21 convex toward the magnification side, a positive meniscus lens L22 convex toward the magnification side, a biconcave lens L23, and a biconvex lens L24.

The negative meniscus lens L21 and the positive meniscus lens L22 are cemented.

The third lens group G3 is a positive group, and includes a positive meniscus lens L31 convex toward the magnification side and a biconvex lens L32.

The fourth lens group G4 is a negative group, and includes a biconcave lens L41, a biconvex lens L42, a negative meniscus lens L43 concave toward the magnification side and a biconvex lens L44.

The biconcave lens L41 and the biconvex lens L42 are cemented.

The fifth lens group G5 is a positive group, and includes one biconvex lens L51.

In Example 13, the range of the focal length of the entire system: F, the F-number, and the half field angle at the wide angle end: ωw are as follows.

F=12.3 to 17.9 mm, Fno=2.56 to 3.34, and ωw=43.6°.

Table 49 shows data on Example 13.

TABLE 49

| SURFACE NUMBER | R | D | Nd | vd | Lens | Group |
|---|---|---|---|---|---|---|
| 1 | 80.916 | 3.00 | 1.60311 | 60.6 | L11 | 1G |
| 2 | 39.522 | 19.99 | | | | |
| 3* | −122.354 | 4.00 | 1.53159 | 55.7 | L12 | |
| 4* | 55.770 | S4 | | | | |
| 5 | 68.200 | 1.60 | 2.00270 | 19.3 | L21 | 2G |
| 6 | 26.523 | 6.00 | 1.75211 | 25.0 | L22 | |
| 7 | 50.030 | 13.91 | | | | |
| 8 | −24.932 | 2.28 | 1.74320 | 49.3 | L23 | |
| 9 | 41.030 | 1.12 | | | | |
| 10 | 78.250 | 4.91 | 1.84666 | 23.8 | L24 | |
| 11 | −43.194 | S11 | | | | |
| 12 | 30.562 | 4.16 | 1.74950 | 35.0 | L31 | 3G |
| 13 | 177.867 | 8.94 | | | | |
| 14 | 18.413 | 5.02 | 1.51823 | 58.9 | L32 | |
| 15 | −97.127 | 0.30 | | | | |
| 16 | INF | S16 | | | | |
| 17 | −74.710 | 1.60 | 1.80610 | 33.3 | L41 | 4G |
| 18 | 11.343 | 5.31 | 1.49700 | 81.6 | L42 | |
| 19 | −51.571 | 1.84 | | | | |
| 20 | −21.298 | 1.60 | 1.83481 | 42.7 | L43 | |
| 21 | −69.662 | 0.30 | | | | |
| 22 | 45.119 | 4.57 | 1.49700 | 81.5 | L44 | |
| 23 | −23.833 | S23 | | | | |
| 24* | 179.539 | 2.35 | 1.48749 | 70.2 | L51 | 5G |
| 25* | −151.430 | Bf | | | | |
| 26 | INF | 1 | 1.5168 | 64.2 | CG | — |
| 27 | INF | — | | | | |

In Example 13, the configuration of the first to fifth lens groups G1 to G5 is "negative, negative, positive, negative and positive".

The first to fifth lens groups G1 to G5 have focal lengths (mm) of −42.1, −43.4, 22.0, −63.3 and 168.4, respectively, and the fifth lens group G5 has the smallest power (1/focal length).

"Aspherical Surface Data"

Table 50 shows data on the aspherical surface.

TABLE 50

| | 3 | 4 | 24 | 25 |
|---|---|---|---|---|
| K | −3.5116E+00 | 3.0080E−00 | −2.9482E+02 | 2.4095E+01 |
| C4 | 6.8777E−05 | 6.8689E−05 | −1.1135E−05 | 5.9740E−06 |
| C6 | −1.6632E−07 | −8.7154E−08 | −4.1567E−08 | 1.7198E−09 |
| C8 | 2.2067E−10 | −2.8280E−10 | 4.8010E−10 | −2.0308E−10 |
| C10 | 1.2503E−14 | 9.8307E−13 | 8.4403E−12 | 1.0217E−11 |
| C12 | −3.9344E−16 | 1.0928E−15 | 0 | 0 |
| C14 | 4.4764E−19 | −6.3860E−18 | 0 | 0 |
| C16 | −1.5954E−22 | 5.9615E−21 | 0 | 0 |

Table 51 shows the lens group spacing: S4, S11, S16 and S23 for the wide angle end, intermediate, and the telephoto end when a projection distance is set to 1600 mm.

TABLE 51

| | S4 | S11 | S16 | S23 |
|---|---|---|---|---|
| WIDE ANGLE END | 17.05 | 16.68 | 1.62 | 0.80 |
| INTERMEDIATE | 19.19 | 8.87 | 2.01 | 1.92 |
| TELEPHOTO END | 18.80 | 3.25 | 2.49 | 2.52 |

"Parameter Values in Each Condition"

Table 52 shows parameter values in Conditions (1-I) to (12-I).

TABLE 52

| (1) | ωw | 43.6° |
|---|---|---|
| (2) | f1/f2 | 0.97 |
| (3) | D3/F3 | 0.53 |
| | D4/F4 | 0.17 |
| (4) | 1/|f1_3w| | 0.14 |
| (5) | |f1_3w/fw| | 0.6 |
| (6) | Nd2p · vd2p | 43.9 |
| | Nd2n · vd2n | 86.0 |
| (7) | Nd2p | 1.8467 |
| (8) | vd2p | 23.8 |
| (9) | Nd2n | 1.7432 |
| (10) | vd2n | 49.3 |
| (11) | |f2p/f2n| | 1.6 |
| (12) | |f2p2n| | 1.3E−02 |

"Parameter Values in Each Condition"

Table 152 shows parameter values in Conditions (MD to (6-ID).

TABLE 152

| (1) | Bf/Fw | 2.68 |
|---|---|---|
| (2) | |F1|/Fw | 3.42 |
| (3) | |Fw1 − 2|/D2G − 3G | 0.92 |
| (4) | F3o4/Fw | 0.56 |
| (5) | OAL/Bf | 4.91 |
| (6) | D5/Bf | 0.53 |

"Parameter Values in Each Condition"

Table 252 shows parameter values in Conditions (1-III) to (3-III).

TABLE 252

| (1) | ωw | 43.6° |
|---|---|---|
| (2) | |F4| | 63.3 |
| | |F5| | 168.4 |
| (3) | F4 − 5w/F4 − 5t | 1.0 |

Also, FIG. 44 shows a magnification chromatic aberration diagram of Example 13 based on FIG. 32.

"Parameter Values in Each Condition"

Table 352 shows parameter values in Conditions (1-IV) to (5-IV).

TABLE 352

| (1) | ωw | 43.6° |
|---|---|---|
| (2) | R1/R2 | 2.0 |
| (3) | f1/F1 | 3.1 |
| (4) | f1/Fw | 10.7 |

TABLE 352-continued

| | | |
|---|---|---|
| (5) | \|F1\| | 42.1 |
| | \|F2\| | 43.4 |

"Parameter Values in Each Condition"
Table 452 shows parameter values in Conditions (1-V).

TABLE 452

| | | |
|---|---|---|
| (1) | D3/D4 | 1.08 |

"Parameter Values in Each Condition"
Table 564 shows parameter values in Conditions (1-VI) to (4-VI).

TABLE 564

| | | |
|---|---|---|
| (1) | ωw | 43.6° |
| (2) | \|fw/F1\| | 0.29 |
| (3) | 1/\|fsph\| | 1.4E−02 |
| (4) | DISw | −1.3% |

Table 565 shows parameter values in Conditions (A-VI) to (C-VI).

TABLE 565

| | | |
|---|---|---|
| (A) | \|Rpf/Rpr\| | 2.19 |
| (B) | fp/F1 | 1.70 |
| (C) | R1f/R1r | 2.05 |

"Parameter Values in Each Condition"
Table 652 shows parameter values in Conditions (1-VII) to (8-VII).

TABLE 652

| | | |
|---|---|---|
| (1) | F2b/F2 | 2.47 |
| (2) | NdNp · vdNp | 43.9 |
| | NdNn · vdNn | 86.0 |
| (3) | NdNp | 1.8467 |
| (4) | vdNp | 23.8 |
| (5) | NdNn | 1.7432 |
| (6) | vdNn | 49.3 |
| (7) | \|fNp/fNn\| | 1.6 |
| (8) | \|fNpNn\| | 1.3E−02 |

Figure 26:
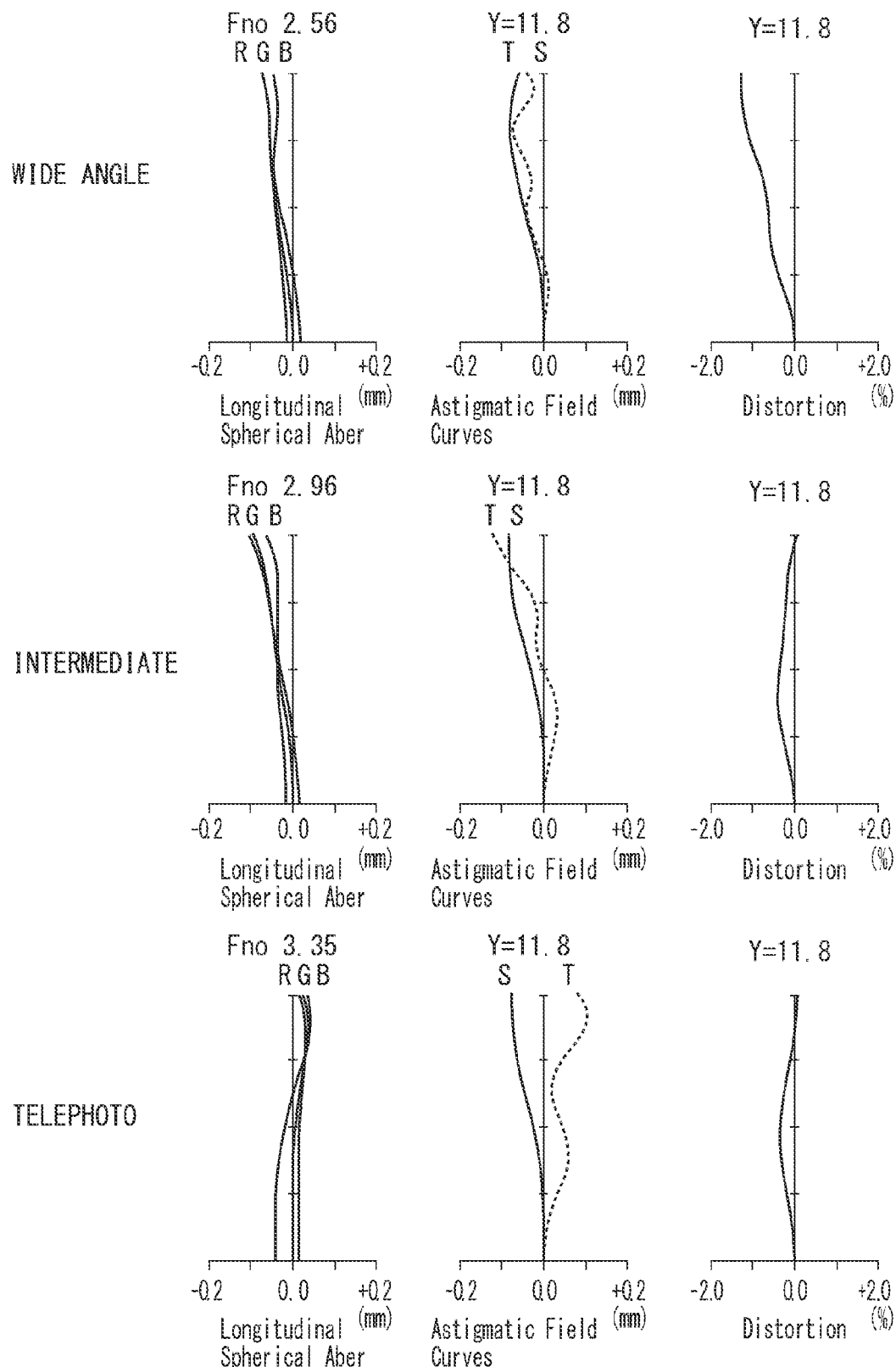
FIG. 26 is an aberration curve diagram of the projection zoom lens according to Example 13.

FIG. 26 shows aberration diagrams of Example 13 based on FIG. 2.

Example 14

FIG. 27 shows a projection zoom lens of Example 14.
As shown in FIG. 27, a first lens group G1 includes lenses L11 to L13, and a second lens group G2 includes lenses L21 to L24.
A third lens group G3 includes one lens L31, a fourth lens group G4 includes lenses L41 and L42, and a fifth lens group G5 includes lenses L51 to L54.
When the magnification is changed from the wide angle end to the telephoto end, the second lens group G2 is moved to the reduction side, and the third to fifth lens groups G3 to G5 are moved to the magnification side.
The first lens group G1 is a negative group, and includes a negative meniscus lens L11 convex toward the magnification side, a negative lens L12 concave toward the magnification side, and a negative meniscus lens L13 concave toward the reduction side.

The second lens group G2 is a negative group, and includes a biconvex lens L21, a biconcave lens L22, a positive meniscus lens L23 convex toward the reduction side, and a negative meniscus lens L24 concave toward the magnification side.
The positive meniscus lens L23 and the negative meniscus lens L24 are cemented.
The third lens group G3 is a positive group, and includes one biconvex lens L31.
The fourth lens group G4 is a positive group, and includes a positive meniscus lens L41 convex toward the magnification side and a planoconvex positive lens L42.
The fifth lens group G5 is a negative group, and includes a planoconcave negative lens L51, a biconvex lens L52, a negative meniscus lens L53 concave toward the magnification side and a biconvex lens L54.
The planoconcave negative lens L51 and the biconvex lens L52 are cemented.
In Example 14, the range of the focal length of the entire system: F, the F-number, and the half field angle at the wide angle end: ωw are as follows.
F=17.4 to 26 mm, Fno=2.55 to 3.33, and ωw=34.0°.
Table 53 shows data on Example 14.

TABLE 53

| SURFACE NUMBER | R | D | Nd | Vd | Lens | Group |
|---|---|---|---|---|---|---|
| 1 | 34.028 | 3.00 | 1.84666 | 23.78 | L11 | G1 |
| 2 | 24.653 | 6.07 | | | | |
| 3* | −39.725 | 4.00 | 1.53159 | 55.70 | L12 | |
| 4* | −63.070 | 9.46 | | | | |
| 5 | 1247.552 | 3.00 | 1.84666 | 23.78 | L13 | |
| 6 | 31.613 | S6 | | | | |
| 7 | 896.956 | 6.00 | 2.00270 | 19.32 | L21 | G2 |
| 8 | −51.018 | 1.74 | | | | |
| 9 | −59.900 | 1.60 | 1.51823 | 58.96 | L22 | |
| 10 | 42.794 | 4.15 | | | | |
| 11 | −45.349 | 2.24 | 1.84666 | 23.78 | L23 | |
| 12 | −40.891 | 1.60 | 1.78472 | 25.72 | L24 | |
| 13 | −133.908 | S13 | | | | |
| 14 | 185.536 | 3.62 | 1.78472 | 25.72 | L31 | G3 |
| 15 | −92.303 | S15 | | | | |
| 16 | 30.730 | 4.05 | 1.67790 | 55.34 | L41 | G4 |
| 17 | 196.964 | 11.49 | | | | |
| 18 | 20.102 | 4.68 | 1.49700 | 81.61 | L42 | |
| 19 | INF | 0.53 | | | | |
| 20 | INF | S20 | | | | |
| 21 | INF | 1.70 | 1.83400 | 37.35 | L51 | G5 |
| 22 | 11.904 | 5.15 | 1.4970 | 81.61 | L52 | |
| 23 | −66.242 | 2.15 | | | | |
| 24 | −19.210 | 1.97 | 1.76200 | 40.10 | L53 | |
| 25 | −40.059 | 0.51 | | | | |
| 26 | 79.940 | 4.04 | 1.48749 | 70.44 | L54 | |
| 27* | −24.319 | BF | | | | |
| 28 | INF | 1 | 1.51680 | 64.17 | CG | |
| 29 | INF | — | | | | |

In Example 14, the configuration of the first to fifth lens groups G1 to G5 is "negative, negative, positive, positive and negative".
"Aspherical Surface Data"
Table 54 shows data on the aspherical surface.

TABLE 54

| | S3 | S4 | S27 |
|---|---|---|---|
| K | 0 | 0 | 0 |
| C4 | 9.1976E−05 | 8.9736E−05 | 9.7865E−06 |
| C6 | −1.6912E−07 | −6.8290E−08 | −4.2607E−09 |
| C8 | 2.9520E−10 | −8.3196E−11 | −2.1040E−10 |

TABLE 54-continued

|  | S3 | S4 | S27 |
|---|---|---|---|
| C10 | −3.4793E−14 | 9.9024E−13 | −5.3707E−13 |
| C12 | −5.7651E−16 | 9.5367E−16 | 0 |
| C14 | 8.8935E−19 | −1.1617E−17 | 0 |
| C16 | 5.1680E−22 | 3.0904E−20 | 0 |

Table 55 shows the lens group spacing: S6, S13, S15 and S20 for the wide angle end, intermediate, and the telephoto end when a projection distance is set to 1600 mm.

TABLE 55

|  | S6 | S13 | S15 | S20 |
|---|---|---|---|---|
| WIDE ANGLE END | 4.46 | 9.06 | 14.14 | 1.20 |
| INTERMEDIATE | 10.37 | 2.81 | 7.10 | 1.88 |
| TELEPHOTO END | 11.42 | 0.80 | 0.80 | 2.60 |

"Parameter Values in Each Condition"

Table 56 shows parameter values in Conditions (1-I) to (12-I).

TABLE 56

| (1) | ωw | 34.0° |
|---|---|---|
| (2) | f1/f2 | 0.21 |
| (3) | D3/F3 | 0.02 |
|  | D4/F4 | 0.54 |
| (4) | 1/|f1__3w| | 0.03 |
| (5) | |f1__3w/fw| | 1.9 |
| (6) | Nd2p · vd2p | 38.7 |
|  | Nd2n · vd2n | 89.5 |
| (7) | Nd2p | 2.0027 |
| (8) | vd2p | 19.3 |
| (9) | Nd2n | 1.5182 |
| (10) | vd2n | 59.0 |
| (11) | |f2p/f2n| | 1.0 |
| (12) | |f2p2n| | 1.0E 03 |

"Parameter Values in Each Condition"

Table 156 shows parameter values in Conditions (1-II) to (6-II).

TABLE 156

| (1) | Bf/Fw | 1.90 |
|---|---|---|
| (2) | |F1|/Fw | 1.30 |
| (3) | |Fw1 − 2|/D2G − 3G | 1.29 |
| (4) | F3o4/Fw | 0.64 |
| (5) | OAL/Bf | 4.39 |
| (6) | D5/Bf | 0.53 |

"Parameter Values in Each Condition"

Table 256 shows parameter values in Conditions (1-III) to (3-III).

TABLE 256

| (1) | ωw | 34.0° |
|---|---|---|
| (2) | |F4| | 27.1 |
|  | |F5| | 120.7 |
| (3) | F4 − 5w/F4 − 5t | 1.0 |

Figure 45:
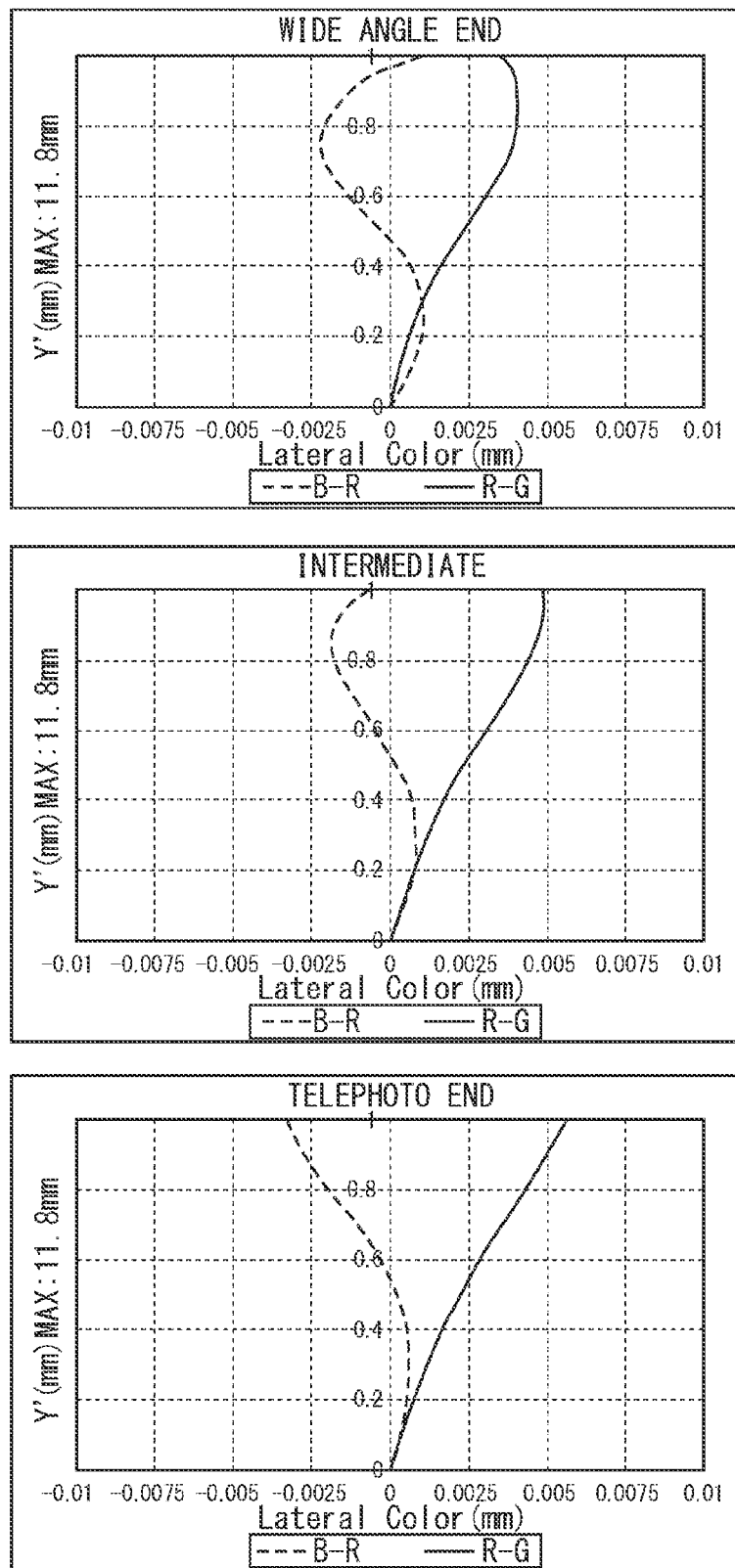
FIG. 45 is a magnification chromatic aberration diagram of the projection zoom lens according to Example 14.
Figure 46:
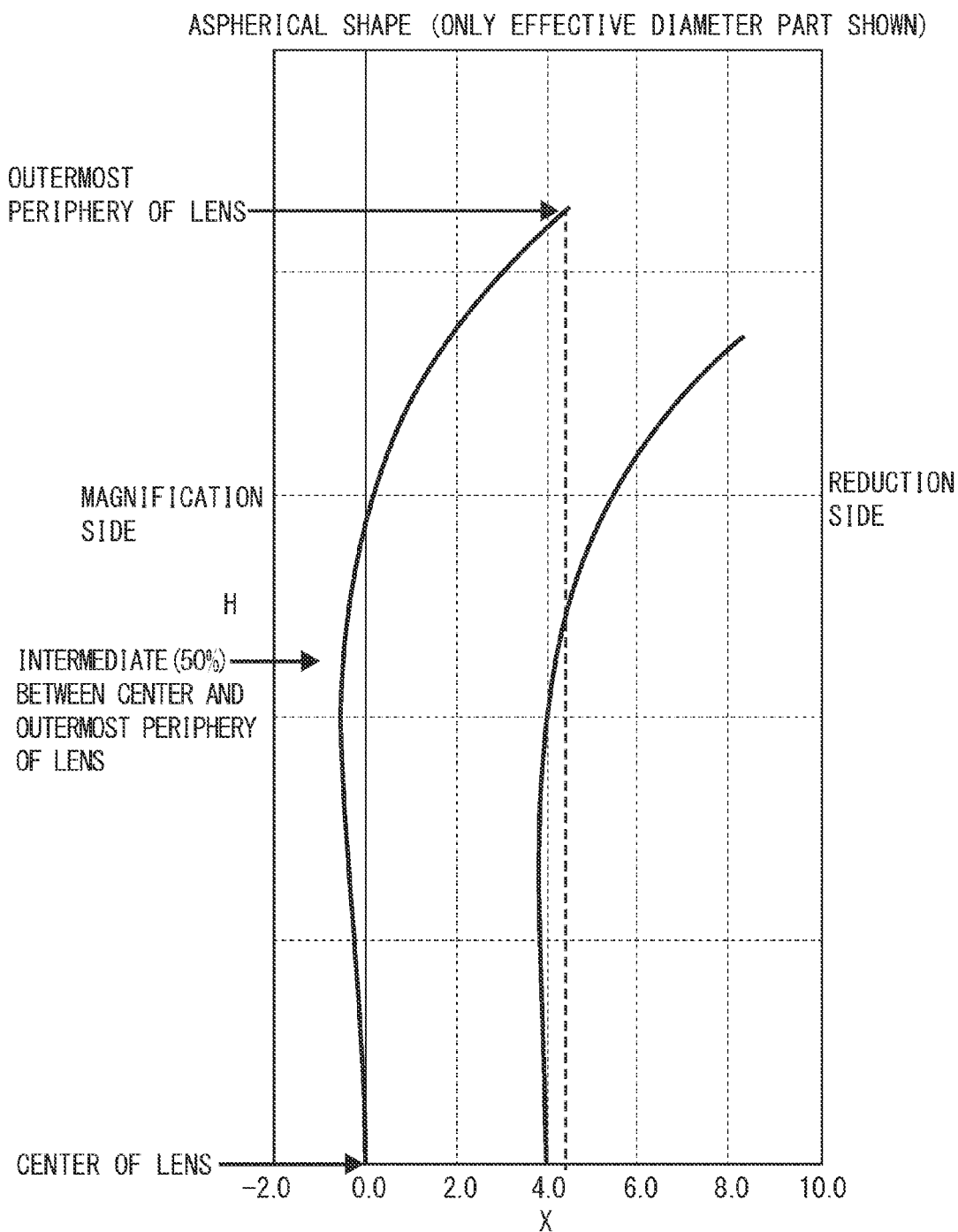
FIG. 46 is a diagram showing an aspherical shape of an aspherical lens in a first lens group according to Example 1.
Figure 47:
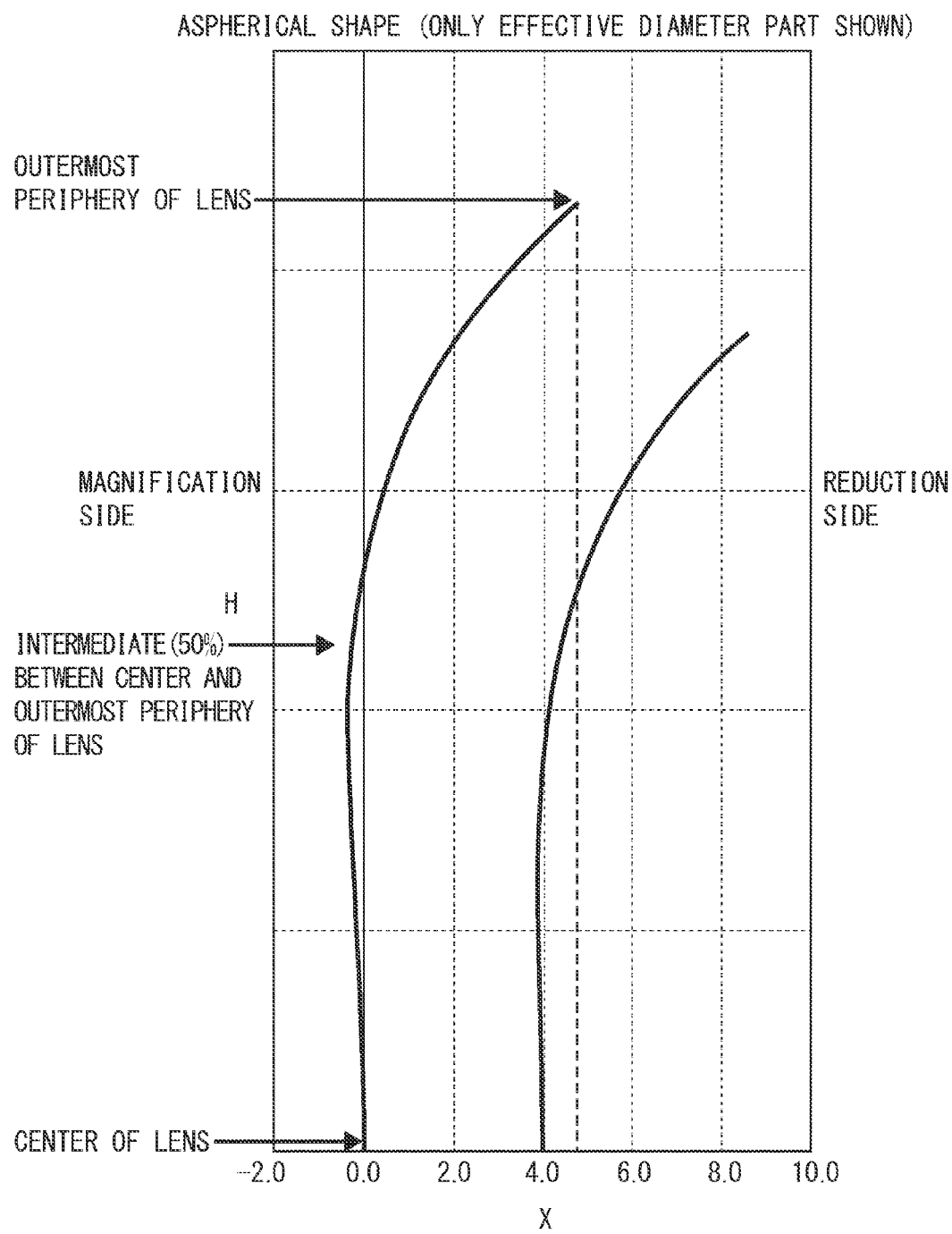
FIG. 47 is a diagram showing an aspherical shape of an aspherical lens in a first lens group according to Example 2.
Figure 48:
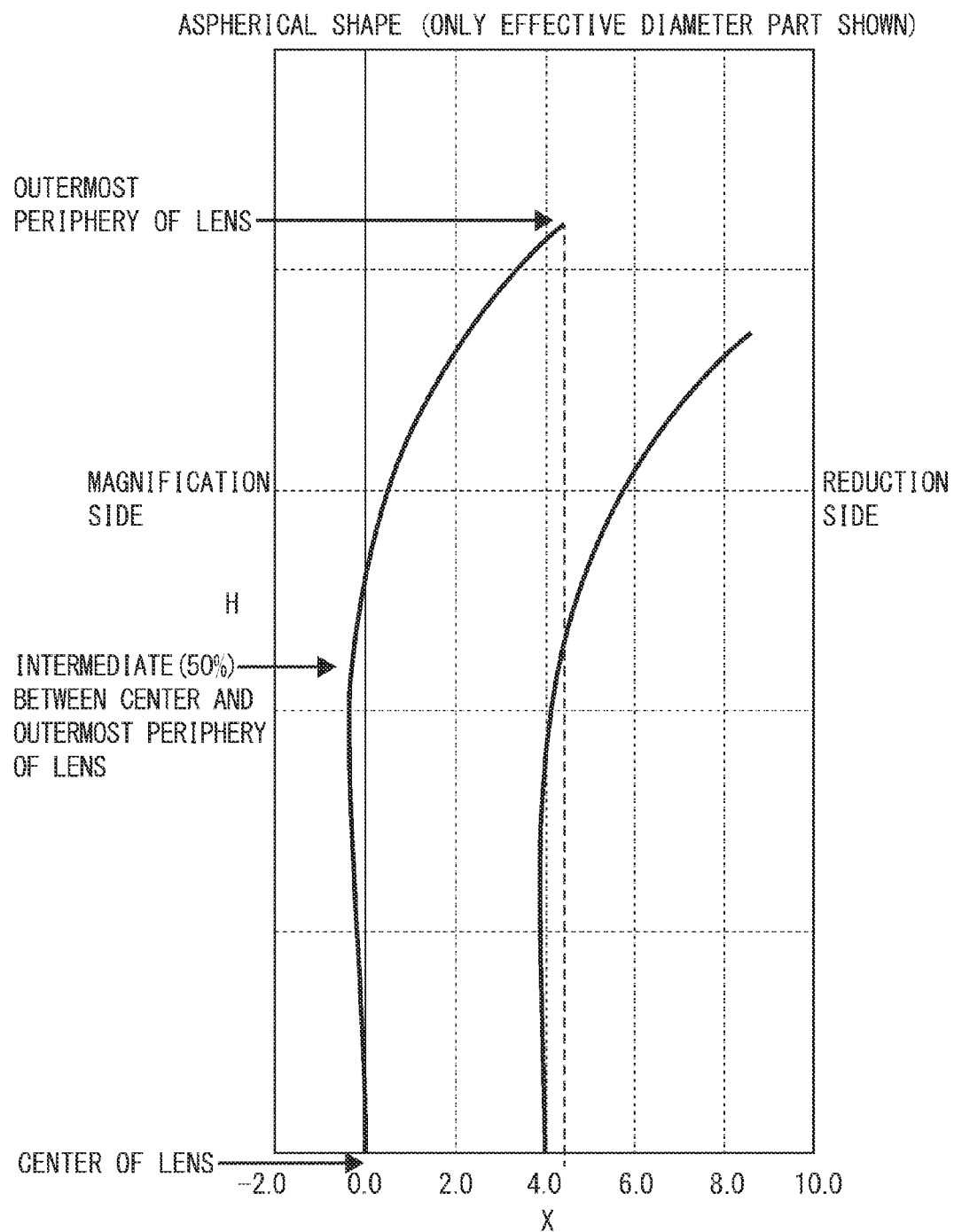
FIG. 48 is a diagram showing an aspherical shape of an aspherical lens in a first lens group according to Example 3.
Figure 49:
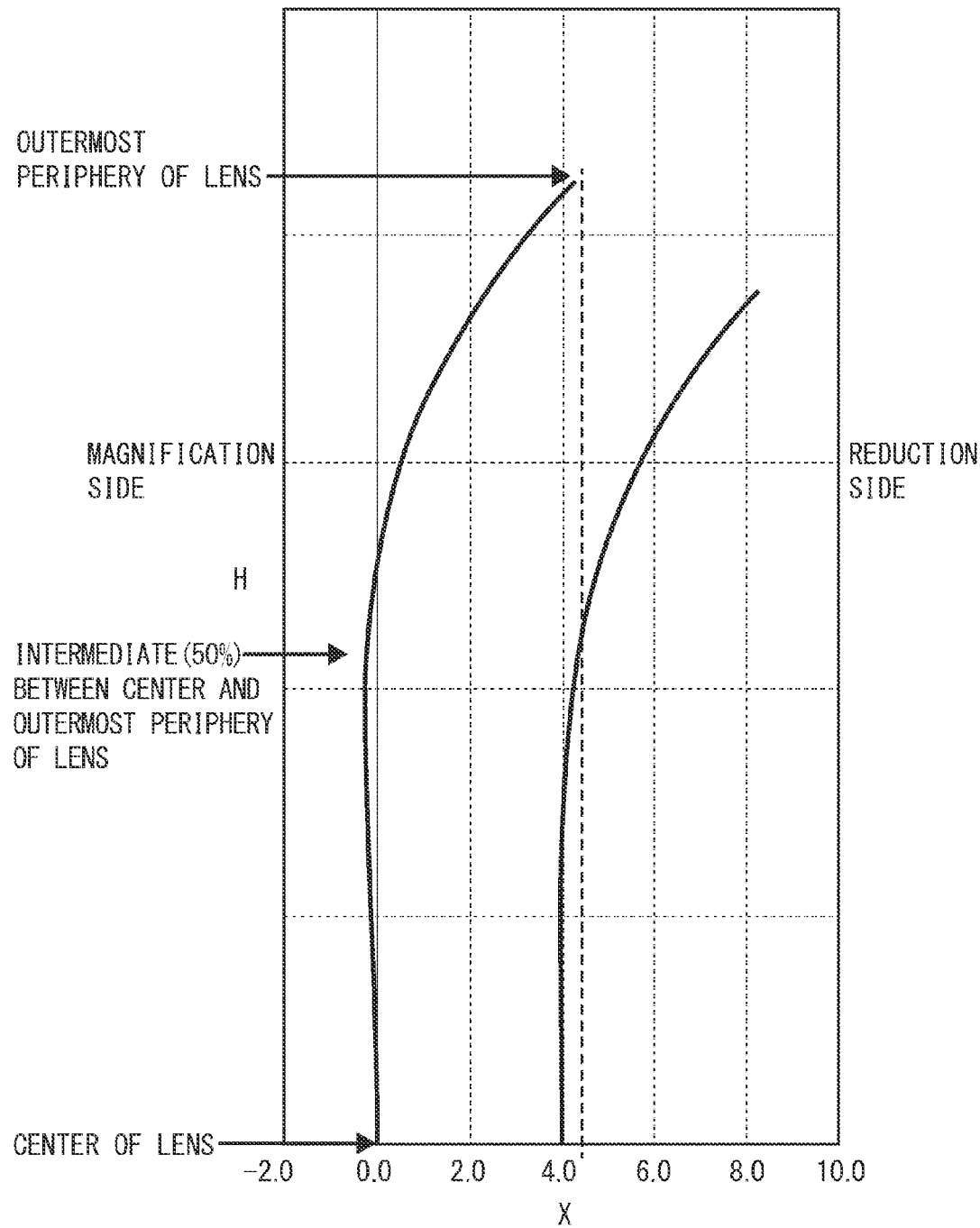
FIG. 49 is a diagram showing an aspherical shape of an aspherical lens in a first lens group according to Example 4.
Figure 50:
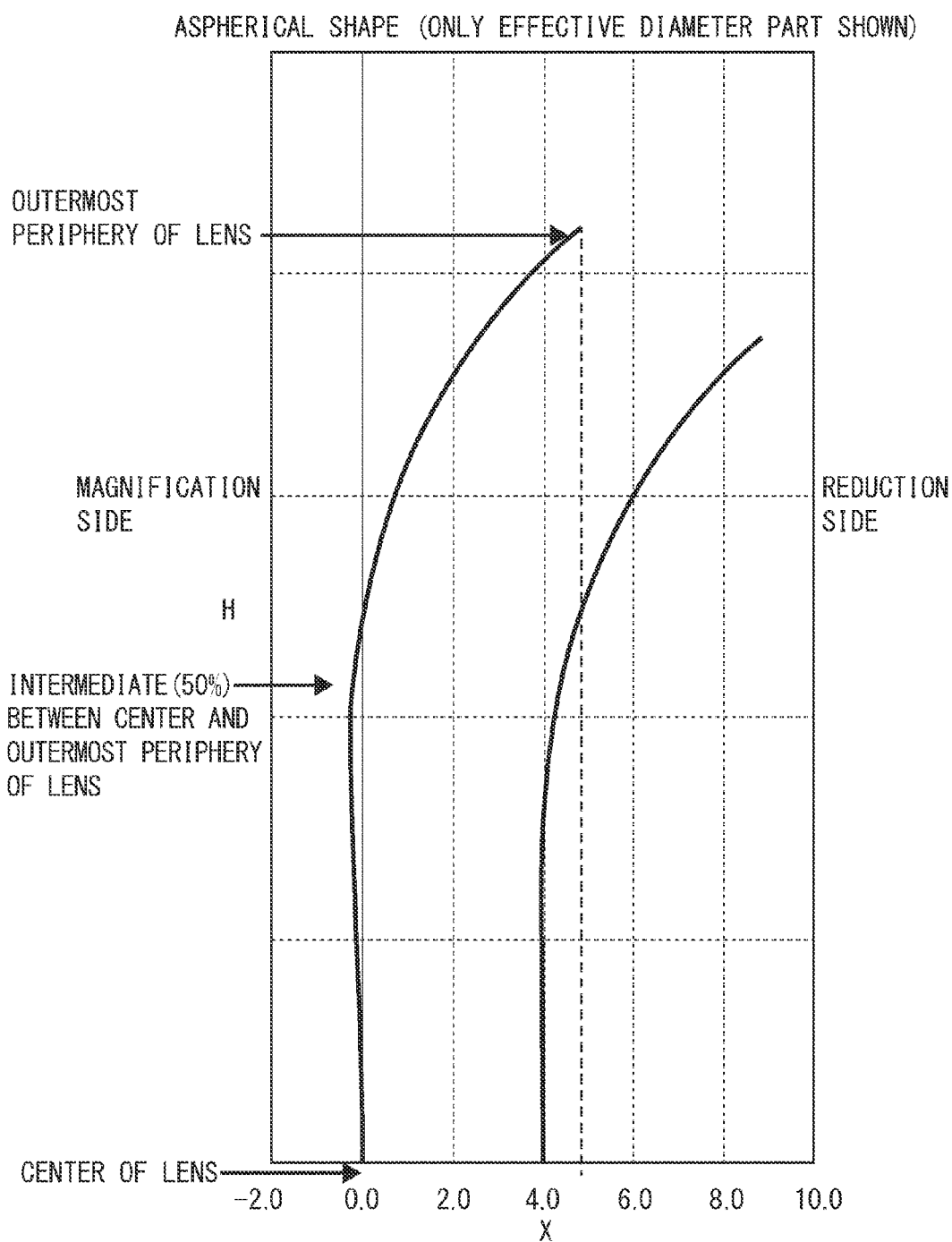
FIG. 50 is a diagram showing an aspherical shape of an aspherical lens in a first lens group according to Example 5.
Figure 51:
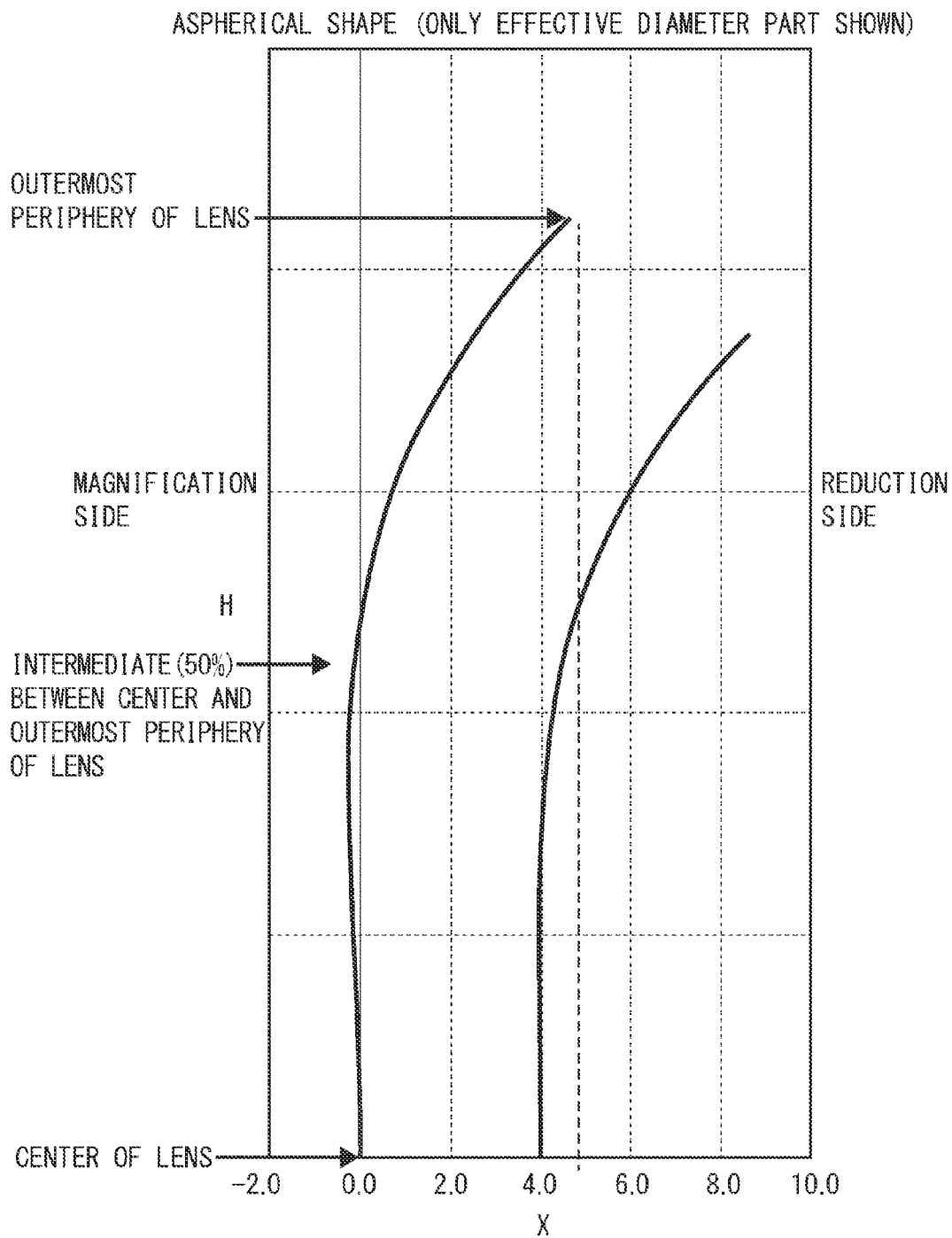
FIG. 51 is a diagram showing an aspherical shape of an aspherical lens in a first lens group according to Example 6.
Figure 52:
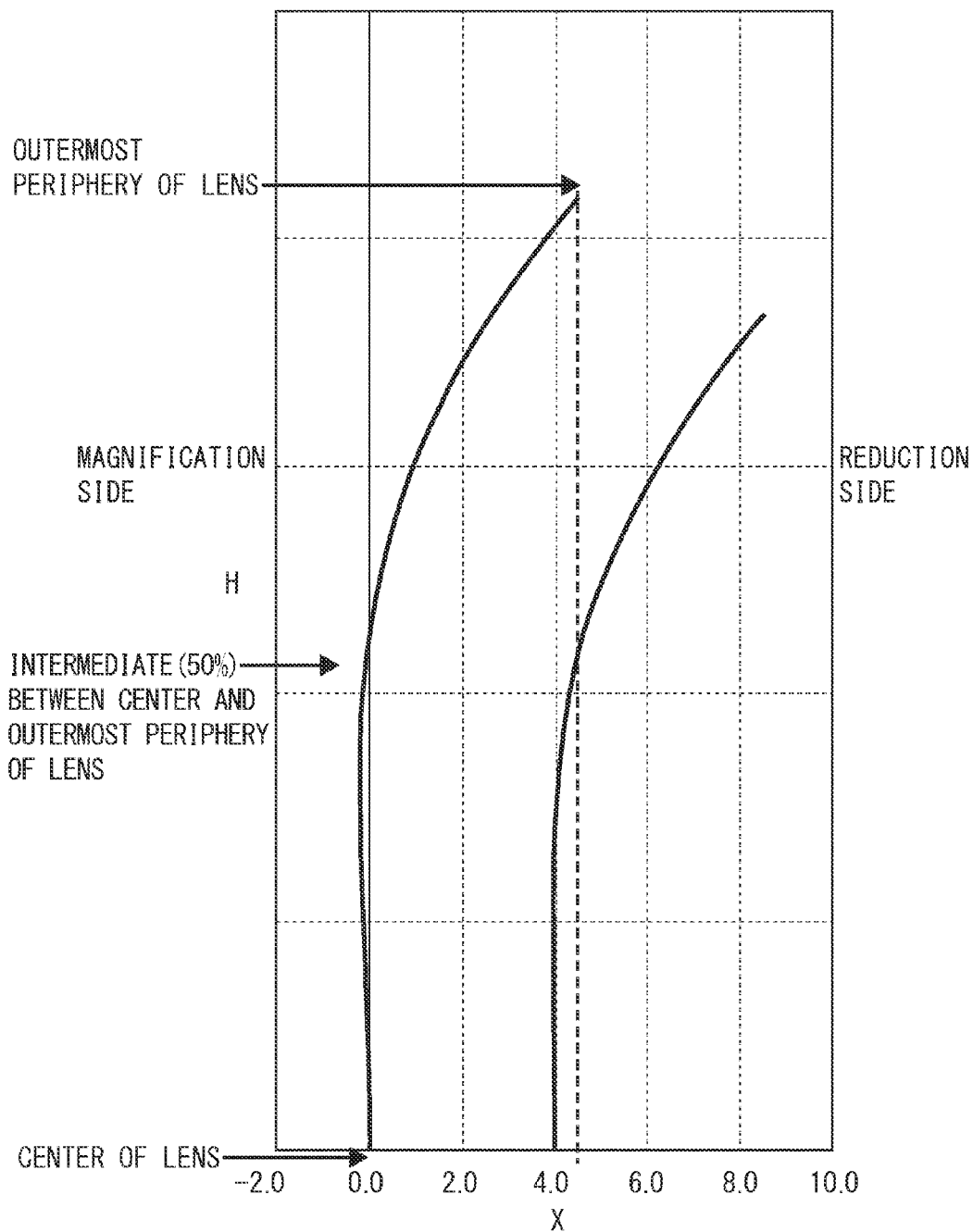
FIG. 52 is a diagram showing an aspherical shape of an aspherical lens in a first lens group according to Example 7.
Figure 53:
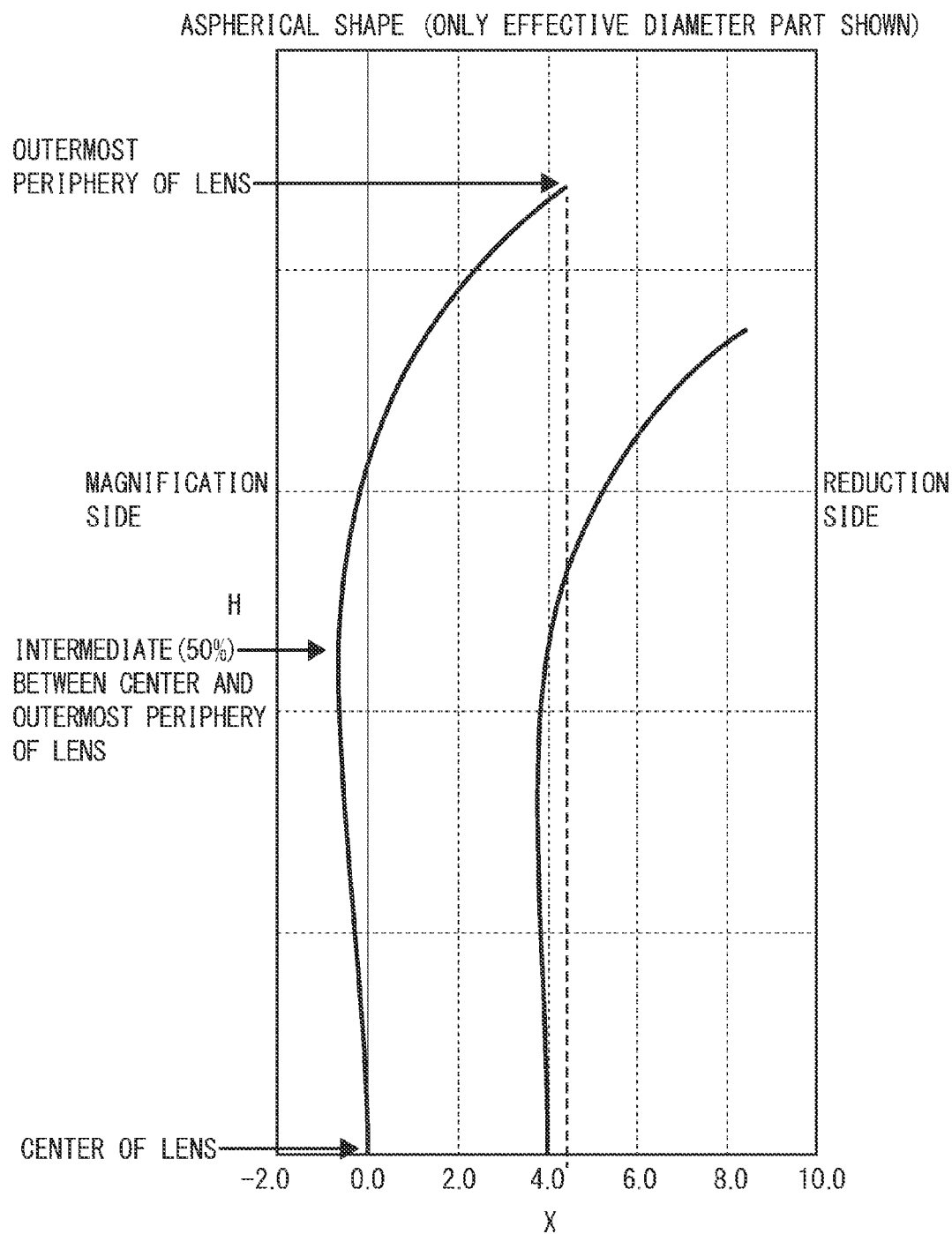
FIG. 53 is a diagram showing an aspherical shape of an aspherical lens in a first lens group according to Example 8.
Figure 54:
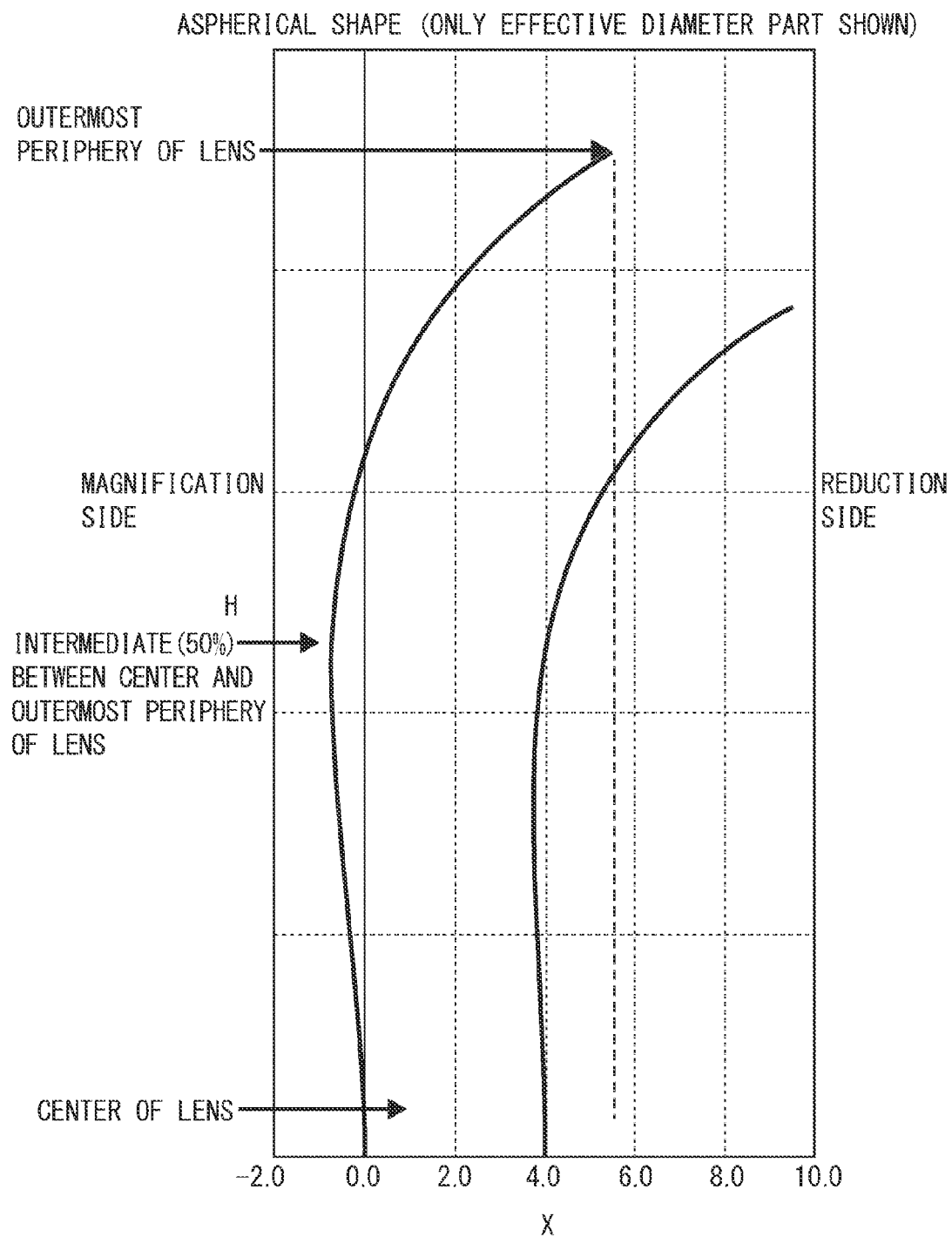
FIG. 54 is a diagram showing an aspherical shape of an aspherical lens in a first lens group according to Example 9.
Figure 55:
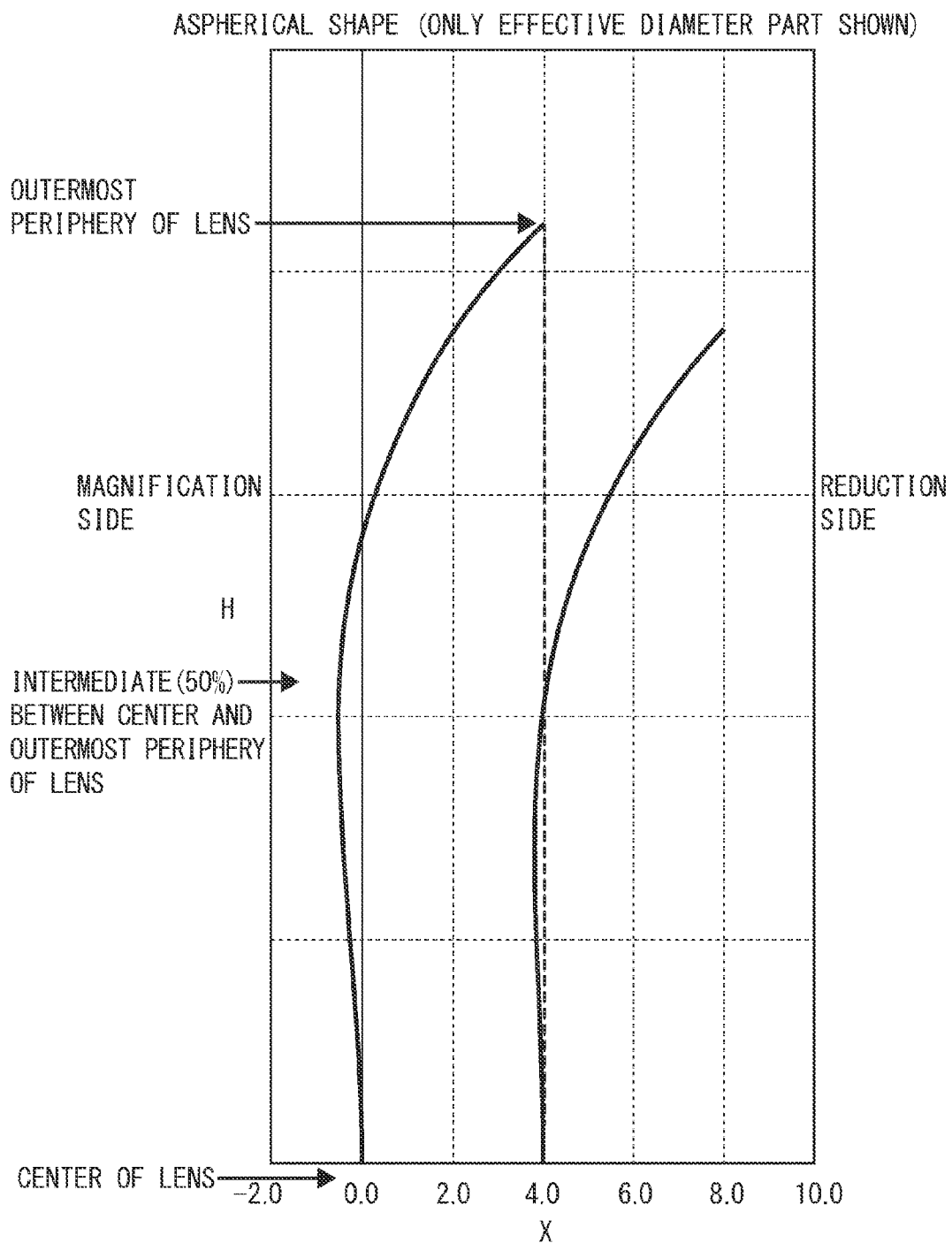
FIG. 55 is a diagram showing an aspherical shape of an aspherical lens in a first lens group according to Example 10.
Figure 56:
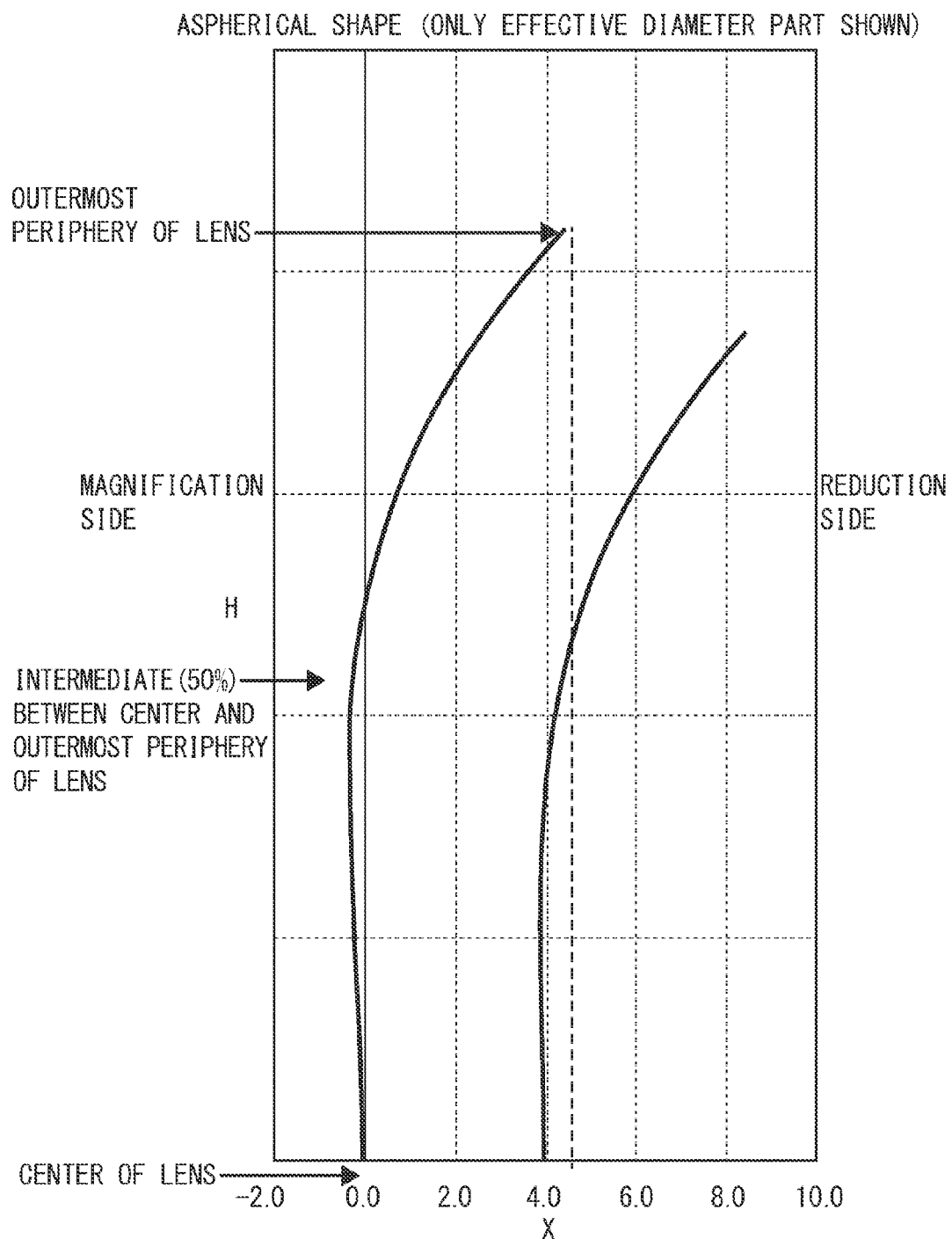
FIG. 56 is a diagram showing an aspherical shape of an aspherical lens in a first lens group according to Example 11.
Figure 57:
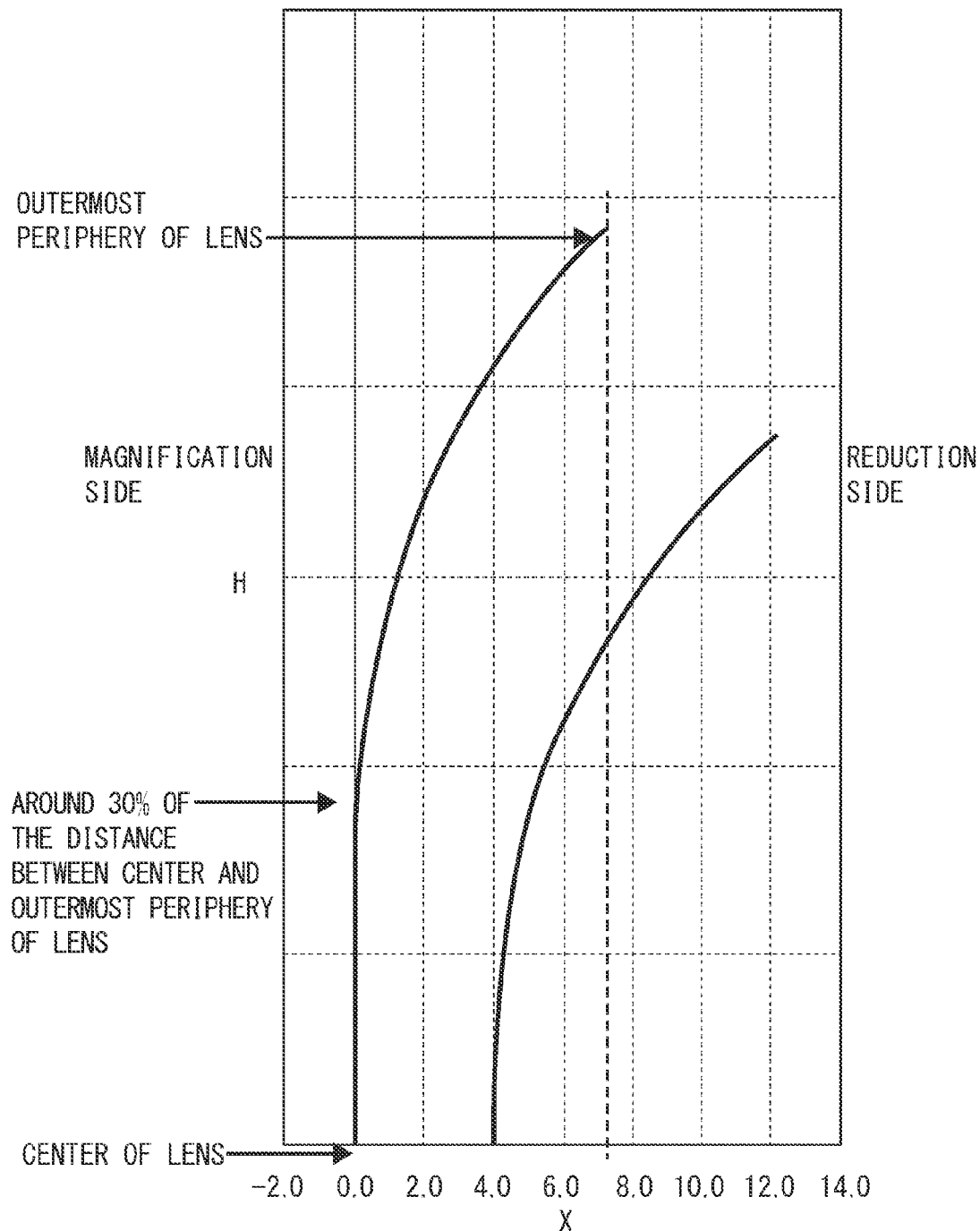
FIG. 57 is a diagram showing an aspherical shape of an aspherical lens in a first lens group according to Example 12.
Figure 58:
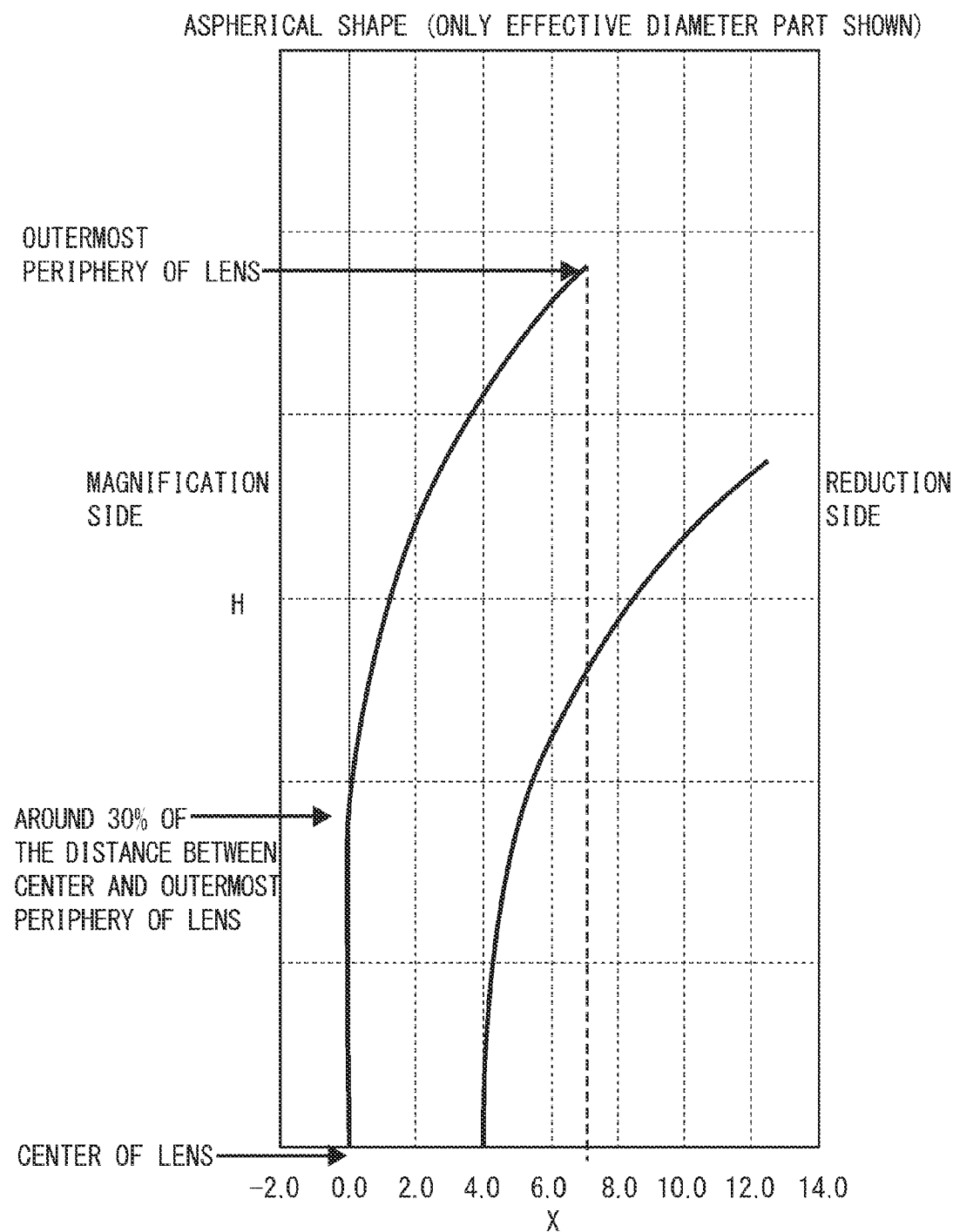
FIG. 58 is a diagram showing an aspherical shape of an aspherical lens in a first lens group according to Example 13.
Figure 59:
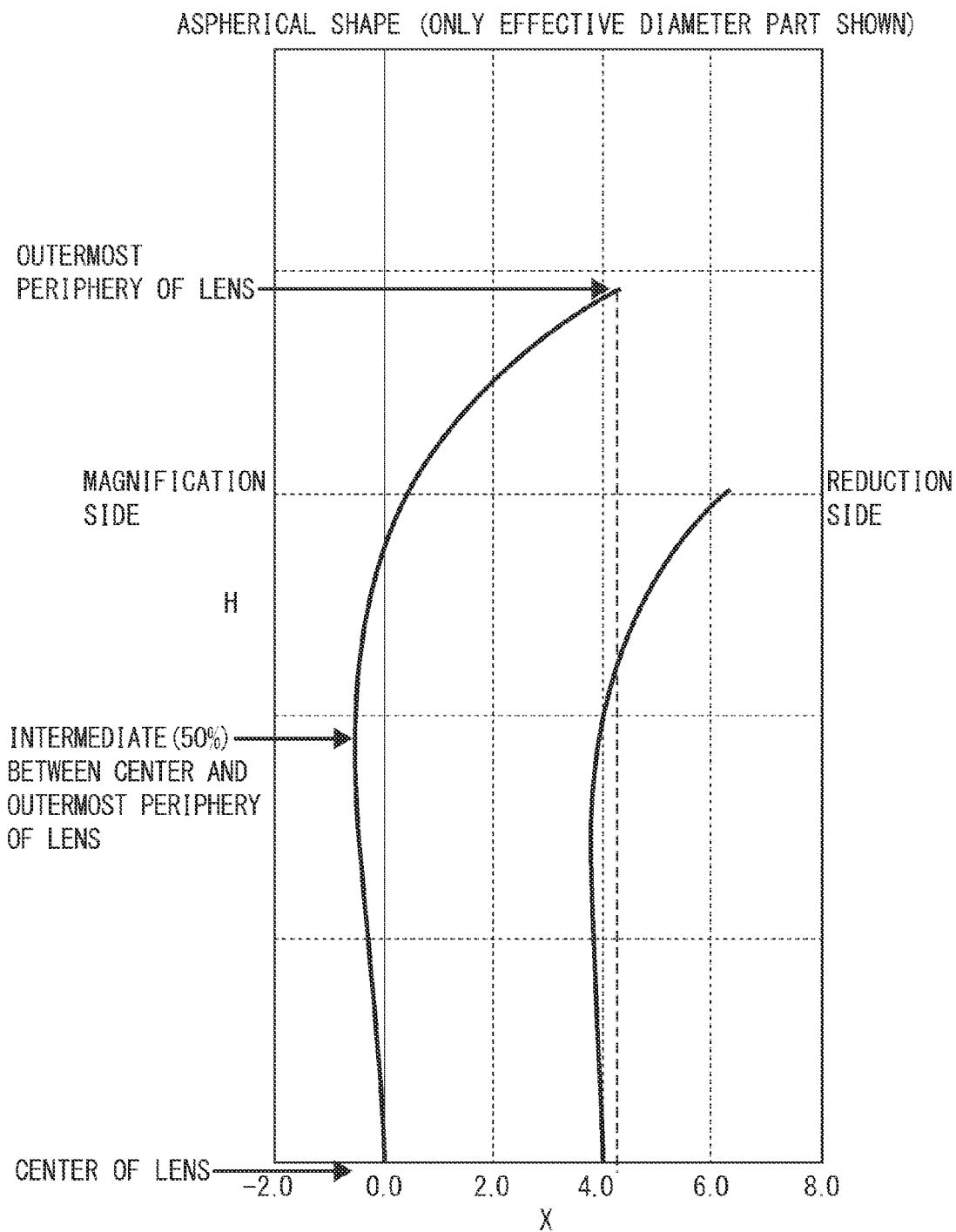
FIG. 59 is a diagram showing an aspherical shape of an aspherical lens in a first lens group according to Example 14.

Also, FIG. 45 shows a magnification chromatic aberration diagram of Example 14 based on FIG. 32.

"Parameter Values in Each Condition"

Table 356 shows parameter values in Conditions (1-IV) to (5-IV).

TABLE 356

| (1) | ωw | 34.0° |
|---|---|---|
| (2) | R1/R2 | 1.4 |
| (3) | f1/F1 | 5.5 |
| (4) | f1/Fw | 7.1 |
| (5) | |F1| | 22.5 |
|  | |F2| | 106.2 |

"Parameter Values in Each Condition"

Table 456 shows parameter values in Conditions (1-V).

TABLE 456

| (1) | D3/D4 | 0.09 |
|---|---|---|

"Parameter Values in Each Condition"

Table 569 shows parameter values in Conditions (1-VI) to (4-VI).

TABLE 569

| (1) | ωw | 34.0° |
|---|---|---|
| (2) | |fw/F1| | 0.77 |
| (3) | 1/|fsph| | 4.7E−03 |
| (4) | DISw | −1.3% |

Table 570 shows parameter values in Conditions (A-VI) to (C-VI).

TABLE 570

| (A) | |Rpf/Rpr| | 0.63 |
|---|---|---|
| (B) | fp/F1 | 9.53 |
| (C) | R1f/R1r | 1.38 |

"Parameter Values in Each Condition"

Table 656 shows parameter values in Conditions (1-VII) to (8-VII).

TABLE 656

| (1) | F2b/F2 | 0.85 |
|---|---|---|
| (2) | NdNp · vdNp | 38.7 |
|  | NdNn · vdNn | 89.5 |
| (3) | NdNp | 2.0027 |
| (4) | vdNp | 19.3 |
| (5) | NdNn | 1.5182 |
| (6) | vdNn | 59.0 |
| (7) | |fNp/fNn| | 1.0 |
| (8) | |fNpNn| | 1.0E−03 |

Figure 28:
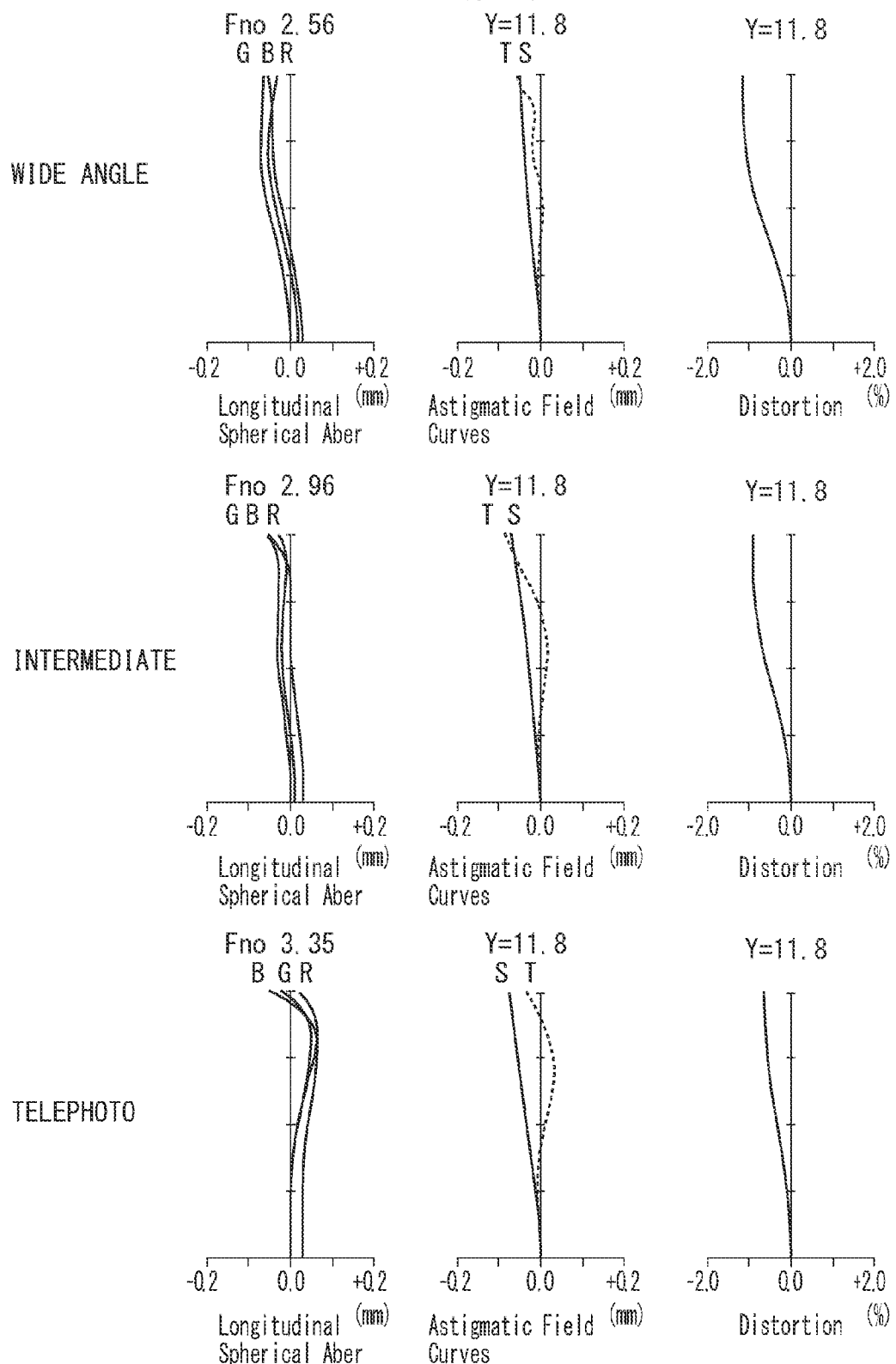
FIG. 28 is an aberration curve diagram of the projection zoom lens according to Example 14.

FIG. 28 shows aberration diagrams of Example 14 based on FIG. 2.

As shown in the aberration diagrams, in the projection zoom lens of each of the examples, the aberrations are corrected at a high level, and the spherical aberration, astigmatism, field curvature, magnification chromatic aberration and distortion are also sufficiently corrected.

As described in Examples 1 to 14, the first lens group G1 includes two or three lenses.

For the first lens group, lenses each having a large lens diameter are used. However, such a configuration of the first lens group including two or three lenses as described in the examples enables reduction in weight of the first lens group.

Such a reduction in weight can suppress the eccentricity of the lens caused by its own weight.

Also, in Examples 1 to 14, the first lens group G1 has "an effect of correcting the astigmatism and distortion".

Moreover, in Examples 1 to 14, the first lens group G1 is configured such that "the surface farthest to the magnification side is convex toward the magnification side, and the surface farthest to the reduction side is concave".

Such a configuration can achieve an effect of "reducing a variation in field curvature and distortion" during magnification change.

In all of the projection zoom lenses of Examples 1 to 14, the first lens group G1 is fixed during the magnification change from the wide angle end to the telephoto end.

Also, the second lens group G2 is moved toward the reduction side, and the third lens group G3 is moved toward the magnification side.

In the projection zoom lens of Examples 12 and 13, the fourth lens group has the "negative refractive power". In Examples 12 and 13, Conditions (1A-I) to (12A-I) described above are satisfied.

In all of the examples except Examples 12 and 13, the fourth lens group has the "positive refractive power", and Conditions (1B-I) to (12B-I) described above are satisfied.

In the projection zoom lens of each of the examples, the first lens group G1 is a focus group, the second lens group G2 is a compensator (aberration correction group), and the third lens group is a variable magnification group.

In the projection zoom lens of the invention, the half field angle of the wide angle end is a "wide field angle", which is greater than 34 degrees. The second lens group G2 is moved toward the reduction side in magnification change to the telephoto end.

Such a configuration can reduce a variation in aberrations during the magnification change.

The first lens group has negative refractive power, the second lens group has negative refractive power, and the third lens group has positive refractive power.

Conditions (1-II) to (6-II) described above are satisfied.

In Examples 12 and 13, the fourth lens group is a "negative group", and the parameters in Conditions (1-II) to (6-II) satisfy Conditions (1A-II) to (6A-II) described above.

In all the other examples except Examples 12 and 13, the fourth lens group is a "positive group", and the parameters in Conditions (1-II) to (6-II) satisfy Conditions (1B-II) to (6B-II) described above.

Moreover, both of a large back focus Bf and a short focal length Fw are ensured. Furthermore, compactness is achieved with good aberration correction during magnification change.

As shown in the magnification chromatic aberration diagrams, the magnification chromatic aberration is corrected at a high level also during magnification change in the projection zoom lens of each of the examples.

As described in Examples 1 to 14, the first lens group G1 includes two or three lenses.

For the first lens group, lenses each having a large lens diameter are used. However, such a configuration of the first lens group including two or three lenses as described in the examples enables reduction in weight of the first lens group.

Such a reduction in weight can suppress the eccentricity of the lens caused by its own weight.

Also, in Examples 1 to 14, the first lens group G1 has "an effect of correcting the astigmatism and distortion".

Moreover, in Examples 1 to 14, the first lens group G1 is configured such that "the surface farthest to the magnification side is convex toward the magnification side, and the surface farthest to the reduction side is concave".

Such a configuration can achieve an effect of "reducing a variation in field curvature and distortion" during magnification change.

In all of the projection zoom lenses of Examples 1 to 14, the first lens group G1 is fixed and the fifth lens group G5 is moved toward the magnification side during the magnification change from the wide angle end to the telephoto end.

The second lens group is slowly moved toward the reduction side, and the third and fourth lens groups are individually moved toward the magnification side.

In the projection zoom lens of the present invention, the half field angle of the wide angle end is a "wide field angle", which is greater than 34 degrees. In magnification change to the telephoto end, the second lens group G2 is slowly moved toward the reduction side.

Thus, a variation in aberrations during magnification change can be reduced.

In all of the projection zoom lenses of Examples 1 to 14, the half field angle of the wide angle end is a "wide field angle", which is greater than 34 degrees. In magnification change from the wide angle end to the telephoto end, the first lens group G1 is fixed.

The second lens group G2 is moved toward the reduction side, and the third to fifth lens groups G3 to G5 are moved toward the magnification side.

Thus, a variation in aberrations during magnification change can be reduced.

All of the projection zoom lenses of Examples 1 to 14 satisfy Conditions (1-III) to (3-III).

In the projection zoom lenses of Examples 12 to 13, the fourth lens group is the "negative group" and has the "negative refractive power", and the parameters in Conditions (1-III) to (3-III) satisfy Conditions (1A-III) to (3A-III).

Also, in all of the examples except Examples 12 and 13, the fourth lens group has the "positive refractive power", and the parameters in Conditions (1-III) to (3-III) satisfy Conditions (1B-III) to (3B-III).

As described in Examples 1 to 14, the first lens group G1 includes two or three lenses.

For the first lens group, lenses each having a large lens diameter are used. However, such a configuration of the first lens group including two or three lenses enables reduction in weight of the first lens group.

This reduction in weight can suppress the lens eccentricity caused by its own weight.

The focal length of the first lens group: F1 and the focal length of the second lens group: F2 are controlled by Condition (5-III). However, it is preferable that a ratio of F1 to F2: F1/F2 is within the range of (a-III) below.

$$0.1 < F1/F2 < 1.0 \quad \text{(a-III)}$$

The range of (a-III) is effective in correcting the astigmatism and field curvature.

Also, it is preferable that the composite focal length of the first to third lens groups: f1_3w is within the range of (b-III) below.

$$0 < 1/|f1\_3w| < 0.14 \quad \text{(b-III)}$$

Also, it is preferable that a ratio of the composite focal length: f1_3w to the focal length of the entire system at the wide angle end: fw is within the range of (c-III) below.

$$0.5 < |f1\_3w/fw| < 8.0 \quad \text{(c-III)}$$

When $1/|f1\_3w|$ is within the range of (b-III), good aberration correction is performed by the second lens group G2 during magnification change. This is effective in avoiding remaining aberrations such as coma aberration.

Setting |f1_3w/fw| within the range of (c-III) is effective in suppressing the coma aberration and magnification chromatic aberration.

In the projection zoom lenses of Examples 1 to 14, the first lens group G1 has "an effect of correcting the astigmatism and distortion".

In the first lens group G1, "the lens surface farthest to the magnification side is convex toward the magnification side, and the lens surface farthest to the reduction side is concave toward the reduction side".

It is preferable that the "curvature radius of the lens surface farthest to the magnification side: R1f and the curvature radius of the lens surface farthest to the reduction side: R1r" in the first lens group is within the range of (A-III).

$$1.3 < R1f/R1r < 2.1 \quad \text{(A-III)}$$

Within the range of (A-III), refraction amounts of the two surfaces can be kept in balance. This is effective in "suppressing the occurrence of color difference in coma aberration".

Moreover, it is preferable that a ratio fw/F1 of the focal length of the entire system at the wide angle end: fw to the focal length of the first lens group: F1 is within the range of (B-III) below.

$$0.2 < |fw/F1| < 0.8 \quad \text{(B-III)}$$

Setting fw/F1 within the range of (B-III) makes it easier to keep the negative power of the first lens group and a power distribution of the entire projection zoom lens in good balance. This enables a good balance of aberrations.

Furthermore, it is preferable that a value of optical distortion "DISw" in an effective image circle at the wide angle end with the projection distance: 1600 mm is within the range of (C-III) below.

$$-1.35\% < DISw < 0.0\% \quad \text{(C-III)}$$

"TV distortion" is suitable as the optical distortion within the above range.

In this case, (C-III) is easily satisfied by disposing an "aspherical lens" in the first lens group and setting a focal length thereof: fsph within the range of (D-III) below.

$$1.0 \times 10^{-3} < 1/|fsph| < 2.0 \times 10^{-2} \quad \text{(D-III)}$$

Note that the "projection distance" means a distance between the target projection surface and the lens surface farthest to the magnification side of the projection zoom lens.

Moreover, in the projection zoom lens of each of the examples, the first lens group G1 is a focus group, the second lens group G2 is a compensator (aberration correction group), and the third lens group is a variable magnification group.

Also, it is preferable that the material of the lenses included in the second lens group satisfies one or more of the following (d-III) to (i-III).

$$Nd2p \cdot vd2p < Nd2n \cdot vd2n \quad \text{(d-III)}$$

$$1.70 < Nd2p < 2.10 \quad \text{(e-III)}$$

$$18.0 < vd2p < 30.0 \quad \text{(f-III)}$$

$$1.45 < Nd2n < 1.75 \quad \text{(g-III)}$$

$$48.0 < vd2n < 90.0 \quad \text{(h-III)}$$

$$1.0 < |f2p/f2n| < 2.0 \quad \text{(i-III)}$$

In Conditions (d-III) to (i-III) described above, the meanings of respective parameter symbols are as follows.

"Nd2p" represents a refractive index of d-line of a "positive lens with the lowest Abbe number of d-line" among the positive lenses arranged in the second lens group. "vd2p" represents the Abbe number of d-line of the positive lens.

"Nd2n" represents a refractive index of d-line of a "negative lens with the highest Abbe number of d-line" among the negative lenses arranged in the second lens group. "vd2n" represents the Abbe number of d-line of the negative lens.

"f2p" represents a focal length of a "positive lens with the lowest Abbe number of d-line" among the positive lenses arranged in the second lens group.

"f2n" represents a focal length of a "negative lens with the highest Abbe number of d-line" among the negative lenses arranged in the second lens group.

"f2p2n" represents a composite focal length of the "positive lens with the lowest Abbe number of d-line" and the "negative lens with the highest Abbe number of d-line" among the lenses arranged in the second lens group.

The ranges of (d-III) to (h-III) are effective in suppressing the magnification chromatic aberration. Within the range of (d-III), the coma aberration and astigmatism are in good balance.

The range of (i-III) is effective in suppressing a variation in field curvature during magnification change.

Moreover, satisfaction of the following Condition (j-III) is effective in increasing projection magnification.

$$0.3 < D3/F3 \text{ or } D4/F4 < 0.6 \quad \text{(j-III)}$$

"F3" represents a focal length of the third lens group. "F4" represents a focal length of the fourth lens group. "D3" represents a travel distance of the third lens group when the magnification is changed from the wide angle side to the telephoto side.

"D4" represents a travel distance of the fourth lens group when the magnification is changed from the wide angle side to the telephoto side.

When the upper limit of Condition (j-III) is exceeded, astigmatism on the telephoto side is likely to be increased. When the lower limit of Condition (j-III) is exceeded, it becomes difficult to achieve the zoom ratio: 1.5 times.

By satisfying Condition (j-III), an optimum solution for astigmatism correction is achieved even if the zoom ratio is 1.5 times or more, and an increase in field curvature can also be effectively suppressed.

In Examples 1 to 11 and 14 among Examples 1 to 14, the fourth lens group has positive refractive power. In Examples 12 and 13, the fourth lens group has negative refractive power.

The first lens group G1 includes three lenses in Examples 1 to 11 and 14, and includes two lenses in Examples 12 and 13.

In all of Examples 1 to 14, an aspherical lens is used as the "second lens from the magnification side" within the first lens group, and the lens has aspherical surfaces on its both sides.

As described above, one of the features of the projection zoom lens of the present invention is that "the fifth lens group is moved toward the magnification side" during magnification change from the wide angle end to the telephoto end.

Here, for comparison, a projection zoom lens having the "fifth lens group fixed during magnification change from the wide angle end to the telephoto end" will be described as a comparative example.

Figure 30:
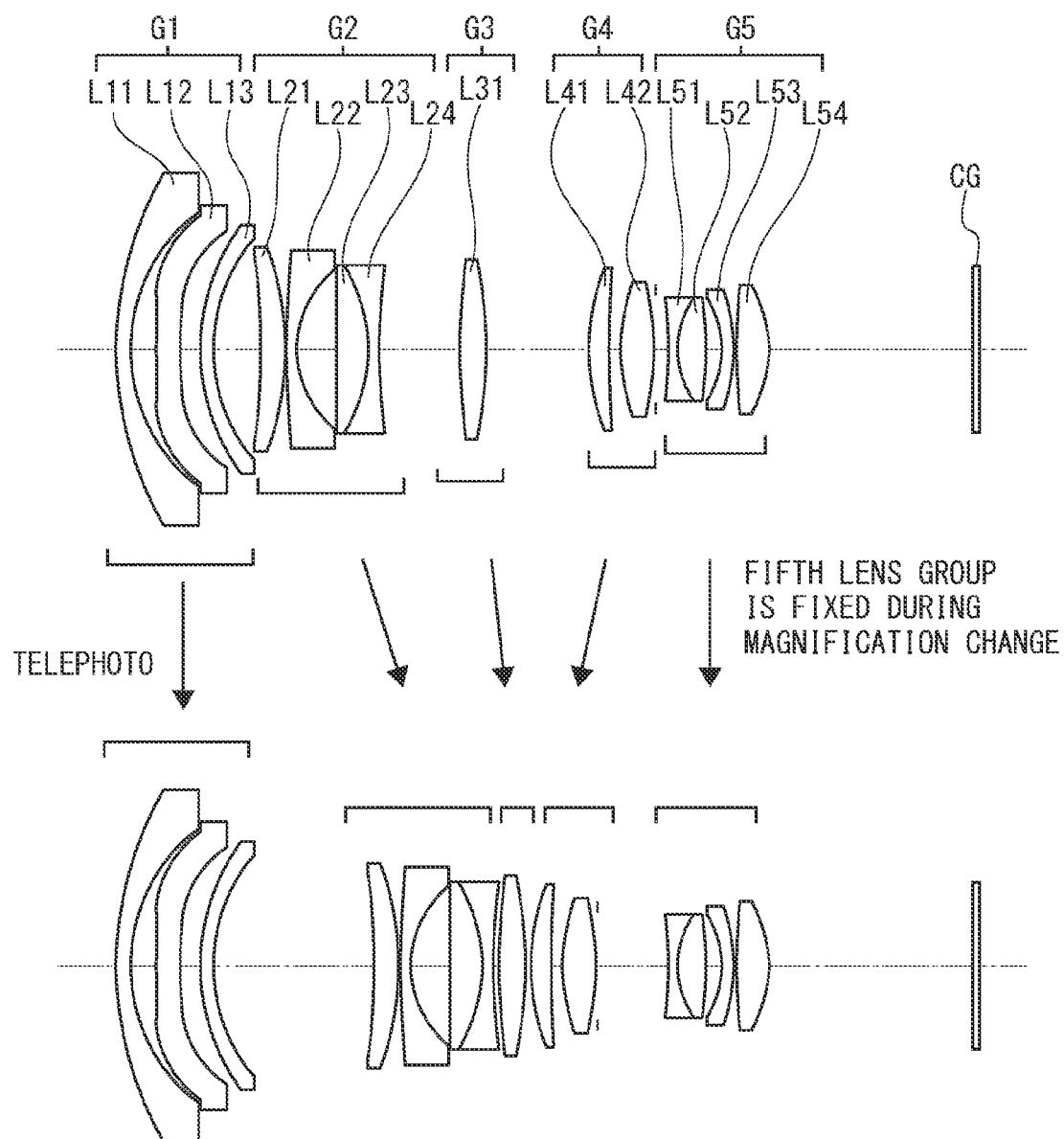
FIG. 30 is a cross-sectional view showing a configuration of a projection zoom lens according to a comparative example.

FIG. 30 is a cross-sectional view showing a configuration of the projection zoom lens according to the comparative example, based on FIG. 1.

Comparative Example

In Comparative Example, the range of the focal length of the entire system: F, the F-number, and the half field angle at the wide angle end: ωw are as follows.

F=13.0 to 19.6 mm, Fno=2.55 to 3.34, and ωw=42.1°.

Table 257 shows data on Comparative Example, based on Table 1.

TABLE 257

| SURFACE NUMBER | R | D | Nd | Vd | Lens | Group |
|---|---|---|---|---|---|---|
| 1 | 51.418 | 2.30 | 1.83400 | 37.3 | L11 | G1 |
| 2 | 26.303 | 3.95 | | | | |
| 3* | −125.028 | 4.00 | 1.53159 | 55.7 | L12 | |
| 4* | 732.970 | 3.00 | | | | |
| 5 | 32.238 | 2.00 | 1.84666 | 23.8 | L13 | |
| 6 | 26.356 | s6 | | | | |
| 7 | −118.840 | 3.87 | 1.74077 | 27.8 | L21 | G2 |
| 8 | −45.762 | 0.30 | | | | |
| 9 | 184.166 | 1.50 | 1.49700 | 81.5 | L22 | |
| 10 | 15.966 | 6.22 | | | | |
| 11 | −502.581 | 4.97 | 1.64769 | 33.8 | L23 | |
| 12 | −23.374 | 1.80 | 1.77250 | 49.6 | L24 | |
| 13 | 104.119 | s13 | | | | |
| 14 | 92.233 | 4.37 | 1.72000 | 46.0 | L31 | G3 |
| 15 | −54.778 | s15 | | | | |
| 16 | 35.578 | 3.00 | 1.69350 | 53.2 | L41 | G4 |
| 17 | 97.371 | 1.86 | | | | |
| 18 | 28.242 | 5.18 | 1.49700 | 81.5 | L42 | |
| 19 | −44.018 | 0.30 | | | | |
| 20 | INF | s20 | | | | |
| 21 | −96.119 | 1.50 | 1.83400 | 37.3 | L51 | G5 |
| 22 | 13.419 | 4.35 | 1.48749 | 70.4 | L52 | |
| 23 | −59.541 | 2.52 | | | | |
| 24 | −14.189 | 1.93 | 1.80610 | 40.9 | L53 | |
| 25 | −26.646 | 0.30 | | | | |
| 26* | 71.938 | 5.33 | 1.48749 | 70.4 | L54 | |
| 27* | −16.428 | Bf | | | | |
| 28 | INF | 1 | 1.51680 | 64.1 | CG | |
| 29 | INF | — | | | | |

"Aspherical Surface Data"

Table 258 shows "aspherical surface data".

TABLE 258

| | S3 | S4 | S26 | S27 |
|---|---|---|---|---|
| K | 0 | 0 | 0 | 0 |
| C4 | 7.8668E−05 | 8.1152E−05 | −1.0294E−05 | 1.7947E−05 |
| C6 | −1.5618E−07 | −7.1789E−08 | 2.3078E−08 | 1.4301E−07 |
| C8 | 2.4809E−10 | −1.2676E−10 | 2.5604E−10 | −7.5248E−10 |
| C10 | 2.7642E−15 | 6.7859E−13 | 6.4445E−12 | 1.1398E−11 |
| C12 | −4.8267E−16 | 7.8175E−16 | 0 | 0 |
| C14 | 4.5637E−19 | −5.5994E−18 | 0 | 0 |
| C16 | −1.5639E−22 | 4.4762E−21 | 0 | 0 |

Table 259 shows the lens group spacing: S6, S13, S15 and S20 for the wide angle end, intermediate, and the telephoto end when a projection distance is set to 1600 mm.

TABLE 259

| | S6 | S13 | S15 | S20 |
|---|---|---|---|---|
| WIDE ANGLE END | 7.36 | 12.45 | 16.12 | 1.95 |
| INTERMEDIATE | 18.19 | 4.11 | 9.19 | 6.39 |
| TELEPHOTO END | 25.20 | 0.92 | 0.80 | 10.96 |

Figure 31:
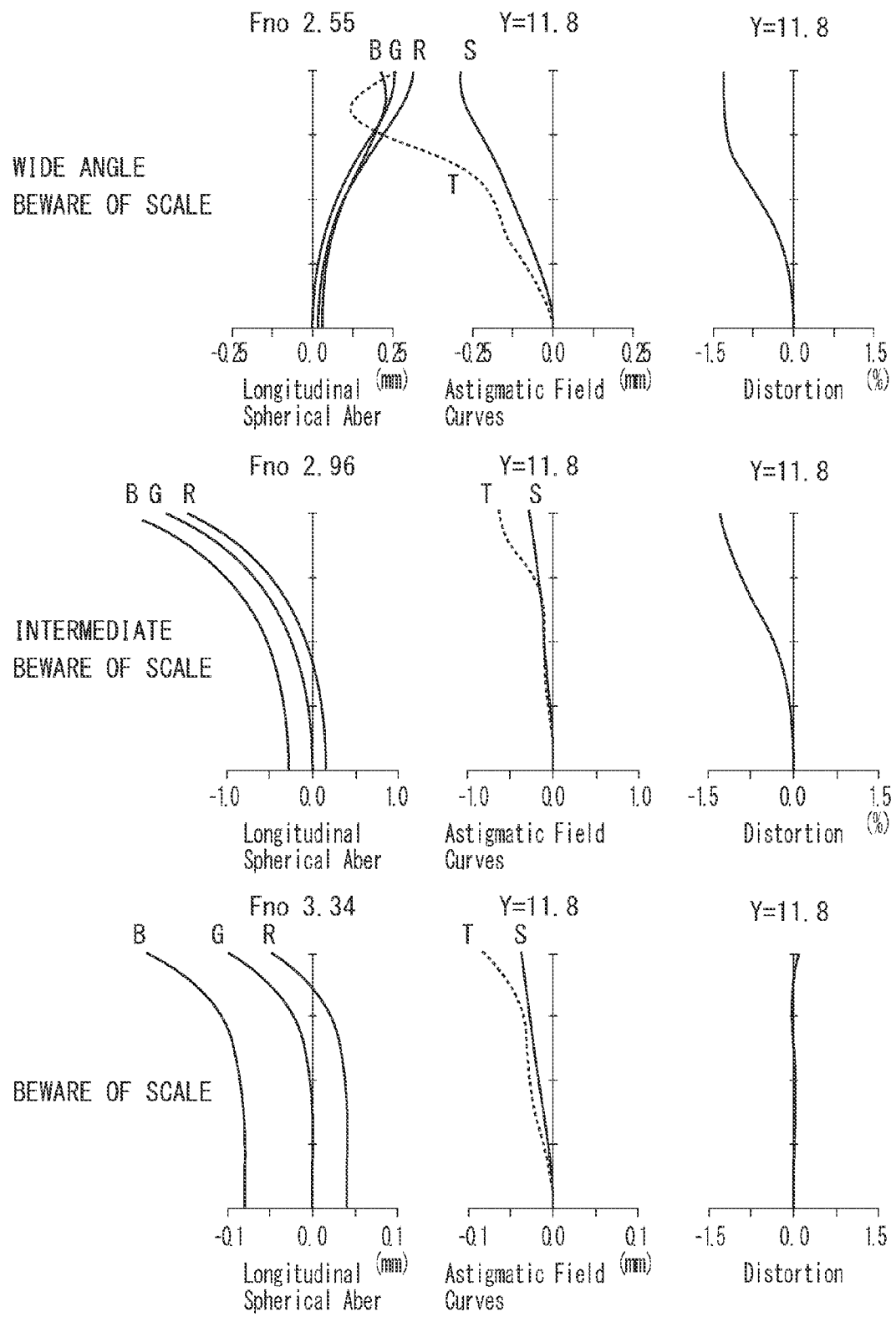
FIG. 31 is an aberration curve diagram of the projection zoom lens according to the comparative example.

FIG. 31 shows aberration diagrams of Comparative Example based on FIG. 2.

As is clear from comparison between the aberration diagrams of each of the examples and the aberration diagrams of Comparative Example, the aberrations are significantly deteriorated compared with the examples where the fifth lens group is moved toward the magnification side during magnification change.

This clearly explains the technical significance of that the "fifth lens group is moved toward the magnification side during magnification change".

In all of the projection zoom lenses of Examples 1 to 14, the half field angle at the wide angle end is a "wide field angle", which is 34 degrees or greater. Also, the first lens group G1 has negative refractive power, the second lens group G2 has negative refractive power, and the third lens group G3 has positive refractive power. In the first lens group G1, the lens surface farthest to the magnification side is convex toward the magnification side, and the lens surface farthest to the reduction side is concave toward the reduction side.

In magnification change from the wide angle end to the telephoto end, the first lens group G1 is fixed. Meanwhile, the second lens group G2 is moved to the reduction side, and the third to fifth lens groups G3 to G5 are moved to the magnification side.

Thus, a variation in aberrations during magnification change can be reduced.

Moreover, the lens farthest to the magnification side and the lens farthest to the reduction side in the first lens group are both "negative meniscus lenses".

By adopting the negative meniscus lenses as the lenses farthest to the magnification side and to the reduction side in the first lens group, the field angle can be increased.

As described in Examples 1 to 14, the first lens group G1 includes two or three lenses.

For the first lens group, lenses each having a large lens diameter are used. However, such a configuration of the first lens group including two or three lenses enables reduction in weight of the first lens group.

Such a reduction in weight can suppress the eccentricity of the lens caused by its own weight.

Also, the first lens group G1 has "an effect of correcting the astigmatism and distortion".

In the projection zoom lenses of Examples 12 and 13, the fourth lens group has the negative refractive power.

The projection zoom lenses of Examples 12 and 13 satisfy Conditions (1A-IV) to (5A-IV). In the projection zoom lenses of all the other examples except Examples 12 and 13, the fourth lens group is the "positive group" and has the positive refractive power. In these examples, Conditions (2B-IV) to (5B-IV) are satisfied together with Condition (1-IV).

In the first lens group of the projection zoom lens of the present invention, "the lens surface farthest to the magnification side is convex toward the magnification side, and the lens surface farthest to the reduction side is concave toward the reduction side".

It is preferable that the "curvature radius of the lens surface farthest to the magnification side: R1f and the curvature radius of the lens surface farthest to the reduction side: R1r" in the first lens group satisfy the following (A-IV).

$$1.3<R1f/R1r<2.1 \quad \text{(A-IV)}$$

Within the range of (A-IV), refraction amounts of the two surfaces can be kept in balance. This is effective in "suppressing the occurrence of color difference in coma aberration".

Moreover, it is preferable that a ratio fw/F1 of the focal length of the entire system at the wide angle end: fw to the focal length of the first lens group: F1 is within the range of (B-IV) below.

$$0.2<|fw/F1|<0.8 \quad \text{(B-IV)}$$

Setting fw/F1 within the range of (B-IV) makes it possible to keep the negative power of the first lens group and a power distribution of the entire projection zoom lens in good balance. This enables a good balance of aberrations.

Furthermore, it is preferable that a value of optical distortion "DISw" in an effective image circle at the wide angle end with the projection distance: 1600 mm is within the range of (C-IV) below.

$$-1.35\%<DISw<0.0\% \quad \text{(C-IV)}$$

"TV distortion" is suitable as the optical distortion within the above range.

In this case, (C-IV) is easily satisfied by disposing an "aspherical lens" in the first lens group and setting a focal length thereof: fsph within the range of (D-IV) below.

$$1.0\times10^{-3}<1/|fsph|<2.0\times10^{-2} \quad \text{(D-IV)}$$

Note that the "projection distance" means a distance between the target projection surface and the lens surface farthest to the magnification side of the projection zoom lens.

Moreover, in the projection zoom lens of each of the examples, the first lens group G1 is a focus group, the second lens group G2 is a compensator (aberration correction group), and the third lens group is a variable magnification group.

The focal length of the first lens group: F1 and the focal length of the second lens group: F2 are controlled by Condition (5-IV). However, it is preferable that a ratio of F1 to F2: F1/F2 satisfies the following Condition (a-IV).

$$0.1<F1/F2<1.0 \quad \text{(a-IV)}$$

Condition (a-IV) is effective in correcting the astigmatism and field curvature.

Also, it is preferable that the composite focal length of the first to third lens groups: f1_3w is within the range of (b-IV) below.

$$0<1/|f1\_3w|<0.14 \quad \text{(b-IV)}$$

Also, it is preferable that a ratio of the composite focal length: f1_3w to the focal length of the entire system at the wide angle end: fw is within the range of (c-IV) below.

$$0.5<|f1\_3w/fw|<8.0 \quad \text{(c-IV)}$$

When 1/|f1_3w| is within the range of (b-IV), good aberration correction is performed by the second lens group G2 during magnification change. This is effective in avoiding remaining aberrations such as coma aberration.

Setting |f1_3w/fw| within the range of (c-IV) is effective in suppressing the coma aberration and magnification chromatic aberration.

Also, it is preferable that the second lens group satisfies one or more of the following (d-IV) to (i-IV).

$$Nd2p\cdot vd2p<Nd2n\cdot vd2n \quad \text{(d-IV)}$$

$$1.70<Nd2p<2.10 \quad \text{(e-IV)}$$

$$18.0<vd2p<30.0 \quad \text{(f-IV)}$$

$$1.45<Nd2n<1.75 \quad \text{(g-IV)}$$

$$48.0<vd2n<90.0 \quad \text{(h-IV)}$$

$$1.0<|f2p/f2n|<2.0 \quad \text{(i-IV)}$$

In Conditions (d-IV) to (i-IV) described above, the meanings of respective parameter symbols are as follows.

"Nd2p" represents a refractive index of d-line of a "positive lens with the lowest Abbe number of d-line" among the positive lenses arranged in the second lens group. "vd2p" represents the Abbe number of d-line of the positive lens.

"Nd2n" represents a refractive index of d-line of a "negative lens with the highest Abbe number of d-line" among the negative lenses arranged in the second lens group. "vd2n" represents the Abbe number of d-line of the negative lens.

"f2p" represents a focal length of a "positive lens with the lowest Abbe number of d-line" among the positive lenses arranged in the second lens group.

"f2n" represents a focal length of a "negative lens with the highest Abbe number of d-line" among the negative lenses arranged in the second lens group.

"f2p2n" represents a composite focal length of the "positive lens with the lowest Abbe number of d-line" and the "negative lens with the highest Abbe number of d-line" among the lenses arranged in the second lens group.

The ranges of (d-IV) to (h-IV) are effective in suppressing the magnification chromatic aberration. Within the range of (d-IV), the coma aberration and astigmatism are in good balance.

The range of (i-IV) is effective in suppressing a variation in field curvature during magnification change.

Moreover, it is preferable to satisfy the following Condition (j-IV) together with one or more of the above conditions.

$$0.3<D3/F3 \text{ or } D4/F4<0.6 \quad \text{(j-IV)}$$

"F3" represents a focal length of the third lens group. "F4" represents a focal length of the fourth lens group. "D3" represents a travel distance of the third lens group when the magnification is changed from the wide angle side to the telephoto side. "D4" represents a travel distance of the fourth lens group when the magnification is changed from the wide angle side to the telephoto side.

Condition (j-IV) is a condition effective in enabling achievement of a zoom ratio: 1.5 times or more.

When the upper limit of Condition (j-IV) is exceeded, astigmatism on the telephoto side is likely to be increased. When the lower limit of Condition (j-IV) is exceeded, it becomes difficult to achieve the zoom ratio: 1.5 times.

By satisfying Condition (j-IV), an optimum solution for astigmatism correction is achieved even if the zoom ratio is 1.5 times or more, and an increase in field curvature can also be effectively suppressed.

All of the projection zoom lenses of Examples 1 to 14 of the invention satisfy Conditions (a-IV) to (j-IV) described above.

In Examples 1 to 11 and 14 among Examples 1 to 14, the fourth lens group has the positive refractive power. In Examples 12 and 13, the fourth lens group has the negative refractive power.

The first lens group G1 includes three lenses in Examples 1 to 11 and 14, and includes two lenses in Examples 12 and 13.

In all of Examples 1 to 14, an aspherical lens is used as the "second lens from the magnification side" within the first lens group, and the lens has aspherical surfaces on its both sides.

For the first lens group, lenses each having a large lens diameter are used. However, such a configuration of the first lens group including two or three lenses as described in the Examples enables reduction in weight of the first lens group.

Such a reduction in weight can suppress the eccentricity of the lens caused by its own weight.

Also, in Examples 1 to 14, the first lens group G1 has "an effect of correcting the astigmatism and distortion".

Moreover, in Examples 1 to 14, the first lens group G1 is configured such that "the surface farthest to the magnification side is convex toward the magnification side, and the surface farthest to the reduction side is concave".

Such a configuration can achieve an effect of "reducing a variation in field curvature and distortion" during magnification change.

In all of the projection zoom lenses of Examples 1 to 14, during magnification change from the wide angle end to the telephoto end, the first lens group G1 is fixed and the second lens group is slowly moved toward the reduction side.

Meanwhile, the third lens group is moved toward the magnification side, and the fourth and fifth lens groups are individually moved toward the magnification side.

In the projection zoom lens of each of the Examples, the first lens group G1 is a focus group, the second lens group G2 is a compensator (aberration correction group), and the third and fourth lens groups are variators.

In the third and fourth lens groups G3 and G4 as the variators, spherical aberration on the negative side and axial chromatic aberration on the negative side are generated to cancel those aberrations in the fifth group.

In this manner, the aberrations can be kept in balance as a whole.

In all of the projection zoom lenses of Examples 1 to 14, the half field angle at the wide angle end is a "wide field angle", which is greater than 34 degrees, and satisfies Condition (2-V).

Furthermore, in Examples 12 and 13, the refractive power of the fourth lens group is "negative", and the parameters in Conditions (1-V) and (2-V) all satisfy Conditions (1A-V) and (2A-V) described above.

In all of the examples except Examples 12 and 13, the refractive power of the fourth lens group is "positive", and the parameters in Conditions (1-V) and (2-V) all satisfy Conditions (1B-V) and (2B-V) described above.

During magnification change to the telephoto end, the second lens group G2 is slowly moved toward the reduction side. Thus, a variation in aberrations during the magnification change can be reduced.

Moreover, the refractive power distribution of the first to third lens groups G1 to G3 is "negative, negative and positive" where the negative lens groups precede the positive lens group.

By adopting the negative lens group preceding type, a principal ray height can be reduced and a lens effective diameter can be reduced.

Therefore, a compact projection zoom lens with a wide field angle can be realized.

Also, a "flip-up angle of luminous flux" from the second lens group to the first lens group upon image projection can be minimized.

Upon image projection, projection luminous flux (oblique ray flux) projected from the light bulb side is guided toward the first lens group from the fifth lens group.

In this event, since the first and second lens groups G1 and G2 are both negative, a divergence angle of the luminous flux from the third lens group can be naturally increased in the second and first lens groups.

Therefore, as described above, a flip-up angle of the luminous flux handed over from the second lens group to the first lens group can be minimized, and thus a divergence angle of luminous flux radiated from the first lens group can be naturally increased.

Moreover, there is achieved an effect of suppressing performance degradation caused by lens eccentricity at the time of manufacturing.

It is preferable that a ratio F1/F2 of the focal length of the first lens group: F1 to the focal length of the second lens group: F2 is within the range of (a-V) below.

$$0.1 < F1/F2 < 1.0 \quad \text{(a-V)}$$

The range of (a-V) is effective in correcting the astigmatism and field curvature.

Also, it is preferable that the composite focal length of the first to third lens groups: f1_3w is within the range of (b-V) below.

$$0 < 1/|f1\_3w| < 0.14 \quad \text{(b-V)}$$

Also, it is preferable that a ratio of the composite focal length: f1_3w to the focal length of the entire system at the wide angle end: fw is within the range of (c-V) below.

$$0.5 < |f1\_3w/fw| < 8.0 \quad \text{(c-V)}$$

When 1/|f1_3w| is within the range of (b-V), good aberration correction is performed by the second lens group G2 during magnification change. This is effective in avoiding remaining aberrations such as coma aberration.

Setting |f1_3w/fw| within the range of (c-V) is effective in suppressing the coma aberration and magnification chromatic aberration.

Furthermore, it is preferable to satisfy the following Condition (d-V).

$$0.3 < D3/F3 \text{ or } D4/F4 < 0.6 \quad \text{(d-V)}$$

"F3" represents a focal length of the third lens group. "F4" represents a focal length of the fourth lens group.

"D3" represents a travel distance of the third lens group when the magnification is changed from the wide angle side to the telephoto side.

"D4" represents a travel distance of the fourth lens group when the magnification is changed from the wide angle side to the telephoto side.

By satisfying Condition (d-V), an optimum solution for astigmatism correction is achieved even if the zoom ratio is 1.5 times or more, and an increase in field curvature can also be effectively suppressed.

In the projection zoom lenses of Examples 1 to 14, the first lens group G1 has "an effect of correcting the astigmatism and distortion".

In the first lens group G1, "the lens surface farthest to the magnification side is convex toward the magnification side, and the lens surface farthest to the reduction side is concave toward the reduction side".

It is preferable that the "curvature radius of the lens surface farthest to the magnification side: R1f and the curvature radius of the lens surface farthest to the reduction side: R1r" in the first lens group is within the range of (A-V).

$$1.3 < R1f/R1r < 2.1 \quad \text{(A-V)}$$

Within the range of (A-V), refraction amounts of the two surfaces can be kept in balance. This is effective in "suppressing the occurrence of color difference in coma aberration".

Moreover, it is preferable that a ratio fw/F1 of the focal length of the entire system at the wide angle end: fw to the focal length of the first lens group: F1 is within the range of (B-V) below.

$$0.2 < |fw/F1| < 0.8 \quad \text{(B-V)}$$

Setting fw/F1 within the range of (B-V) makes it easier to keep the negative power of the first lens group and a power distribution of the entire projection zoom lens in good balance. This enables a good balance of aberrations.

Furthermore, it is preferable that a value of optical distortion "DISw" in an effective image circle at the wide angle end with the projection distance: 1600 mm is within the range of (C-V) below.

$$-1.35\% < DISw < 0.0\% \quad \text{(C-V)}$$

"TV distortion" is suitable as the optical distortion within the above range.

In this case, (C-V) is easily satisfied by disposing an "aspherical lens" in the first lens group and setting a focal length thereof: fsph within the range of (D-V) below.

$$1.0 \times 10^{-3} < 1/|fsph| < 2.0 \times 10^{-2} \quad \text{(D-V)}$$

Note that the "projection distance" means a distance between the target projection surface and the lens surface farthest to the magnification side of the projection zoom lens.

In Examples 1 to 11 and 14, the fourth lens group has the positive refractive power. In Examples 12 and 13, the fourth lens group has the negative refractive power.

The first lens group G1 includes three lenses in Examples 1 to 11 and 14, and includes two lenses in Examples 12 and 13.

In all of Examples 1 to 14, an aspherical lens is used as the "second lens from the magnification side" within the first lens group, and the lens has aspherical surfaces on its both sides.

As described in Examples 1 to 14, the first lens group G1 includes two or three lenses.

Also, the second lens L12 from the magnification side in the first lens group G1 is made of synthetic resin.

For the first lens group, lenses each having a large lens diameter are used. However, such a configuration of the first lens group including two or three lenses enables reduction in weight of the first lens group.

Such a reduction in weight can suppress the eccentricity of the lens caused by its own weight.

Also, the first lens group G1 has "an effect of correcting the astigmatism and distortion".

In all of the projection zoom lenses of Examples 1 to 14, the first lens group G1 is fixed during the magnification change from the wide angle end to the telephoto end.

The second lens group G2 is moved toward the reduction side, and the third lens group G3 is moved toward the magnification side.

In each of the projection zoom lenses of Examples 1 to 14, one or more of the lenses in the first lens group are aspherical lenses. The projection zoom lens satisfies Conditions (1-VI) to (4-VI) and also Conditions (A-VI) to (C-VI).

Each of the projection zoom lenses of Examples 12 and 13 has the fourth lens group as a negative group and satisfies Conditions (1A-VI) to (4A-VI) and Conditions (A1-VI) to (C1-VI).

Each of the projection zoom lenses of the examples other than Examples 12 and 13 has the fourth lens group as a positive group and satisfies Conditions (1B-VI) to (4B-VI) and Conditions (A2-VI) to (C2-VI).

In the projection zoom lens of each of the examples, the first lens group G1 is a focus group, the second lens group G2 is a compensator (aberration correction group), and the third lens group is a variable magnification group.

In the projection zoom lens of the invention, the half field angle of the wide angle end is a "wide field angle", which is greater than 34 degrees. The second lens group G2 is moved toward the reduction side in magnification change to the telephoto end.

Such a configuration can reduce a variation in aberrations during the magnification change.

The satisfaction of one or more of the following Conditions (a-VI) to (k-VI) in addition to the above configuration is effective in realizing better performance of the projection zoom lens.

$$0.1 < f1/f2 < 1.0 \quad \text{(a-VI)}$$

$$0 < 1/|f1\_3w| < 0.14 \quad \text{(b-VI)}$$

$$0.5 < |f1\_3w/fw| < 8.0 \quad \text{(c-VI)}$$

$$Nd2p \cdot vd2p < Nd2n \cdot vd2n \quad \text{(d-VI)}$$

$$1.70 < Nd2p < 2.10 \quad \text{(e-VI)}$$

$$18.0 < vd2p < 30.0 \quad \text{(f-VI)}$$

$$1.45 < Nd2n < 1.75 \quad \text{(g-VI)}$$

$$48.0 < vd2n < 90.0 \quad \text{(h-VI)}$$

$$1.0 < |f2p/f2n| < 2.0 \quad \text{(i-VI)}$$

$$2.5E\text{-}04 < |f2p2n| < 2.0E\text{-}02 \quad \text{(j-VI)}$$

$$0.3 < D3/F3 \text{ or } D4/F4 < 0.6 \quad \text{(k-VI)}$$

In Conditions (a-VI) to (k-VI) described above, the meanings of respective parameter symbols are as follows.

"f1" represents a focal length of the first lens group. "f2" represents a focal length of the second lens group.

"f1_3w" represents a composite focal length of the first to third lens groups at the wide angle end. Also, "fw" represents a "focal length of the entire system" at the wide angle end.

"Nd2p" represents a refractive index of d-line of a "positive lens with the lowest Abbe number of d-line" among the positive lenses arranged in the second lens group. "vd2p" represents the Abbe number of d-line of the positive lens.

"Nd2n" represents a refractive index of d-line of a "negative lens with the highest Abbe number of d-line" among the negative lenses arranged in the second lens group. "vd2n" represents the Abbe number of d-line of the negative lens.

"f2p" represents a focal length of a "positive lens with the lowest Abbe number of d-line" among the positive lenses arranged in the second lens group.

"f2n" represents a focal length of a "negative lens with the highest Abbe number of d-line" among the negative lenses arranged in the second lens group.

"f2p2n" represents a composite focal length of the "positive lens with the lowest Abbe number of d-line" and the "negative lens with the highest Abbe number of d-line" among the lenses arranged in the second lens group.

"D3" represents a travel distance of the third lens group when the magnification is changed from the wide angle side to the telephoto side.

"D4" represents a travel distance of the fourth lens group when the magnification is changed from the wide angle side to the telephoto side.

Note that, in Condition (j-VI), "2.5E-04", for example, represents "$2.5 \times 10^{-4}$". The same goes for the following.

As described above, Conditions (d-VI) to (j-VI) among Conditions (a-VI) to (j-VI) are those specifying the materials of the lenses included in the second lens group.

In the projection zoom lens of the present invention, the second lens group G2 can be set as the "aberration correction group" and the third lens group G3 can be set as the "zoom group".

Condition (a-VI) is a condition particularly effective in satisfactory correction of astigmatism and field curvature.

When the upper limit of Condition (a-VI) is exceeded, an absolute value of the refractive power (1/f1) of the first lens group G1 is likely to be relatively reduced and the field curvature is likely to be increased.

When the lower limit of Condition (a-VI) is exceeded, the absolute value of the refractive power (1/f1) of the first lens group G1 is likely to be relatively increased and the astigmatism is likely to be increased.

By satisfying Condition (a-VI), an optimum solution for astigmatism correction is achieved, and an increase in field curvature can also be effectively suppressed.

Condition (b-VI) is an optimum range of a composite focal length of the negative first lens group G1, the negative second lens group G2 and the positive third lens group G3.

The range of Condition (b-VI) is exceeded, "aberration correction by the second lens group G2" during magnification change is not sufficiently optimized. As a result, aberrations, particularly, a large coma aberration is likely to remain.

By satisfying Condition (b-VI), the aberration correction by the second lens group G2" during magnification change can be optimized. Thus, the aberrations such as the coma aberration can be effectively prevented from remaining.

Condition (c-VI) is a condition to realize more satisfactory "coma aberration correction" over the entire variable magnification region.

When the upper or lower limit of Condition (c-VI) is exceeded, a large coma aberration is likely to occur, and magnification chromatic aberration is also likely to be increased.

By satisfying Condition (c-VI), occurrence of the coma aberration and magnification chromatic aberration can be effectively suppressed.

Condition (d-VI) is a condition to keep the magnification chromatic aberration, coma aberration and astigmatism in balance.

When Condition (d-VI) is not satisfied, a large imbalance is likely to occur particularly in the magnification chromatic aberration, coma aberration and astigmatism.

By satisfying Condition (d-VI), particularly the magnification chromatic aberration, coma aberration and astigmatism can be kept in balance.

The "negative second lens group" in the projection zoom lens of the present invention can be set as the "aberration correction group" as described above.

In this case, outside the range of Condition (e-VI), a large magnification chromatic aberration occurs, and the coma aberration and astigmatism are also likely to be increased.

By satisfying Condition (e-VI), increases in the magnification chromatic aberration, coma aberration and astigmatism can be effectively suppressed.

As is well known, a combination of crown glass (low refractive index) as a positive lens and flint glass (high refractive index) as a negative lens is generally effective in effectively performing "achromatization".

However, in the projection zoom lens of the present invention, it is preferable that the second lens group includes a high refractive index and high dispersion positive lens and a low refractive index and low dispersion negative lens, as in the case of Condition (e-VI).

Here, description is given of the case of a lens configuration of positive, negative and negative (cemented lens), which is also employed as the second lens group in Examples 1 to 14.

In this case, when a positive lens has a "high refractive index and high dispersion" and a negative lens has a "low refractive index and low dispersion", the high refractive index and high dispersion causes a large chromatic aberration in the positive lens.

Such chromatic aberration is "effectively suppressed" by the negative lens having the low refractive index and low dispersion.

Thus, the increases in the magnification chromatic aberration, coma aberration and astigmatism are effectively suppressed.

On the other hand, when the positive lens has a "low refractive index and low dispersion" and the negative lens has a "high refractive index and high dispersion", chromatic aberration which occurs in the positive lens is small, but is "magnified" by the negative lens.

For this reason, the magnification chromatic aberration, coma aberration and astigmatism are even more likely to be increased.

Condition (f-VI) is a condition effective in suppressing the magnification chromatic aberration.

As described above, a "high-dispersion material" is preferable for the positive lens in the second lens group. The use of the high-dispersion material which satisfies Condition (f-VI) can effectively suppress the occurrence of the magnification chromatic aberration.

Also, in the case of the projection zoom lens which satisfies Condition (e-VI) or (f-VI), it is preferable that a biconvex lens is adopted as the positive lens in the second lens group.

The adoption of the biconvex lens as the shape of the "positive lens with the lowest Abbe number relative to d-line within the second lens group" is effective in correcting the aberration.

When the positive lens is "not the biconvex lens", a large "variation in field curvature" is likely to occur during magnification change.

Condition (g-VI) is a condition effective in suppressing the magnification chromatic aberration. As described above, a lens made of a low-refractive-index material is preferable as the negative lens in the second lens group.

By satisfying Condition (g-VI), the occurrence of a large magnification chromatic aberration can be effectively suppressed.

Condition (h-VI) is also a condition effective in suppressing the magnification chromatic aberration. As described above, a lens made of a low-dispersion material is preferable as the negative lens in the second lens group.

By satisfying Condition (h-VI), the occurrence of a large magnification chromatic aberration can be effectively suppressed.

In the projection zoom lens which satisfies Condition (g-VI) or (h-VI), it is preferable that a "biconcave lens" is adopted as the "negative lens in the second lens group".

When the negative lens (negative lens with the highest Abbe number and a low refractive index) is "not the biconcave lens", a "large variation in field curvature" is likely to occur during magnification change.

Condition (i-VI) is an optimum solution to suppress the variation in field curvature during magnification change. By satisfying (i-VI), the variation in field curvature during magnification change can be most effectively suppressed.

Condition (i-VI) is a condition favorable to effective suppression of the occurrence of aberrations.

By satisfying Condition (j-VI), the occurrence of large aberrations can be effectively suppressed.

Condition (k-VI) is a condition effective in enabling achievement of a zoom ratio: 1.5 times or more.

When the upper limit of Condition (k-VI) is exceeded, astigmatism on the telephoto side is likely to be increased. When the lower limit of Condition (k-VI) is exceeded, it becomes difficult to achieve the zoom ratio: 1.5 times.

By satisfying Condition (k-VI), an optimum solution for astigmatism correction is achieved even if the zoom ratio is 1.5 times or more, and an increase in field curvature can also be effectively suppressed.

The projection zoom lenses of Examples 1 to 14 all satisfy Conditions (a-VI) to (k-VI) described above.

In Examples 11 to 11 and 14 among Examples 1 to 14, the fourth lens group has positive refractive power. In Examples 12 and 13, the fourth lens group has negative refractive power.

The first lens group G1 includes three lenses in Examples 1 to 11 and 14, and includes two lenses in Examples 12 and 13.

In all of Examples 1 to 14, an aspherical lens disposed in the first lens group is the second lens from the magnification side, and has aspherical surfaces on its both sides.

The magnification-side aspherical surface of the aspherical lens in the first lens group G1 in Examples 1 to 11 and 14 has a shape which is concave toward the magnification side in the vicinity of the optical axis and has an extreme value in the vicinity of 50% of the effective radius of the lens surface outward from the optical axis.

The "extreme value" is a position where a value obtained by differentiating the aspherical shape: X with respect to H reaches 0.

Since the aspherical surface is concave toward the magnification side in the vicinity of the optical axis, the position of the extreme value is where the aspherical surface sticks out the most toward the magnification side.

Therefore, the aspherical shape in this case refracts a light ray in the vicinity of the optical axis, among the "luminous flux directed toward the lens farthest to the magnification side", toward the side away from the optical axis.

Meanwhile, a light ray on the periphery of the lens surface is refracted so as to approach the optical axis.

The positive refractive power of the fourth lens group G4 is effective for such an aspherical shape to improve the performance.

The first lens group G1 in Examples 12 and 13 includes two lenses, and the second lens from the magnification side has aspherical surfaces on its both sides.

The aspherical surface in this case is convex toward the magnification side in the vicinity of the optical axis, and the aspherical shape starts to significantly bend toward the reduction side in the vicinity of 30% of the effective radius of the lens surface outward from the optical axis.

The aspherical surface in this case refracts a light ray from the reduction side so as to "approach the optical axis" from the vicinity of 30% of the effective radius of the lens to the periphery. Here, the closer to the periphery, the stronger the refraction.

The negative refractive power of the fourth lens group G4 is effective for such an aspherical shape to improve the performance.

FIGS. 46 to 59 show, on one side of the optical axis, shapes of both sides (magnification side and reduction side) of an aspherical lens in the first lens group G1 according to Examples 1 to 14.

As is clear from FIGS. 46 to 59, the aspherical surface in the first lens group G1 in Examples 1 to 14.

As described in Examples 1 to 14, the projection zoom lens, has the five-lens-group configuration including the first to fifth lens groups arranged from the magnification side toward the reduction side.

The first lens group has negative refractive power, the second lens group has negative refractive power, and the third lens group has positive refractive power.

One or more of the second to fifth lens groups are set to be negative lens groups each including four lenses or more and having negative refractive power.

Also, the refractive power arrangement of the first to fourth lenses from the magnification side among the four or more lenses included in the negative lens group is set as positive, negative, positive and negative or negative, positive, negative and positive.

The first lens group G1 is fixed during magnification change.

At least one lens group including four lenses or more and having negative refractive power is disposed as the second lens group or subsequent lens group.

The negative lens group is moved "from the magnification side to the reduction side" or "from the reduction side to the magnification side" during magnification change from the wide angle side to the telephoto side.

The first lens group G1 is a focus group, the second lens group G2 is a compensator (aberration correction group), and the third or fourth lens group is a variable magnification group.

In the projection zoom lens of Examples 1 to 14, the half field angle at the wide angle end: ω is a "wide field angle", which is greater than 34 degrees. Also, the second lens group G2 is moved toward the reduction side in magnification change to the telephoto end.

Such a configuration can reduce a variation in aberrations during the magnification change.

All of the projection zoom lenses of the examples can realize a zoom ratio of 1.45 times or more. Also, all of the projection zoom lenses of Examples 1 to 14 satisfy Conditions (1-VII) to (8-VII).

Among the projection zoom lenses of Examples 1 to 14, those of Examples 12 and 13 have the configuration in which the refractive power of the fourth lens group is set to "negative", and satisfy Conditions (1A-VII) to (8A-VII) described above.

Moreover, the projection zoom lenses of the examples other than Examples 12 and 13 have the configuration in which the refractive power of the fourth lens group is set to "positive", and satisfy Conditions (1B-VII) to (8B-VII) described above.

What is claimed is:

1. A projection zoom lens, comprising, in order from a magnification side to a reduction side:
a first lens group having negative refraction power;
a second lens group having negative refraction power;
a third lens group having positive refraction power;
a fourth lens group having positive refraction power; and
a fifth lens group,
wherein, when magnification is changed from a wide angle end to a telephoto end, the first lens group is fixed and the fifth lens group moves in an optical axis direction.

2. The projection zoom lens according to claim 1, wherein a focal length (F4) of the fourth lens group and a focal length (F5) of the fifth lens group satisfy a condition of:

$$|F4|<|F5|.$$

3. The projection zoom lens according to claim 1, wherein a focal length (F1) of the first lens group and a focal length (F2) of the second lens group satisfy a condition of:

$$|F1|<|F2|.$$

4. The projection zoom lens according to claim 1, wherein the fifth lens group has the smallest refraction power among the first, second, third, and fourth lens group.

5. The projection zoom lens according to claim 1, wherein, when the magnification is changed from the wide angle end to the telephoto end, the second lens group moves toward the reduction side, the third lens group moves toward the magnification side, and the fourth lens group moves toward the magnification side.

6. The projection zoom lens according to claim 1, wherein, when the magnification is changed from the wide angle end to the telephoto end, the fifth lens group moves toward the magnification side.

7. The projection zoom lens according to claim 1, wherein the fifth lens group has a negative refractive power.

8. The projection zoom lens according to claim 1, wherein the fifth lens group has a positive refractive power.

9. The projection zoom lens according to claim 1, wherein a composite focal length (f1_3w) of the first to third lens groups at the wide angle end satisfies a condition of:

$$0<1/|f1\_3w|<0.14.$$

10. The projection zoom lens according to claim 1, wherein a composite focal length (f1_3w) of the first to third lens groups of the first to third lens groups at the wide angle end and a focal length (fw) of an entire system at the wide angle end satisfy a condition of:

$$0.5<|f1\_3w/fw|<8.0.$$

11. The projection zoom lens according to claim 1, wherein a focal length (Fw) of an entire system at the wide angle end, a focal length of the first lens group (F1) satisfy a condition of:

$$1.2<|F1|/Fw<3.5.$$

12. The projection zoom lens according to claim 1, wherein a focal length (f1) of a lens on the most magnification side in the first lens group and a focal length (F1) of the first lens group satisfy a condition of:

$$2.0<|f1/F1|<6.5.$$

13. The projection zoom lens according to claim 1, wherein a focal length (f1) of a lens on the most magnification side in the first lens group and a focal length (Fw) of an entire system at the wide angle end satisfy a condition of:

$$2.0<|f1/Fw|<6.5.$$

14. The projection zoom lens according to claim 1, wherein a focal length (F3oF4) of the third lens group or the fourth lens group, which has a higher refractive power than the other, a focal length (Fw) of an entire system at the wide angle end satisfy a condition of:

$$0.35<F3oF4/Fw<0.70.$$

15. The projection zoom lens according to claim 1, wherein a curvature radius (R1) of a magnification side lens surface of a lens on the most magnification side in the first lens group and a curvature radius (R2) of a reduction side lens surface of the lens satisfy a condition of:

$$1.3<R1/R2<2.1.$$

16. The projection zoom lens according to claim 1, wherein a lens on the most magnification side in the first lens group and a lens on the most reduction side in the first lens group are negative meniscus lenses.

17. The projection zoom lens according to claim 1, wherein each of the third lens group and the fourth lens group is configured by one or more positive lenses, and
wherein a total number of the lenses in the third lens group and the fourth lens group is three or less.

* * * * *